United States Patent
Schmidt et al.

(10) Patent No.: US 12,409,689 B2
(45) Date of Patent: Sep. 9, 2025

(54) TRAILER JACK AND TRANSPORT SYSTEMS EMPLOYING A SPHERICAL LOAD-BEARING TRANSPORT BALL, AND SPORT, RECREATIONAL AND UTILITY TRAILER SYSTEMS AND METHODS EMPLOYING THE SAME

(71) Applicant: ORBIT JACK LLC, Windermere, FL (US)

(72) Inventors: Mark Christopher Schmidt, Windermere, FL (US); Edward Joel Rodriguez, Kissimmee, FL (US)

(73) Assignee: ORBITJACK LLC, Greenville, SC (US)

( * ) Notice: Subject to any disclaimer, the term of this patent is extended or adjusted under 35 U.S.C. 154(b) by 664 days.

(21) Appl. No.: 17/535,561

(22) Filed: Nov. 24, 2021

(65) Prior Publication Data
US 2023/0158847 A1    May 25, 2023

(51) Int. Cl.
*B60D 1/66* (2006.01)
*B62D 63/08* (2006.01)

(52) U.S. Cl.
CPC ............. *B60D 1/665* (2013.01); *B62D 63/08* (2013.01)

(58) Field of Classification Search
CPC .............................. B60D 1/665; B62D 63/08
USPC ......................................................... 280/400
See application file for complete search history.

(56) References Cited

U.S. PATENT DOCUMENTS

| | | | |
|---|---|---|---|
| 1,732,030 A | 10/1929 | Runyan | |
| 2,233,135 A | 2/1941 | Ketel | |
| 3,934,852 A | 1/1976 | Weber | |
| 4,097,840 A | * 6/1978 | Chappelle | B60S 9/04 280/766.1 |
| 4,369,439 A | 1/1983 | Broos | |
| 4,404,865 A | 9/1983 | Kim | |
| 4,464,652 A | 8/1984 | Lapson | |

(Continued)

FOREIGN PATENT DOCUMENTS

| | | |
|---|---|---|
| CN | 2889755 Y * | 4/2007 |
| GB | 2515800 | 1/2015 |

(Continued)

OTHER PUBLICATIONS

"Development of a Ball Drive Unit using Partially Sliding Rollers—An alternative mechanism for semi-omnidirectional motion", by Masaaki Kumagai, The 2010 IEEE/RSJ International Conference on Intelligent Robots and Systems, Oct. 18-22, 2010, Taipei, Taiwan (6 Pages).

(Continued)

*Primary Examiner* — Valentin Neacsu
*Assistant Examiner* — Felicia L. Brittman-Alabi
(74) *Attorney, Agent, or Firm* — THOMAS J. PERKOWSKI, ESQ., PC

(57) ABSTRACT

A trailer jack and transport system providing improved rolling and steerable motion to sport, recreational and utility trailers, when operating on diverse kinds of ground surfaces, including pavement, dirt, sand, and mud, without use of caster-style wheels. The trailer jack and transport system employs a spherical load-bearing transport ball supported within a frame assembly and configured to allow the spherical wheel to freely rotate in any orientation, on ground surfaces of a diverse nature during system operation.

43 Claims, 121 Drawing Sheets

(56) References Cited

U.S. PATENT DOCUMENTS

| | | | |
|---|---|---|---|
| 4,702,458 A | 10/1987 | Kendrick | |
| 4,978,104 A | 12/1990 | Gipson, Jr. | |
| D408,806 S | 4/1999 | Schmidt | |
| 6,439,545 B1 * | 8/2002 | Hansen | B60S 9/18 |
| | | | 254/419 |
| 6,739,601 B1 | 5/2004 | Fine | |
| 7,240,844 B2 | 7/2007 | Zhu | |
| 7,785,167 B2 | 8/2010 | Friend-Douglass | |
| 8,157,175 B2 | 4/2012 | Kotlarsky | |
| 9,010,769 B1 | 4/2015 | Munive | |
| 9,090,214 B2 | 7/2015 | Bernstein | |
| 9,211,920 B1 | 12/2015 | Bernstein | |
| 10,308,134 B2 | 6/2019 | Fontaine | |
| 11,124,201 B2 | 9/2021 | Niewiadomski | |
| 2015/0004873 A1 | 1/2015 | Schecter | |
| 2018/0362026 A1 | 12/2018 | Heimberger | |
| 2019/0064837 A1 | 2/2019 | Miller | |
| 2019/0322319 A1 | 10/2019 | Smith | |
| 2021/0009143 A1 | 1/2021 | Niewiadomski | |
| 2021/0229509 A1 | 7/2021 | Raeis Hosseiny | |

FOREIGN PATENT DOCUMENTS

| | | |
|---|---|---|
| GB | 2568879 A | 6/2019 |
| WO | 2006036913 A2 | 4/2006 |
| WO | 2018162031 | 9/2018 |

OTHER PUBLICATIONS

Jung Rotating Dollies Specification Sheets, Toolwell Website, https://toolwell.com/rotating-dollies/, Captured on Mar. 21, 2024 (11 Pages).

Screen Shots captured from Slide Show titled "The Future Tire by Goodyear—It's Spherical", http://www.Yyoutube.com, Mar. 7, 2016 (4 Pages).

Spherical Motor Eliminates Robot's Mechanical Drive System, Tech Briefs, Motion Control, Oct. 26, 2016 (1 Page).

Trailer Valet RVR Operating Manual, SuperTech S. Corp., City of Indfustry, CA, 2018 (12 Pages).

* cited by examiner

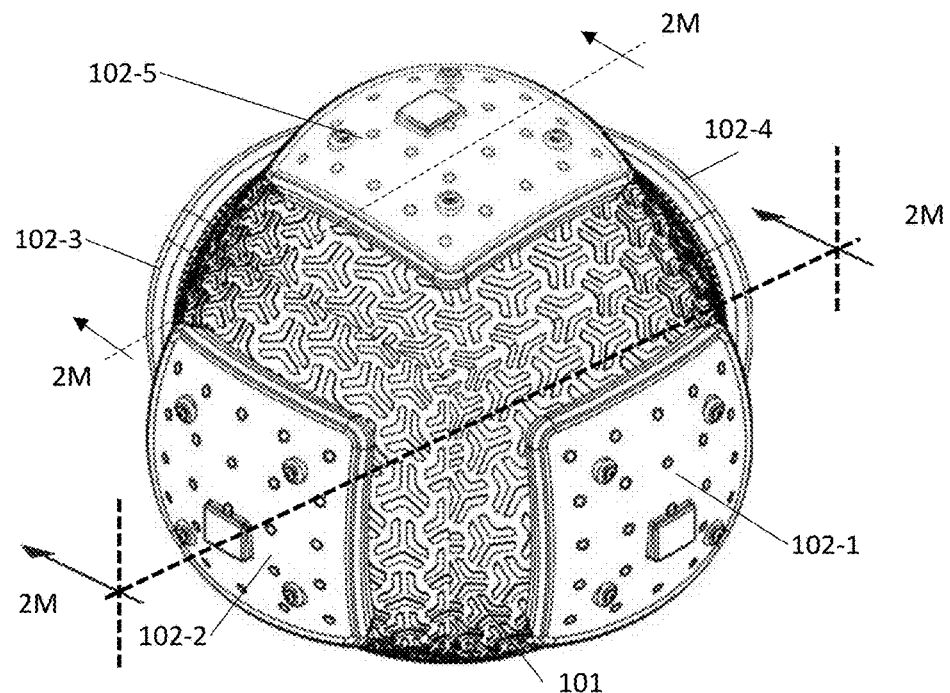
FIG. 2K
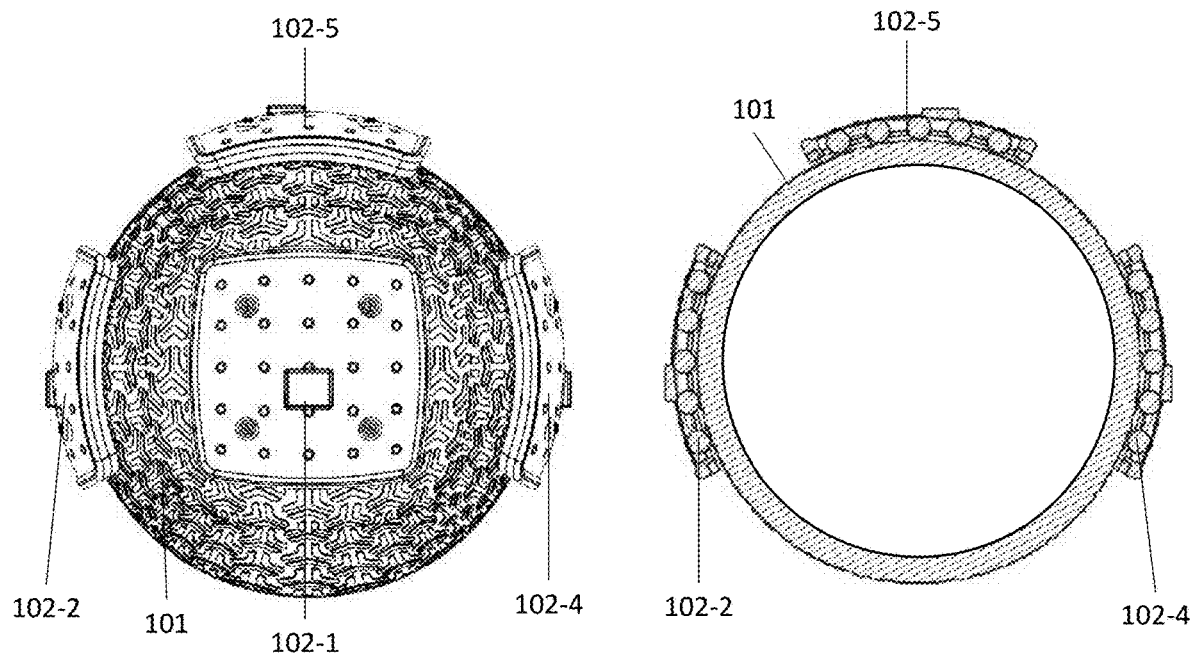
FIG. 2L
FIG. 2M

SOLID CORE
LOAD-BEARING BALL
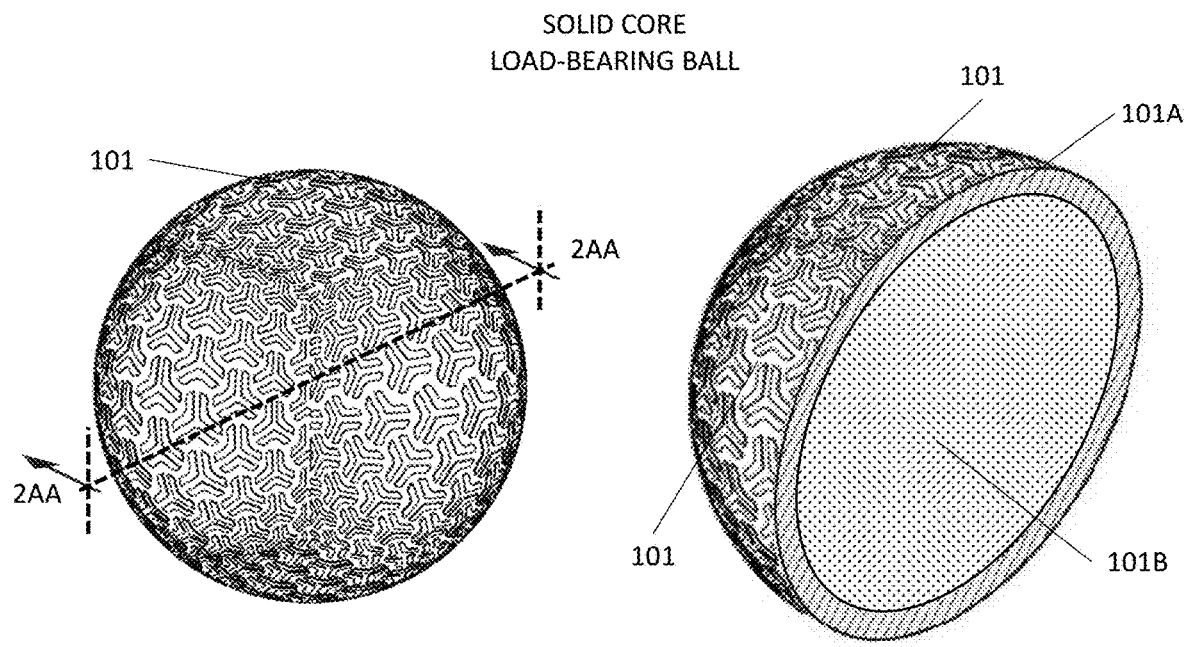
FIG. 2Z
FIG. 2AA
MULTI-LAYER CORE
LOAD-BEARING BALL
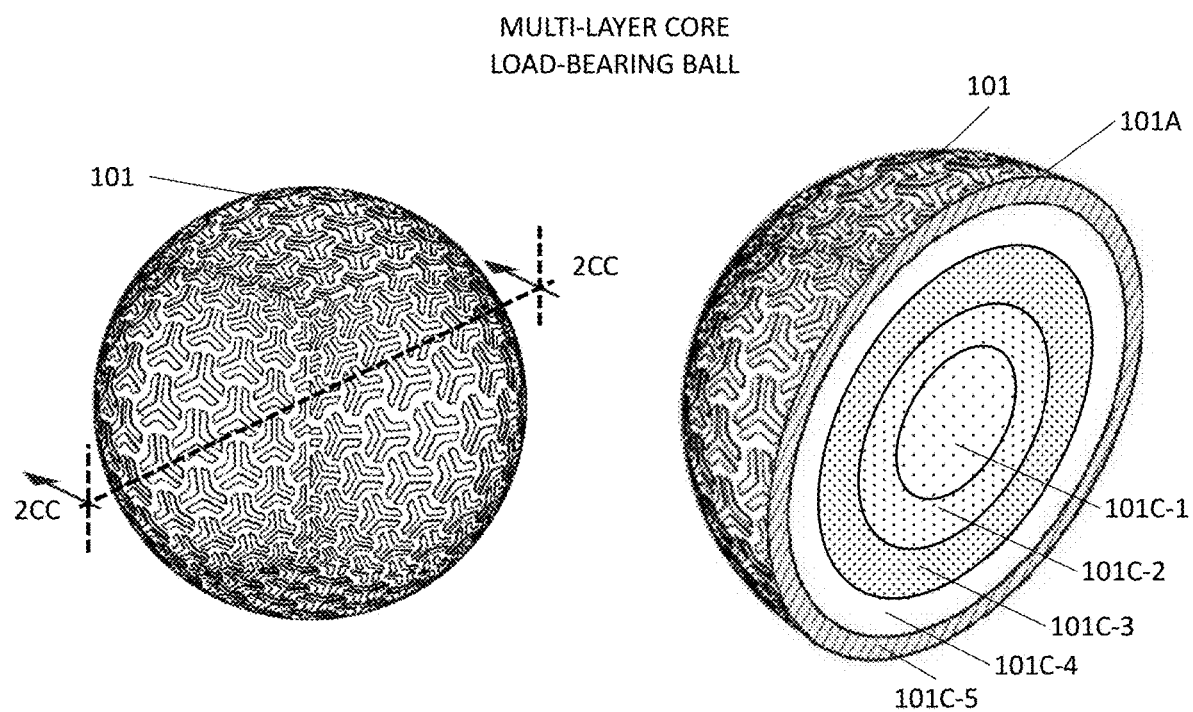
FIG. 2BB
FIG. 2CC

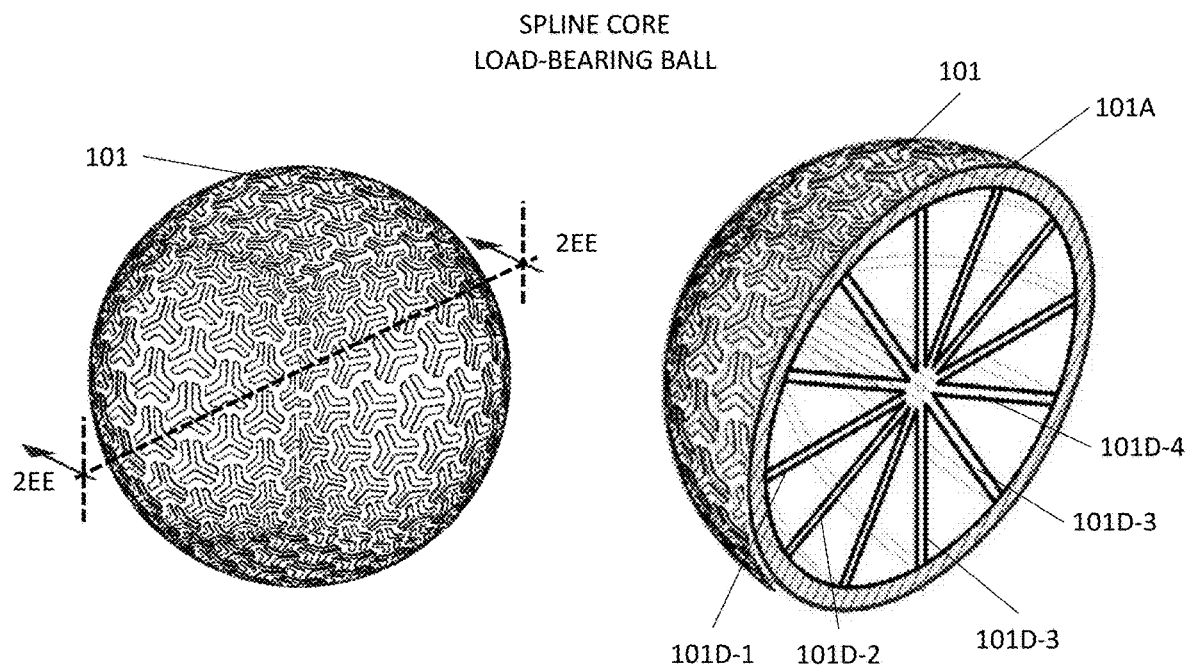
SPLINE CORE
LOAD-BEARING BALL
FIG. 2DD
FIG. 2EE
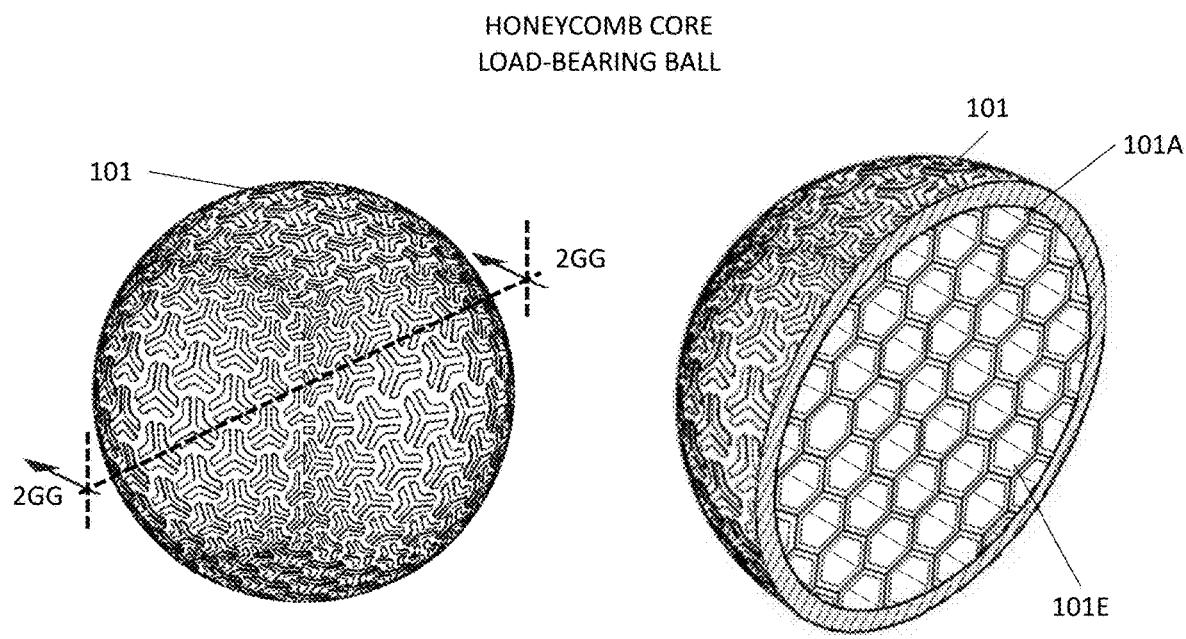
HONEYCOMB CORE
LOAD-BEARING BALL
FIG. 2FF
FIG. 2GG

TELESCOPIC SWIVEL SUB-ASSEMBLY
ARRANGED IN RETRACTED POSITION

TELESCOPIC SWIVEL SUB-ASSEMBLY
ARRANGED IN EXTENDED POSITION

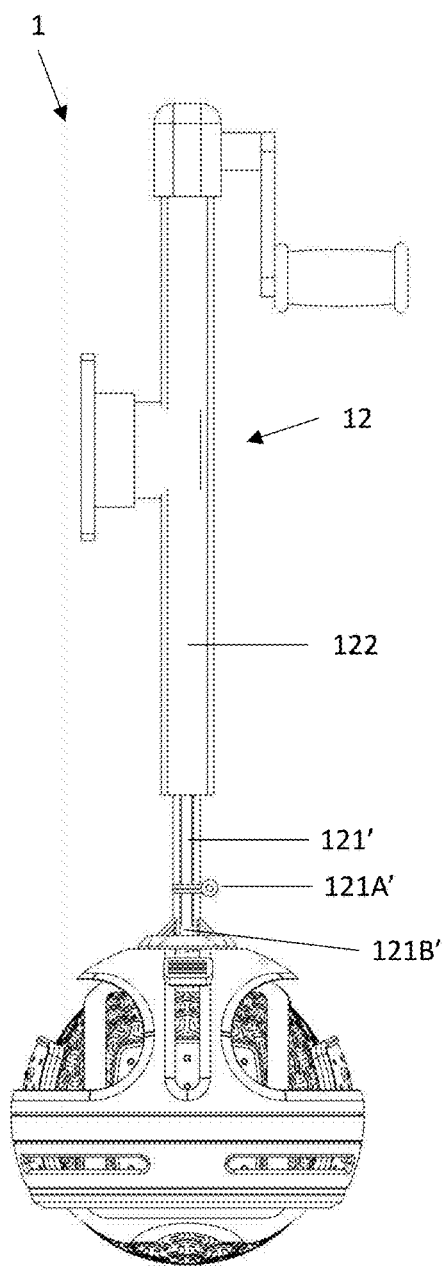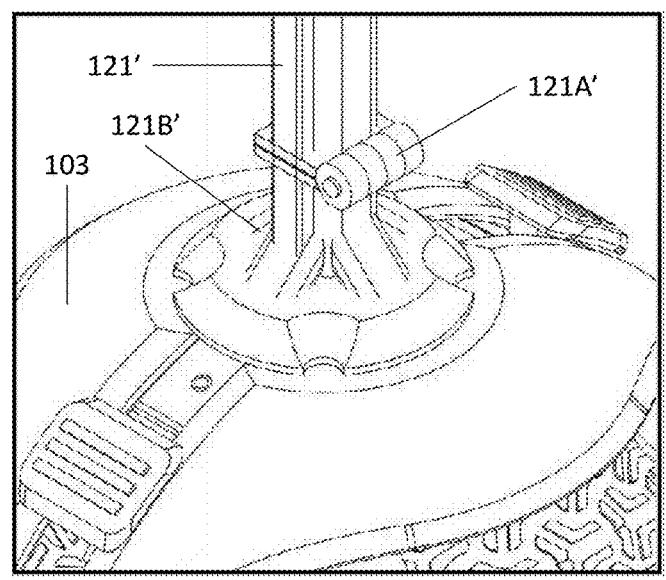
FIG. 7E
FIG. 7F

TORQUE HANDLES USED FOR POSITIONING
EXTENDABLE FOOT IN NON-ROLLING MODE

TORQUE HANDLES USED FOR POSITIONING EXTENDABLE
FOOT IN ROLLING MODE

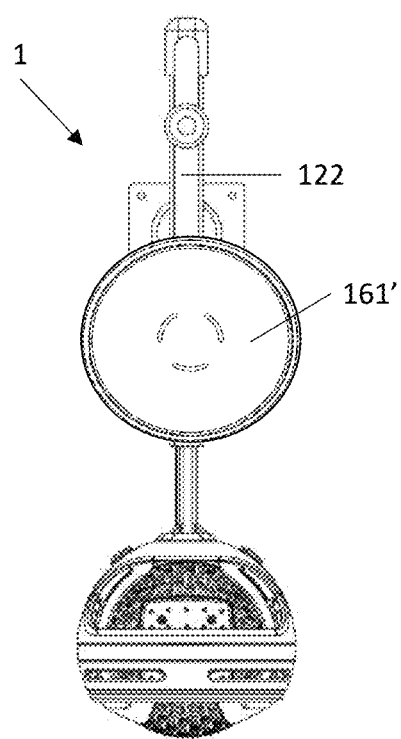
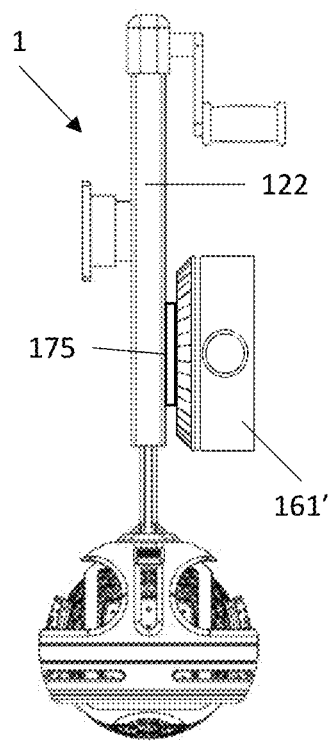
FIG. 9E    FIG. 9F
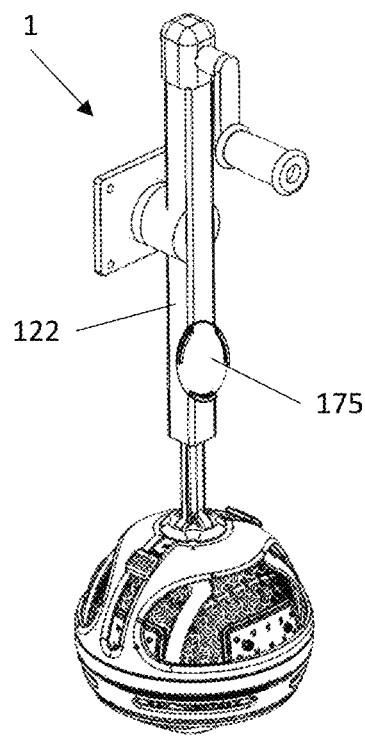
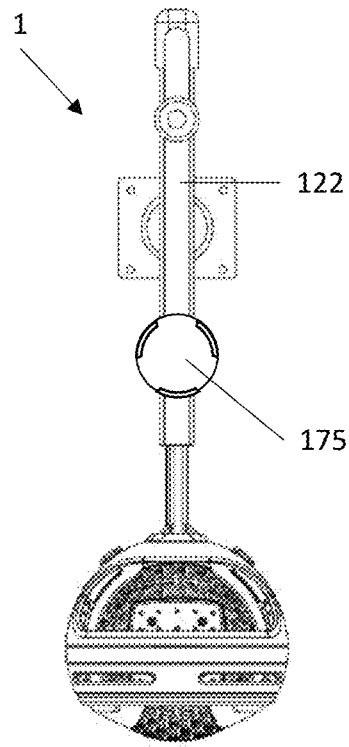
FIG. 9G    FIG. 9H

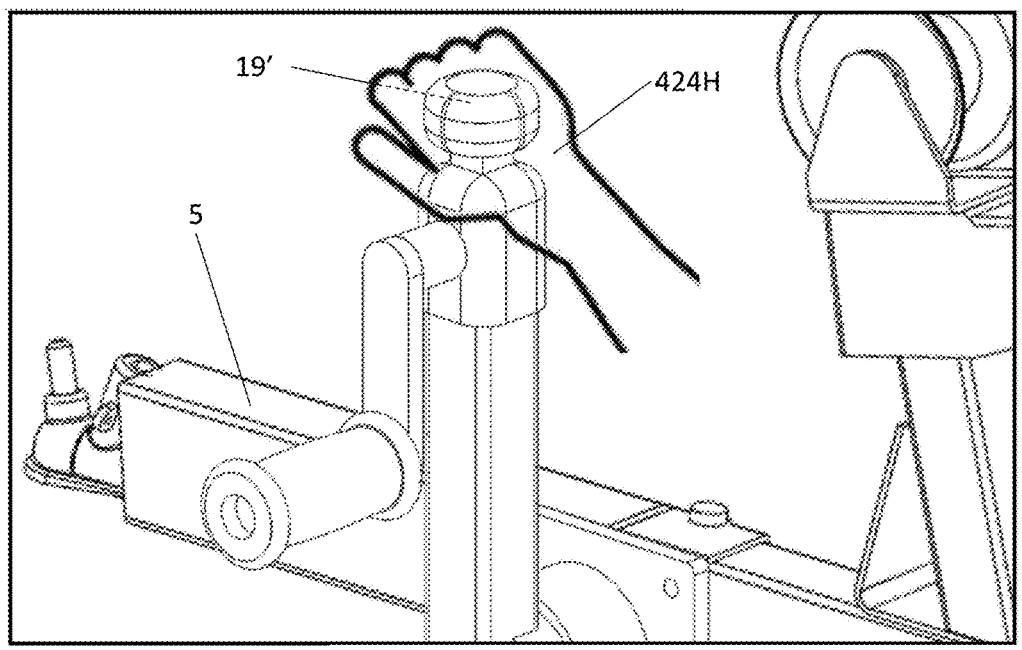
FIG. 11H
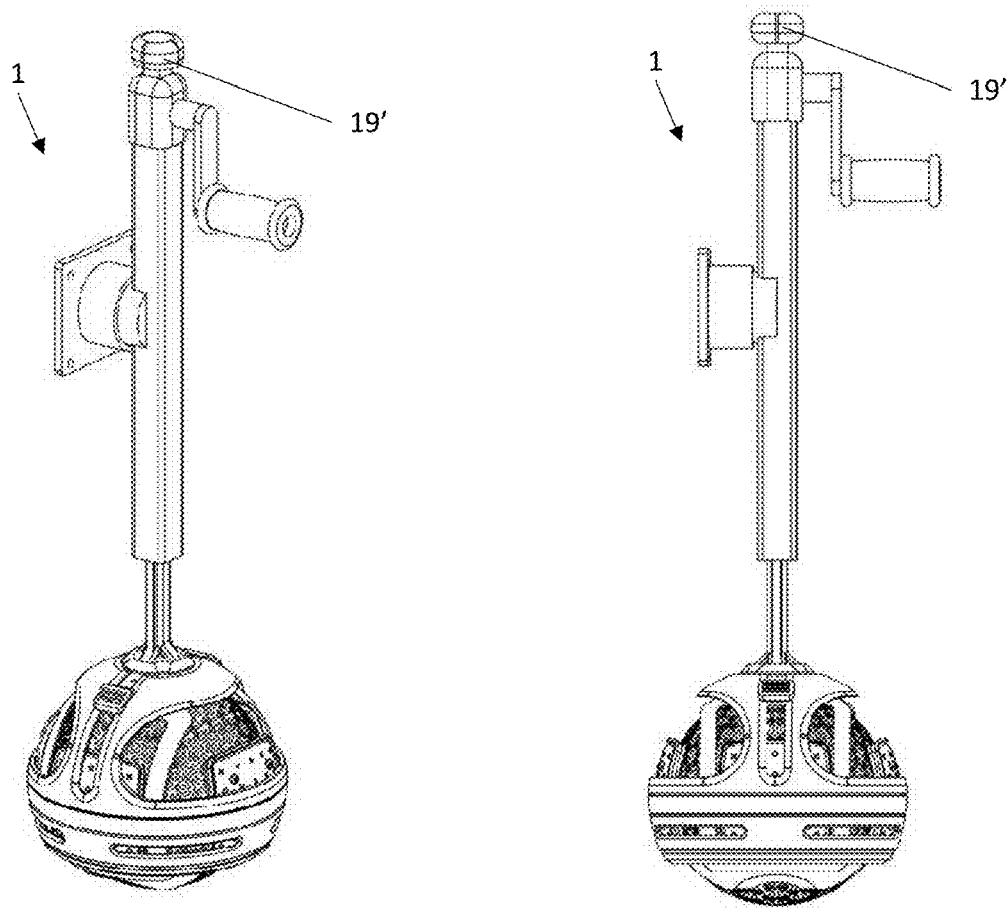
FIG. 11I
FIG. 11J

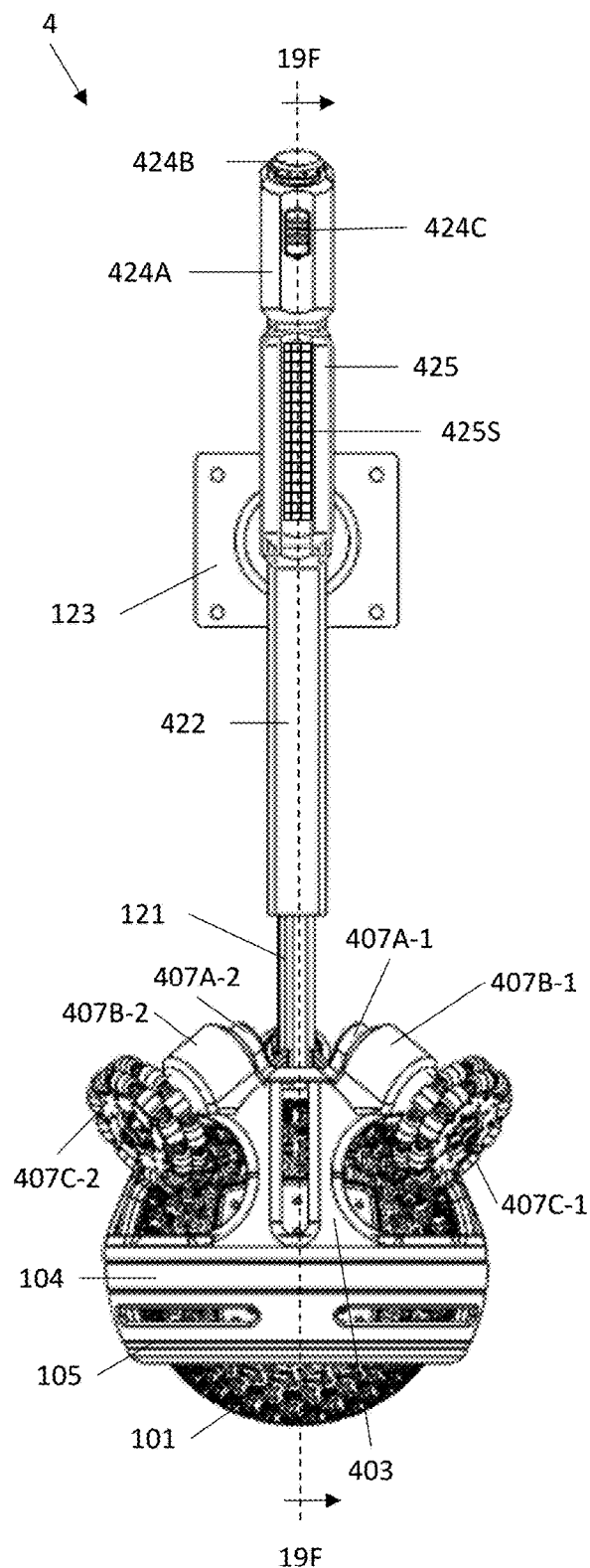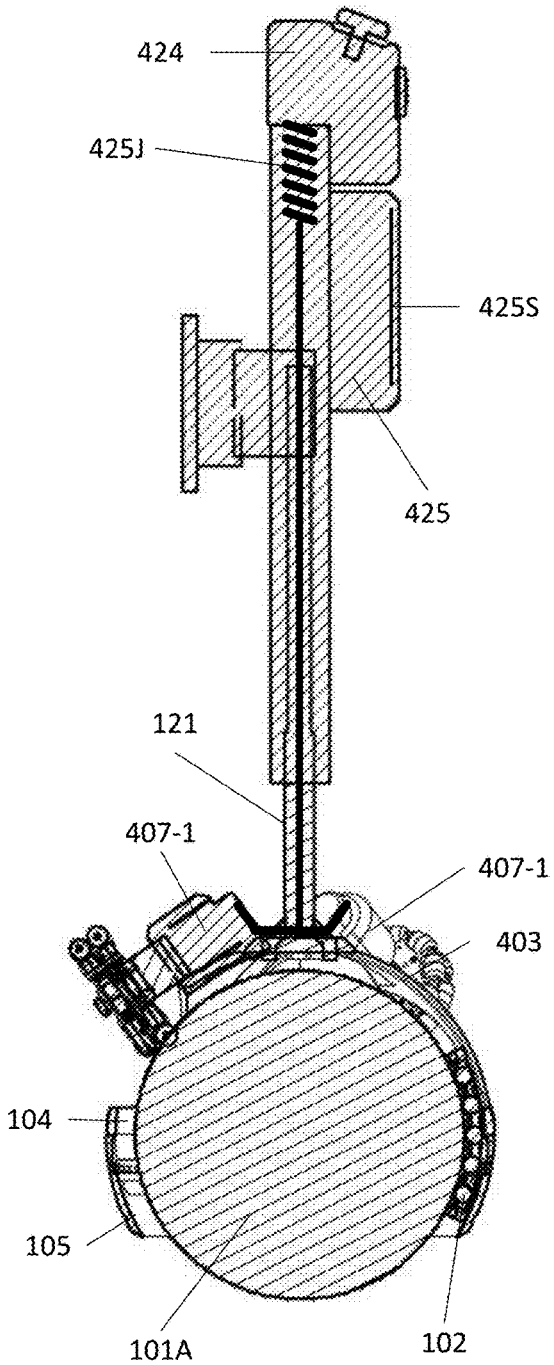
FIG. 18E                    FIG. 18F

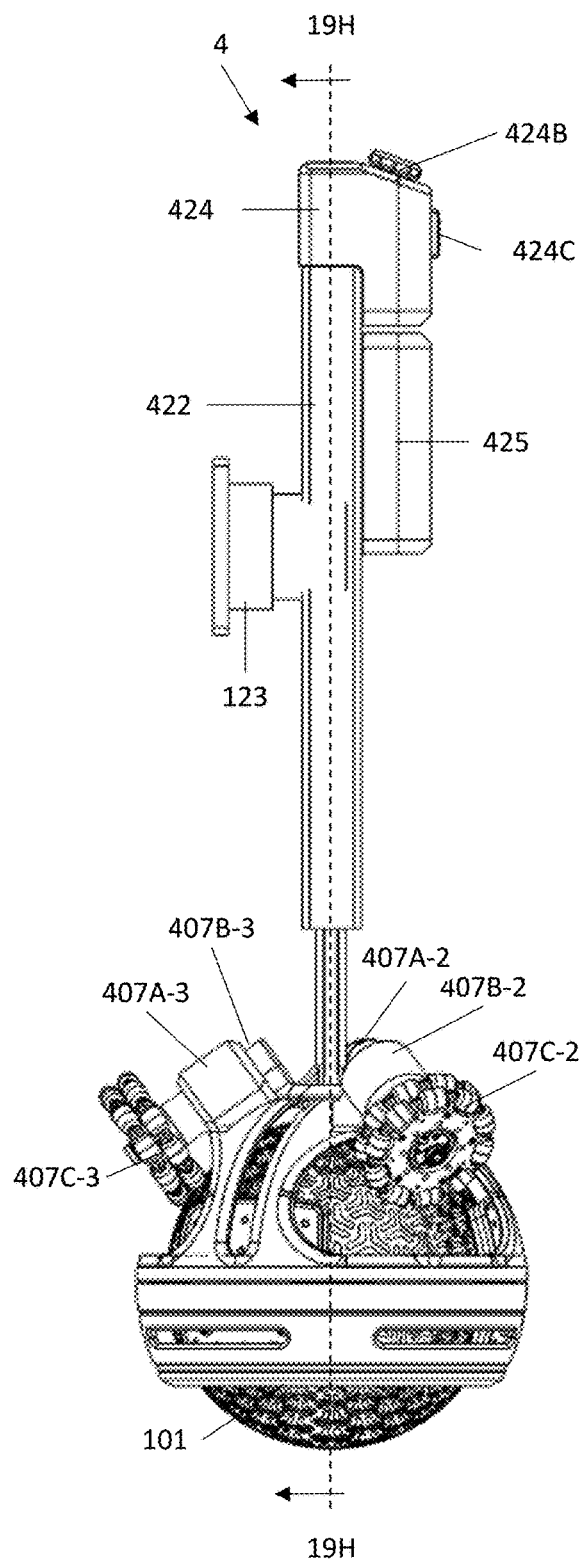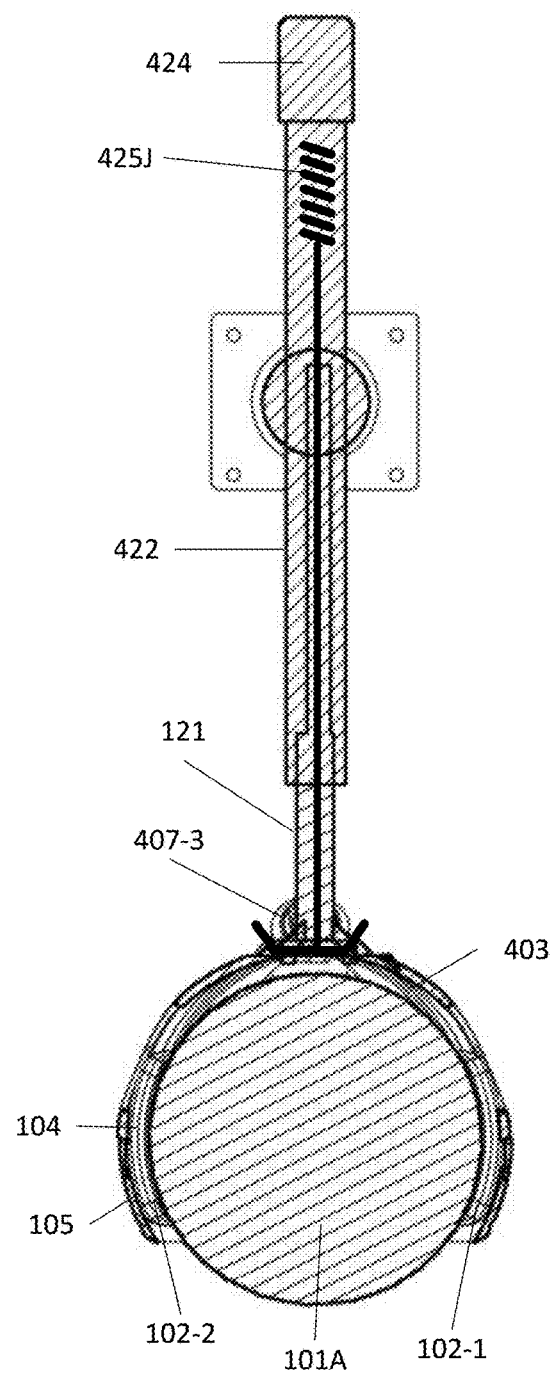
FIG. 18G
FIG. 18H

THE AUTOMATED TRAILER JACK AND TRANSPORT SYSTEM WORKS IN COOPERATION WITH THE
NAVIGATOR BEACON TO CREATE A VIRTUAL AXIS ABOUT WHICH DIRECTION OF TRAVEL IS DETERMINED

TRAILER JACK AND TRANSPORT SYSTEMS EMPLOYING A SPHERICAL LOAD-BEARING TRANSPORT BALL, AND SPORT, RECREATIONAL AND UTILITY TRAILER SYSTEMS AND METHODS EMPLOYING THE SAME

BACKGROUND OF INVENTION

Field of Invention

The present invention is related to new and improved trailer jack and transport systems and related equipment, adapted for mounting to sport, recreational and/or utility trailers designed to carry and transport personal water crafts (PWCs), boats, mobile vehicles such as motorcycles and all-terrain vehicles (ATVs), recreational and camping shelters, and portable utility equipment such as power generators, air compressors and pumping systems, transportable over solid surfaces such as concrete and asphalt, over soft surfaces such as sandy beaches and dirt roads, and within shallow muddy waters along beaches and coastal areas.

Brief Description of the State of the Art

Trailer jack and transport systems are well known in the art, and are currently provided (e.g. mounted) on the tow end or portion of sport, recreational and utility trailers designed to carry and transport personal watercrafts (PWCs), boats, mobile vehicles such as motorcycles and all-terrain vehicles (ATVs), recreational and camping shelters, and portable utility equipment such as power generators and pumping systems, capable of supporting a stationary trailer or transport over solid surfaces such as concrete and asphalt, as well as soft surfaces such as sandy beaches, dirt roads, and shallow muddy waters along beaches or coastal areas.

In general, most conventional wheeled trailer jack and transport systems employ an extendable jacking post member that is rotatably mounted to the trailer's central tow beam or framework. The extendable jacking post member is terminated with one or more caster-type wheels for enabling rolling action of the supported trailer during transport along a desired direction. Trailer jacks may also be terminated with a stationary foot for supporting the trailer in a fixed position. Typically, during trailer jacking operations, the extendable jacking post member is extendable by turning a hand-crank provided on the caster-wheel trailer jack and transport system.

The raising and lowering of the wheeled jack adjusts the height of a trailer's tongue, allowing for, among other purposes, the trailer coupler to be lifted above the ball of a trailer hitch, typically on a motor vehicle, and lowered onto the ball of the trailer hitch. The caster wheel offers a method of positioning the trailer coupler over the hitch through manually pushing, pulling, and steering of the trailer assembly. Trailer jacks may also include a means of rotating into a storage position on the trailer to which the trailer jack is fastened. This non-functioning position allows for the coupled motor vehicle and trailer to operate as a physically connected system without interference by the trailer jack wheel on the rolling surface.

Prior art trailer jacks, as they are often called, are available in a variety of sizes capable of carrying varying loads depending on the load capacity of the trailer to which it is affixed. For example: 500-pound, 1,000-pound or 2,000-pound capacities. Similarly, conventional wheeled trailer jacks also utilize a variety of wheel sizes, both in diameter and width, to accommodate load and offer motion over varied terrain. Common wheel diameters range from 6" to 8" with wheel widths ranging from 1" to 2.5". Some casters include two wheels side-by-side, offering better support on gravel or loose ground surfaces where trailers are often used. Trailer jacks can be welded onto trailers or bolted in place.

Prior art caster-style wheels such as those employed on wheeled trailer jacks utilize two axes of rotation to accomplish steerable movement. A first axis is provided about which the wheel rotates (namely the axle, or X-axis) and a second axis is provided about which the wheel assembly consisting of forks, wheel, axle, and mechanical fasteners rotate to accomplish steering (the longitudinal or Y-axis)). The two axes are offset by design, allowing a caster wheel to "swing" into the intended direction of travel as the trailer is manually moved. A disadvantage of this type of arrangement occurs when starting from a standstill, particularly when the desired travel distance of the trailer is short. While bearing the weight of the trailer (and often its contents), it is often difficult to turn the caster wheel(s) toward an intended target (e.g. a trailer hitch) while the trailer and wheeled jack assembly are not in motion. It is improbable to have "preset" the direction of travel when the trailer jack wheel was previously lowered onto the ground as the desired direction of travel of the trailer assembly is not known until its target (typically a motor vehicle's trailer hitch) has returned and later positioned in close proximity to the trailer coupler.

When coupling or de-coupling a trailer from a motor vehicle, it is desirable for the action to be as easy, quick, and safe as possible. Coupling or de-coupling a trailer is a critical but small preparation step of a larger goal: to transport goods (a boat, personal watercraft, snowmobile, lawn mower, furniture, camper, air compressor or any other equipment that does not contain its own terrestrial propulsion) over the road to a new destination (e.g. a boat launch, a beach, a trail, a worksite, a storage facility, a campsite, etc.). Users desire to spend as little time as needed on preparation. When a caster wheel is not rotated into the desired direction of travel, it takes time and energy to reposition the wheel through "banging" on the wheel, jockeying an entire trailer assembly, or through unwanted and unnecessary additional rolling travel. Some caster-style trailer jacks employ a larger distance between its steering axis (Y-axis) and its axle. Such a configuration offers smoother straight-line travel but requires a larger turning circle. Short X-to-Y axis caster styles exhibit shorter turning circles but can result in erratic straight-line travel as the caster is more prone to "wobbling" about the steering axis.

Prior art type caster-style wheeled trailer jacks, as disclosed in U.S. Pat. No. 6,439,545 to Hansen can be easily damaged or broken when excessive force is exerted onto the caster wheel assembly by a user pushing the trailer tongue in a direction for which its two-axis system is not properly positioned. Plastic wheels can break, wheel bearings can be damaged, and a jack's typically metal-and-welded components can bend or break. Pushing a wheeled trailer-jack-enabled trailer whose caster is not properly positioned can also result in damage to the trailer hitch-equipped motor vehicle. Once in motion, a caster-style wheeled jack continues in the direction the wheel is pointed unless and until sufficient lateral force is applied to the rolling trailer to cause the caster to rotate about its second axis. The momentum of a trailer equipped with a caster-style wheeled trailer jack, particularly when carrying a load, can be difficult to overcome. When traveling toward a vehicle, this can result in a collision, causing cosmetic damage to the vehicle. Worse yet, the user can get caught between the trailer and the motor vehicle, causing bodily injury.

Narrow traditional wheels have less rolling resistance and are therefore easier to get moving and keep in motion when used on a wheeled trailer jack. The disadvantage to narrow wheels carrying weight is their tendency to sink into soft ground surfaces which are common to many trailer applications, namely non-paved surfaces like sand, gravel, grass, snow, or dirt, rendering the wheel inoperable. Wider conventional wheels and dual wheel configurations have been developed to minimize this disadvantage; but such wider configurations are more difficult to directionally steer.

While improvements have been made with regard to manual trailer jacks and transport systems, there has also been an increased demand for remote controlled powered tractor-type trailer transport systems such as the Trailer Valet RVR series by Supertech S. Corp. While this system allows virtually anyone to transport trailers of many weights and sizes and offers great convenience when needing to transport trailers without a motor vehicle, it suffers from shortcomings and drawbacks such as in-place storage modes and easy-rolling manual 360-degree freewheel operation as situations may require. Consequently, prior art remote-controlled self-powered trailer transport systems fail to fulfill the diverse needs of the growing recreational vehicle (RV) industry, and the marketplace is clearly searching new and improved technologies that will increase convenient and safety.

Accordingly, there is a great need in the art for new and improved trailer jack and transport systems that provide improved steerable rolling motion to sport, recreational and utility trailers, when operating on diverse kinds of ground surfaces, including pavement, dirt, sand, and mud, without the use of caster-style wheels, while avoiding the shortcomings and drawbacks of the prior art apparatus and methodologies.

SUMMARY AND OBJECTS OF INVENTION

Accordingly, a primary object of the present invention is to provide a new and improved trailer jack and transport system that provides improved rolling and steerable motion to sport, recreational and utility trailers, when operating on diverse kinds of ground surfaces, including pavement, dirt, sand, and mud, without the use of caster-style wheels, while avoiding the shortcomings and drawbacks of the prior art apparatus and methodologies.

Another object of the present invention is to provide a new and improved trailer jack and transport system that employs a load-bearing spherical object, such as a load-bearing transport ball, as a wheeling device that is supported within a frame assembly and configured to allow the spherical wheel to freely rotate with 360 degrees of freedom, in any orientation on bearing surfaces of a diverse nature, that may come in contact with and engage a portion of the spherical wheel during system operation.

Another object of the present invention is to provide a new and improved trailer jack and transport system that employs a load-bearing spherical object, such as a load-bearing transport ball, as a wheeling device, having infinite number of virtual axes of rotation passing through a single virtual centroid located and embedded within the center of the spherical ball, about which all motion is accomplished-both directional and rotational.

Another object of the present invention is to provide a new and improved trailer jack and transport system that comprises: a semispherical framework supporting a rigid load-bearing transport ball rotatably supported by bearing surfaces mounted in bearing mounting structure, and retained in the semispherical framework by a ball retaining ring structure; a set of braking frames mounted between the semispherical framework and the bearing surfaces, and having thumb slidable levers extending through the semispherical framework, and operable to be arranged in a braking-configuration or a non-braking configuration; and a jacking assembly mounted to the top center of the semispherical framework by welding or other fastening means, and having an inner jacking post that is extendible relative to an outer jacking post member so as to raise and lower the trailer and having a rotatable mounting mechanism that allows the outer post member to rotate through at least 90 degrees of movement, from a storage configuration, to a transport configuration.

Another object of the present invention is to provide a new and improved trailer jack and transport system, wherein the height-adjusting jack assembly is centered above the spherical wheel, providing 360-degree direction of travel.

Another object of the present invention is to provide a new and improved trailer jack and transport system, wherein the height-adjusting jack assembly is offset from the center of the spherical wheel, reducing the complexities of rotating the wheeled jack into a storage position.

Another object of the present invention is to provide a new and improved trailer equipped with a trailer jack and transport system centrally mounted within the center of the A-frame portion of the trailer frame, with ground clearance created through its mounting structure and multi-position outer jacking post configuration.

Another object of the present invention is to provide a new and improved trailer jack and transport system, wherein the height-adjusting jack assembly creates the opportunity to drive the wheel through powered means for maximum convenience.

Another object of the present invention is to provide new and improved trailer jack and transport system, wherein its spherical load-bearing wheel distributes an associated trailer's tongue weight over an increasingly larger area when the ground surface is soft, providing defense over gravel, sand, snow, grass, dirt, and mud.

Another object of the present invention is to provide a new and improved trailer jack and transport system, wherein the load-bearing transport ball is supported by a set of bearing pads mounted within the semispherical framework and extending from its bottom aperture to allow rolling support on a ground surface, and embraced within a dual-sided ball braking system mounted between the load-bearing transport ball and the interior surfaces of the semispherical framework.

Another object of the present invention is to provide a new and improved trailer jack and transport system, wherein a plurality of bearing surfaces is mounted within the interior volume of a semispherical framework, for freely supporting a load-bearing transport ball, and thereby enabling 360 degrees of freedom of movement by the transport ball while mounted within the semispherical framework of the trailer jack and transport system.

Another object of the present invention is to provide a new and improved trailer jack and transport system, comprising a semispherical framework having an interior volume for rotatably mounting a load-bearing transport ball, a set of bearing pads (e.g. ball-bearing type) for supporting the load-bearing transport ball, a transport ball retaining ring member, a dual set of braking frames or pads, a transport ball surface brushing mechanism, and an hand-cranked extendable jacking member for mounting to both a trailer via an integrated trailer mount, and also to the top portion of semispherical framework.

Another object of the present invention is to provide a new and improved trailer jack and transport system, wherein the extendible jacking post member is manually operated using a handle-portion projecting from a semispherical framework.

Another object of the present invention is to provide a new and improved trailer jack and transport system, wherein a set of larger, spring-loaded ball bearing pads are mountable within a semispherical framework of the system, for supporting a load-bearing transport ball, thereby enabling 360 degrees of freedom of movement by the transport ball while mounted within the semispherical framework of the trailer jack and transport system.

Another object of the present invention is to provide a new and improved trailer jack and transport system, wherein a set of smooth, self-lubricating bearing pads are mountable within a semispherical framework of the system, for supporting a load-bearing transport ball, thereby enabling 360 degrees of freedom of movement by the transport ball while mounted within the semispherical framework of the trailer jack and transport system.

Another object of the present invention is to provide a new and improved trailer jack and transport system, employing a dual-sided ball braking system mounted between a load-bearing transport ball and the interior surfaces of a semispherical framework, for gripping the surfaces of the load-bearing transport ball during breaking operations.

Another object of the present invention is to provide such a new and improved trailer jack and transport system, wherein the semispherical framework comprises at least a pair of arching support portions (i) extending towards and integrated with a central dome portion, to which the elongated jacking member is fixedly connected, and (ii) forming an elongated arcuate slot within which a ball braking slider is adapted to move up and down, to release and lock the load-bearing transport ball.

Another object of the present invention is to provide a new and improved trailer jack and transport system, wherein a dual-sided side-pull type of transport ball braking system is provided with a mechanically-operated safety-lever wherein the braking shoes are spring-biased in their locking configuration by a pair of brake compression springs, and retracted in an upward manner by a pair of cables that are pulled against the brake compression springs, on the sides of the jacking post member assembly, and taken-up on a cable take-up mechanism mounted along the outer jacking post member, while mechanically-operated by a safety lever.

Another object of the present invention is to provide a new and improved trailer jack and transport system, wherein a dual-sided center-pull type of transport ball braking system is provided with a mechanically-operated safety-lever shown arrangeable in a locking or braking mode of operation or a non-locking or non-braking mode of operation, wherein during the locking mode of operation, the braking shoes are spring-biased in their locking configuration by a pair of brake tension springs, and protracted in an down manner while the pair of cables are not pulled against the brake tension springs and are released from a cable take-up mechanism mounted along the outer jacking post member, while mechanically-operated by the safety lever.

Another object of the present invention is to provide a new and improved trailer jack and transport system, in which a load-bearing transport ball is supported by three symmetrically spaced-apart bearing pads to evenly distribute trailer loads across these three (or more) load-bearing pads in an advantageous manner.

Another object of the present invention is to provide a new and improved trailer jack and transport system provided with an auto-tilting rotational mounting mechanism which creates an acute angle (e.g., about 5 degrees) through the use of a slanted hinge mechanism, when the system is configured in its horizontal storage mode while mounted to the frame of a trailer, and when arranged in a storage configuration, disposed adjacent the trailer frame.

Another object of the present invention is to provide a new and improved trailer for hitching to a motor vehicle equipped with a trailer hitch and equipped with a trailer jack and transport system having a storage configuration, wherein its jacking post is arranged parallel to the plane of the trailer frame, with about 5 degrees between the jack rotation plane and the trailer plane, to allow the semispherical framework portion of the system to be accommodated during its storage mode.

Another object of the present invention is to provide a new and improved trailer jack and transport system, wherein a plurality of bearing surfaces are mounted within the interior volume of a semispherical framework, for freely supporting a load-bearing transport ball, and thereby enabling 360 degrees of movement by the transport ball mounted within the semispherical framework of the trailer jack and transport system, and wherein the length of the transverse mounting post elongates automatically as the jacking member is rotated through 90 degrees relative to the trailer mounting bracket fixed to the trailer's frame, so as to displace the jacking post member away from the trailer beam during the storage configuration and accommodate the diameter of the semispherical framework member containing the transport ball.

Another object of the present invention is to provide a new and improved trailer equipped with a trailer jack and transport system having a telescoping rotational mounting mechanism so that its jacking post is arranged perpendicular to the plane of the trailer frame whereby, the telescopic rotational mounting mechanism allows a larger semispherical framework portion to be accommodated when arranged in its storage mode or configuration; wherein during the storage mode, the elongated length of the mounting mechanism maintains the semispherical framework portion and transport ball at the correct distance from the trailer's frame to enable compact and stable storage.

Another object of the present invention is to provide a new and improved trailer jack and transport system provided with a hinge mechanism installed along an extendable jacking post member mounted on a central portion of a semispherical framework, so that the semispherical framework is disposed at an angle of rotation (e.g. 5-10 degrees) about the hinge mechanism when hinged semispherical framework portion is disposed against the primary beam of the trailer during the storage configuration of the system.

Another object of the present invention is to provide a new and improved trailer equipped with the trailer jack and transport system, having a rotational mounting mechanism and a hinged jacking post member, allowing its semispherical framework to adapt to the limited storage space provided in the storage configuration.

Another object of the present invention is to provide a new and improved trailer jack and transport system mounted on a main beam of a trailer frame and when arranged in its active jack and transporting configuration, its hinged mechanism can be closed and locked along the extendable jacking post member mounted to the central portion of the semispherical framework.

Another object of the present invention is to provide a new and improved trailer jack and transport system employing a cylindrically-shaped stationary mechanism (i.e. extendible foot) installed on the bottom portion of a semispherical framework and adapted for easy rotation about its load-bearing transport ball when applying torque to the cylindrically-shaped stationary mechanism, and a means of lifting the transport ball off the ground surface after a ½ turn, to prevent the transport ball and its mounting assembly from rolling along the ground by maintaining the semispherical framework member stationary relative to the ground surface, and functioning in way similar to a safety-brake mechanism.

Another object of the present invention is to provide a cylindrical parking ring structure (i.e. extendible foot) having a first set of foldable torque generating handles adapted for arranging the cylindrical ring structure in a non-rolling configuration, and a second set of foldable torque generating handles adapted for arranging the cylindrical ring structure in a rolling configuration, wherein the first set of handles are being used to arrange the ring structure in its non-rolling configuration.

Another object of the present invention is to provide a new and improved trailer jack and transport system comprising: a semispherical framework; bearing surfaces supported within a bearing surface retention ring structure mounted within the semispherical framework; a load-bearing transport ball supported by said bearing surfaces; a mounting mechanism for mounting said semispherical framework to said trailer; and cylindrical support structure operably mounted to said semispherical framework, and having an integrated torque generation system adapted for use in rotating the cylindrical support structure to selectively raise or lower its position along the longitudinal axis of said spherical framework, and thereby lifting said load-bearing transport ball off the ground surface for long term storage applications, and lowering back down when it is desired to transport the trailer, once again; wherein the torque generation system comprises: a first set of foldable handles adapted for arranging the cylindrical ring structure in a non-rolling configuration; and a second set of foldable handles adapted for arranging the cylindrical ring structure in a rolling configuration.

Another object of the present invention is to provide a new and improved trailer jack and transport system provided with a bracket for supporting a removable chocking device (i.e., parking foot) that can be snapped onto the bottom portion of the bearing surface retention ring structure.

Another object of the present invention is to provide a new and improved trailer jack and transport system for mounting to a trailer, and having a hinged or ball-and-socket push- and pull-type handlebar mounted on the jacking post member of the trailer jack and transport system, to offer a human operator mechanical advantage when moving the trailer in a desired direction while the trailer jack and transport system is arranged in its transport configuration (i.e., mode of operation); and storing said handlebar in a downward storage direction.

Another object of the present invention is to provide a new and improved electrically powered trailer jack and transport system for mounting on a trailer and employing a set of electric motors mounted on a semispherical framework and adapted to drive a load-bearing transport ball mounted within the semispherical framework, along 360 degrees of rotational freedom, while operated under the remote control of a user.

Another object of the present invention is to provide a new and improved motor-powered trailer jack and transport system comprising a controller supporting a directional joystick, jacking controls, and controller electronics, and a jack and transport drive subsystem operably connected to the controller by way of a controller wiring harness, supporting a control and comminutions unit provided with gears, jack motor, battery module, battery charging unit, position controller, and drive motors provided with a drive motor wiring interface.

Another object of the present invention is to provide a new and improved powered trailer jack and transport system comprising (i) a load-bearing transport ball rotatably and freely mounted within a semispherical framework by way of a set of five ball-bearing bearing pads, (ii) a powered jacking post mounted and extending from the top central portion of the semispherical framework, and bearing a rotatable mounting mechanism around midsection, and supporting an outboard controller, (iii) a set of three battery-powered motors mounted on the semispherical framework, operably connection to the outboard controls, and configured for driving the transport ball into controlled motion in accordance with user operator controls provided through the onboard controller, and (iv) drive motor protective housing covers, adapted for fitting over the rotating motor drive gears for user safety protection.

Another object of the present invention is to provide a new and improved electrically powered trailer jack and transport system for mounting on a trailer, wherein a hand-supportable remote-control unit is removed from the top portion of its jacking post member and operated within the hand of a user operating the electrically-powered trailer jack and transport system.

Another object of the present invention is to provide a new and improved motor-powered trailer jack and transport system comprising: a removable remote controller supporting a directional joystick, jacking controls, controller electronics, battery storage module, and wireless communications; a releasable electrical connector; and a jack and transport drive subsystem supporting a control and communications unit provided with gears, jack motor, battery module, a battery charging unit, position controller and drive motors provided with a drive motor wiring interface.

Another object of the present invention is to provide a new and improved electrically-powered trailer jack and transport system for mounting on a trailer, wherein a mobile phone running a mobile application is operated within the hand of a user to operate and control the electrically-powered trailer jack and transport system.

Another object of the present invention is to provide a new and improved system network comprising: (i) a mobile phone equipped with a mobile application (i.e. mobile app) to control and navigate a trailer equipped with a motorized trailer jack and transport system, in various applications namely; (ii) a truck-trailer hitching operation, wherein the trailer is transported towards the hitching post of a truck or vehicle and then jacked up and placed on the hitching post/ball; and (iii) trailer parking operations, wherein the trailer is transported from a starting position in a parking lot, across the parking lot and into an intended parking space, without the need to physically handle the trailer during the parking operation.

Another object of the present invention is to provide a new and improved method of controlling and navigating a trailer equipped with a motorized trailer jack and transport system configured to serve and support various applications namely: (i) trailer-vehicle hitching operations, wherein the trailer is transported towards the hitching post of a truck or vehicle and then jacked up so the trailer hitch can be placed on the hitching post/ball; and (ii) trailer parking operations, wherein the trailer equipped with the jack and transport system is transported from a starting position in a parking lot, across the parking lot and into an intended parking space, without the need to physically handle the trailer during the parking operation.

Another object of the present invention is to provide a new and improved method of controlling a motorized trailer jack and transport system mounted to a trailer, from a stationary starting position in the parking lot, disconnected from its truck, across the parking lot surface and ultimately into a target parking space using the powered trailer jack and transport system remotely and wirelessly controlled by a mobile app running on a mobile phone in communication with the controller aboard the trailer jack and transport system Another object of the present invention is to provide a new and improved system adapted for automated IR-guided transport and docking of a utility trailer to an IR-guided hitch mounted on a mobile vehicle, using an electrically-powered trailer jack and transport system, wherein the system is adapted for remote control using a remote controller box button input or mobile phone remote input, as the case may be.

Another object of the present invention is to provide a new and improved cloud-based system network supporting a motor vehicle provided with a trailer hitch located near a trailer to be hitched to the motor vehicle, wherein the trailer is equipped with a powered trailer jack and transport system so that this trailer jack and transport system employs an intelligent GPS-tracked and IR-ranging controller on the trailer and a GPS-tracked and IR-ranging module about the hitching post on the motor vehicle, and wherein GPS-tracked and IR-ranging controller on the trailer and a GPS-tracked and IR-ranging module about the hitching post communicate together in a wireless manner and support automated transport, docking and hitching operations without user involvement after the user inputs an automated docking request to either the outboard controller or the mobile app running on the smartphone used by the user.

Another object of the present invention is to provide a new and improved cloud-based system network, enabling a person standing in a parking lot near a vehicle and boat or PWC trailer equipped with the intelligent GPS-tracking motorized trailer jack and transport system, to remotely-control the GPS-tracking motorized trailer jack and transport system using a mobile computing system, such as a smartphone running a special mobile application, and operational in a programmable mode of operation including an automated trailer parking method.

Another object of the present invention is to provide a new and improved motor vehicle having a GPS-tracking and IR ranging module mounted about a trailer hitch for receiving GPS signals and IR ranging signals and communicating dual IR-range finding signals with a trailer jack and transport system during an automated GPS-guided docking and hitching process.

Another object of the present invention is to provide a new and improved method of mounting the GPS-tracking and IR ranging hitch finding module (HFM) about the hitching post (i.e. ball) mounted on the rear end of the motor vehicle in the system intended to hitch to a trailer equipped with the trailer jack and transport system showing the communication of left and right IR ranging signals between the hitching module and the controller within the trailer jack and transport system using "time of flight" (TOF) calculation principles.

Another object of the present invention is to provide a new and improved GPS-tracking and IR ranging hitch finding module (HFM) having a centrally positioned mounting aperture, through which a hitching post is allowed to pass and then secured by a suitable fastening mechanism.

Another object of the present invention is to provide a new and improved GPS-tracking and IR ranging hitch finding module (HFM) employing left and right spaced apart IR transceiver diode spaced apart for supporting the communication of left and right channel IR signals through the IR light transmission window formed in the compact device.

Another object of the present invention is to provide a new and improved GPS-tracking and IR ranging hitch finding module having an IR light transmission window, in communication with a trailer jack and transport system during automated hitch finding, tracking and docking operations, wherein two channels of line of sight IR signal communications are maintained during system operation so that the two systems can share left and right channel distance information (L1 and L2) with the controller aboard the trailer jack and transport system and automatically generate drive control signals for the driving motors and accurately navigating the trailer towards the hitching post, using a hitch-finding algorithm running within the controller aboard the trailer jack and transport system.

Another object of the present invention is to provide a new and improved automated motor-powered trailer jack and transport system interfaced with a cloud-computing environment and wireless communication infrastructure, and comprising: a controller module mounted upon the end of the jacking post member and supporting a directional joystick, jacking controls and automated finding, docking and hitching mode button, and controller electronics, battery storage module, and wireless communications; an electrical connector; a jack and transport drive subsystem supporting a control and comminutions unit provided with gears, jack motor, and battery module, and a control and communications electronics including an IR finding transceiver, a battery charging unit and a position controller, and drive motors provided with a drive motor wiring interface; and cloud computing and wireless data communication infrastructure.

Another object of the present invention is to provide a new and improved method of automated docking and hitching of a trailer to a hitching post on a motor vehicle, using an automated and electrically-powered trailer jack and transport system mounted to the trailer, initiated by depressing a hard-key button on the outboard controller.

Another object of the present invention is to provide a new and improved method of automated docking and hitching of a trailer to a hitching post on a motor vehicle, using an automated and electrically-powered trailer jack and transport system mounted to the trailer, initiated by depressing a button on the mobile phone app controller.

Another object of the present invention is to provide a new and improved automated method of hitching a trailer to a motor vehicle using an automated trailer jack and transport system employing an intelligent GPS-tracked and IR-ranging controller on the trailer and a GPS-tracked and IR-ranging module about the hitching post on the motor vehicle, during wireless and automated transport, docking and hitching operations.

Another object of the present invention is to provide a new and improved trailer equipped with a GPS-tracking motorized trailer jack and transport system having a GPS-tracking trailer module mounted on the rear of the trailer and in wireless (Bluetooth) communication with the GPS-tracking motorized trailer jack and transport system mounted on the front of the trailer for automatically transporting from a starting position in a parking lot, across the parking lot and into an intended parking space, and the GPS-coordinates of the trailer's boundaries and destination parking space are captured prior to automated parking operations so as to enable automated GPS-guided transport of the trailer from a starting position in a parking lot, across the parking lot, and into an intended destination parking space, using GPS-tracking and navigation methods without the need to physically handle the trailer during the parking operation.

Another object of the present invention is to provide n new and improved automated trailer jack and transport system configured and working in cooperation with a GPS-tracking and LIDAR-mapping navigator beacon module mounted to the rear of the trailer, so as to establish and maintain a virtual trailer navigation axis, passing through the trailer, and about which the spatial boundaries of the trailer are defined and managed within local databases and cloud-based servers, for use to park the trailer into a destination parking space while avoiding collisions with neighboring with a GPS-tracking and LIDAR-mapping navigator beacon module to detect obstacles.

Another object of the present invention is to provide an automated motor-powered trailer jack and transport system interfaced with a cloud-computing environment and wireless data communication infrastructure, and comprising: a wireless controller module mounted upon the end of the jacking post member and supporting a directional joystick, jacking controls and automated finding, docking and hitching mode button, and controller electronics, battery storage module, and wireless communications; a releasable electrical connector; a jack and transport drive subsystem supporting a control and communications unit (CCU) provided with gears, jack motor, and battery module, battery recharging module, and control and communications electronics including a processor, firmware, and memory (supporting all functions of the system), a dual-channel IR hitch finding module, a battery charging unit and a position controller, GPS signal receiver with antenna for receiving and processing GPS positioning signals, WWAN module, Bluetooth module, gears, jack motor, battery, battery recharging module, and solar panel for recharging battery, and drive motors provided with drive motors and a drive motor wiring interface; a GPS navigator beacon for mounting on rear of trailer provided with a GPS receiver and antenna, a Bluetooth communication module, a processor, firmware and memory, and LIDAR ToF range finder with 180 degree FOV; and cloud computing and wireless data communication infrastructure.

Another object of the present invention is to provide a new and improved GPS-tracking and LIDAR-mapping navigator beacon module mounted to the rear of the trailer to establish and maintain a virtual trailer navigation axis, passing through the central axis of the trailer, while avoiding collisions with neighboring objects.

Another object of the present invention is to provide a new and improved method of automatic parking of a registered trailer that is equipped with the automated trailer jack and transport system and GPS navigator beacon.

Another object of the present invention is to provide a new and improved method of registering GPS coordinate maps of a trailer equipped with the automated trailer jack and transport system, destination parking spaces, and keep out (i.e., obstacle) zones, for storage in a network database system on a cloud-based system network.

Another object of the present invention is to provide a new and improved method for training the cloud-based trailer jack and transport system while configured in an automated learning mode so as to automatically capture and store the GPS coordinates of a trailer and parking locations where the trailer has been parked by a human driver during training operations.

Another object of the present invention is to provide a new and improved automated method of parking a trailer equipped with an automated cloud-based trailer jack and transport system, wherein the automated trailer jack and transport system is installed on the trailer, and configured in a storage mode, uses a mobile app on a mobile phone to learn and record a GPS-specified parking pathway; then the user decouples trailer and automated trailer jack and transport system from tow vehicle; and when operating the trailer jack and transport system in its automated parking mode, stored GPS coordinates are used to automatically guide and transport the trailer safely to its intended parking location without the use of a human driver.

Another object of the present invention is to provide a new and improved personal watercraft (PWC) trailer equipped with the trailer jack and transport system having storage and transport modes of operation.

Another object of the present invention is to provide a new and improved trailer jack and transport system for mounting to the frame of a sport (e.g. personal watercraft or PWC) trailer, and arrangeable in (i) a jack and transport configuration, with the load-bearing transport ball contacting and supported upon a ground surface such as concrete, sand and/or muddy water, and (ii) a storage configuration where the load-bearing transport ball is stored securely against the trailer frame, without obstructions.

Another object of the present invention is to provide a new and improved snowmobile trailer equipped with a trailer jack and transport system having storage and transport modes of operation.

Another object of the present invention is to provide a new and improved trailer jack and transport system for mounting to the frame of a snow-mobile trailer, and arrangeable in (i) a jack and transport configuration, with the load-bearing transport ball contacting and supported upon a ground surface such as concrete, sand and/or muddy water, and (ii) a storage configuration where the load-bearing transport ball is stored securely against the trailer frame, without obstructions.

Another object of the present invention is to provide a new and improved multi-axle boat trailer equipped with the trailer jack and transport system having storage and transport modes of operation.

Another object of the present invention is to provide a new and improved trailer jack and transport system for mounting to the frame of a multi-axle boat trailer and arrangeable in (i) a jack and transport configuration, with the load-bearing transport ball contacting and supported upon a ground surface such as concrete, sand and/or muddy water, and (ii) a storage configuration where the load-bearing transport ball is stored securely against the trailer frame, without obstructions.

Another object of the present invention is to provide a new and improved camper or recreational vehicle (RV) trailer equipped with a trailer jack and transport system having storage and transport modes of operation.

Another object of the present invention is to provide a new and improved trailer jack and transport system for mounting to a frame of a camping and/or recreational vehicle (RV) trailer, and arrangeable in (i) a jack and transport configuration, with the load-bearing transport ball contacting and supported upon a ground surface such as asphalt, dirt, and and/or snow, and (ii) a storage configuration where the load-bearing transport ball is stored securely against the trailer frame, without obstructions.

Another object of the present invention is to provide a new and improved flatbed trailer equipped with a trailer jack and transport system having storage and transport modes of operation. Another object of the present invention is to provide a new and improved trailer jack and transport system for mounting to the frame of a utility trailer carrying an industrial tool such a power generator, air compressor and/or other tool for doing work on a job or construction site, and arrangeable in (i) a jack and transport configuration, with the load-bearing transport ball contacting and supported upon a ground surface such as concrete, sand and/or muddy water, and (ii) a storage configuration where the load-bearing transport ball is stored securely against the trailer frame, without obstructions Another object of the present invention is to provide a new and improved transportable system comprising a platform of rigid construction, comprising: at least three corners, each having a load-bearing transportation ball construction top-mounted through the top surface of each platform corner, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.), capable of carrying and transporting a heavy cylindrical beer keg or barrel across a lawn surface Another object of the present invention is to provide a new and improved trapezoidal transportable system comprising a platform of rigid construction, comprising: four corners, each having a load-bearing transportation ball construction edge-mounted to the side surface of each platform corner, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.) capable of carrying and transporting a heavy object, such as barbeque gas grill, across a lawn surface.

Another object of the present invention is to provide a new and improved powered and remote controlled multi-wheeled transport system consisting of a trailer hitch or other means of coupling to a trailer for transport of said trailer and contents in tight spaces without the use of a traditional motor vehicle (e.g., car or truck).

These and other objects will become more apparent hereinafter in view of the Detailed Description and pending Claims to Invention.

BRIEF DESCRIPTION OF THE DRAWINGS

In order to understand the Objects more fully, the following Brief Description of the illustrative embodiments should be read in conjunction with the accompanying Drawings, wherein:

FIG. 2K is a perspective view the load-bearing transport ball supported by the bearing surfaces (e.g., ball-bearing pads) installed in the trailer jack and transport system of the first illustrative embodiment shown in FIG. 2B, shown removed from its semispherical framework, dual-sided ball braking system, and retaining ring structure for purposes of exposition and illustration;

FIG. 2L is an elevated side view the load-bearing transport ball supported by the bearing surfaces (e.g., ball-bearing pads) installed in the trailer jack and transport system of the first illustrative embodiment shown in FIGS. 2B and 2K, shown with its semispherical framework, dual-sided ball braking system, and retaining ring structure removed for purposes of exposition and illustration;

FIG. 2M is a cross-sectional view of the load-bearing transport ball supported by the bearing surfaces (e.g., ball-bearing pads) installed in the trailer jack and transport system of the first illustrative embodiment shown in FIGS. 2B and 2K, taken along viewing line 2M-2M in FIG. 2K;

FIG. 2Z is a perspective view of a first illustrative embodiment of the load-bearing transport ball of the present invention, characterized by having a solid-core fabricated from durable material that can withstand the expected loads bearing down on the transport ball during operation;

FIG. 2AA is a cross-sectional view of the first illustrative embodiment of the load-bearing transport ball taken along viewing line 2AA-2AA shown in FIG. 2Z;

FIG. 2BB is a perspective view of a second illustrative embodiment of the load-bearing transport ball of the present invention, characterized by having a multi-layer core fabricated from different layers of durable material designed to withstand the expected loads bearing down on the transport ball during operation;

FIG. 2CC is a cross-sectional view of the second illustrative embodiment of the load-bearing transport ball taken along viewing line 2CC-2CC shown in FIG. 2BB;

FIG. 2DD is a perspective view of a third illustrative embodiment of the load-bearing transport ball of the present invention, characterized by having a spline-core fabricated from durable material that can withstand the expected loads bearing down on the transport ball during operation;

FIG. 2EE is a cross-sectional view of the third illustrative embodiment of the load-bearing transport ball taken along viewing line 2EE-2EE shown in FIG. 2DD;

FIG. 2FF is a perspective view of a fourth illustrative embodiment of the load-bearing transport ball of the present invention, characterized by having a honeycomb-core fabricated from durable material that can withstand the expected loads bearing down on the transport ball during operation;

FIG. 2GG is a cross-sectional view of the fourth illustrative embodiment of the load-bearing transport ball taken along viewing line 2GG-2GG shown in FIG. 2FF;

FIG. 2HH is a perspective view of a fifth illustrative embodiment of the load-bearing transport ball of the present invention, characterized by having a hollow-core fabricated from durable material that can withstand the expect loads bearing down on the transport ball during operation;

FIG. 2II is a cross-sectional view of the fourth illustrative embodiment of the load-bearing transport ball taken along viewing line 2II-2II shown in FIG. 2HH;

FIG. 7E is a plan view of the trailer jack and transport system of the present invention as shown in FIG. 7A, having a rotational mounting mechanism and modified with a hinged jacking post member, and being shown rotatably arranged in its transport configuration, but removed from its trailer for purposes of illustration;

FIG. 7F is an enlarged view of the trailer jack and transport system of the present invention as shown in FIG. 7E, wherein the hinged jacking post is arranged perpendicular to the plane of the semispherical framework with its jacking post hinge in a closed state;

FIG. 9E is a front elevated side view of the trailer jack and transport system of the present invention shown in FIG. 9C, showing its cylindrical parking foot device stored on the jacking post portion of the system;

FIG. 9F is a side elevated side view of the trailer jack and transport system of the present invention shown in FIG. 9C, showing its cylindrical parking foot device stored on the bracket fixedly attached to the jacking post portion of the system;

FIG. 9G is a first perspective view of the trailer jack and transport system of the present invention shown in FIG. 9, showing its cylindrical parking foot device removed from the bracket of the jacking post portion of the system;

FIG. 9H is an elevated front view of the trailer jack and transport system of the present invention shown in FIG. 9C, showing its cylindrical parking foot device removed from the jacking post portion of the system;

FIG. 11H is a perspective partially fragmented view of the trailer jack and transport system shown mounted in FIG. 11A, showing its push-type ball assembly configured for and being manually pushed in a forward direction (e.g., toward the trailer hitch);

FIG. 11I is a perspective view of the trailer jack and transport system of FIG. 11H showing the push-type ball assembly for manually pushing, pulling and/or steering the trailer equipped with the trailer jack and transport system;

FIG. 11J is an elevated side view of the trailer jack and transport system shown in FIG. 11I:

FIG. 12A is a perspective view of the trailer jack and transport system of the alternative embodiment of the present invention shown in FIG. 13A, shown arranged in its transport mode and being used to transport and jack a trailer during the hitching of the trailer to a trailer hitch and ball mounted on a mobile vehicle such as a pickup truck;

FIG. 12B is a perspective view of the trailer jack and transport system of the alternative embodiment of the present invention shown in FIG. 13A, shown arranged in its storage mode, after the trailer has been completely hitched to of the trailer hitch of the mobile vehicle;

FIG. 12C is a plan view of the trailer jack and transport system of the alternative embodiment of the present invention shown in FIG. 13A, shown arranged in its transport mode and being used to transport and jack a trailer during the hitching of the trailer to a trailer hitch mounted on a mobile vehicle such as a truck;

FIG. 12D is a plan view of the trailer jack and transport system of the alternative embodiment of the present invention shown in FIG. 13A, shown arranged in its storage mode, after the trailer has been completely hitched to the trailer hitch of the mobile vehicle;

Figure 2A:
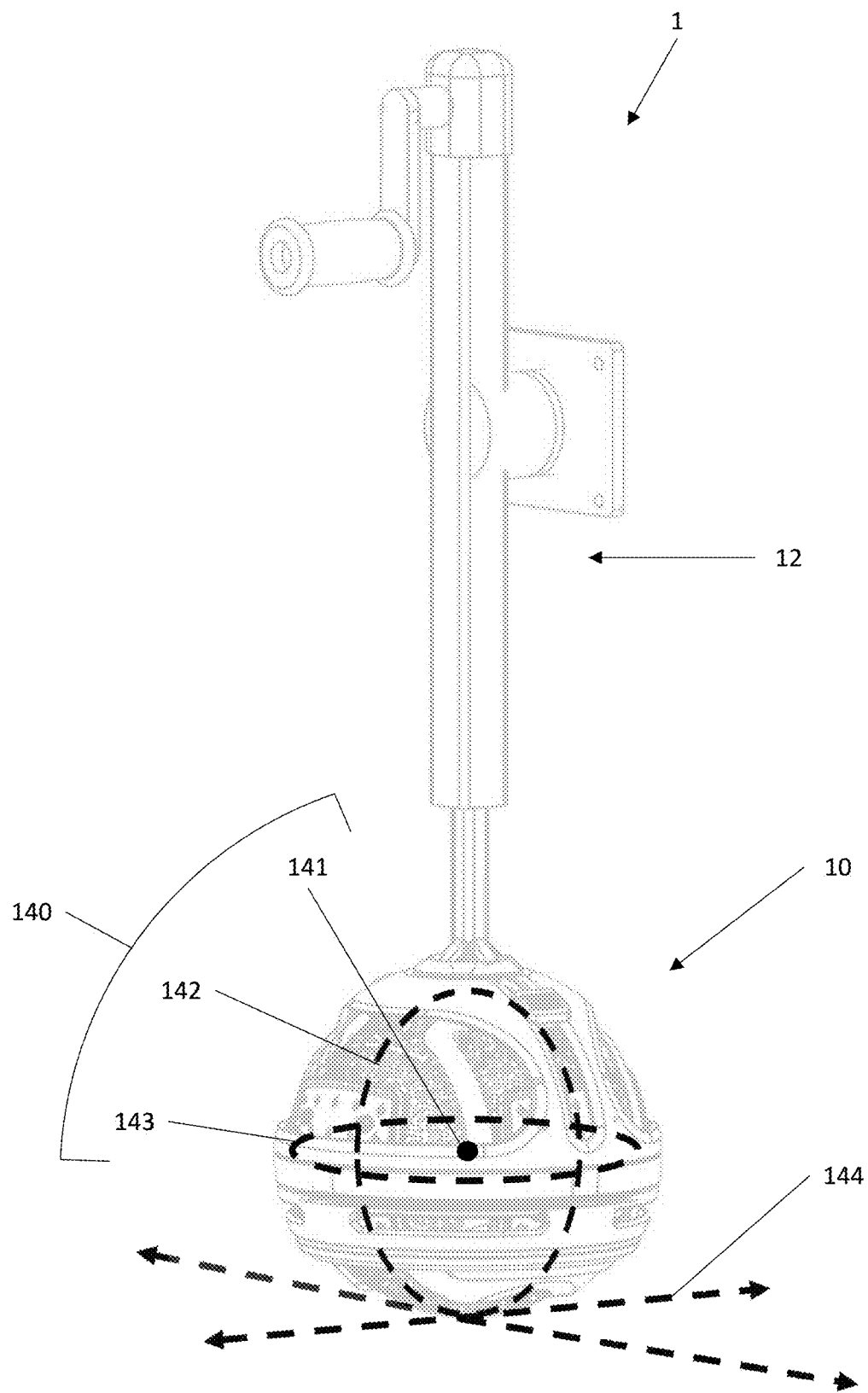
FIG. 2A is a perspective view of the trailer jack and transport subsystem of the present invention arranged shown removed from its trailer, and in which a coordinate reference system is symbolically embedded for referencing the omni-directional motion of the load-bearing transport ball freely mounted within its semispherical framework.
Figure 2B:
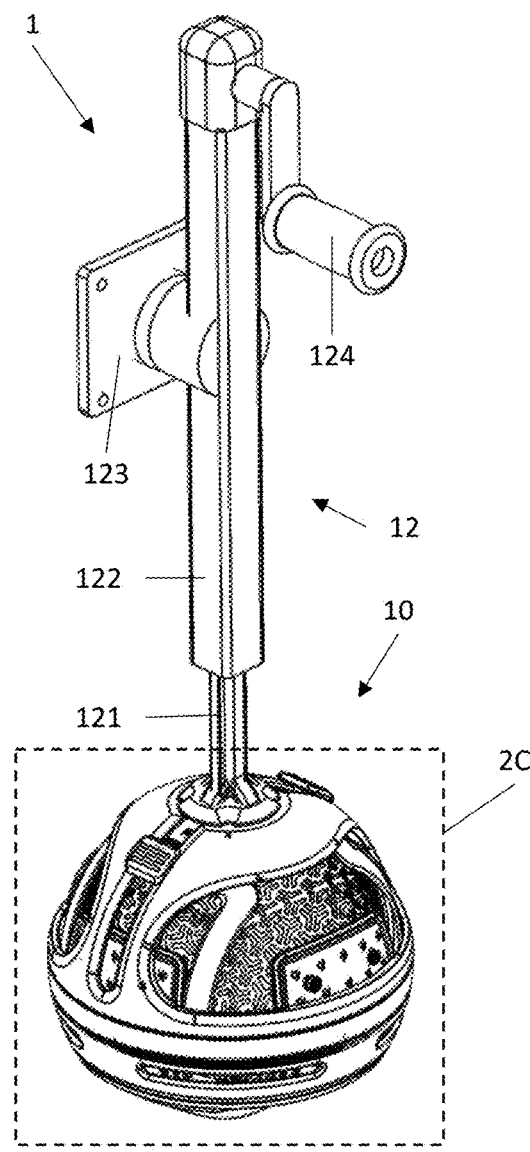
FIG. 2B is a perspective view of the trailer jack and transport system of the present invention shown removed from any trailer, while arranged in its jack and transporting configuration, with its load-bearing transport ball contacting the ground surface.
Figure 2C:
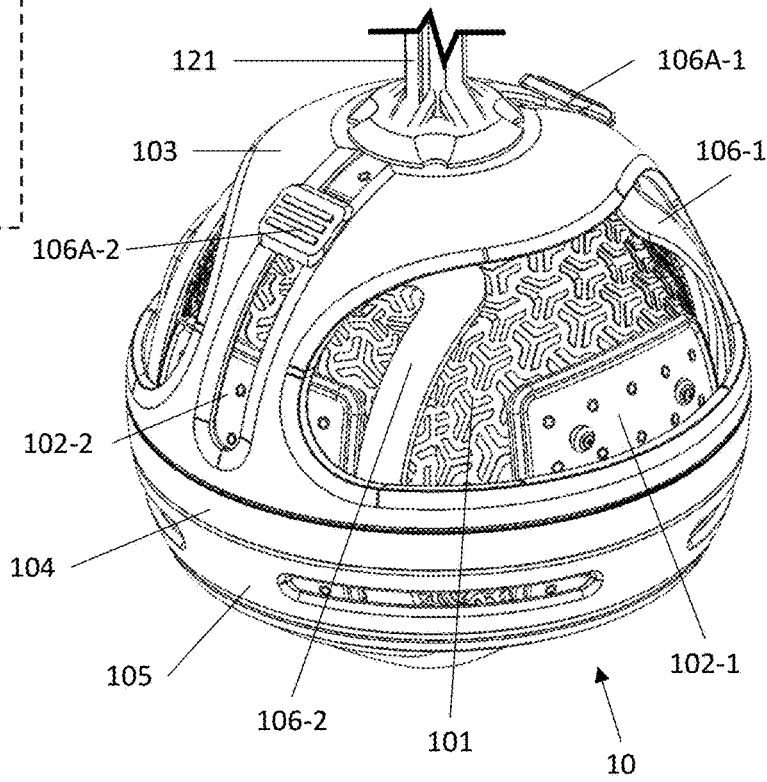
FIG. 2C is a perspective, partially cut away view of the trailer jack and transport system of the first illustrative embodiment shown in FIG. 2B showing the spherical wheel assembly of the present invention, wherein the load-bearing transport ball is shown in greater detail (i) supported by a set of bearing pads mounted along the perimeter of the interior space of the semispherical framework and extending from its bottom aperture to allow physical engagement with and rolling support on a ground surface, and (ii) embraced within a dual-sided ball braking system mounted between the load-bearing transport ball and the interior surfaces of the semispherical framework.
Figure 2D:
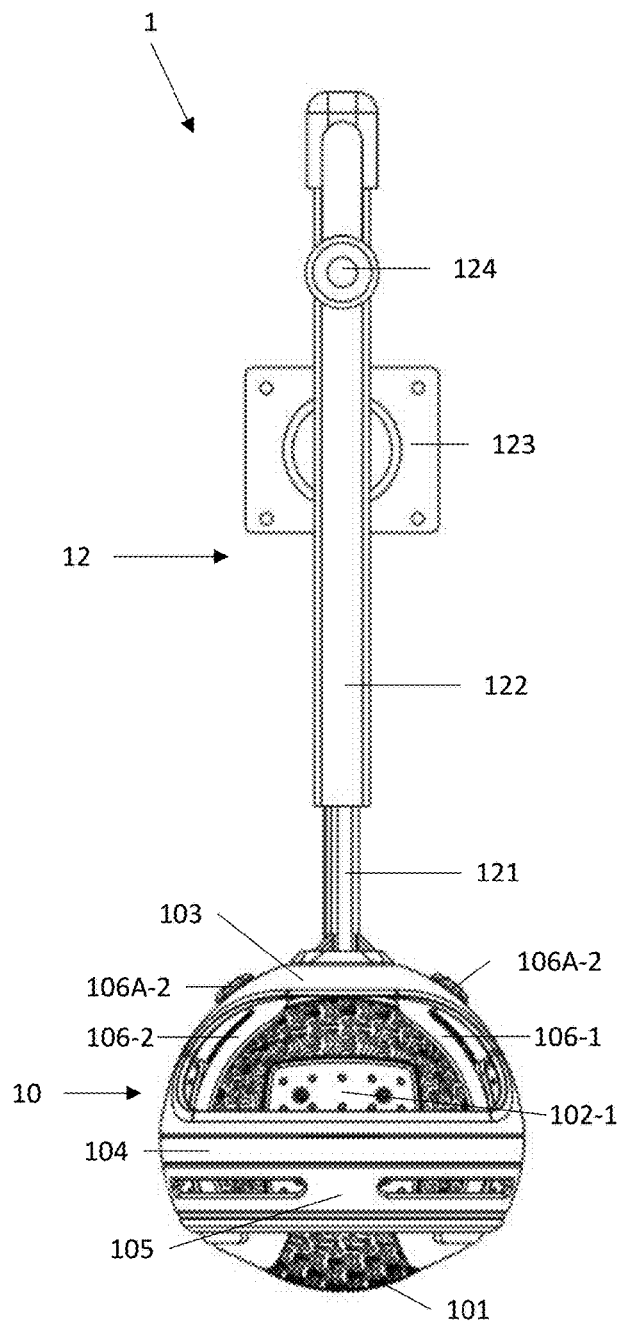
FIG. 2D is a first elevated side view the trailer jack and transport system of the first illustrative embodiment shown in FIG. 2B, wherein the dual-sided ball braking system is shown arranged in its non-braking (i.e., unlocked) mode of operation, between the load-bearing transport ball and the interior surfaces of the semispherical framework, while the extendable jacking post member is shown extended and in a jack mode of operation.
Figure 2E:
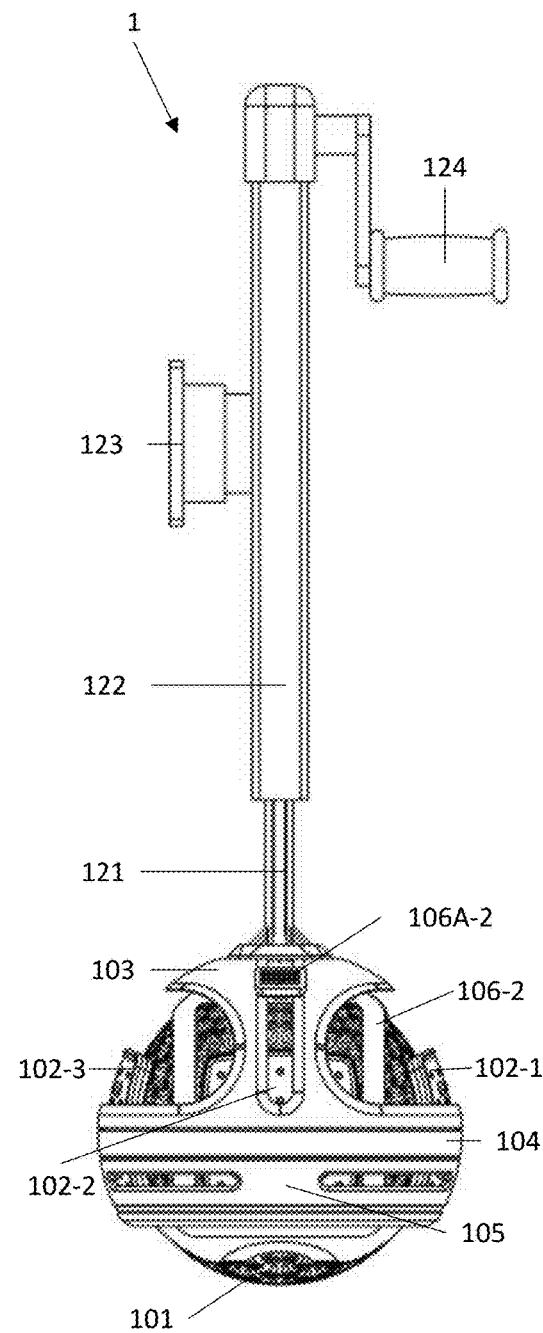
FIG. 2E is a second elevated side view the trailer jack and transport system of the first illustrative embodiment shown in FIG. 2B, wherein the dual-sided ball braking system is shown arranged in its non-braking (i.e., unlocked) mode of operation, between the load-bearing transport ball and the interior surfaces of the semispherical framework, while the extendable jacking post member is shown extended and in a jack mode of operation.
Figure 2F:
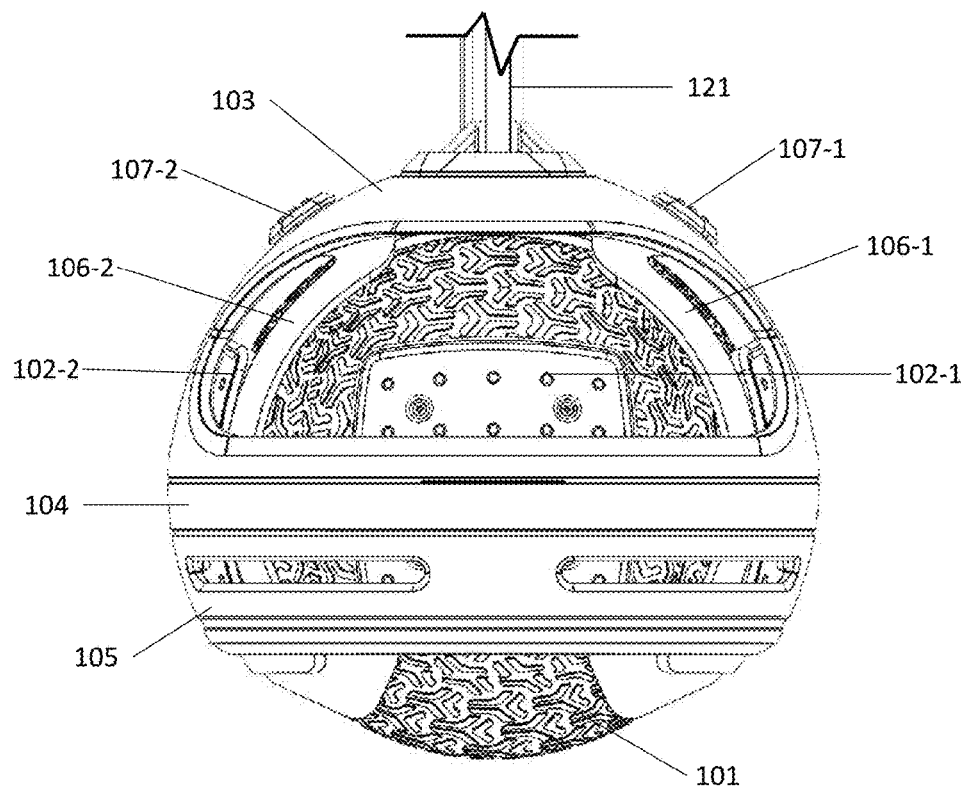
FIG. 2F is an elevated partially cut-away side view the semispherical framework portion of the trailer jack and transport system of the first illustrative embodiment shown in FIG. 2B, wherein the dual-sided ball braking system is shown arranged in its non-braking (i.e., unlocked) mode of operation, between the load-bearing transport ball and the interior surfaces of the semispherical framework.
Figure 2G:
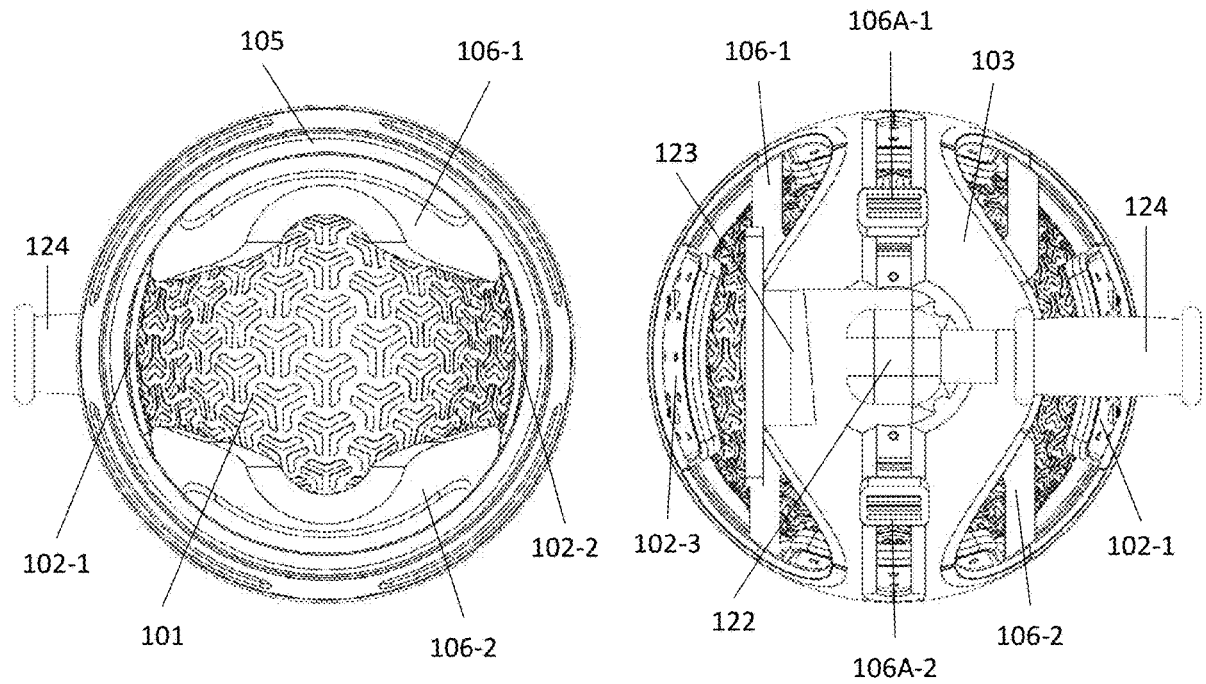
FIG. 2G is a bottom view the semispherical framework portion of the trailer jack and transport system of the first illustrative embodiment shown in FIG. 2B, wherein the dual-sided ball braking system is shown arranged in its non-braking (i.e., unlocked) mode of operation, between the load-bearing transport ball and the interior surfaces of the semispherical framework.
Figure 2H:
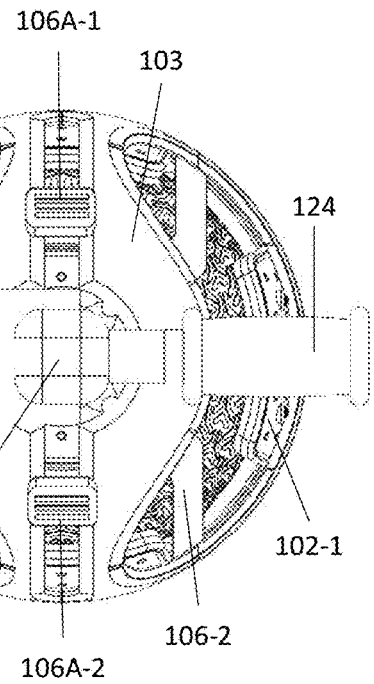
FIG. 2H is a top axial view the semispherical framework portion of the trailer jack and transport system of the first illustrative embodiment shown in FIG. 2B, wherein the dual-sided ball braking system is shown arranged in its non-braking (i.e., unlocked) mode of operation, between the load-bearing transport ball and the interior surfaces of the semispherical framework.
Figure 21:
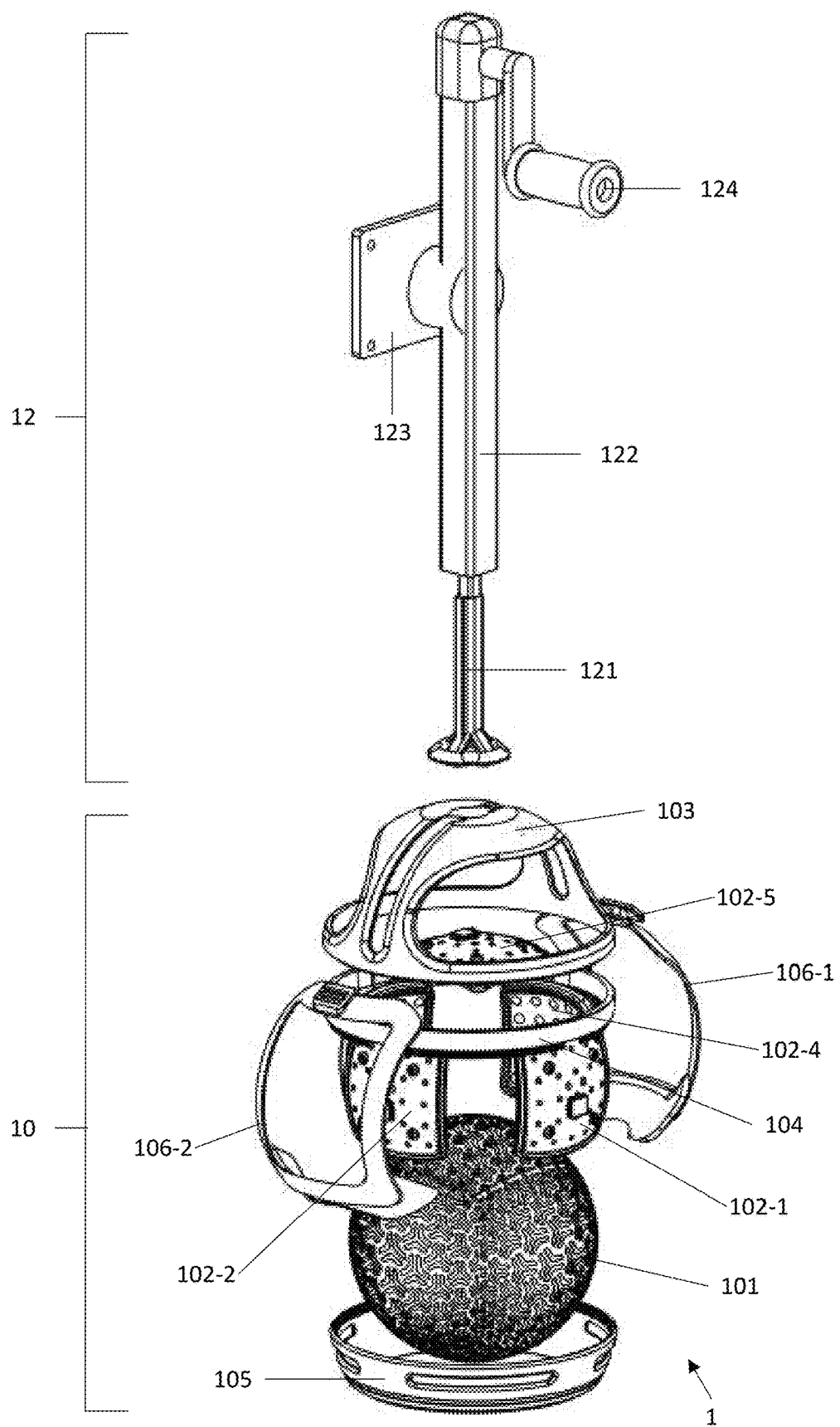
Figure 2J:
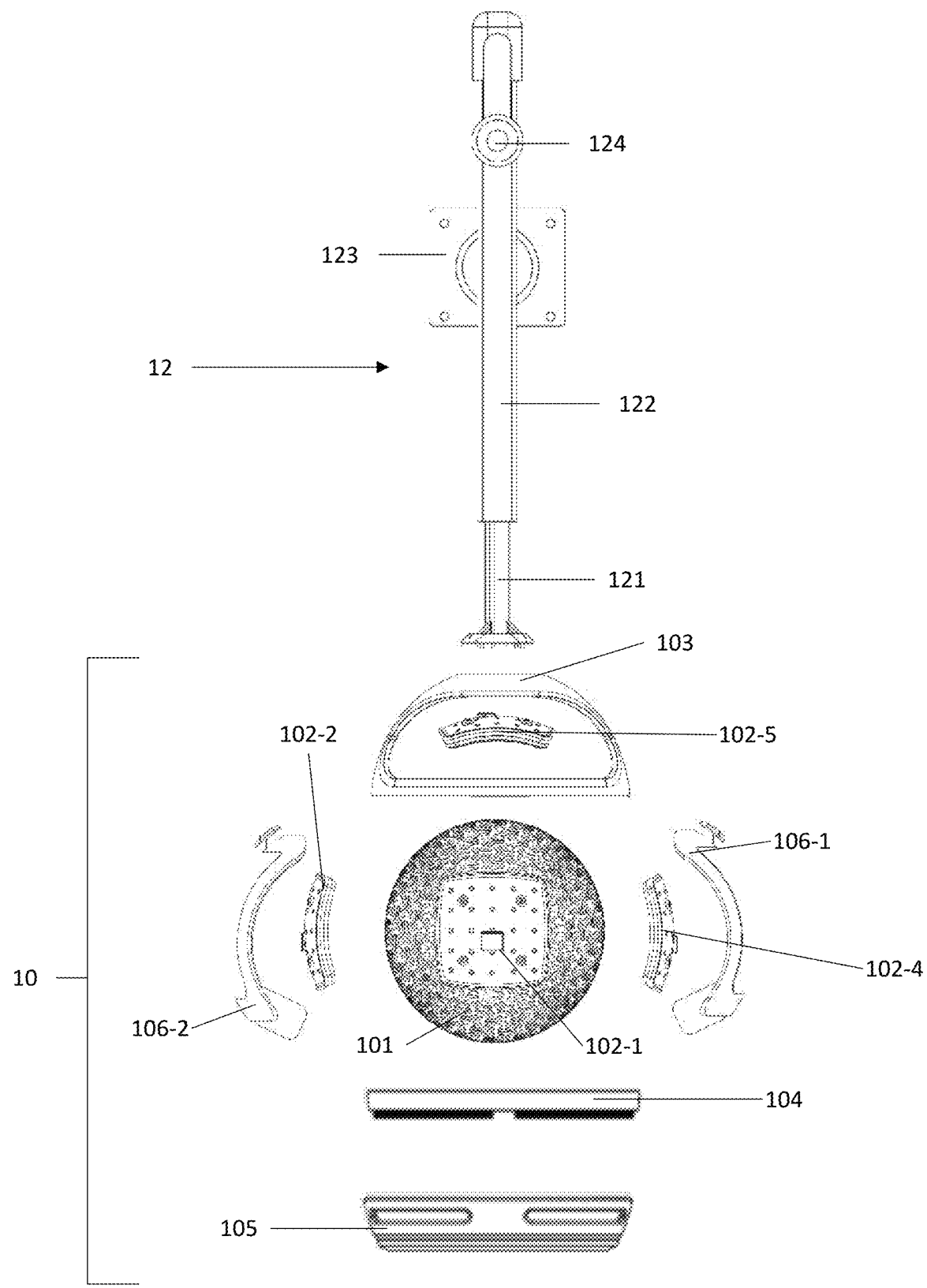
FIG. 2J is an exploded side of the trailer jack and transport system of the first illustrative embodiment shown in FIG. 2B, shown comprising a semispherical framework for supporting a set of bearing surfaces (e.g. ball bearing pads) between the interior surfaces of the semispherical framework and a load-bearing transport ball supported by bearing surfaces, and a dual-sided ball braking system mounted about the load-bearing transport ball while retained within the semispherical framework using a retaining ring structure.
Figure 2N:
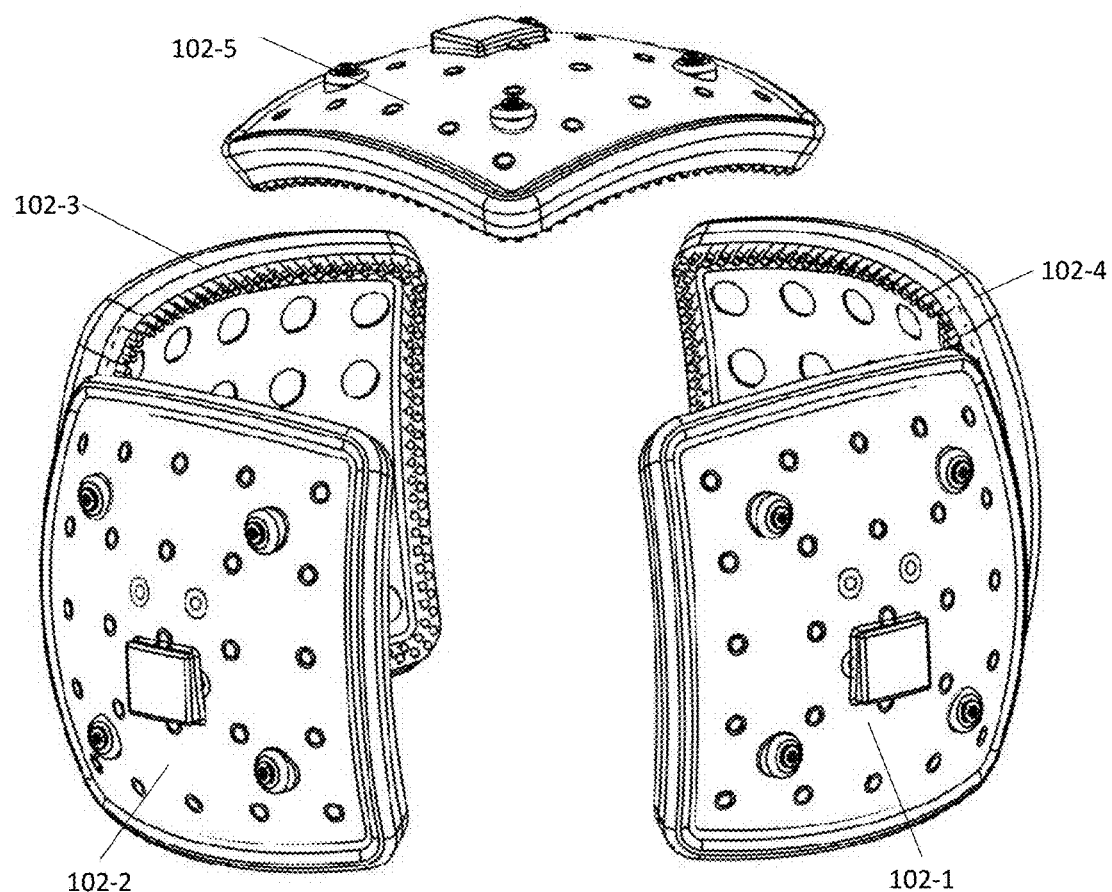
FIG. 2N is the spatial arrangement of bearing surfaces (e.g., ball bearing pads) shown employed in FIGS. 2K and 2L, with the load-bearing transport ball removed for purposes of exposition and illustration purposes.
Figure 2O:
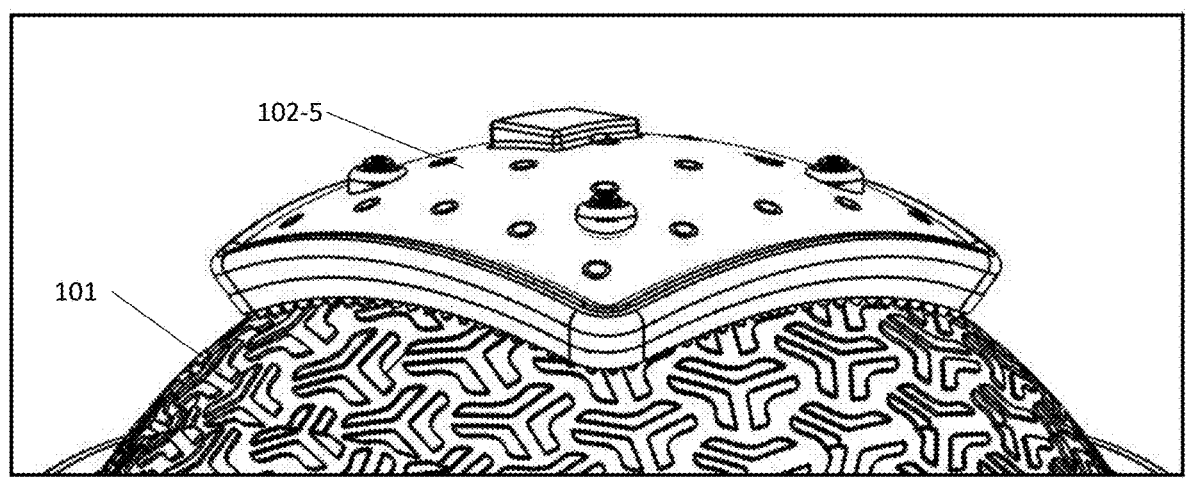
FIG. 2O is a fragmented view of a single bearing surface engaging with a portion of the load-bearing transport ball employed in the trailer jack and transport system of the first illustrative embodiment of the present invention, shown in FIG. 2B.
Figure 2P:
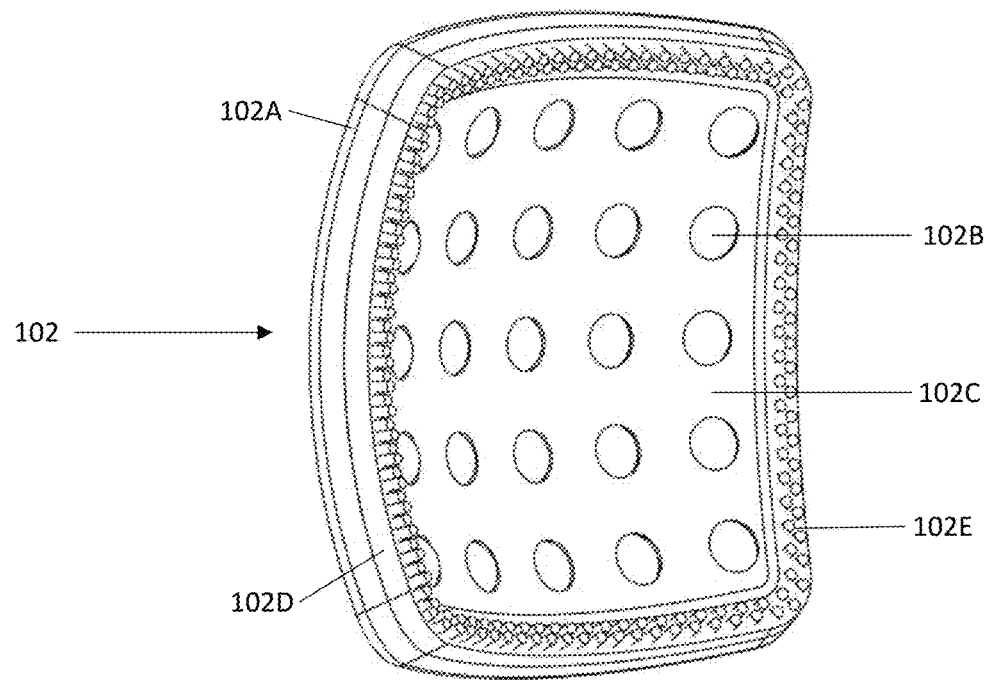
FIG. 2P is a perspective view of one of the five (5) bearing surfaces (e.g., ball bearing pads) installed in the trailer jack and transport system of the first illustrative embodiment of the present invention shown in FIG. 2B, adapted for rotatable support of the load-bearing transport ball in an omni-directional manner providing freedom for it to roll freely within the semispherical framework of the system.
Figure 2Q:
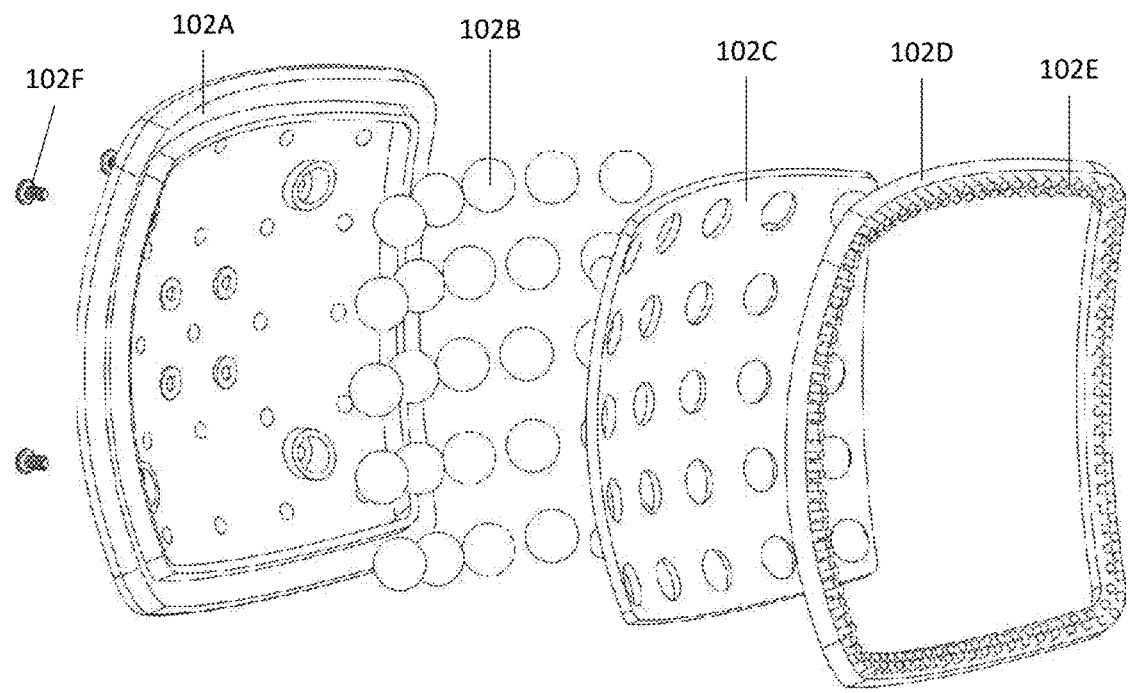
FIG. 2Q is a perspective exploded view of one of the five (5) bearing surfaces (e.g. ball bearing pads) installed in the trailer jack and transport system of the first illustrative embodiment shown in FIG. 2B, comprising (i) a set of ball bearings mounted between a slightly arcuate support base portion and an apertured arcuate surface plate, through which each ball bearing is permitted to project while mounted within the bearing surface pad, and (ii) a user-replaceable brush ring consisting of a frame supporting and brushes for expelling debris from the surface of the load-bearing transport ball.
Figure 12A:
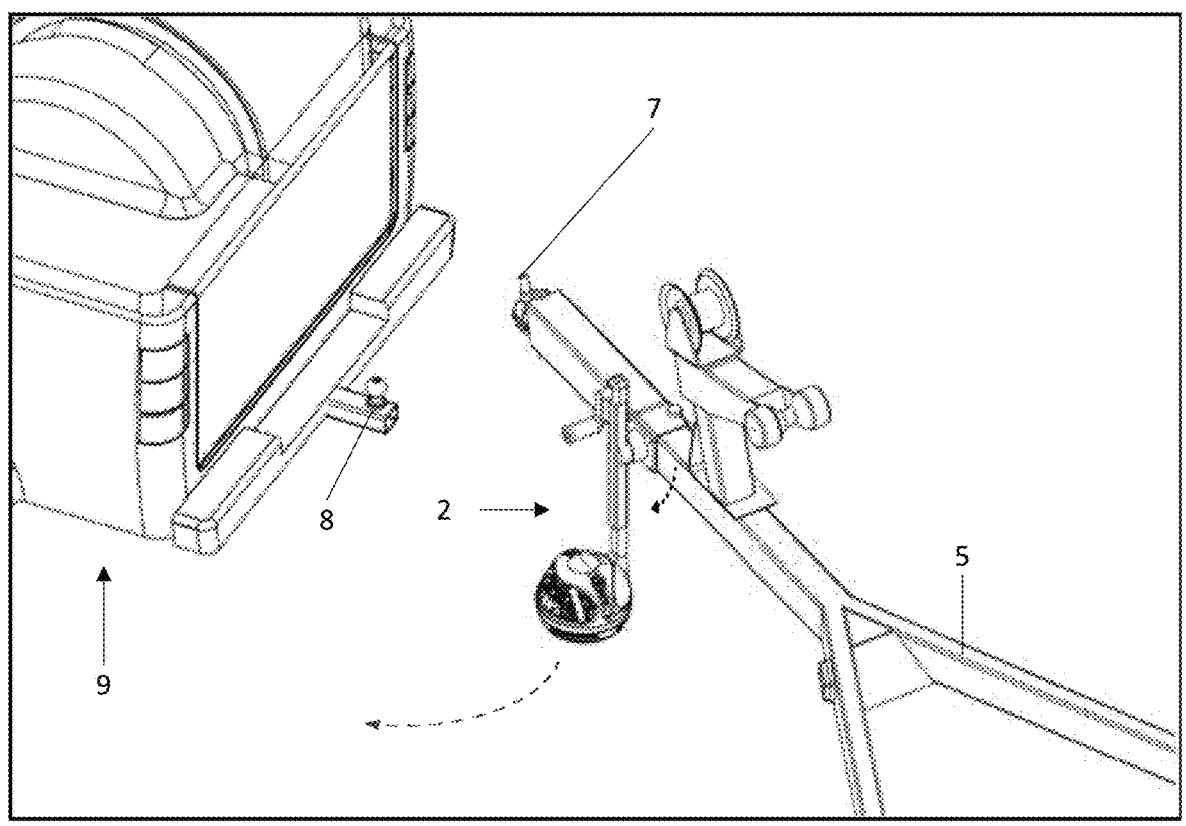
Figure 12B:
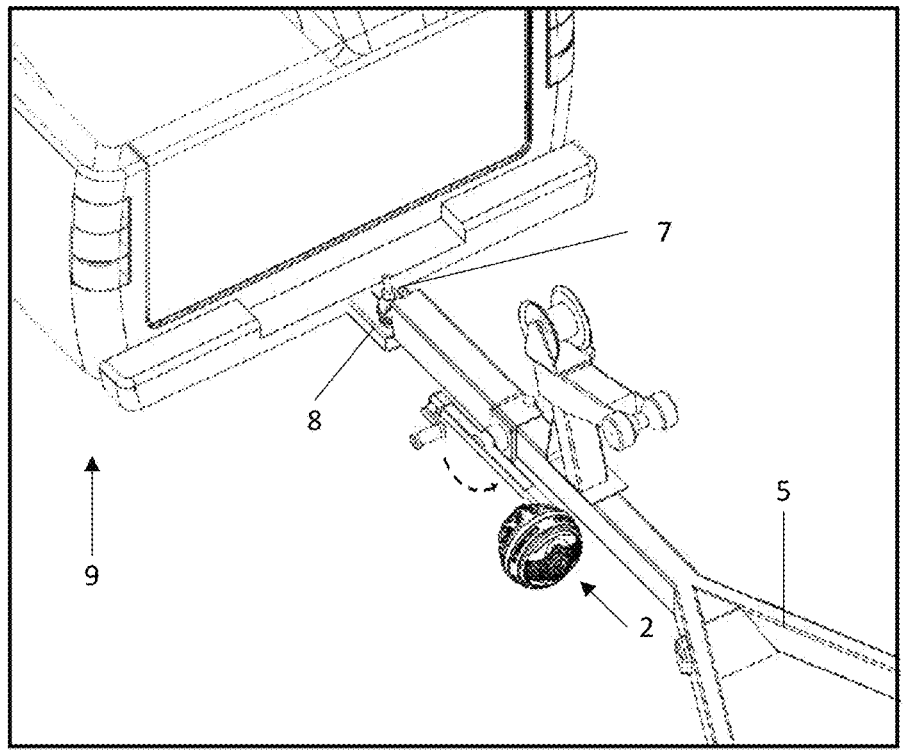
Figure 12C:
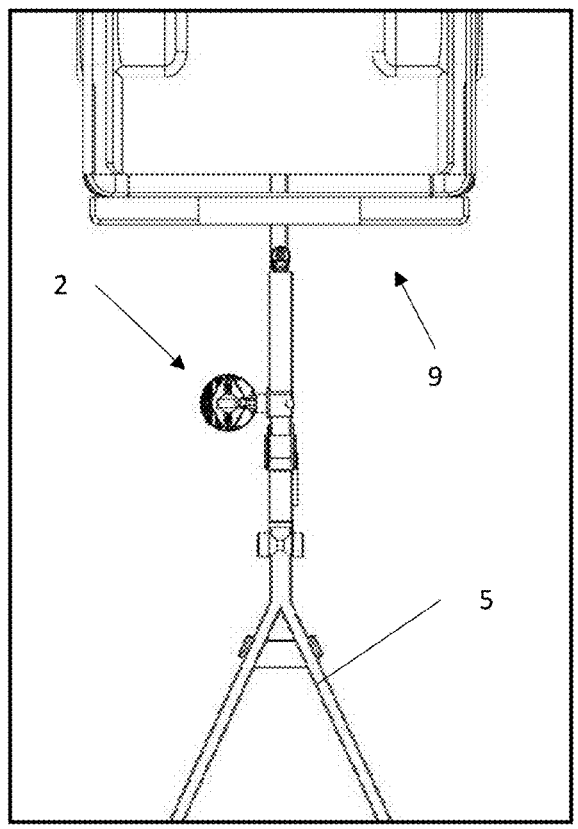
Figure 12D:
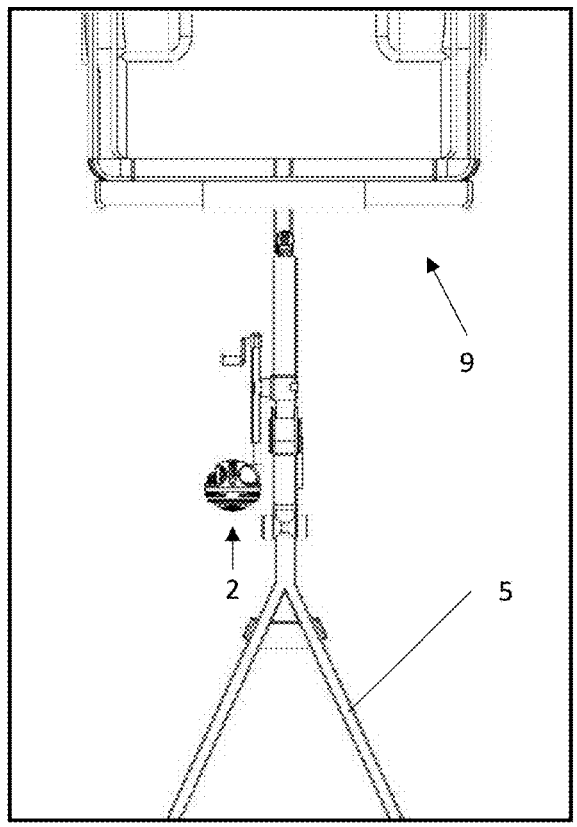
Figure 12E:
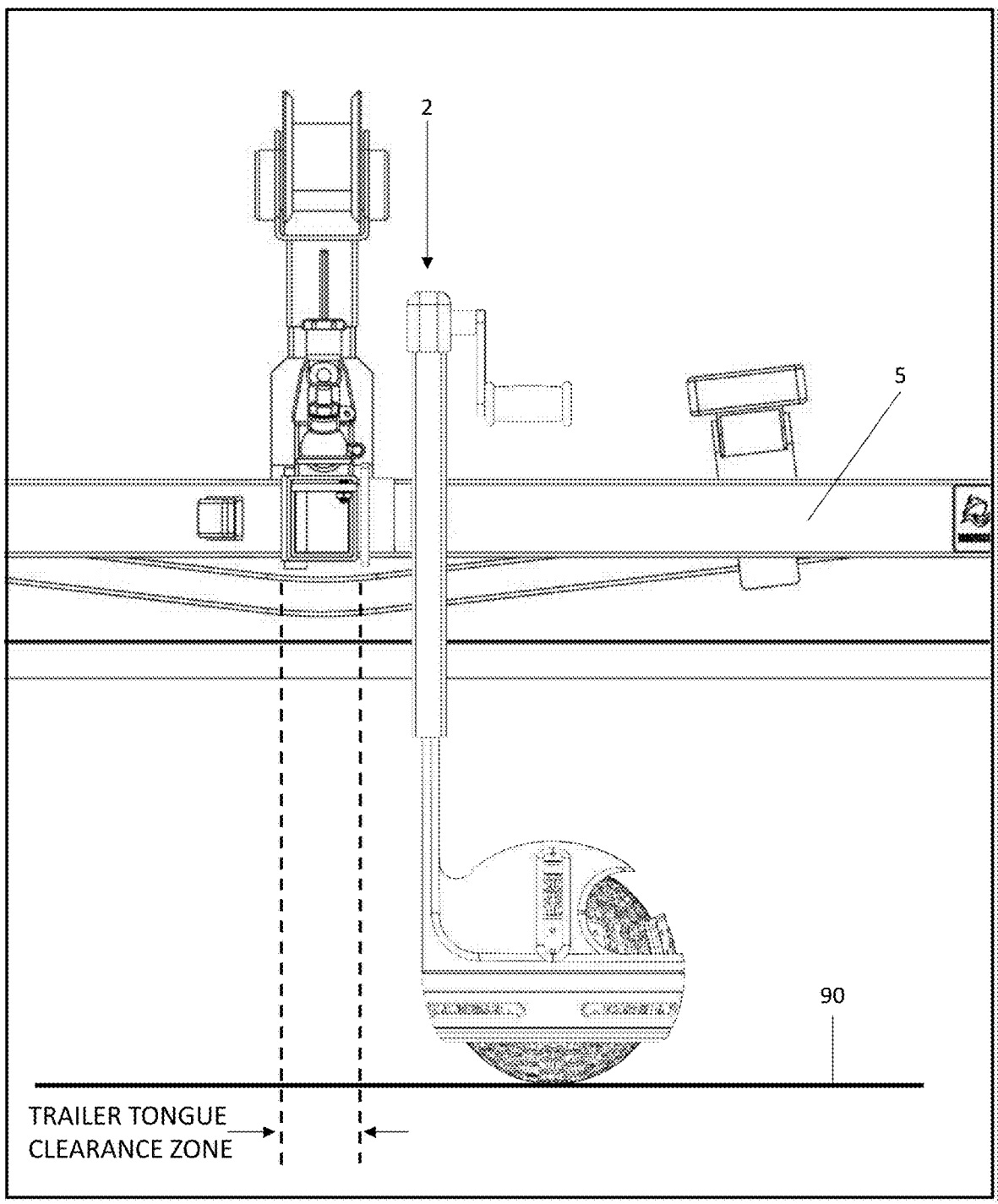
Figure 13A:
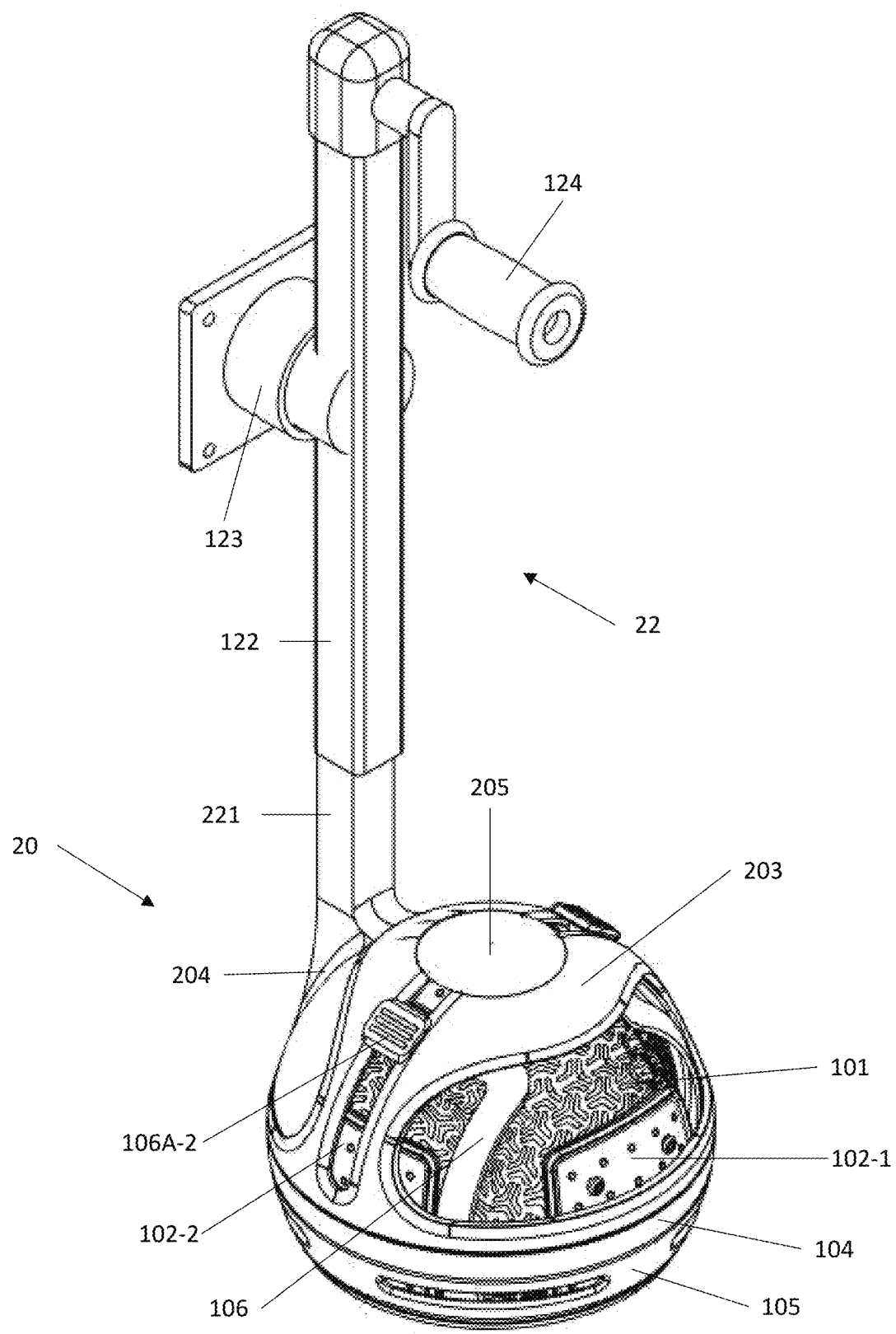
Figure 13B:
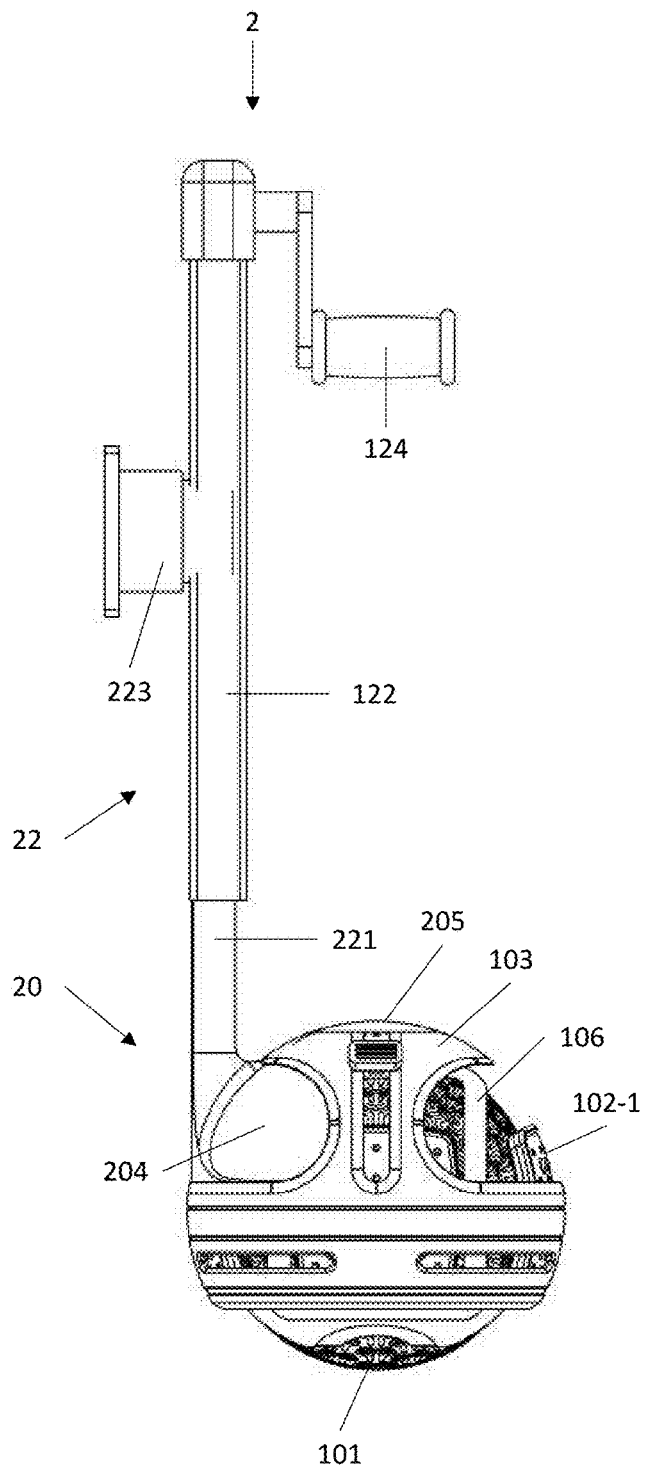
Figure 13C:
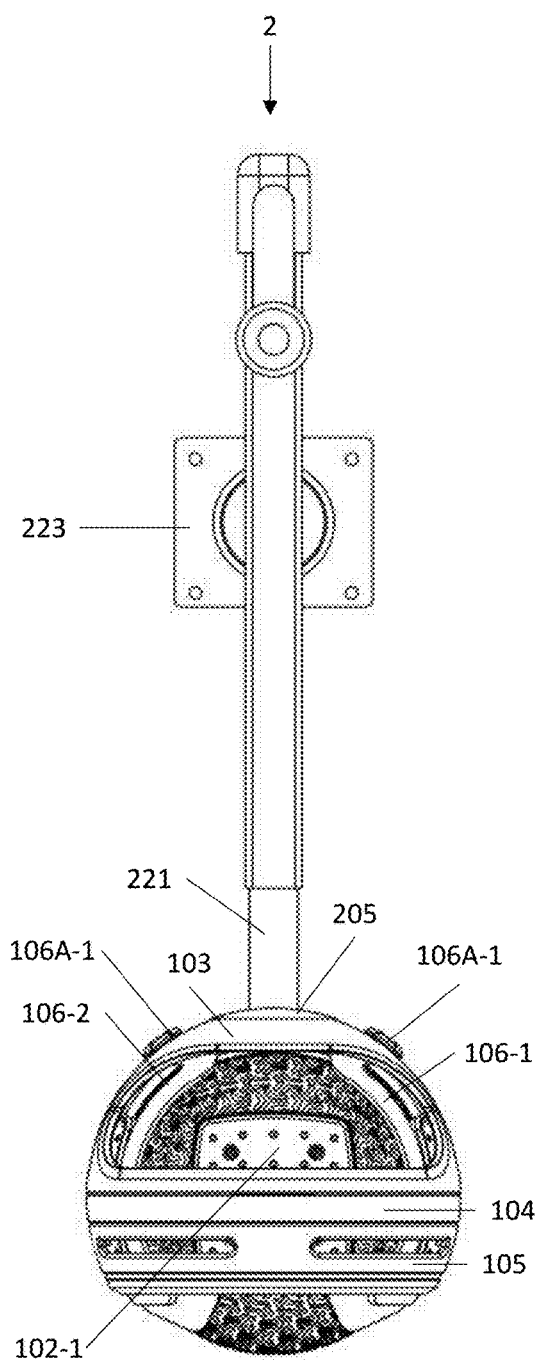
Figure 13D:
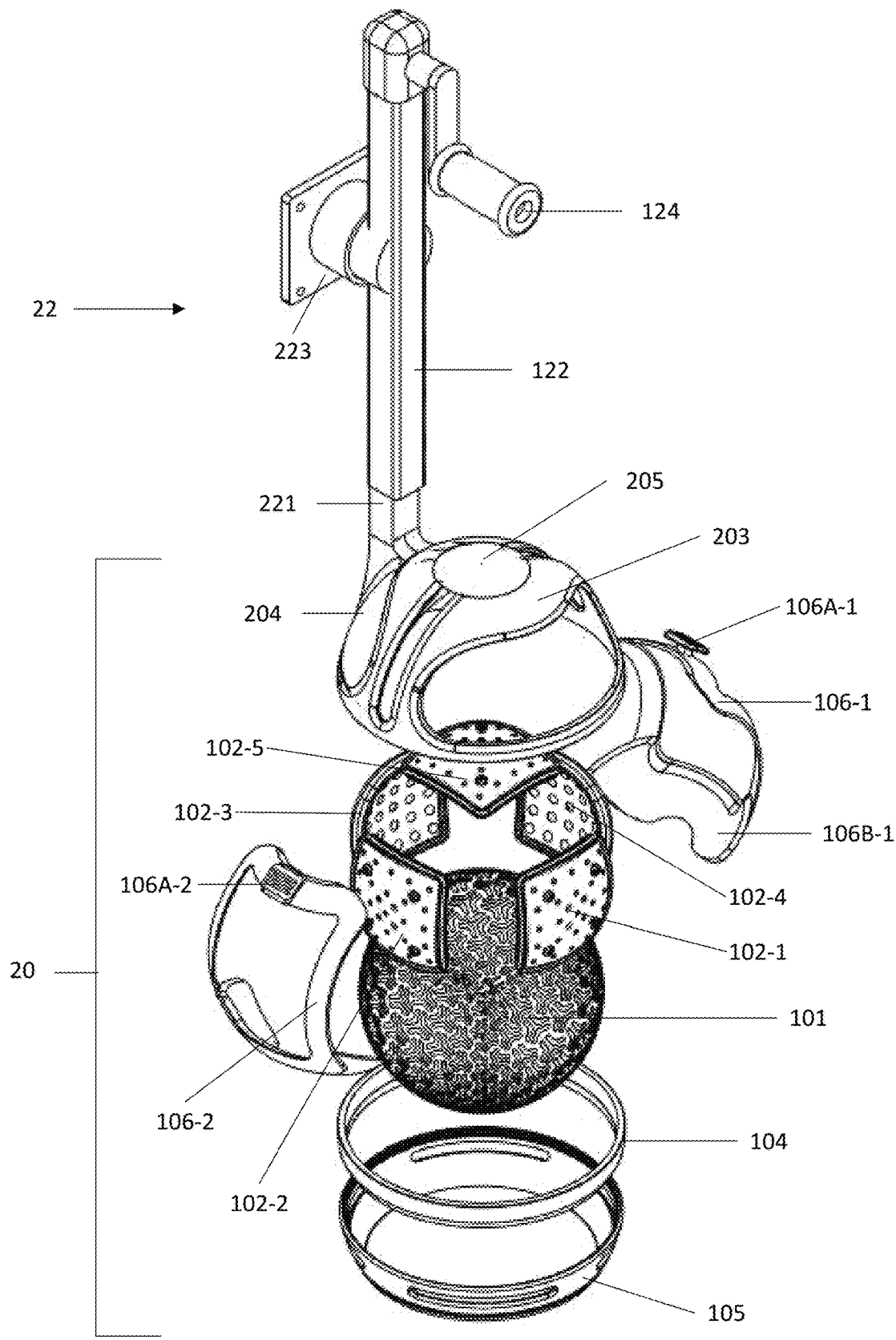
Figure 13E:
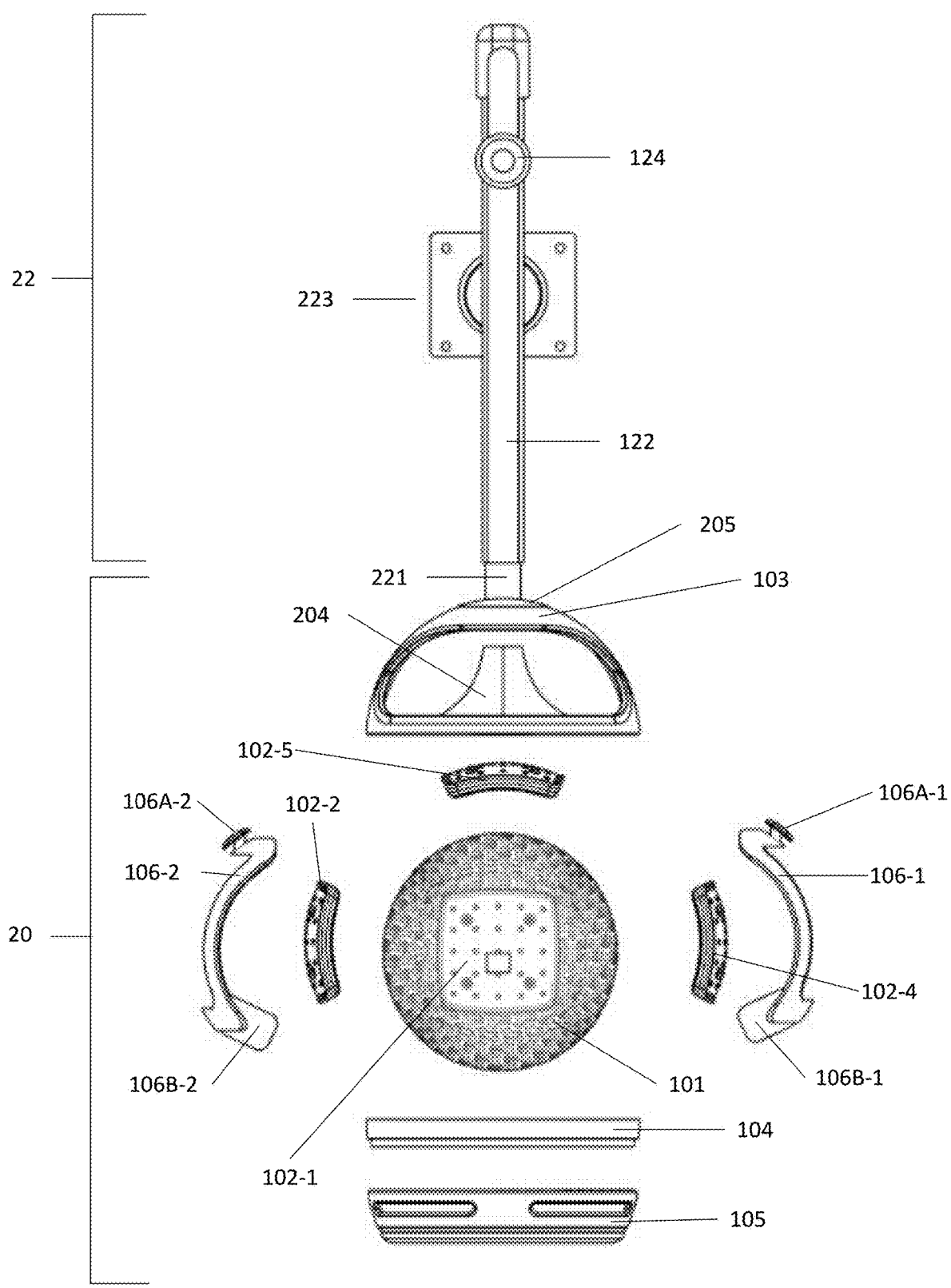
Figure 14A:
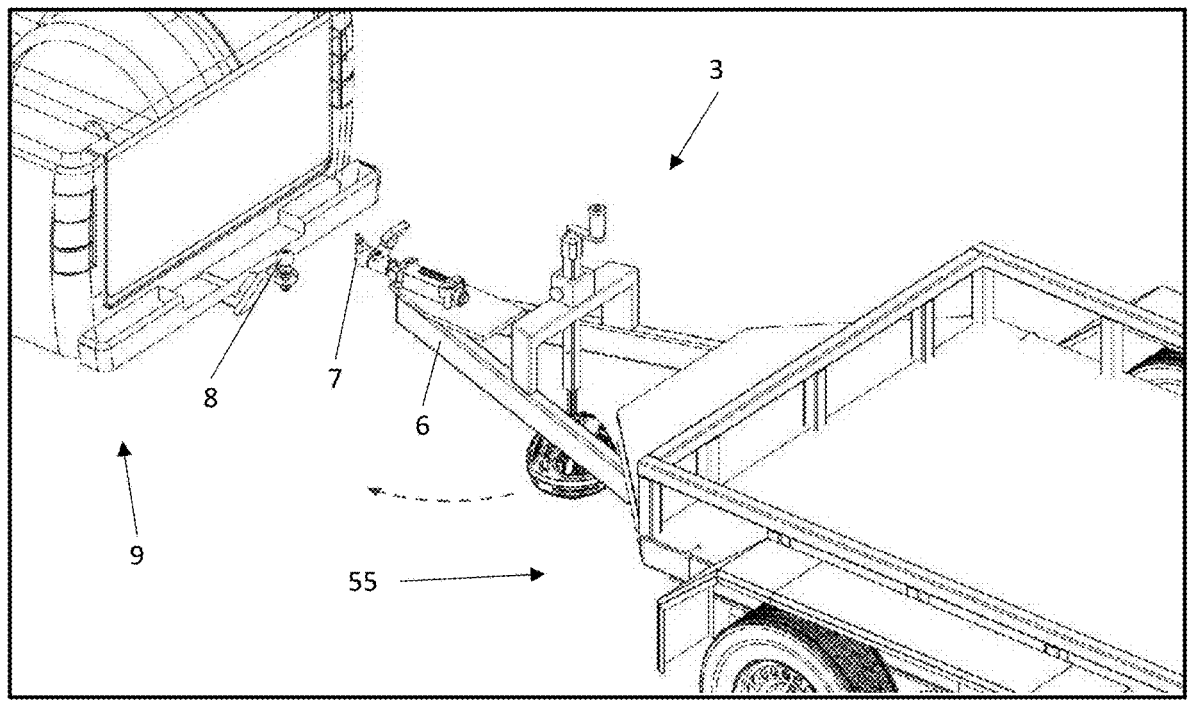
Figure 14B:
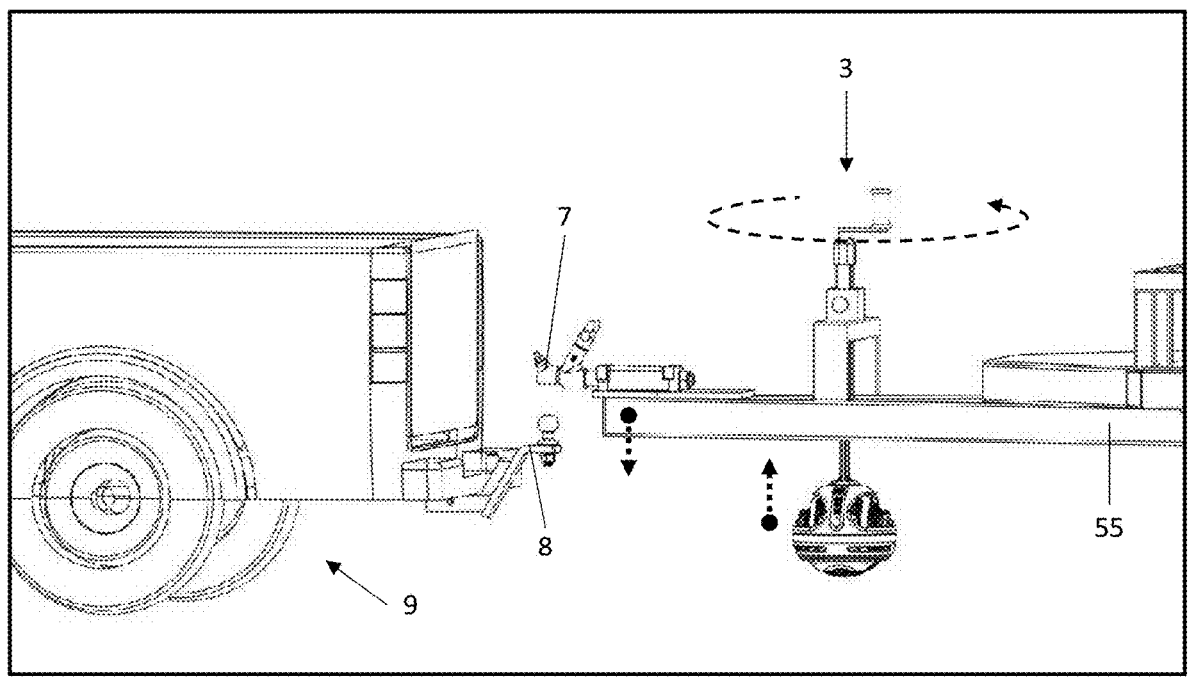
Figure 14C:
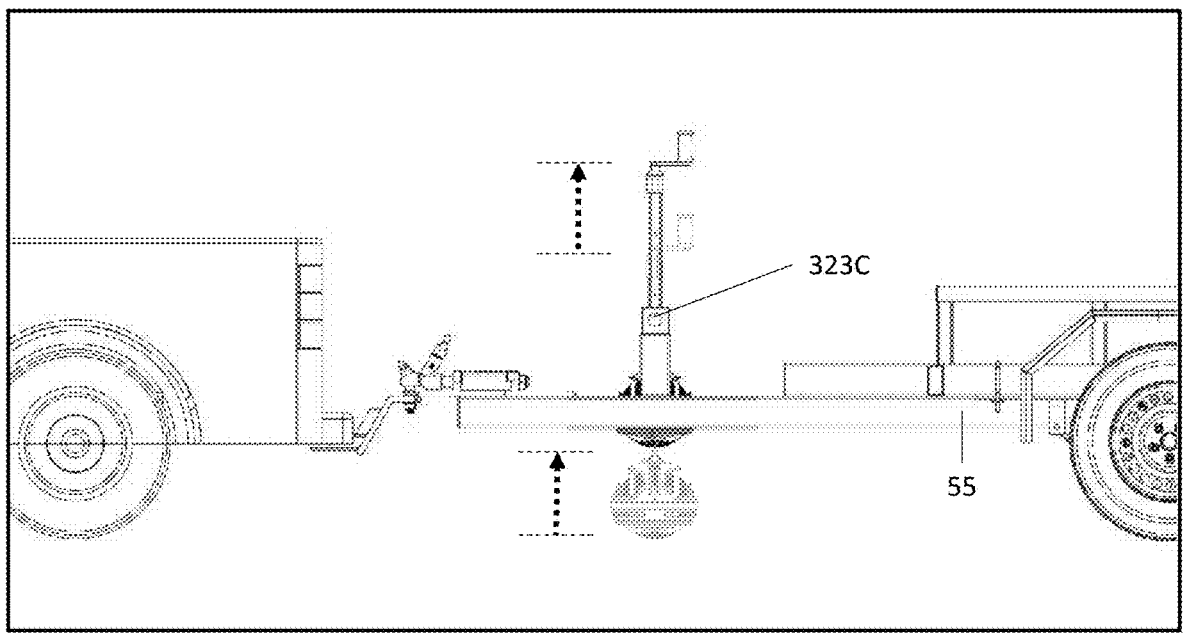
Figure 14D:
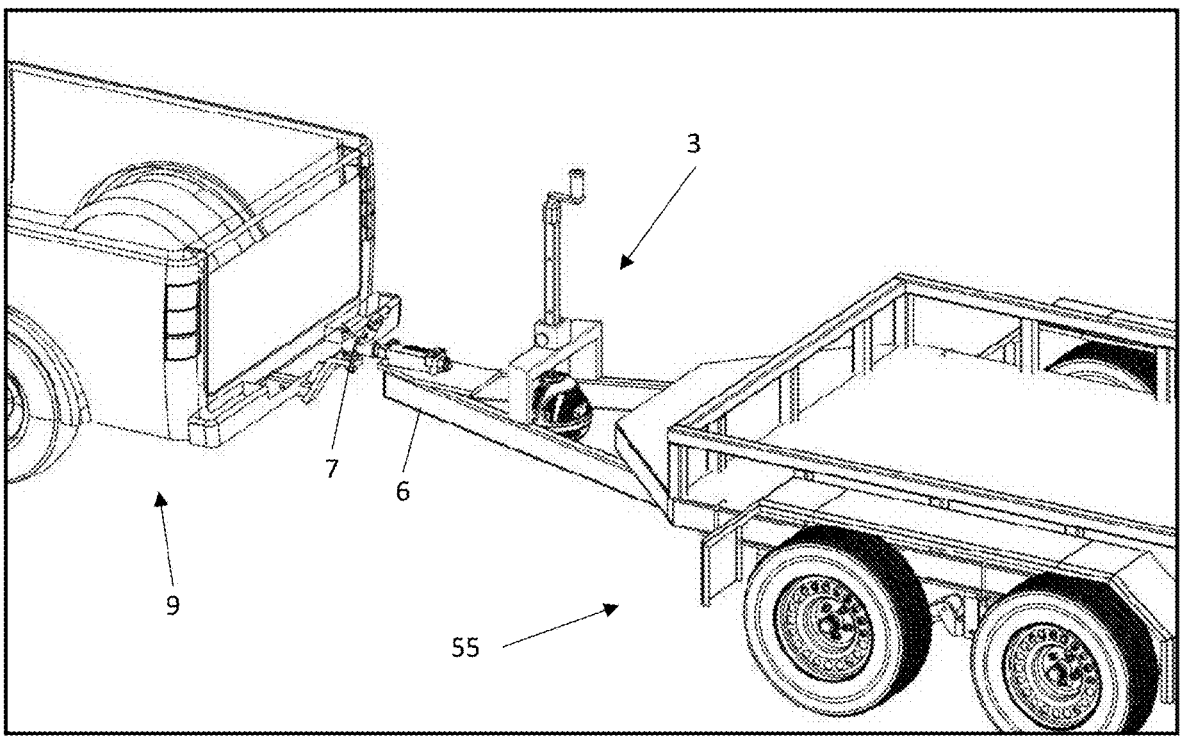
Figure 14E:
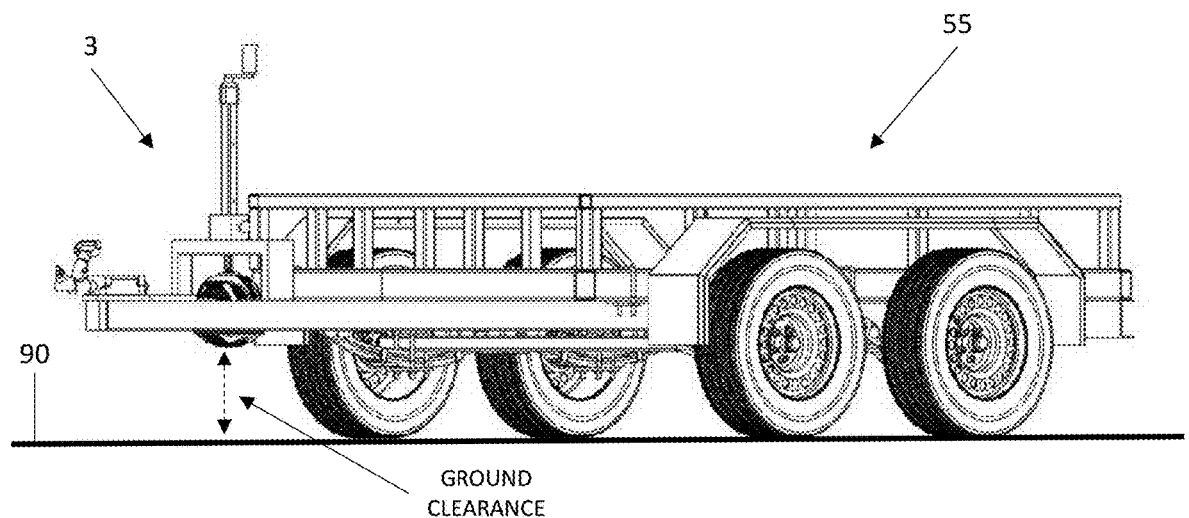
Figure 14F:
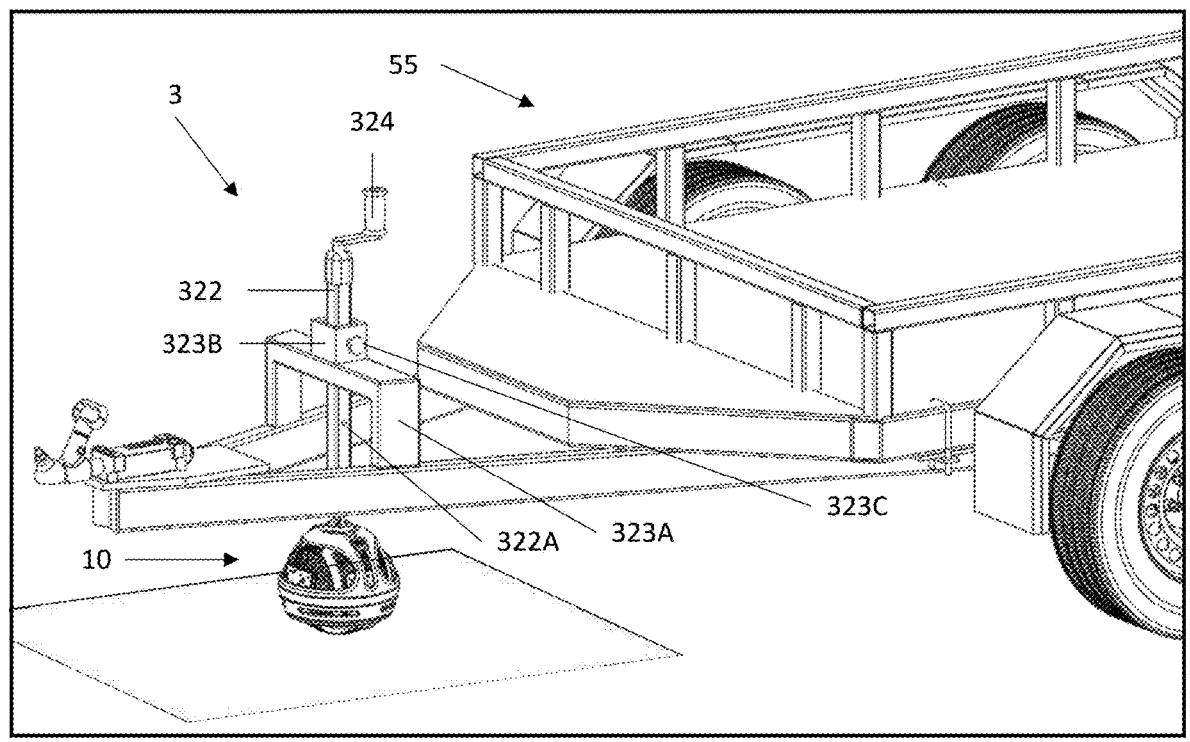
Figure 14G:
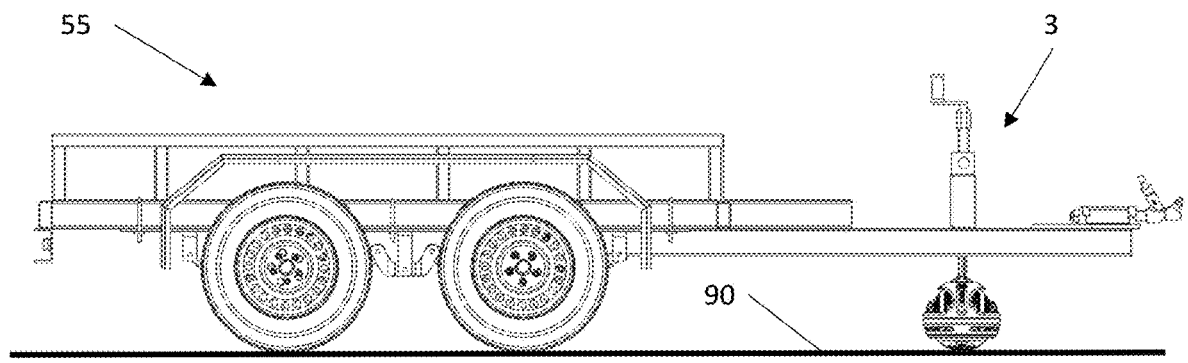
Figure 14H:
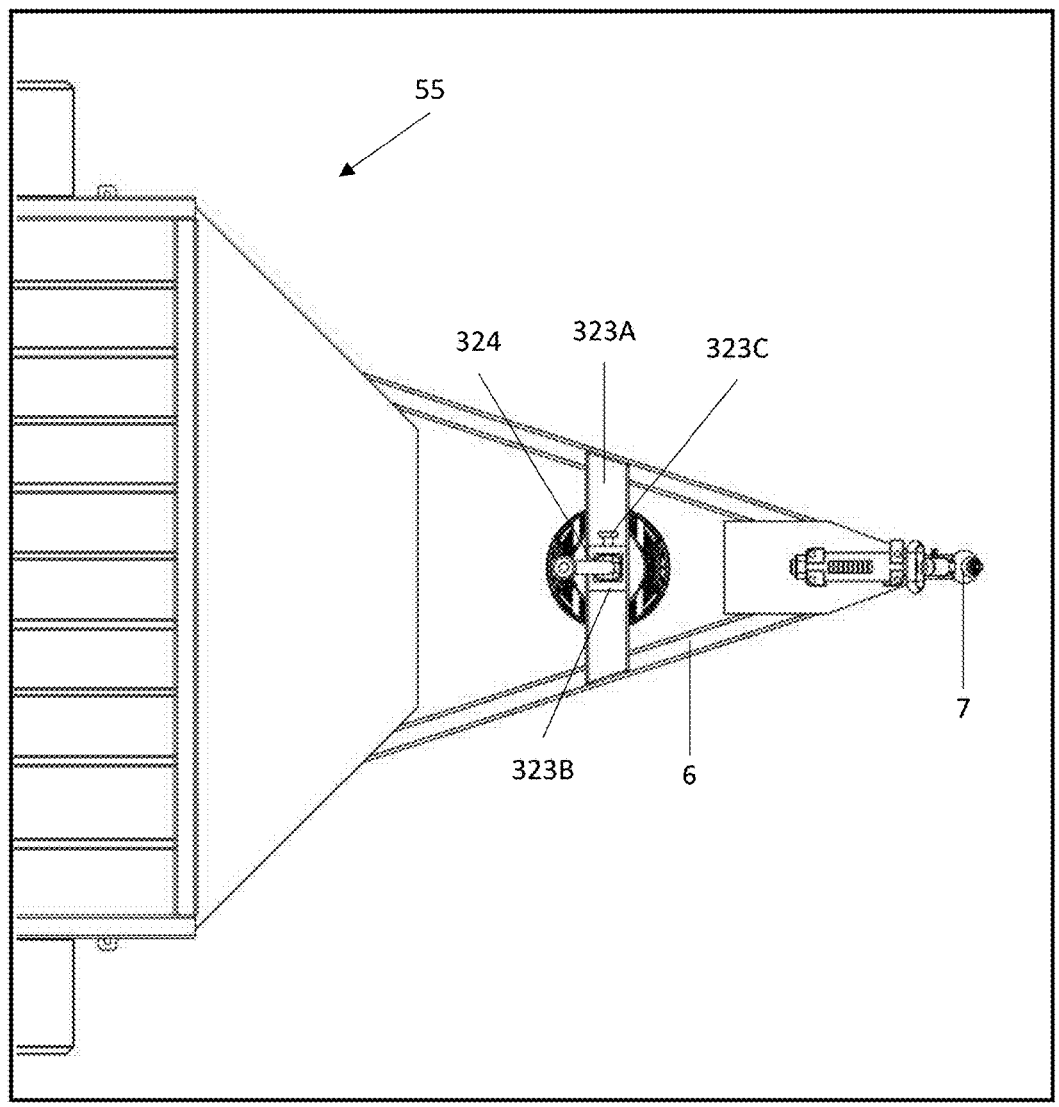
Figure 15A:
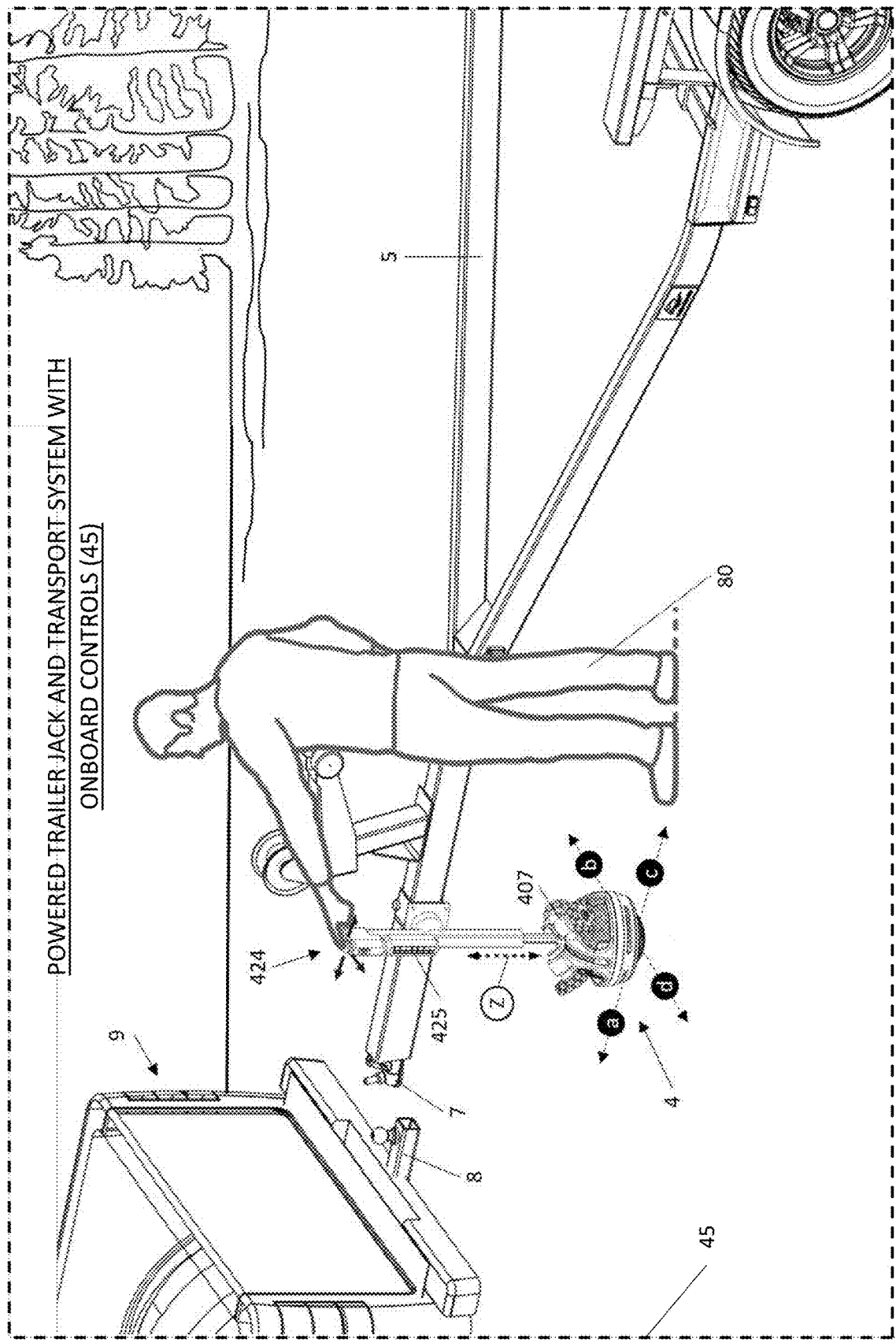
Figure 15B:
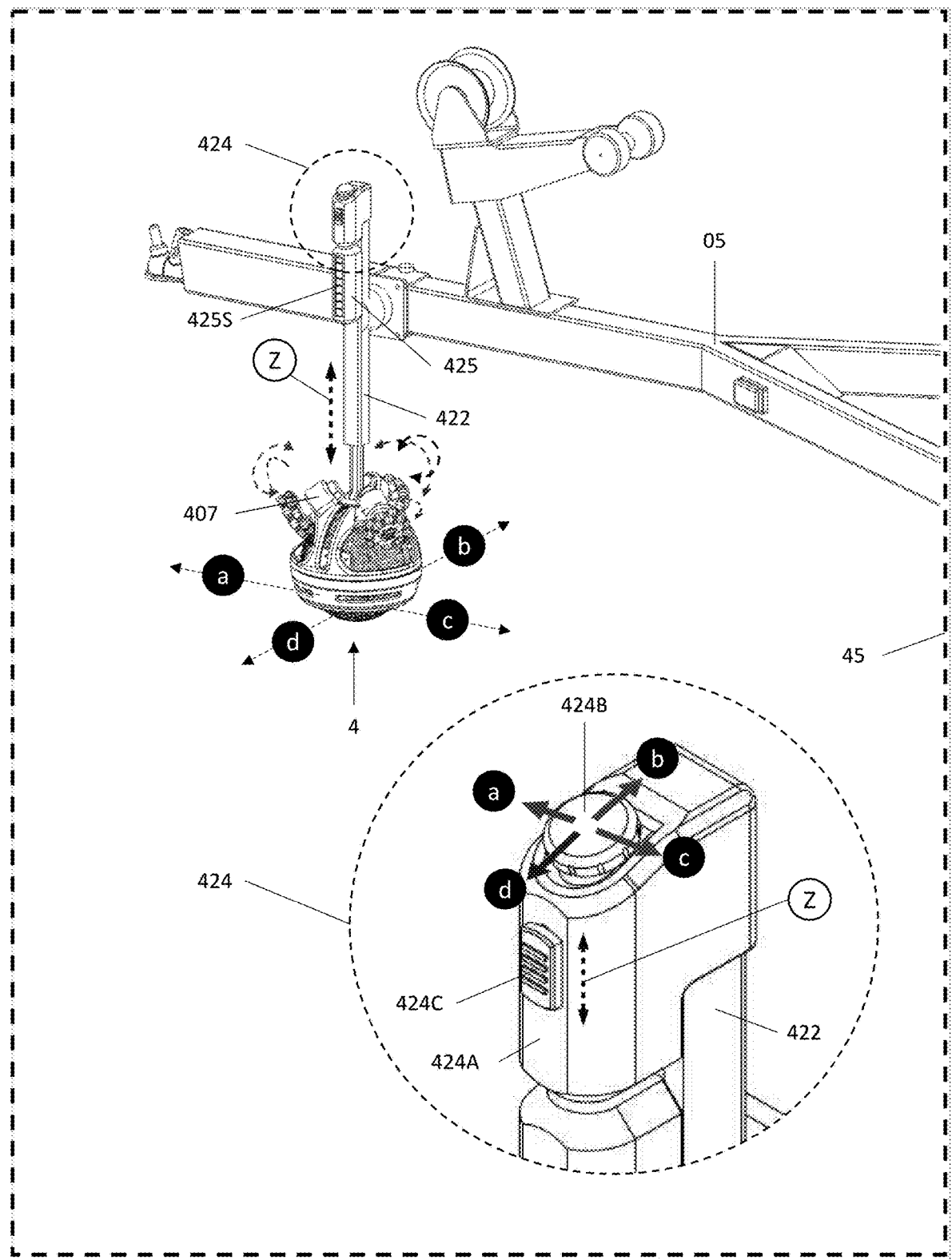
Figure 15C:
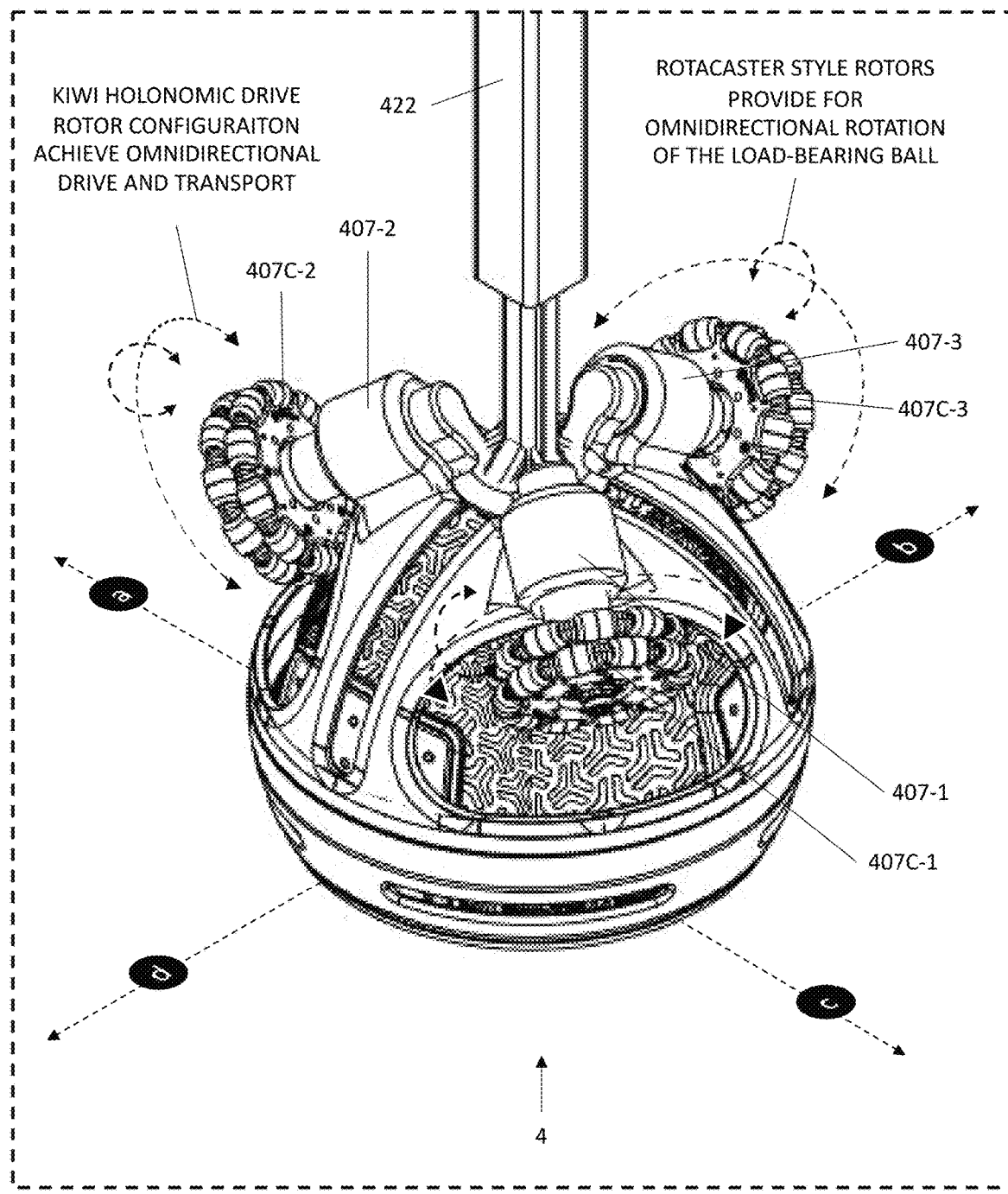
Figure 16:
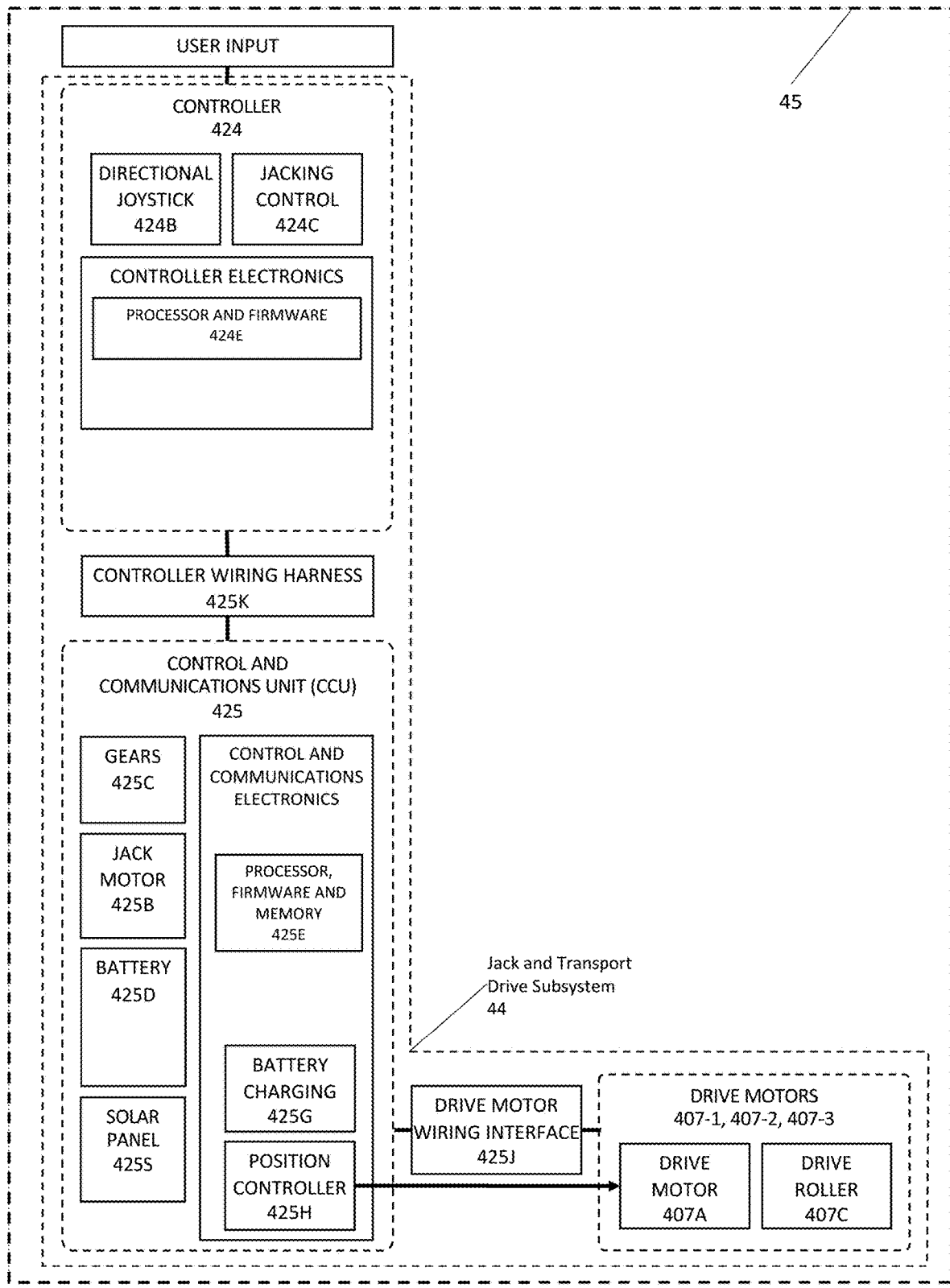
Figure 17:
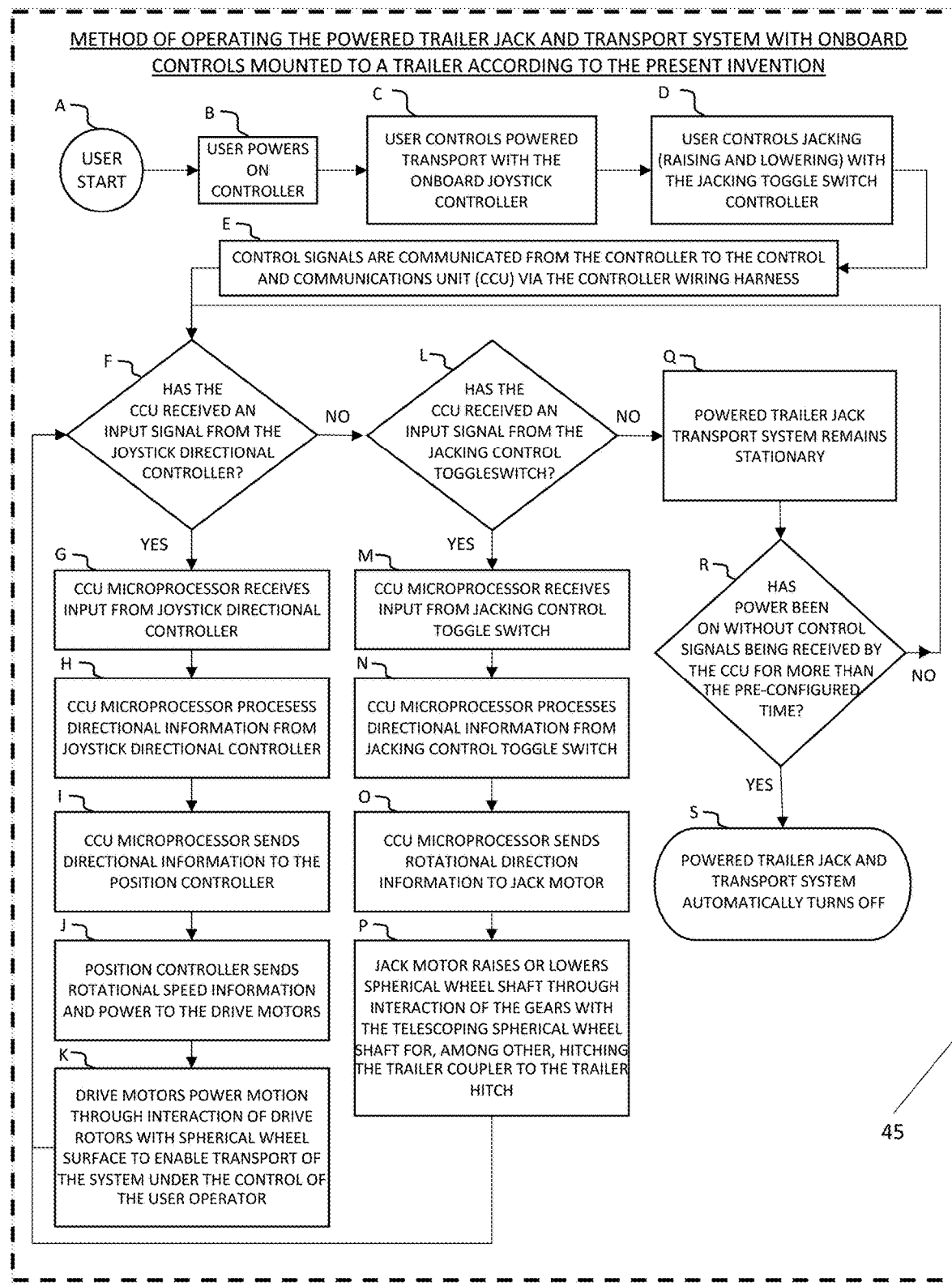
Figure 18A:
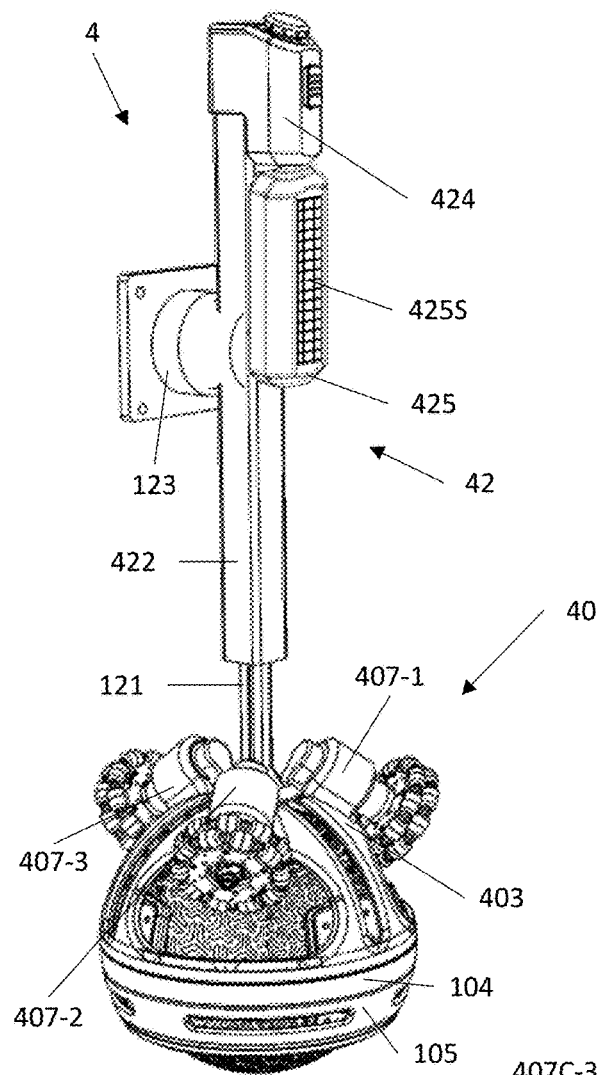
Figure 18B:
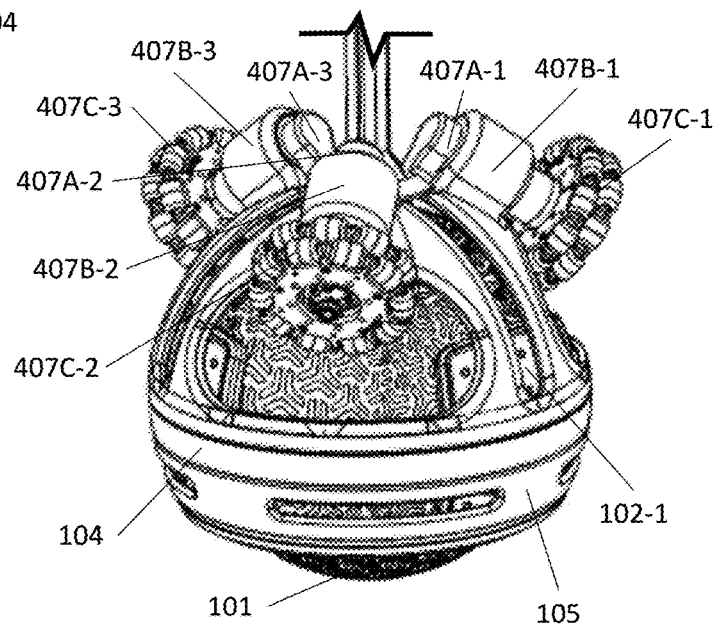
Figure 18C:
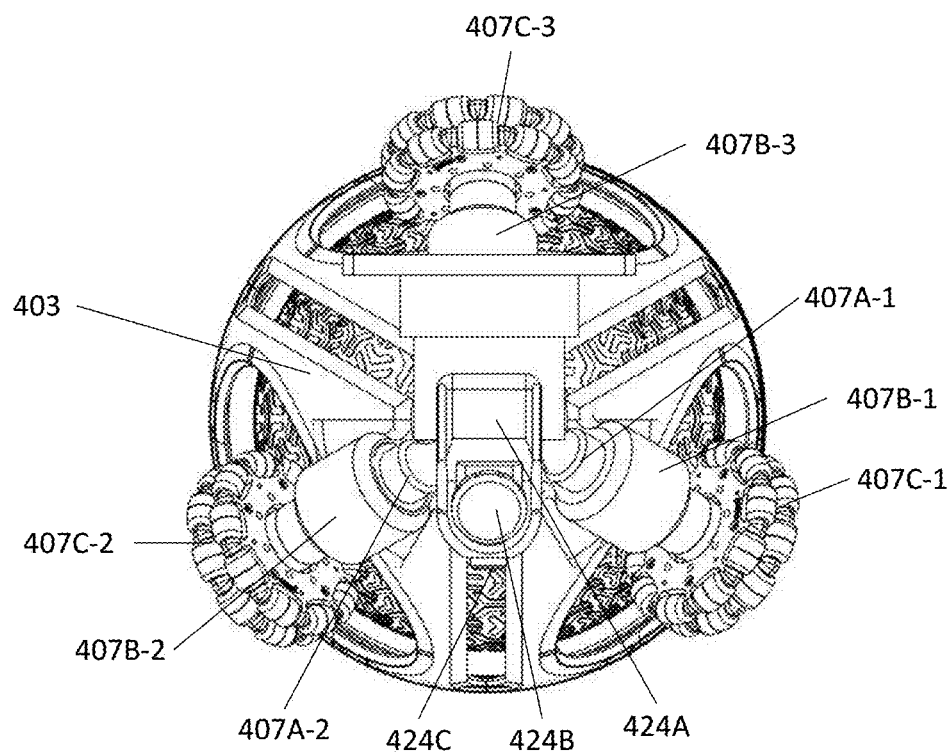
Figure 18D:
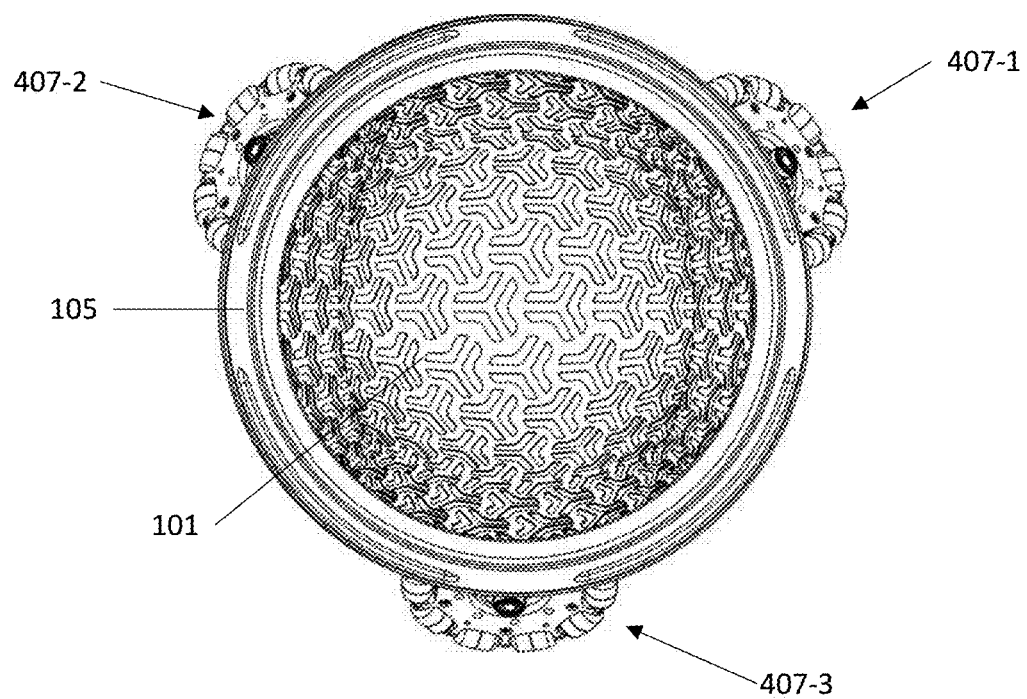
Figure 18I:
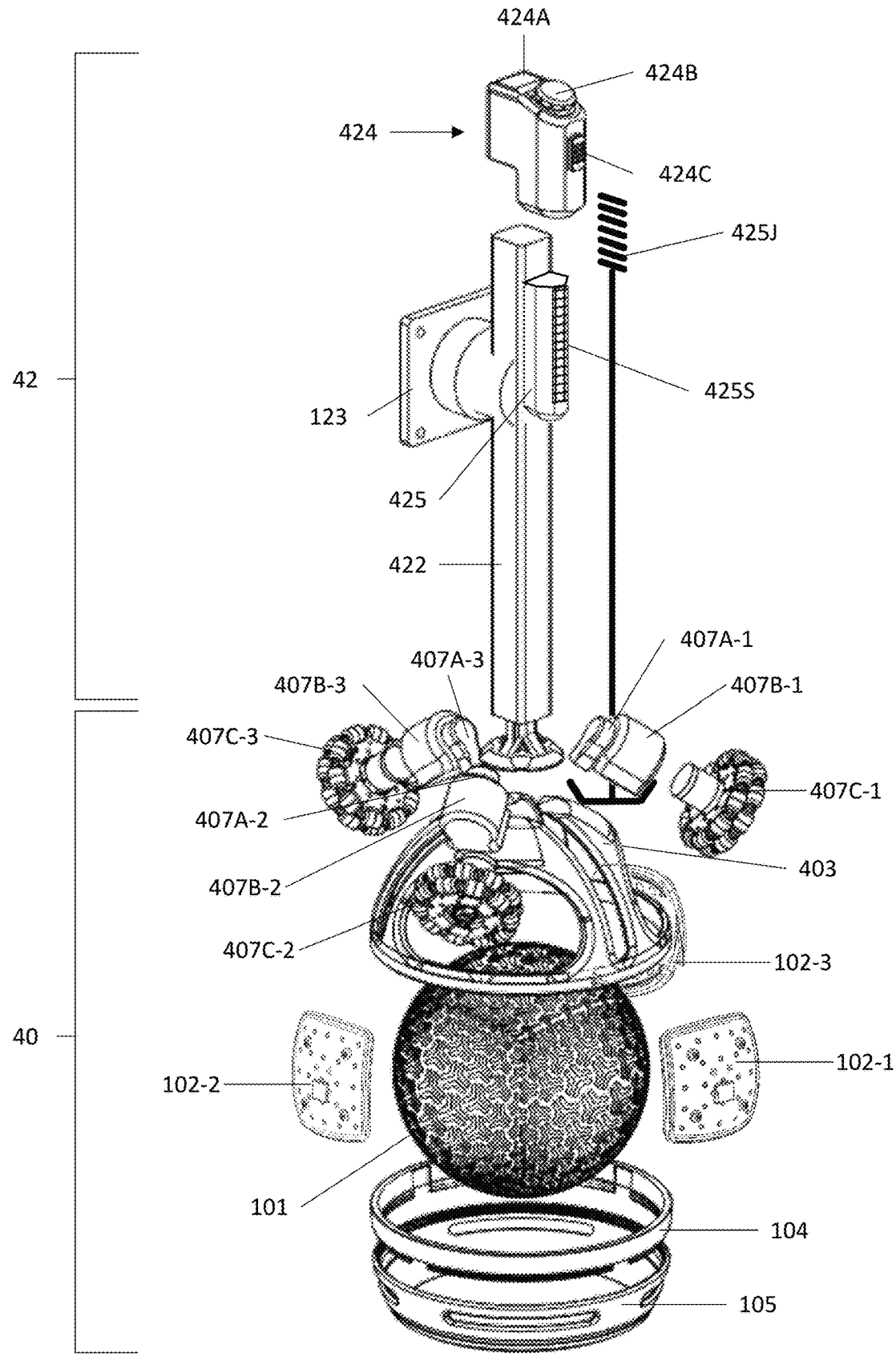
Figure 18J:
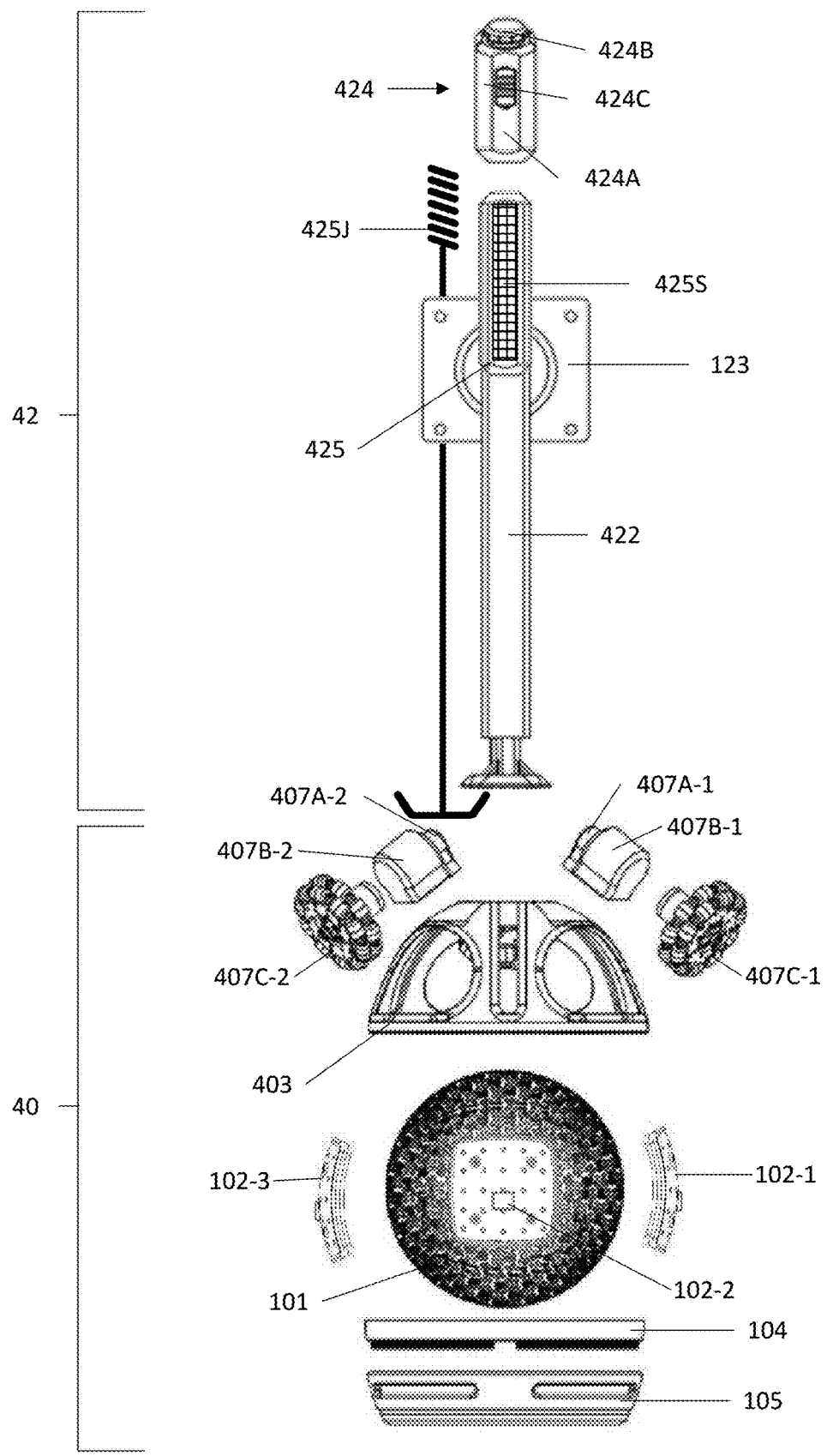
Figure 18K:
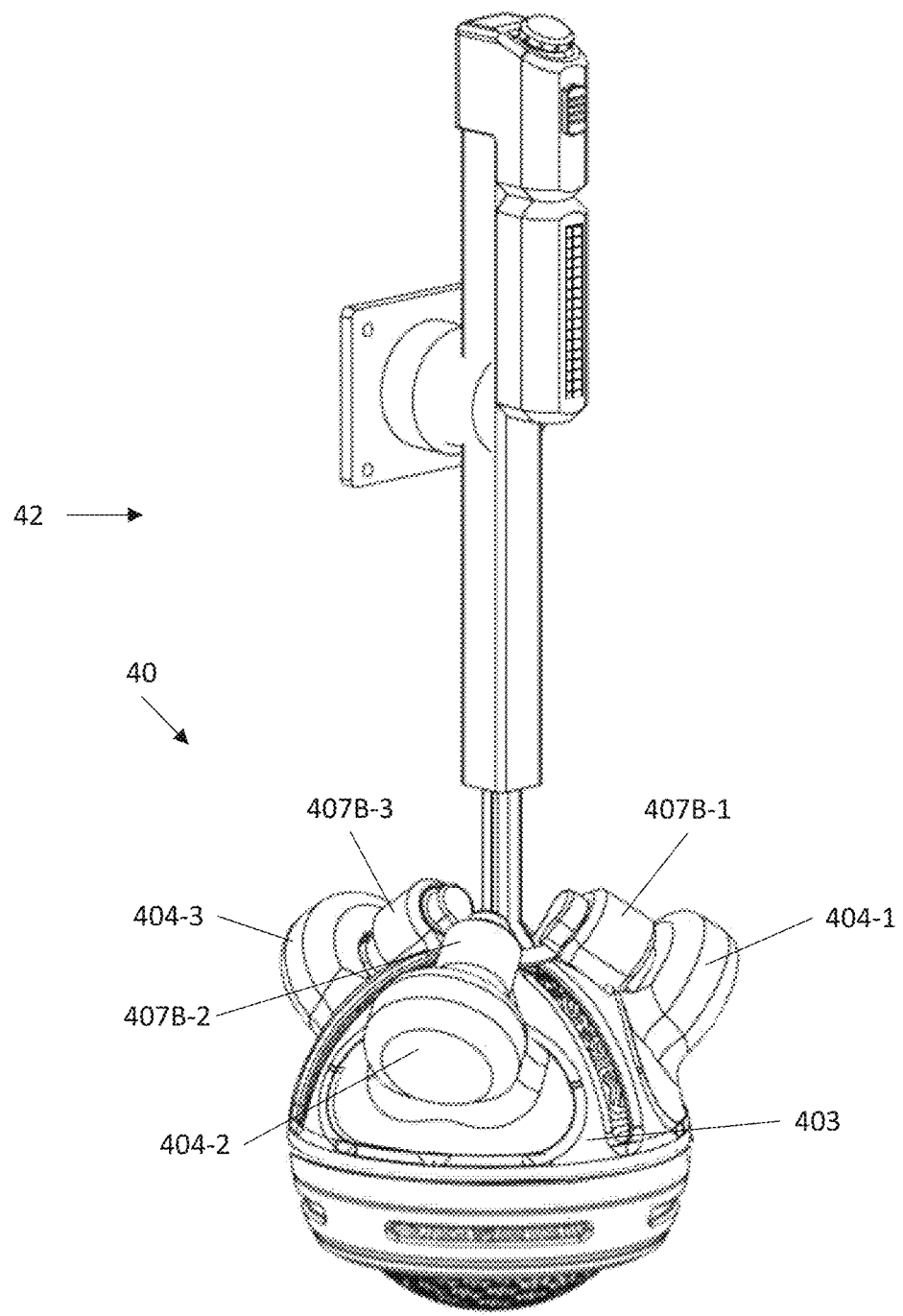
Figure 18L:
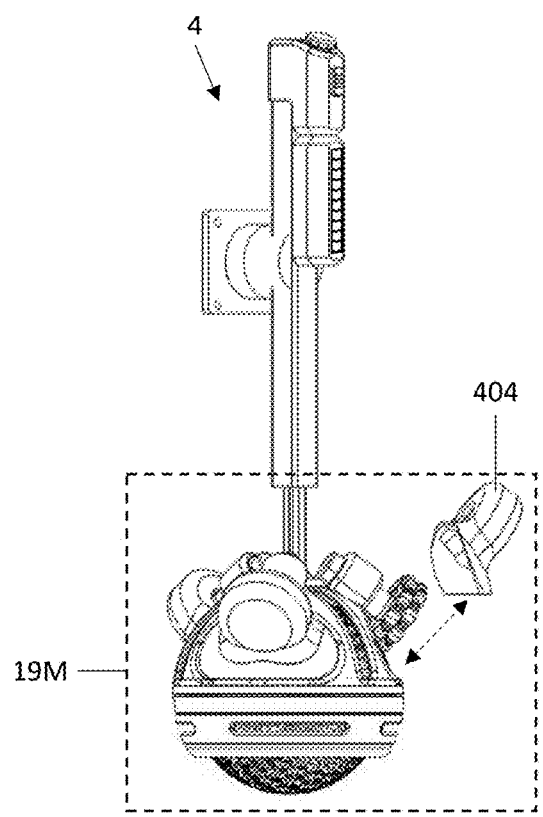
Figure 18M:
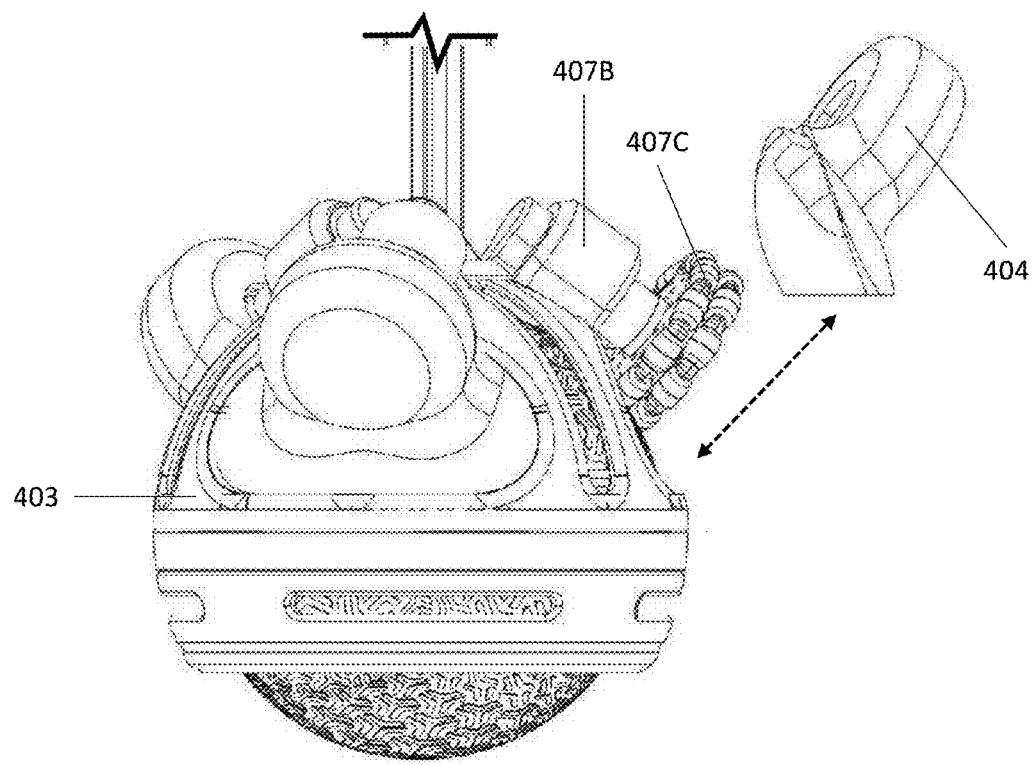
Figure 18N:
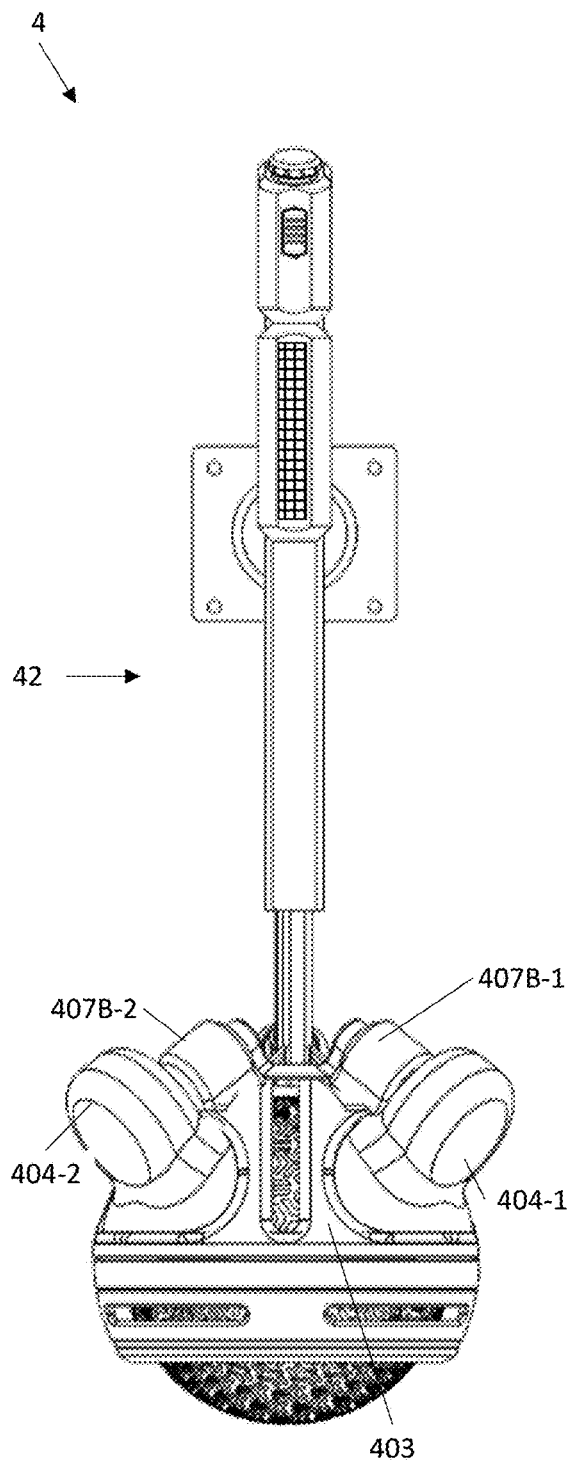
Figure 18O:
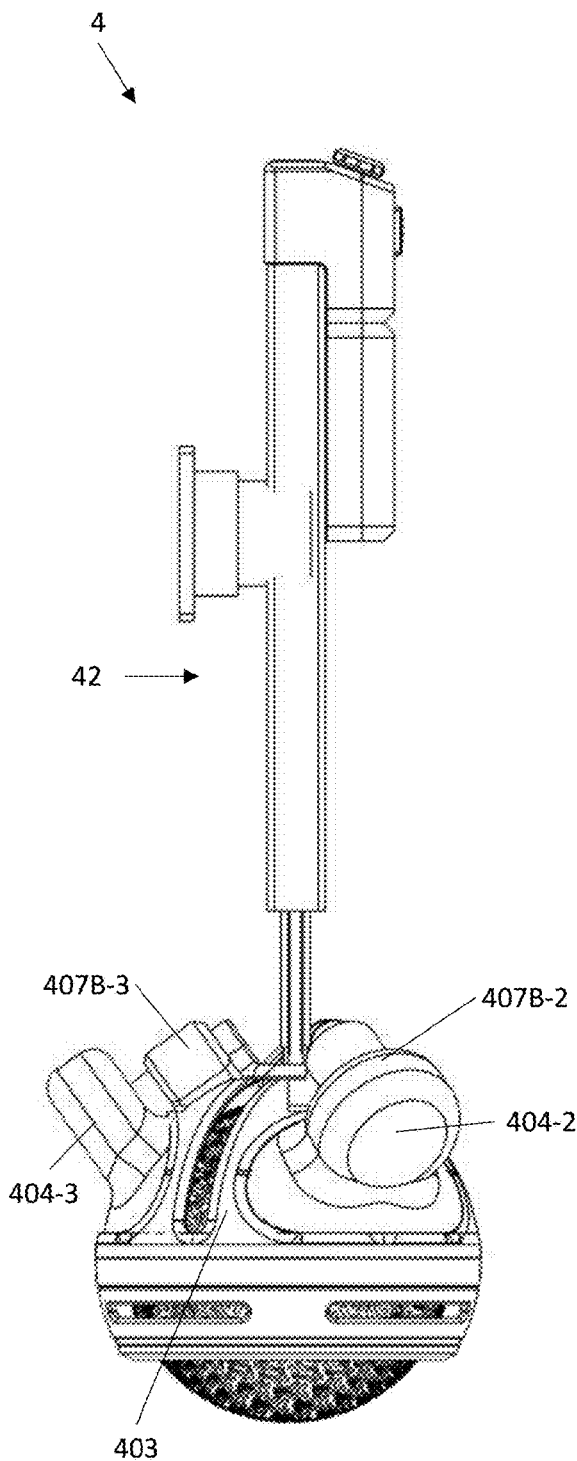
Figure 19A:
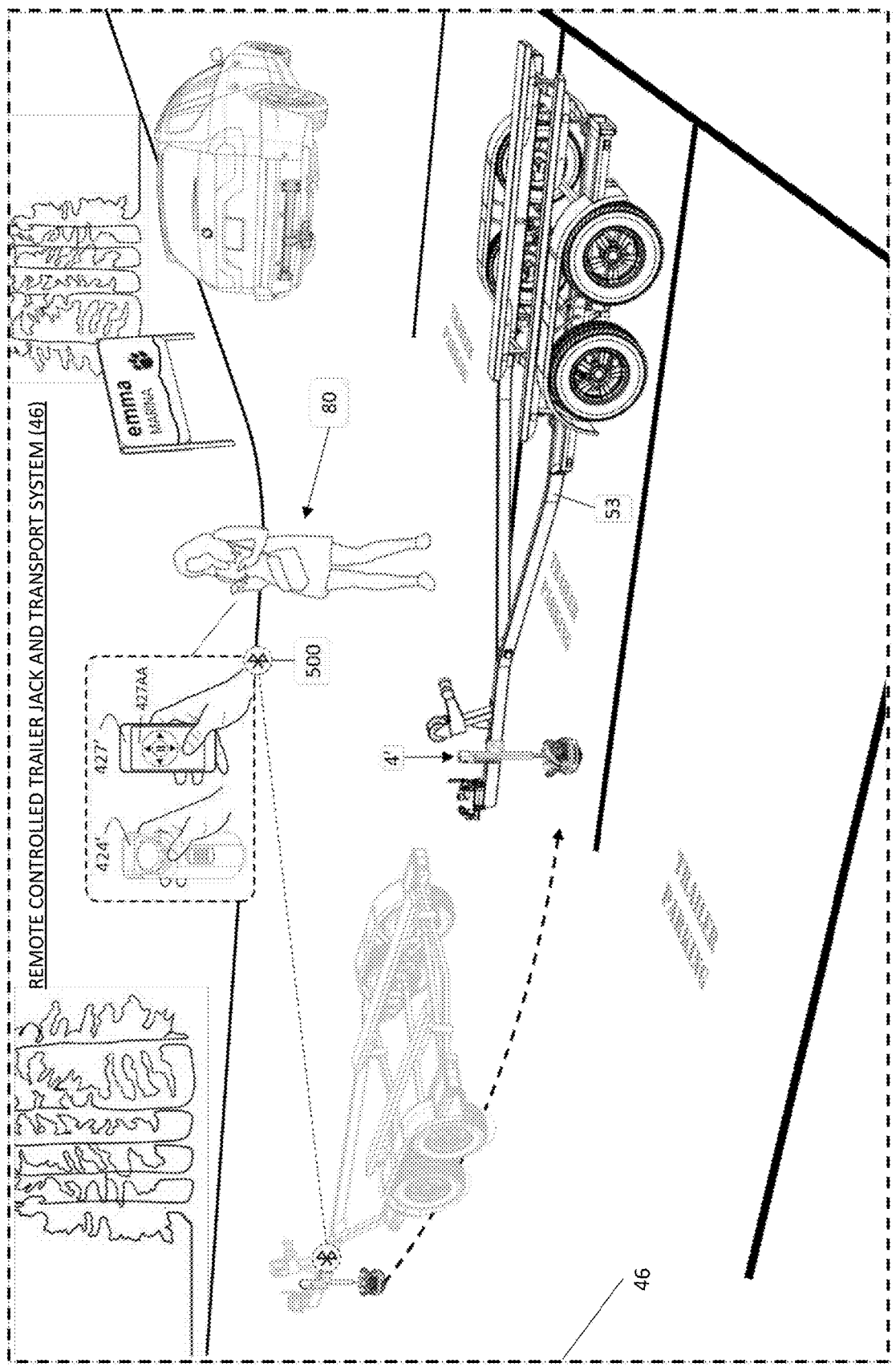
Figure 19B:
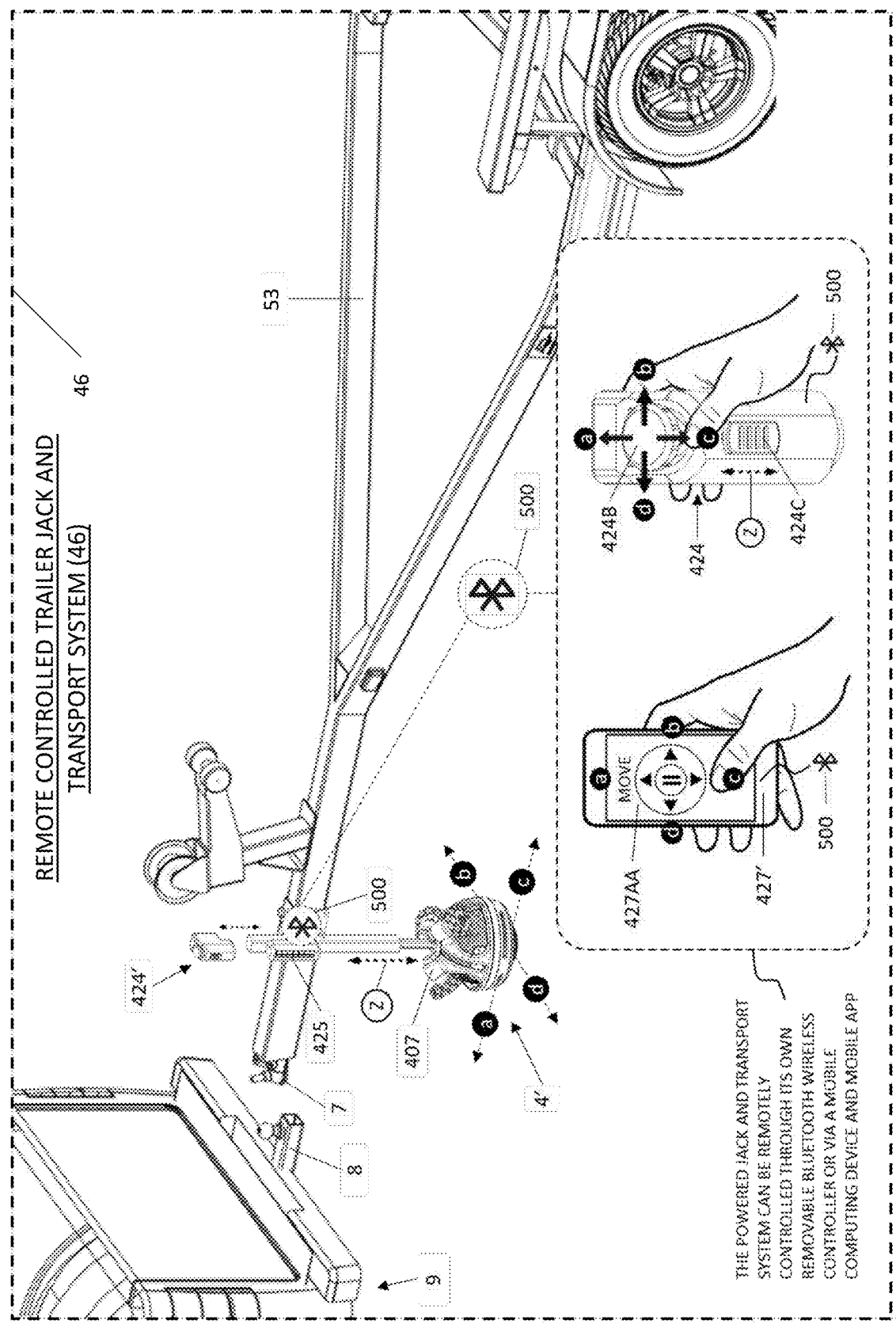
Figure 19C:
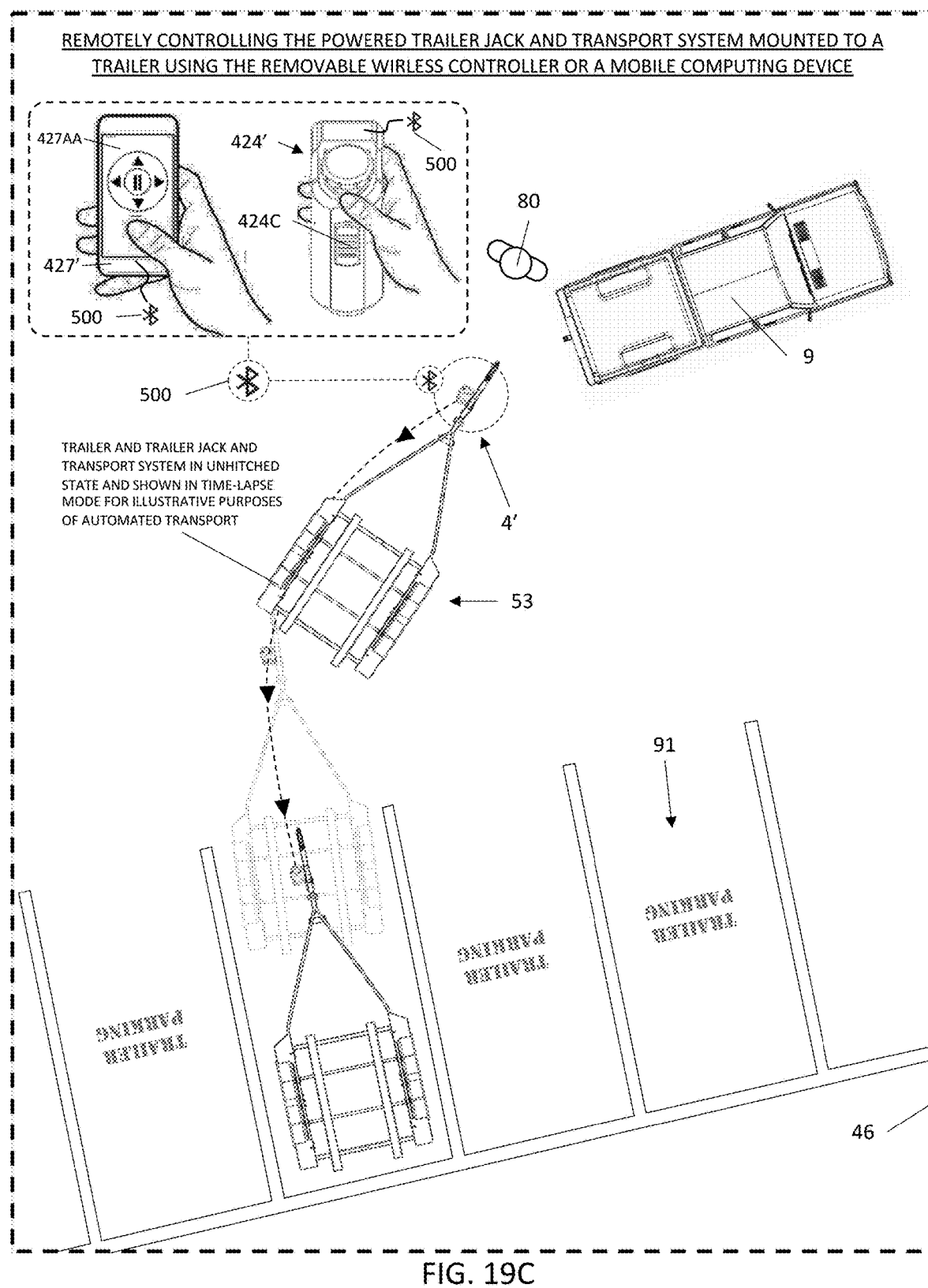
Figure 20:
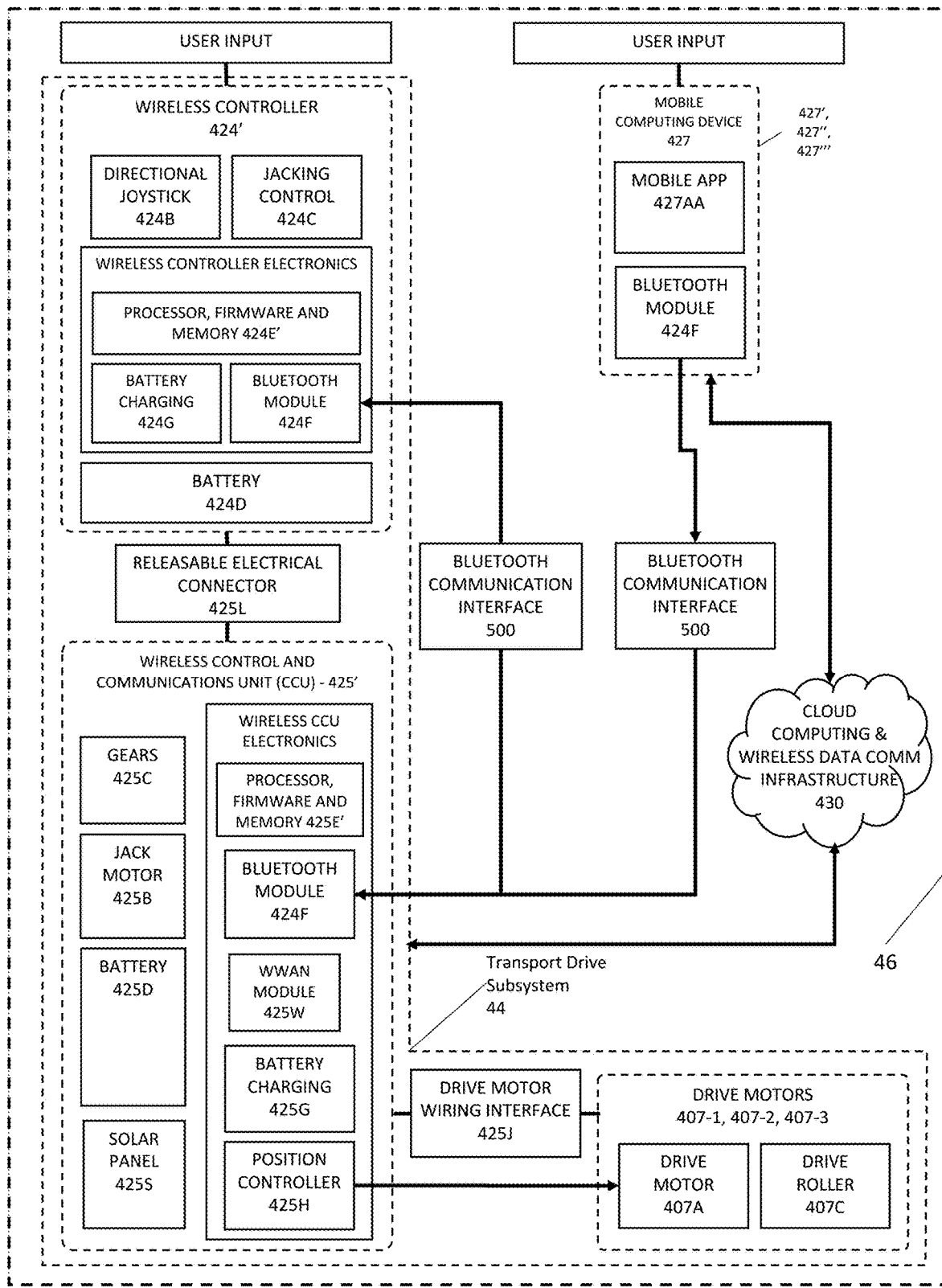
Figure 21A:
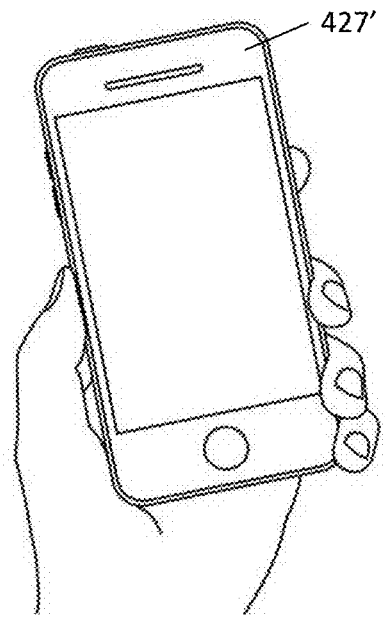
Figure 21B:
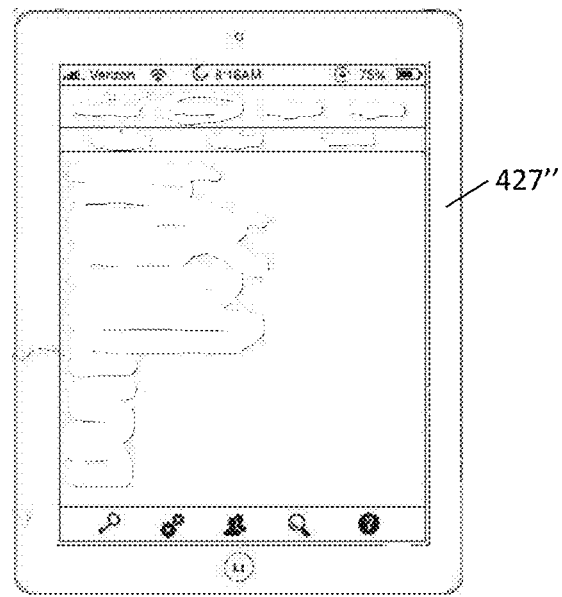
Figure 21C:
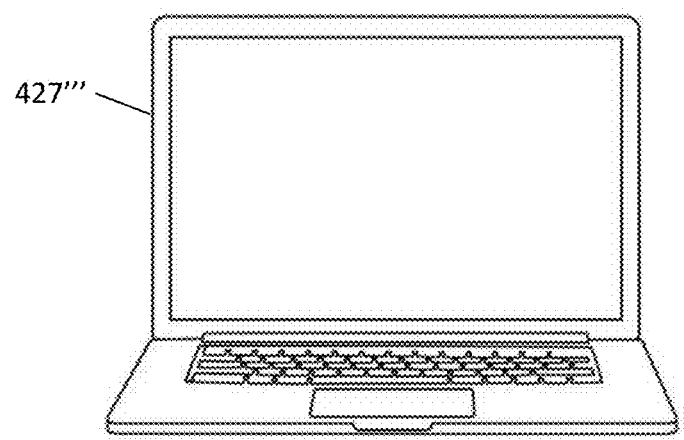
Figure 21D:
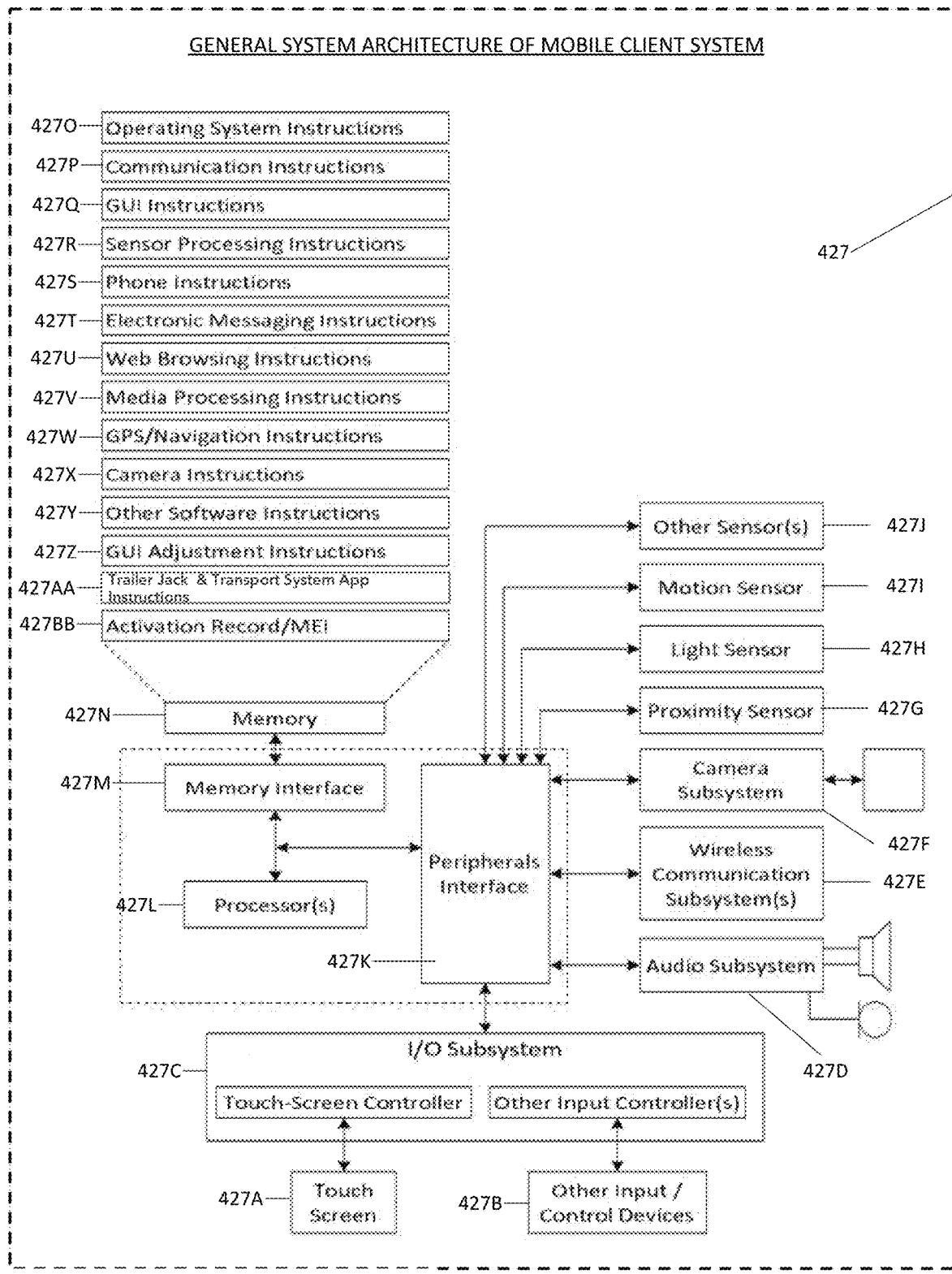
Figure 22:
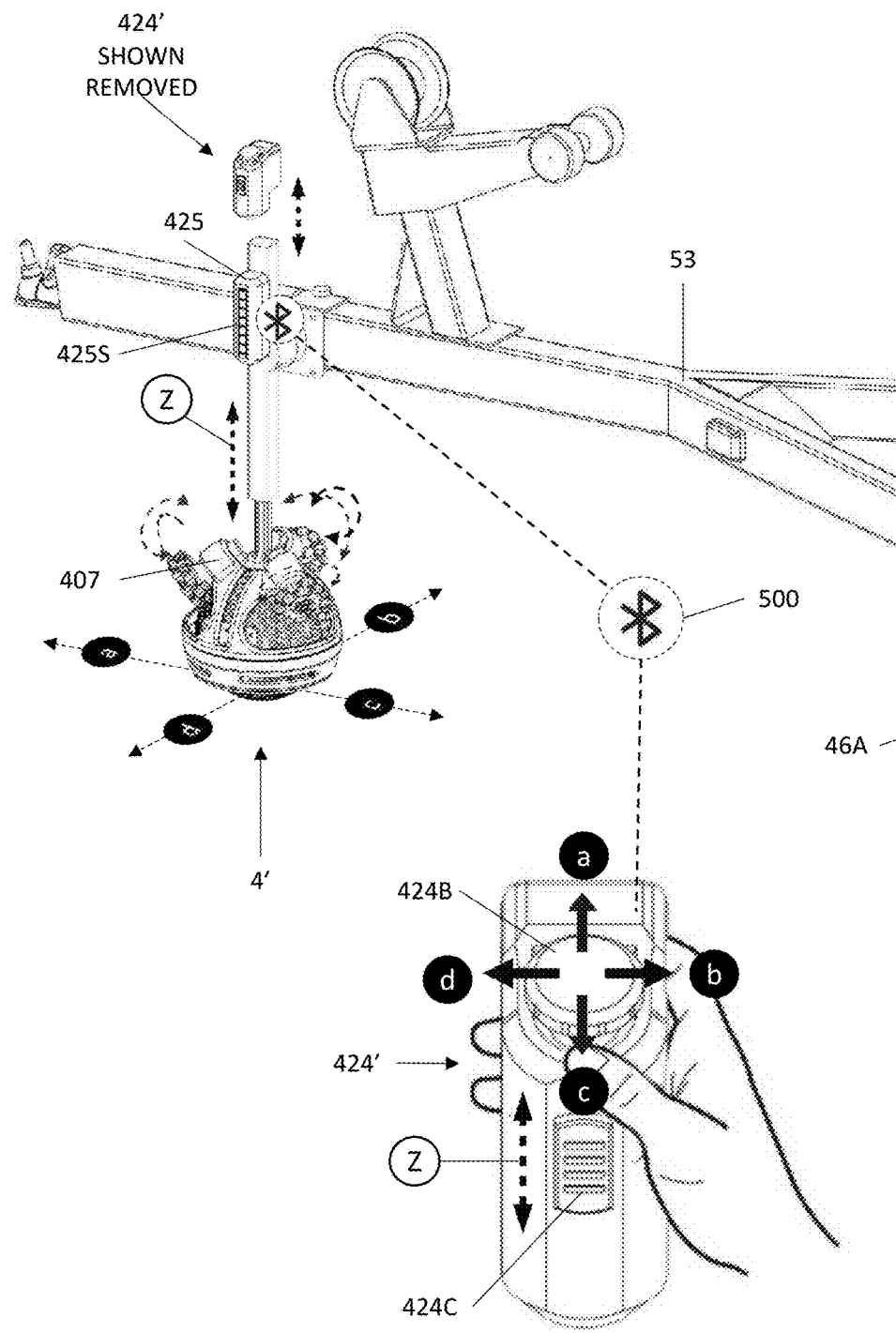
Figure 23:
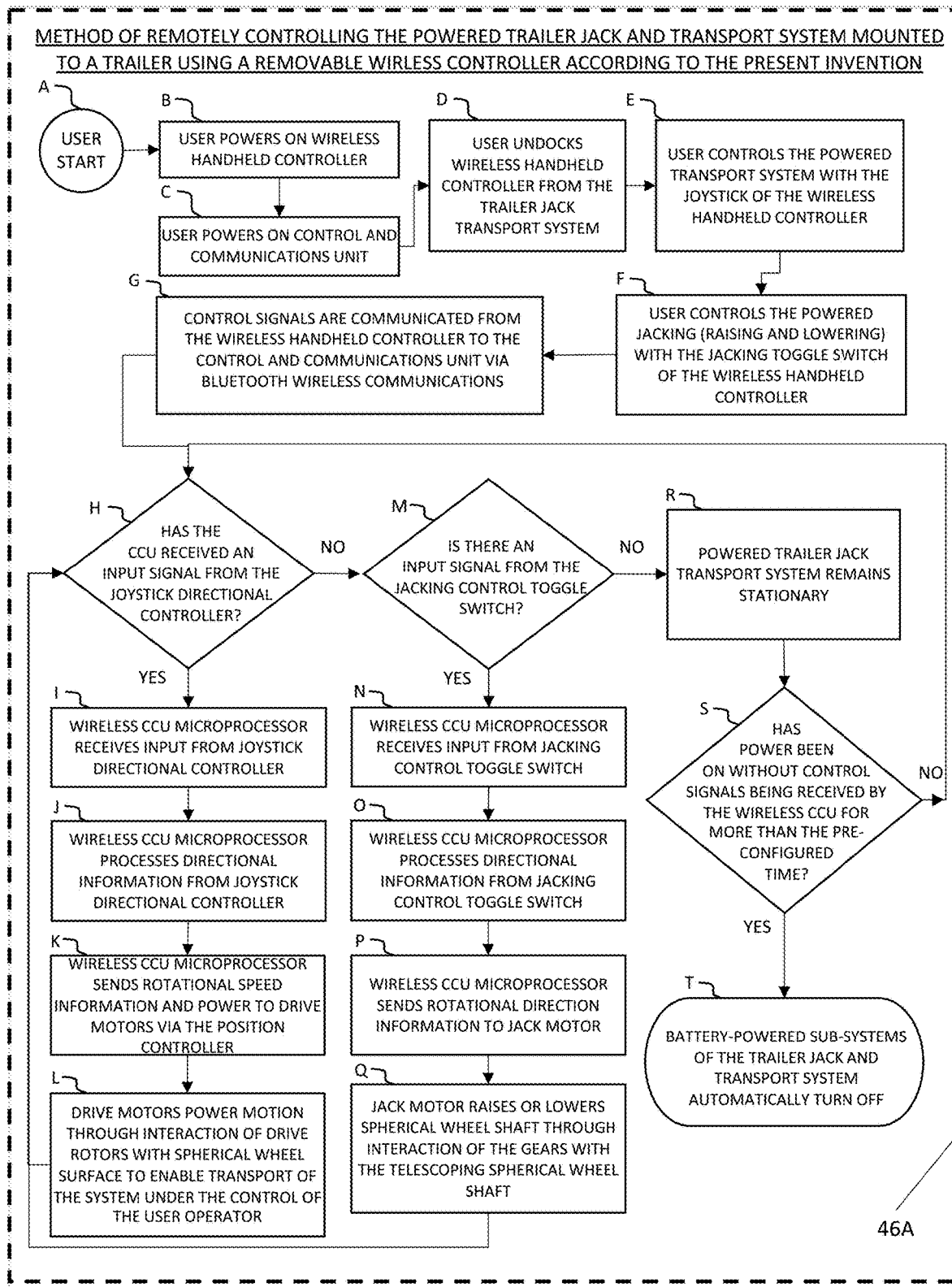
Figure 24:
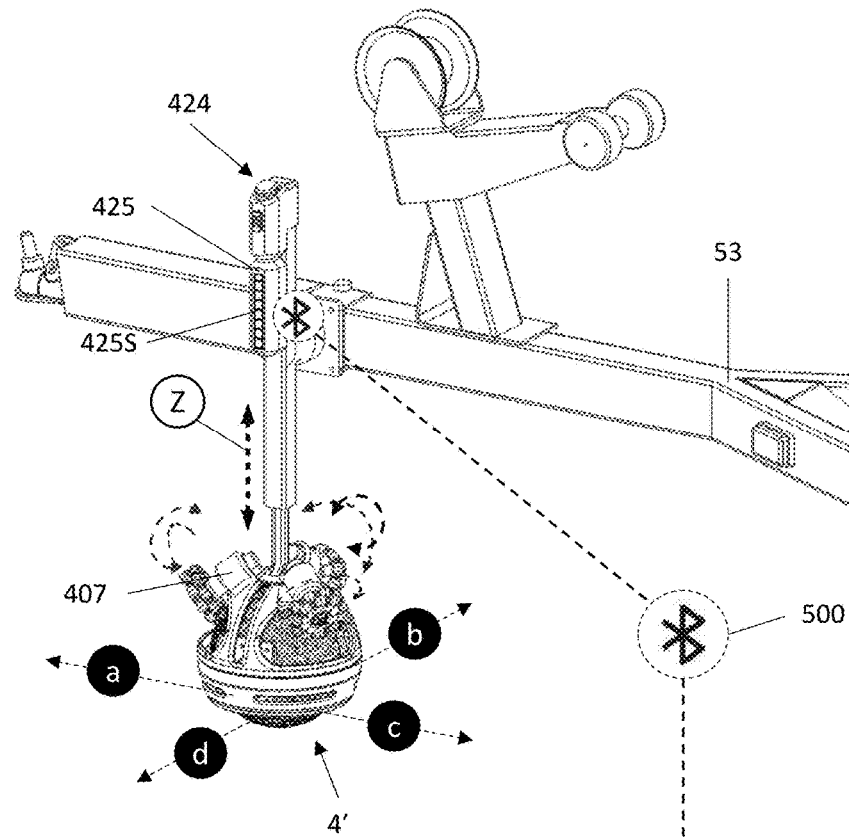
Figure 24:
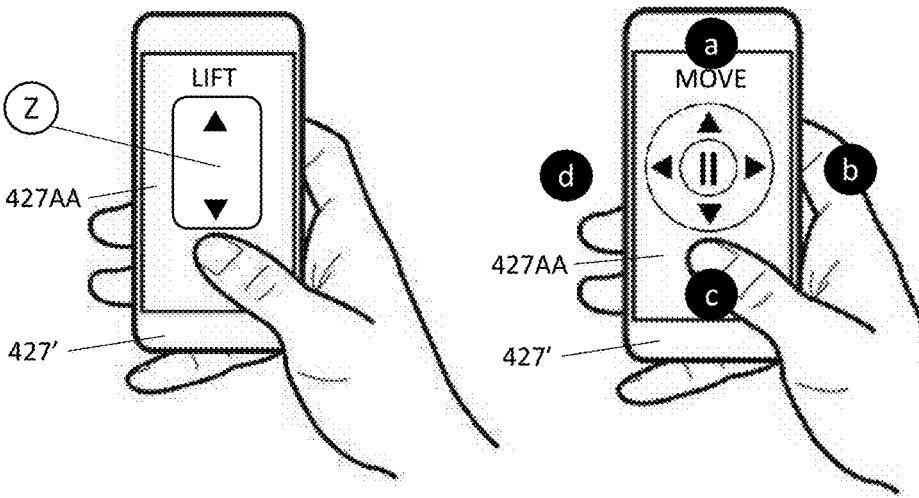
Figure 25:
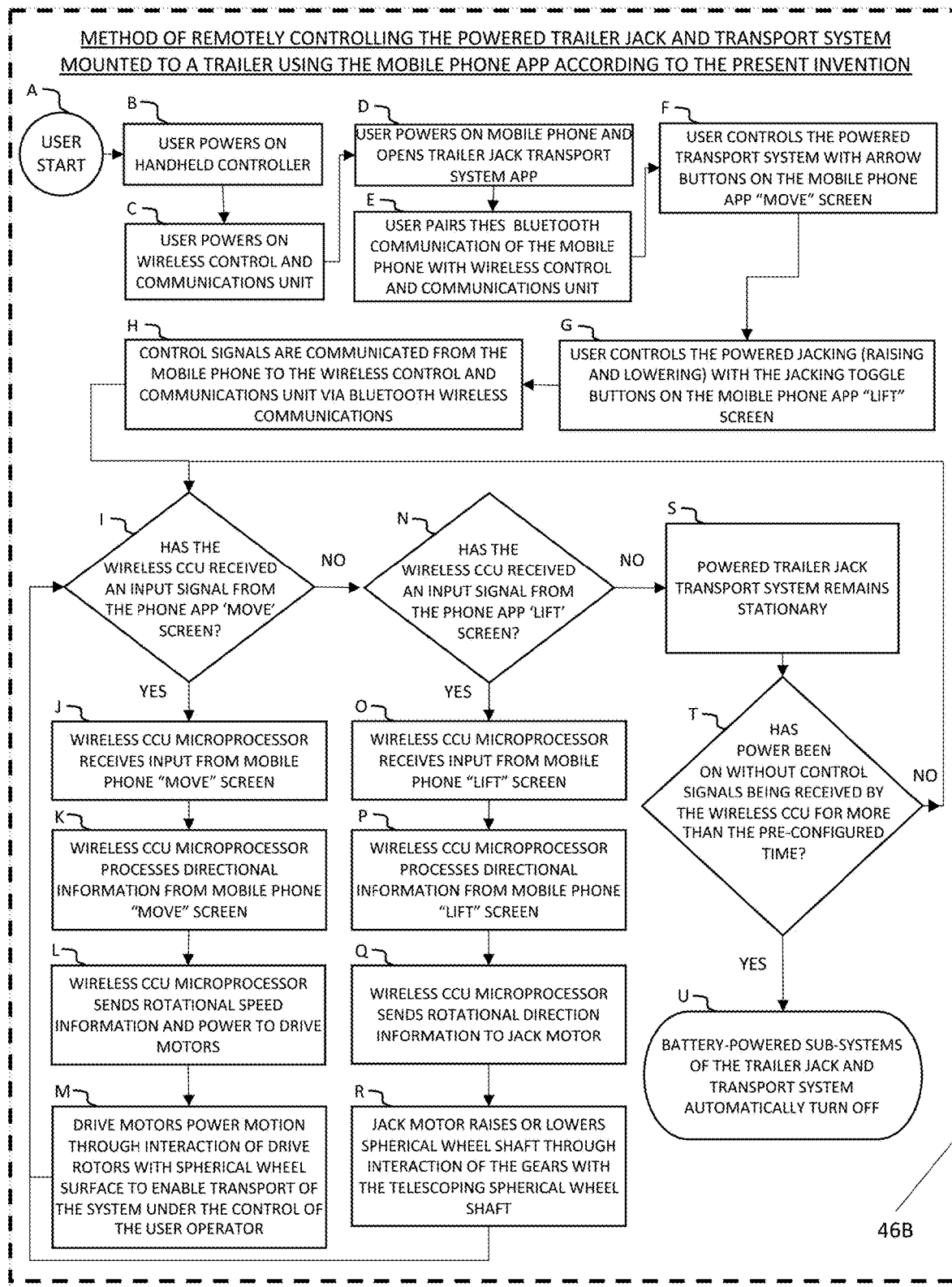
Figure 26A:
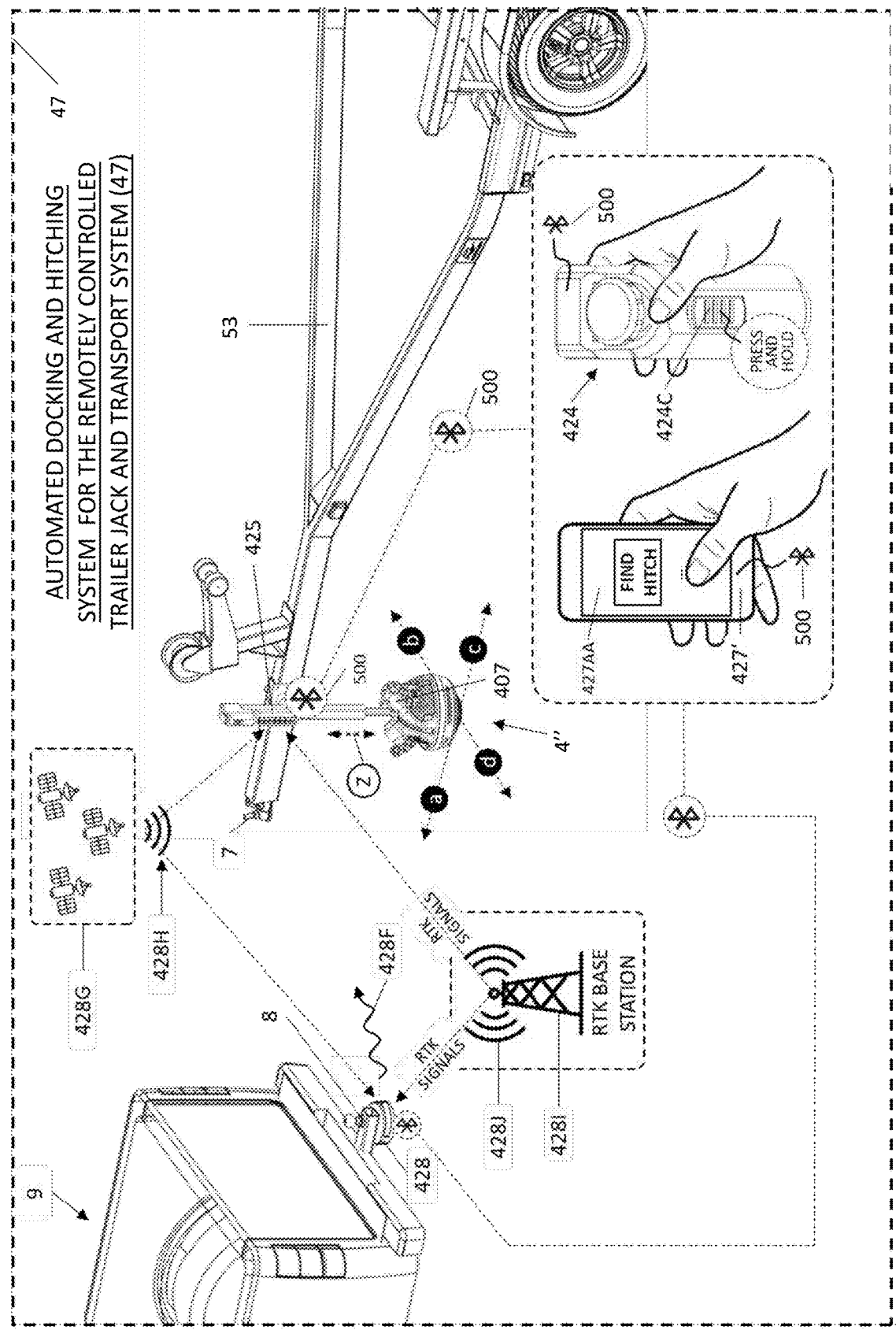
Figure 26B:
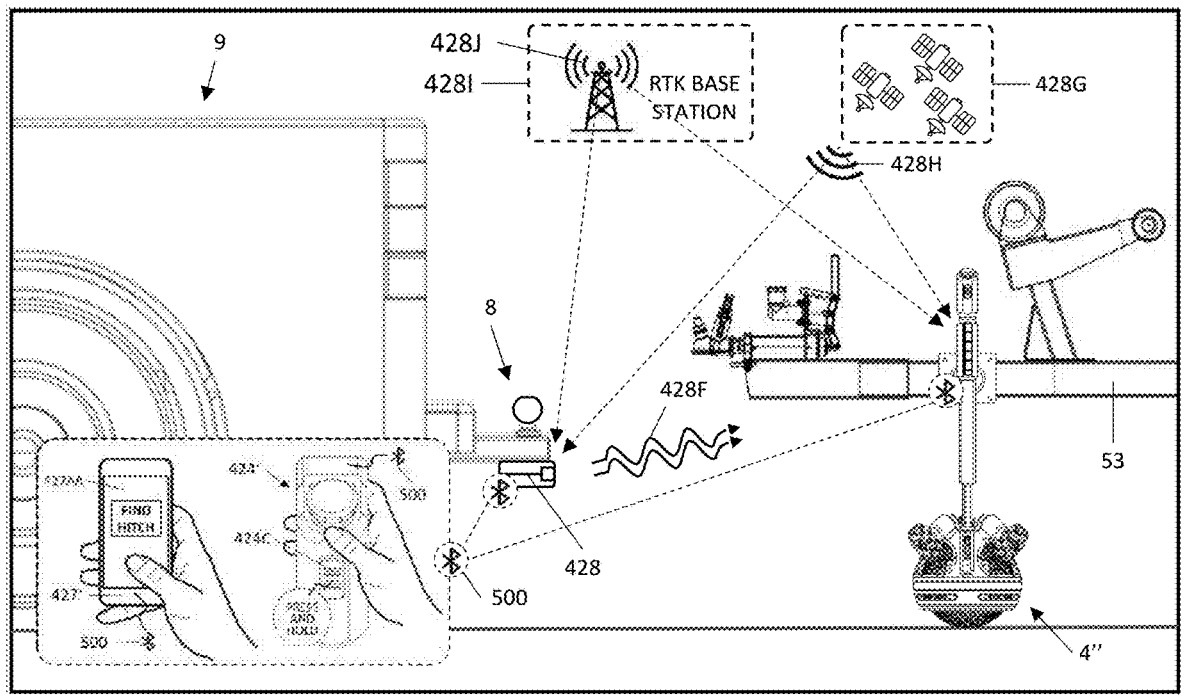
Figure 26C:
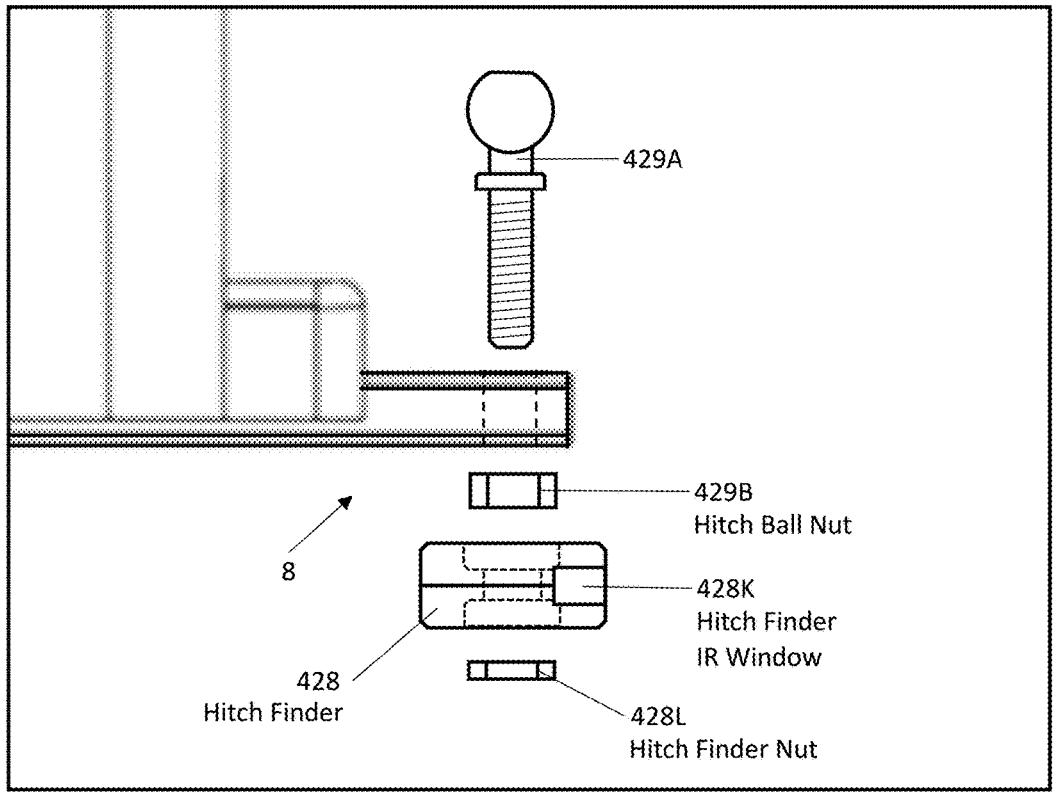
Figure 26D:
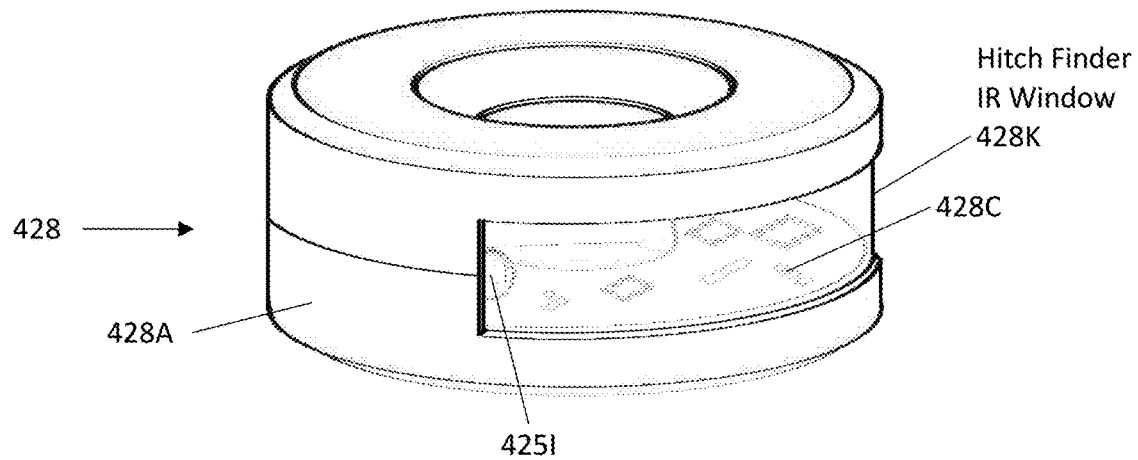
Figure 26E:
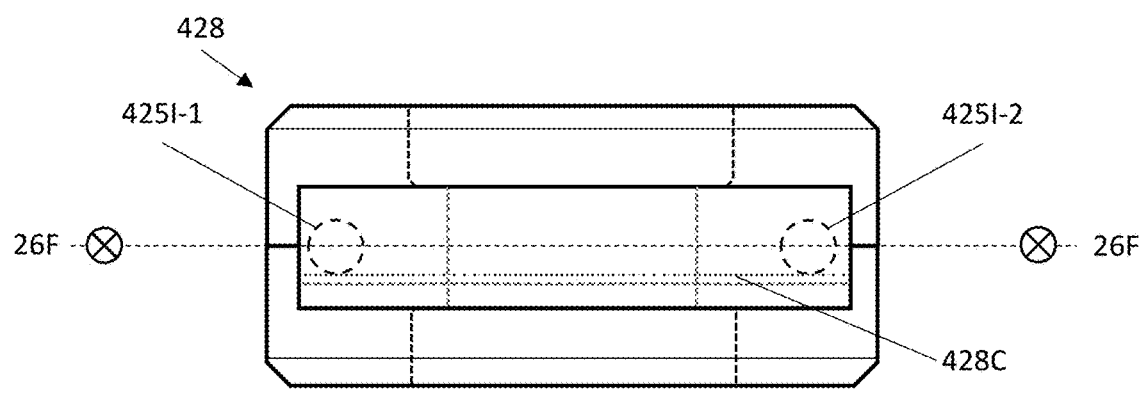
Figure 26F:
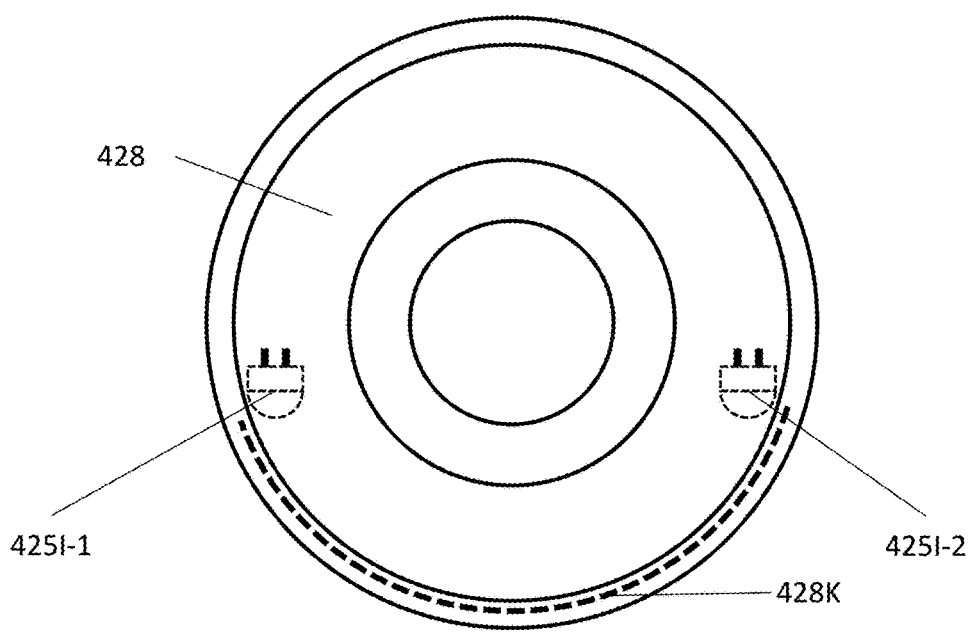
Figure 26G:
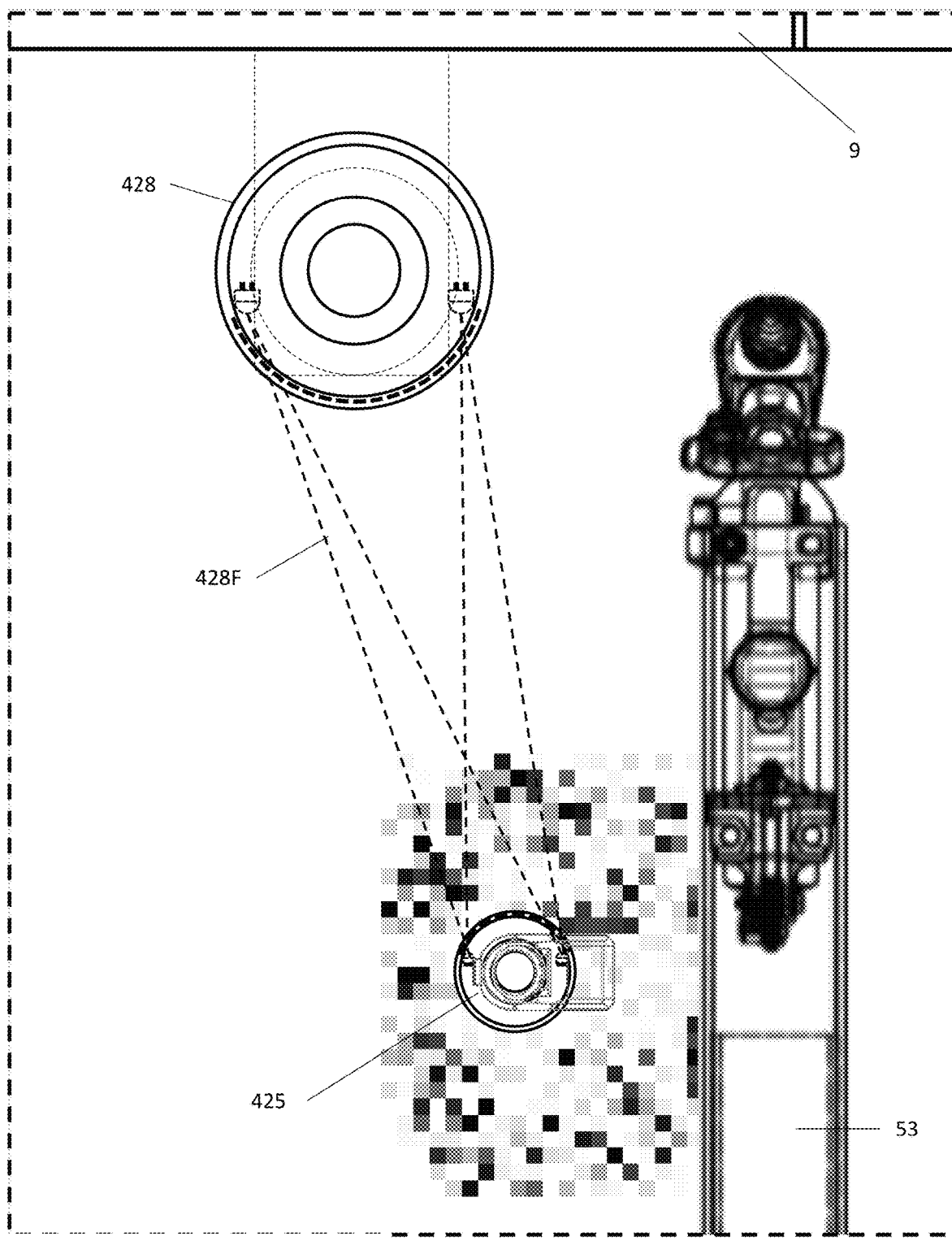
Figure 27:
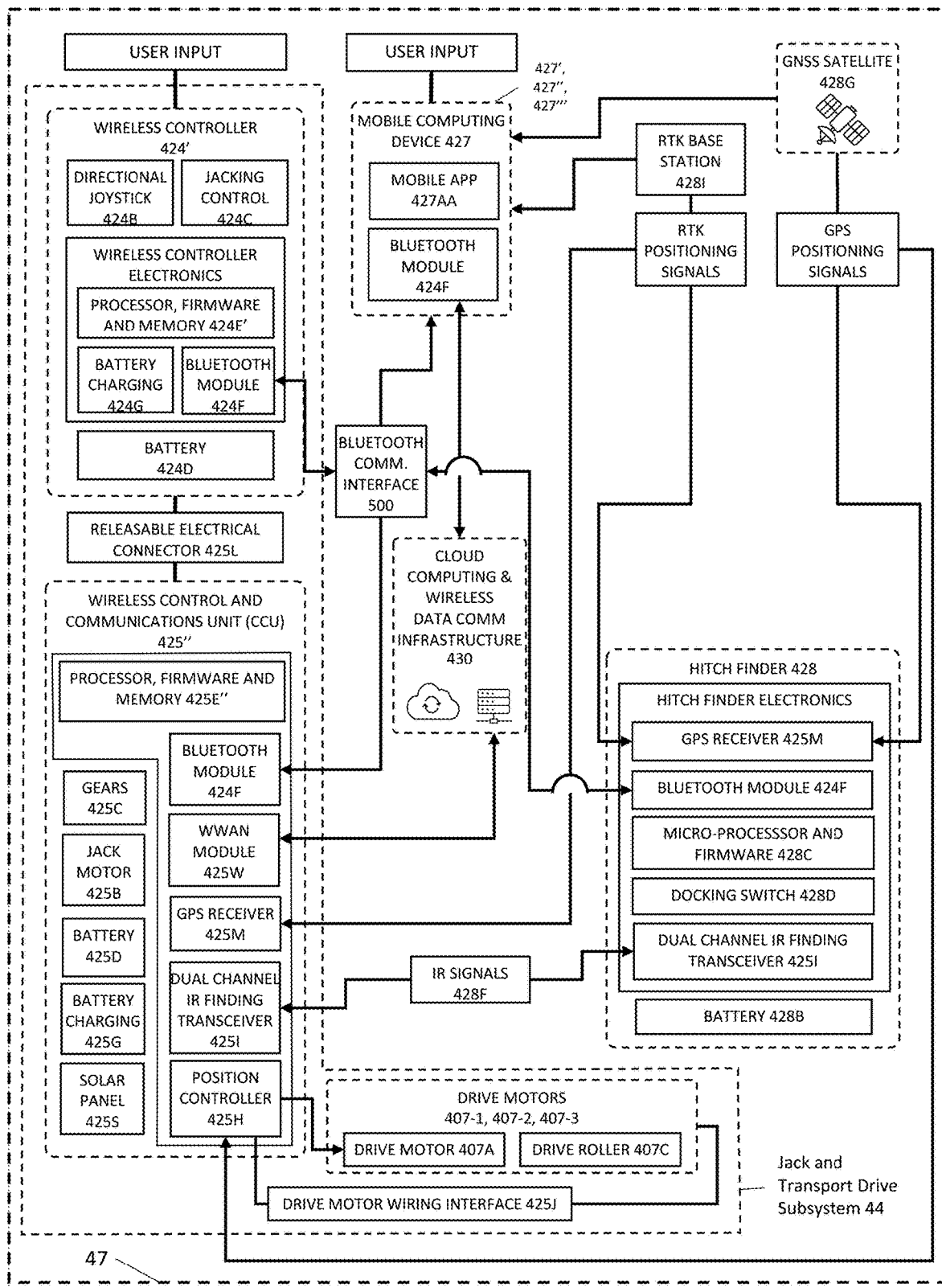
Figure 28:
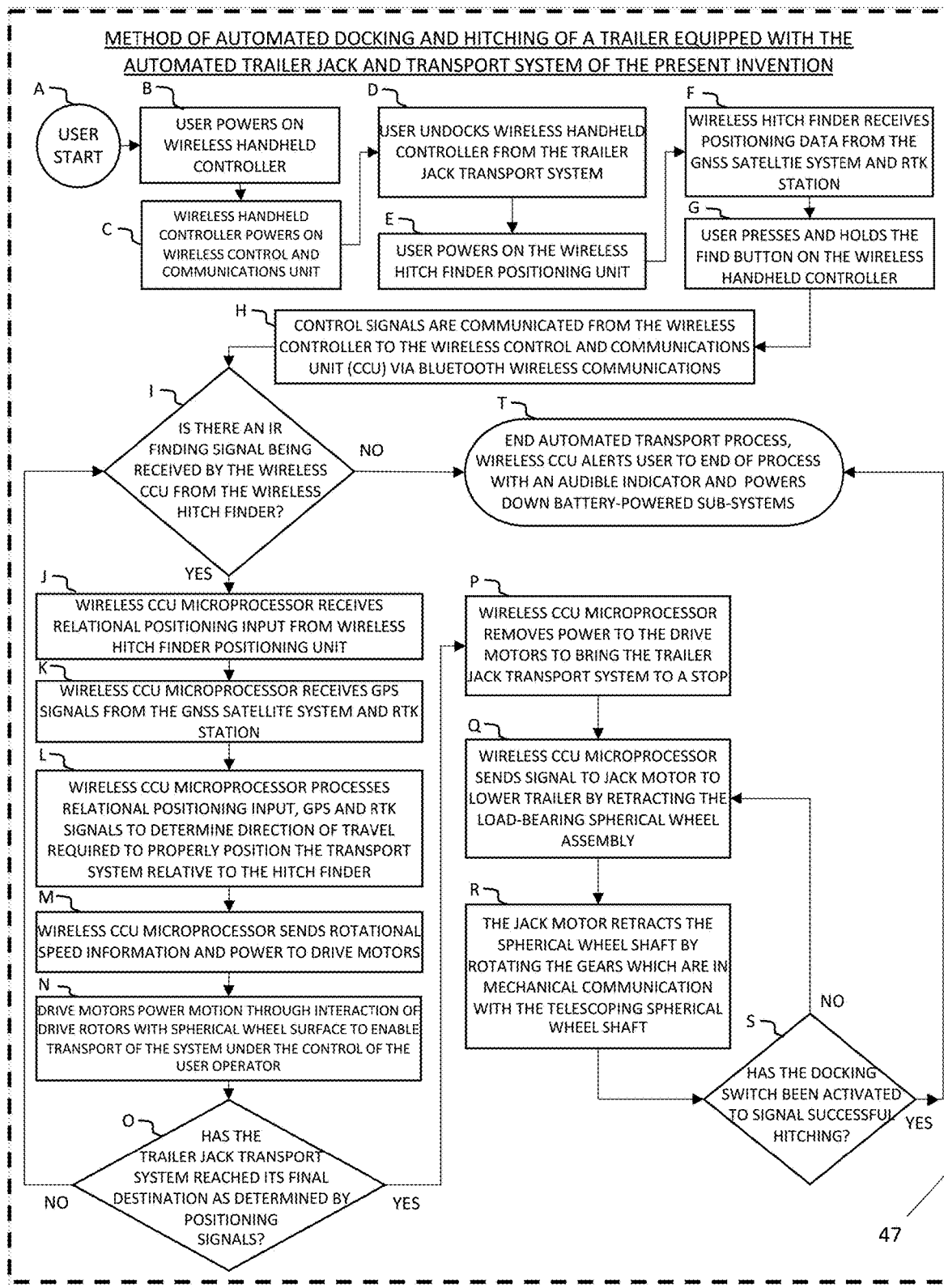
Figure 29:
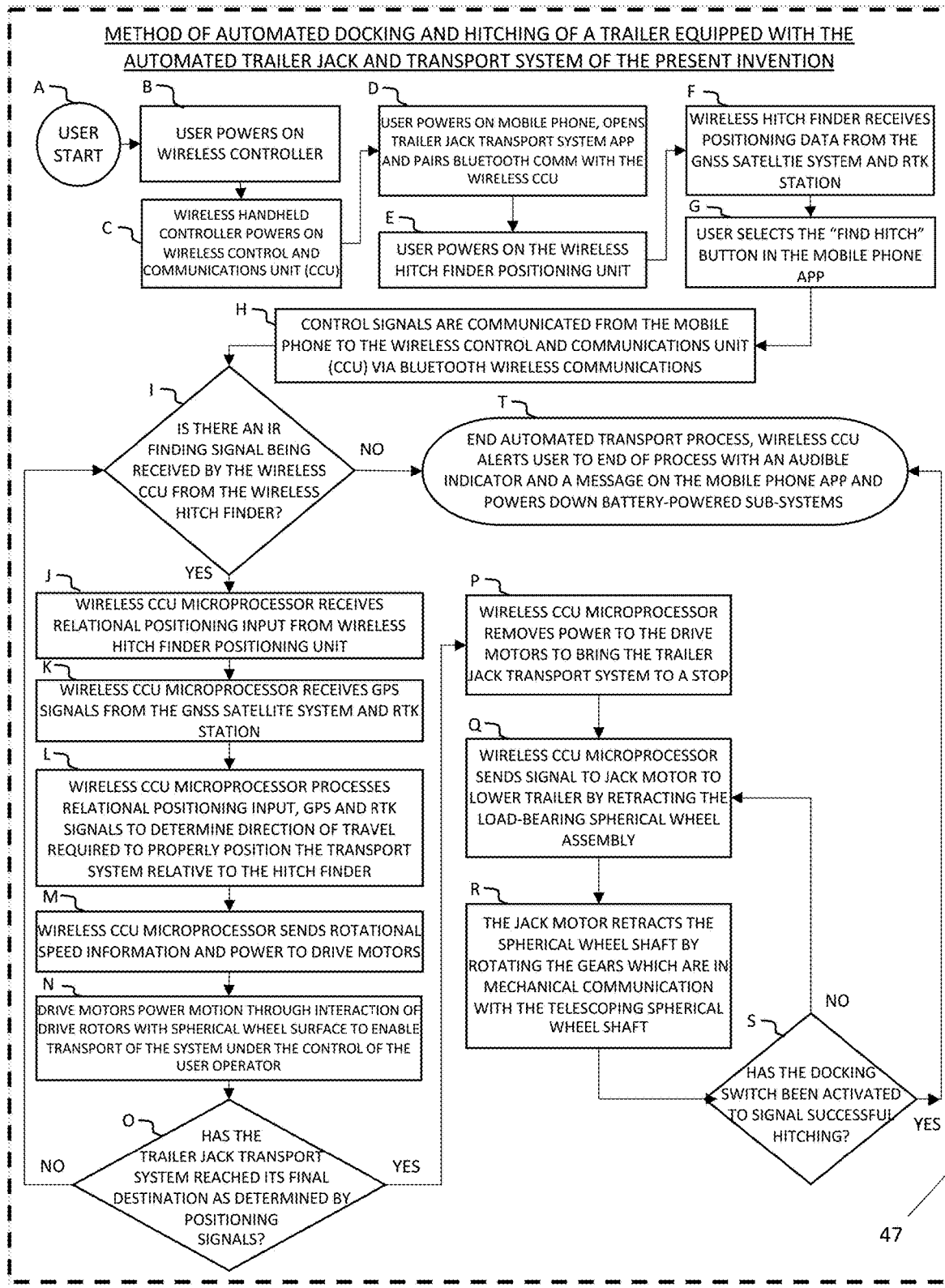
Figure 30A:
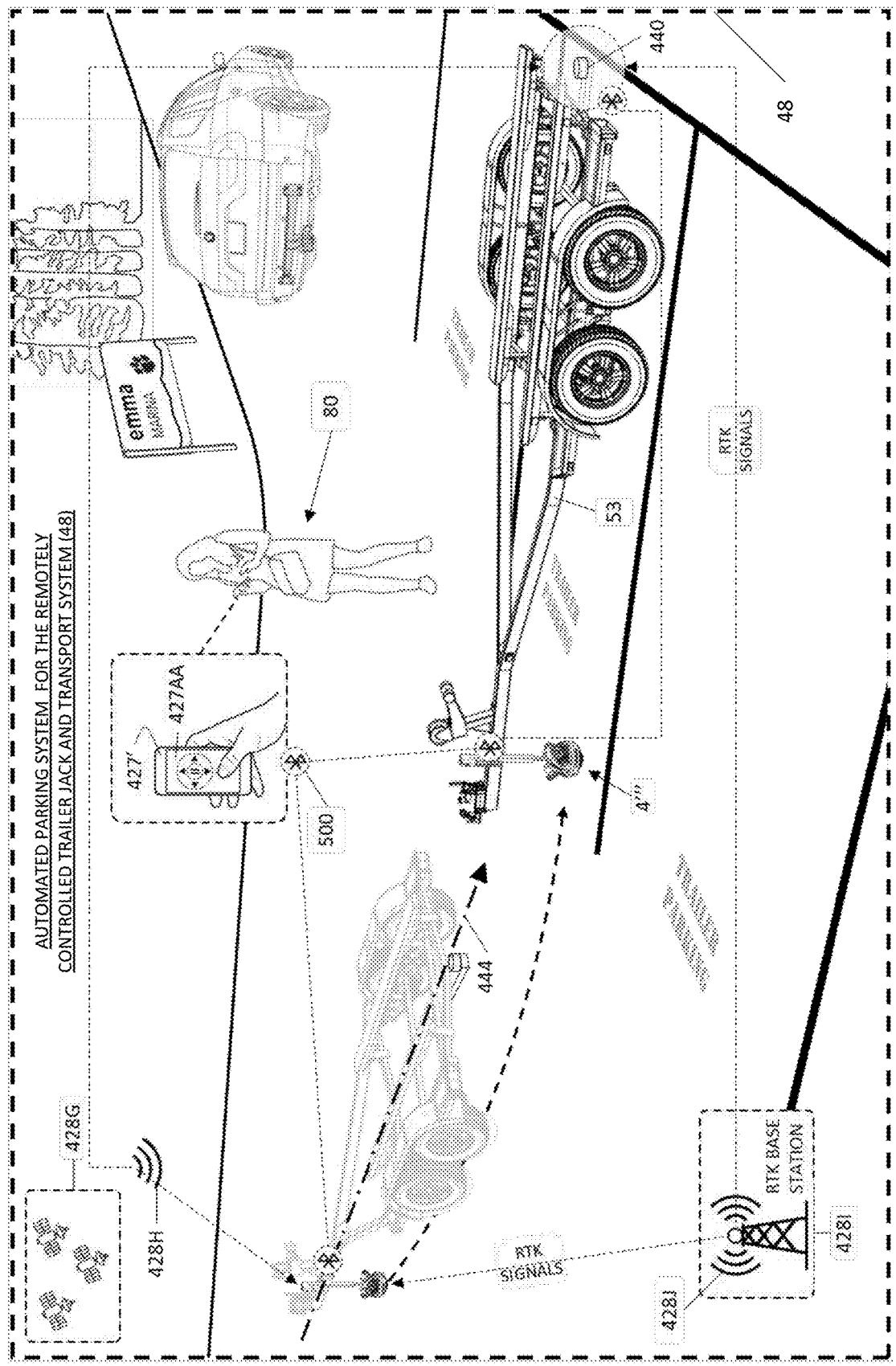
Figure 30B:
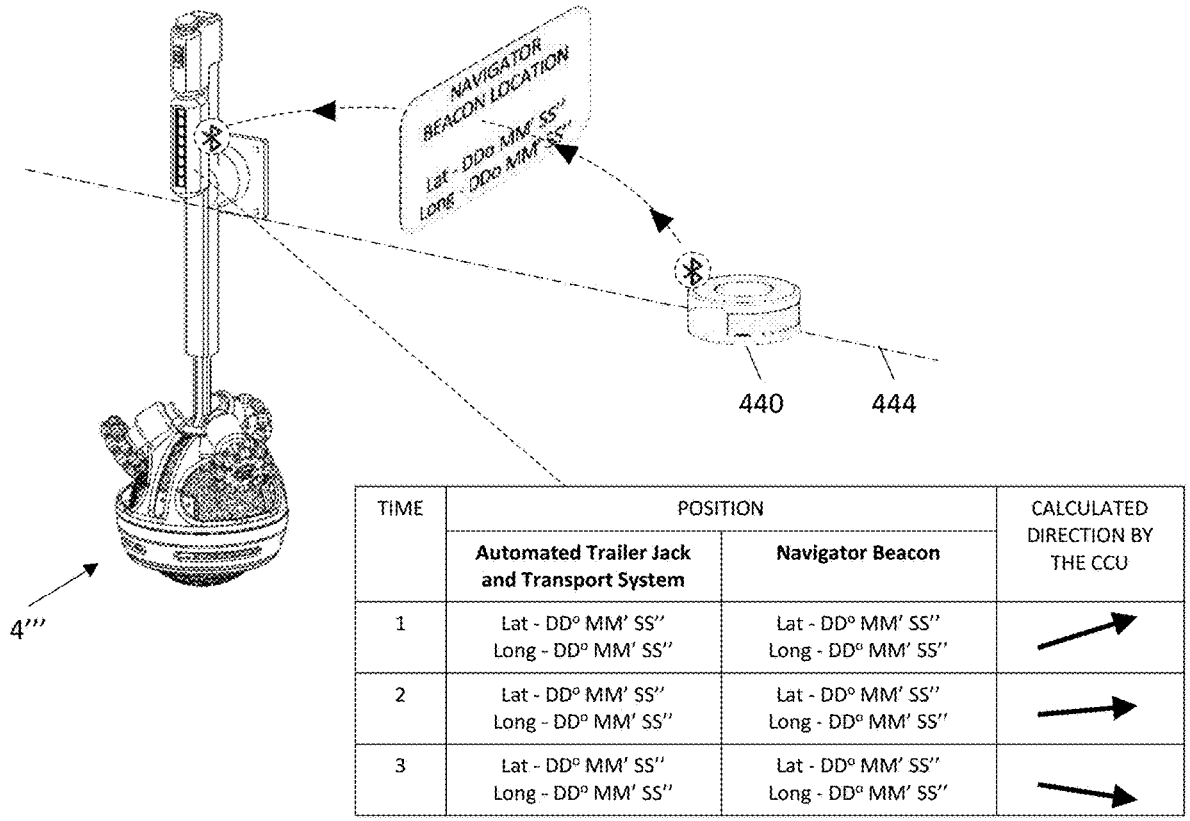
Figure 30C:
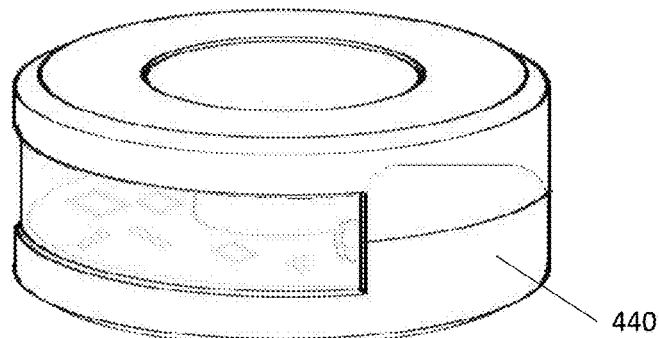
Figure 31:
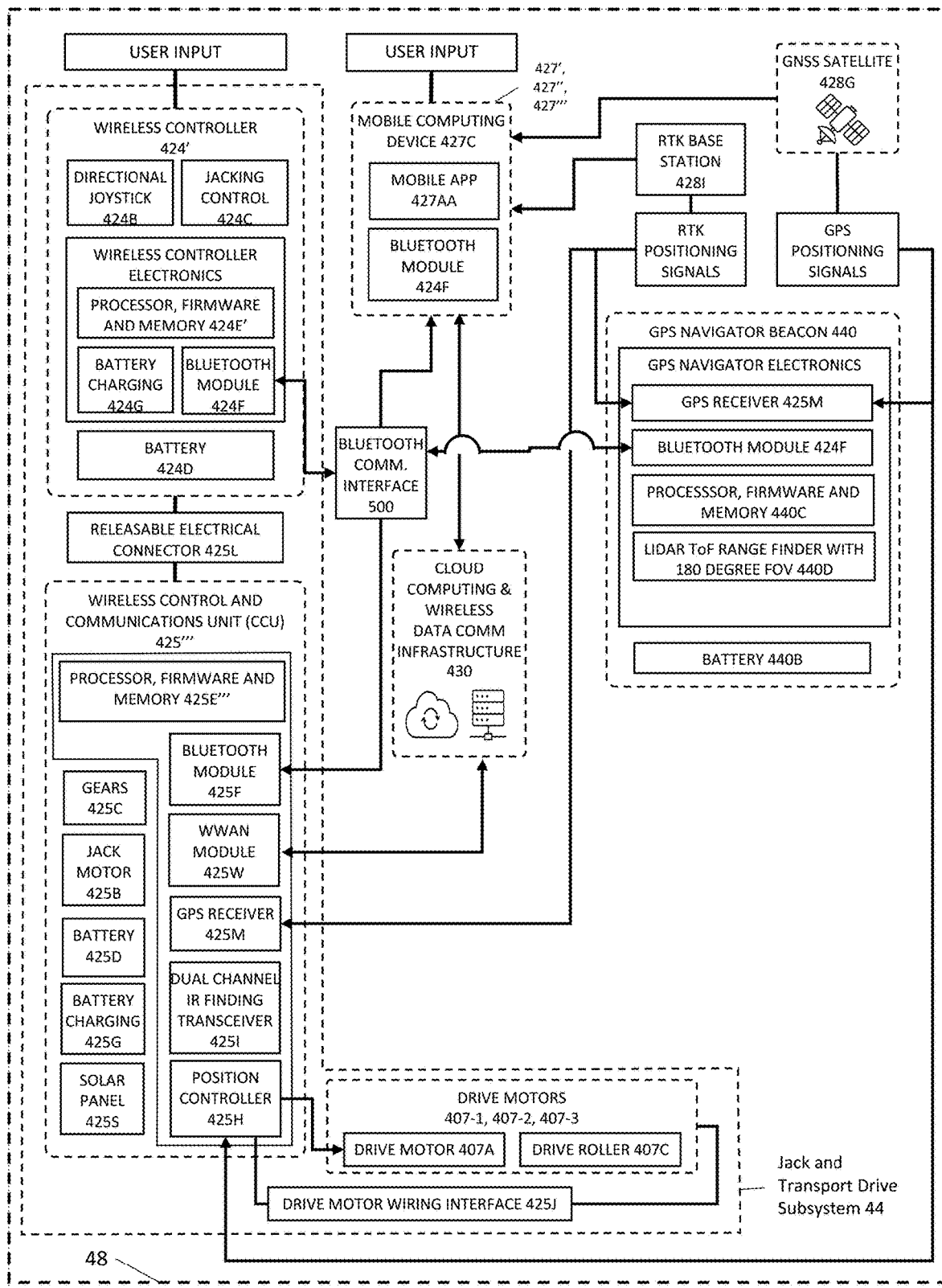
Figure 32:
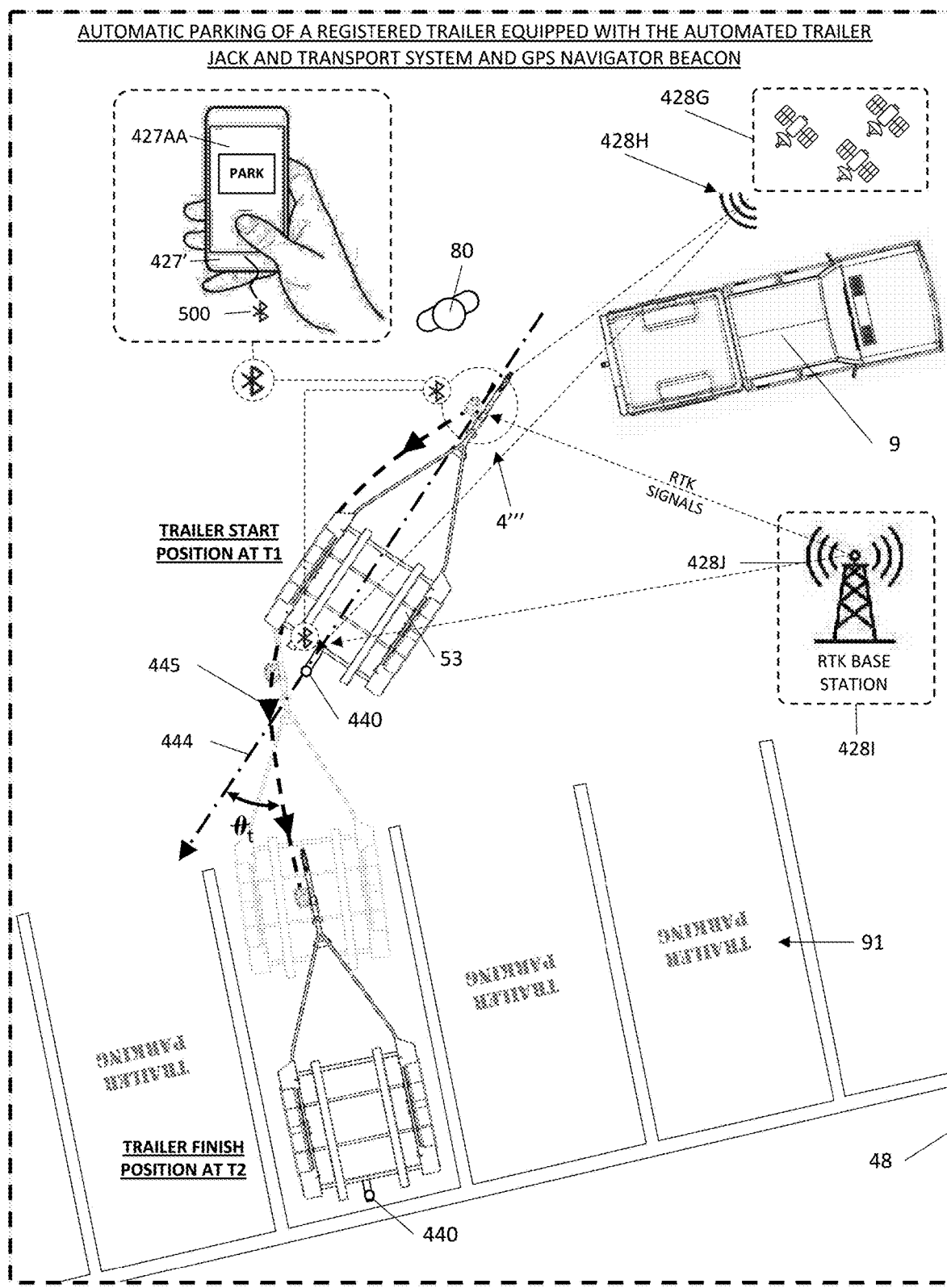
Figure 33:
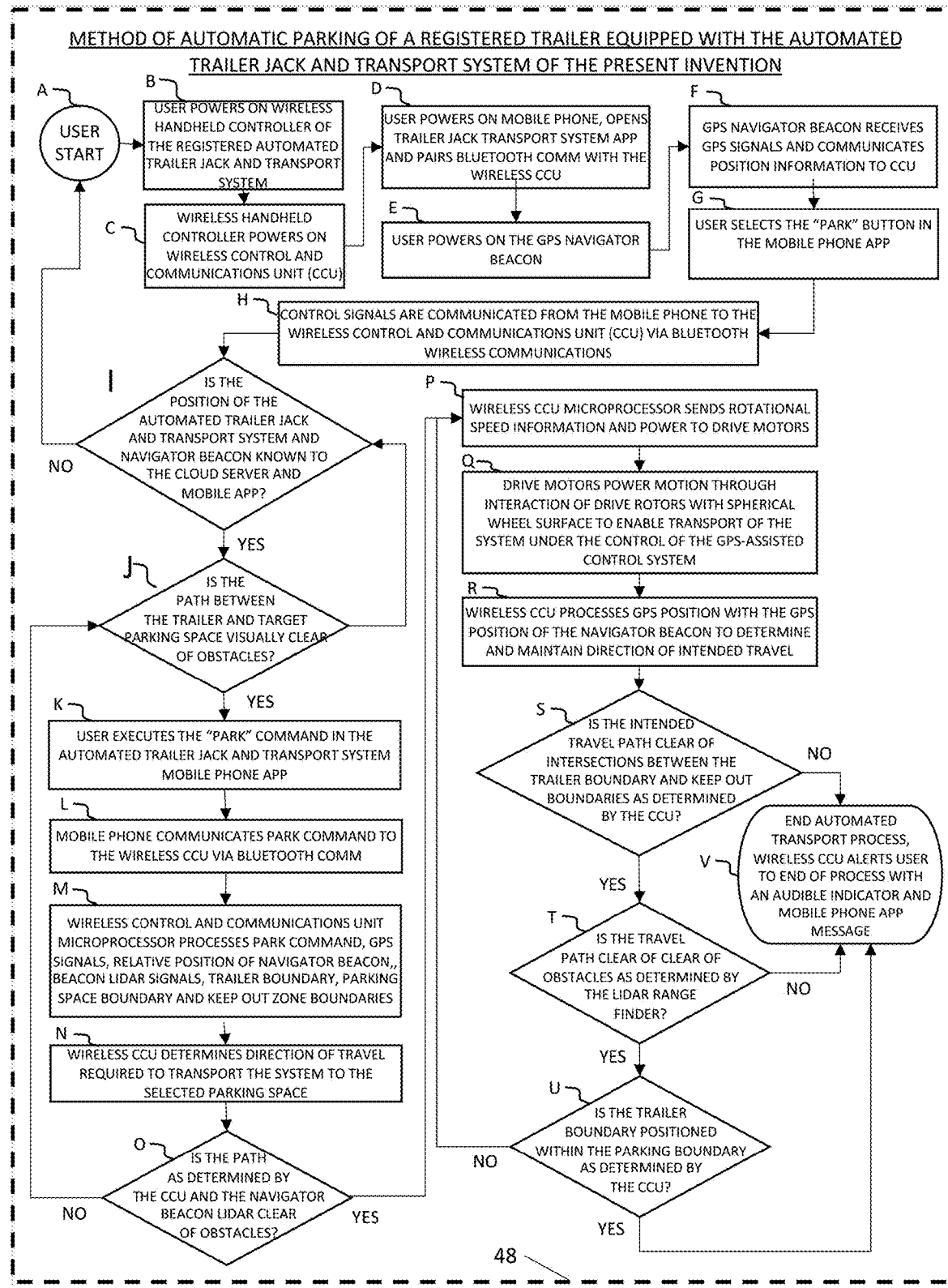
Figure 34A:
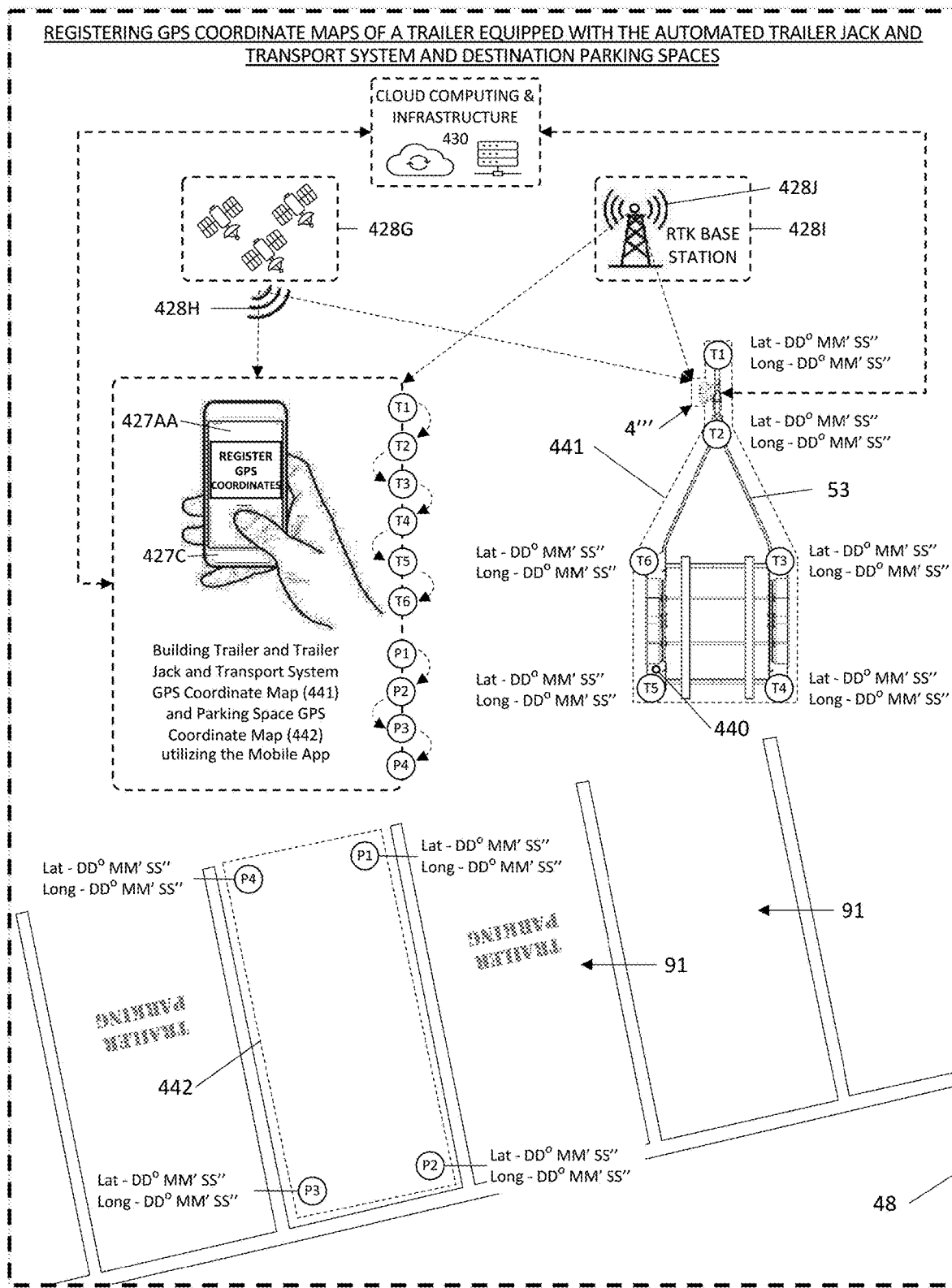
Figure 34B:
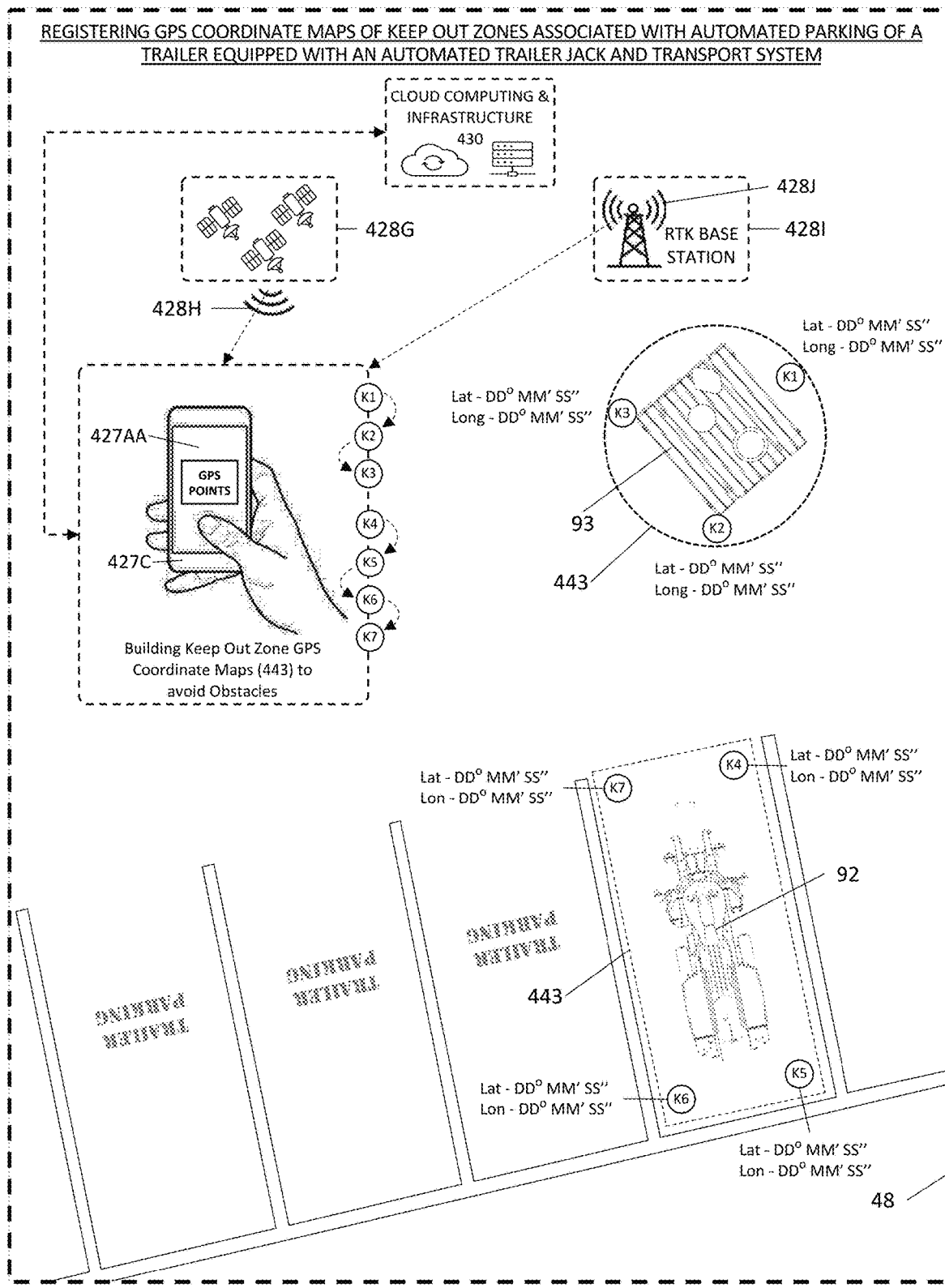
Figure 35:
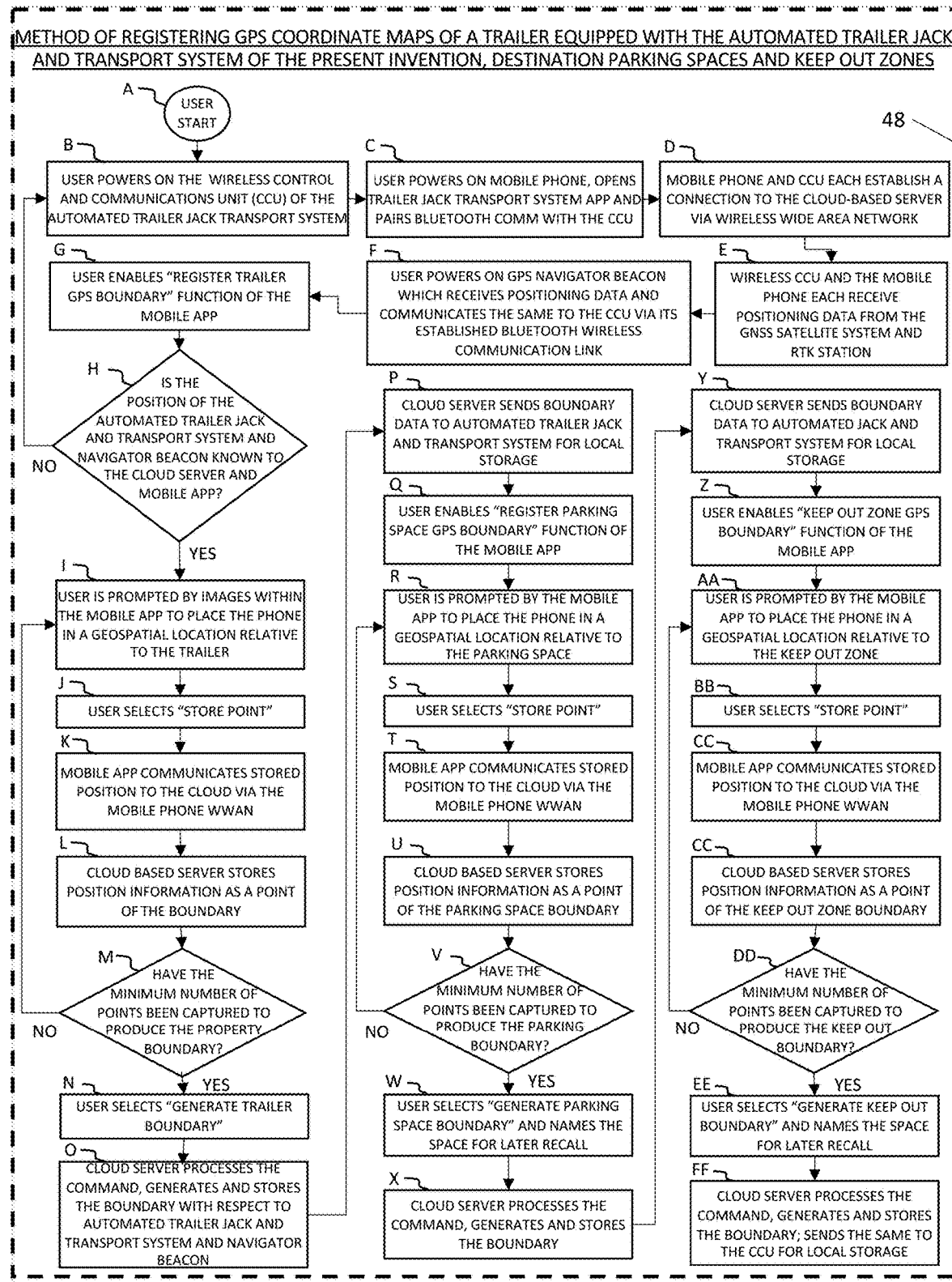
Figure 36:
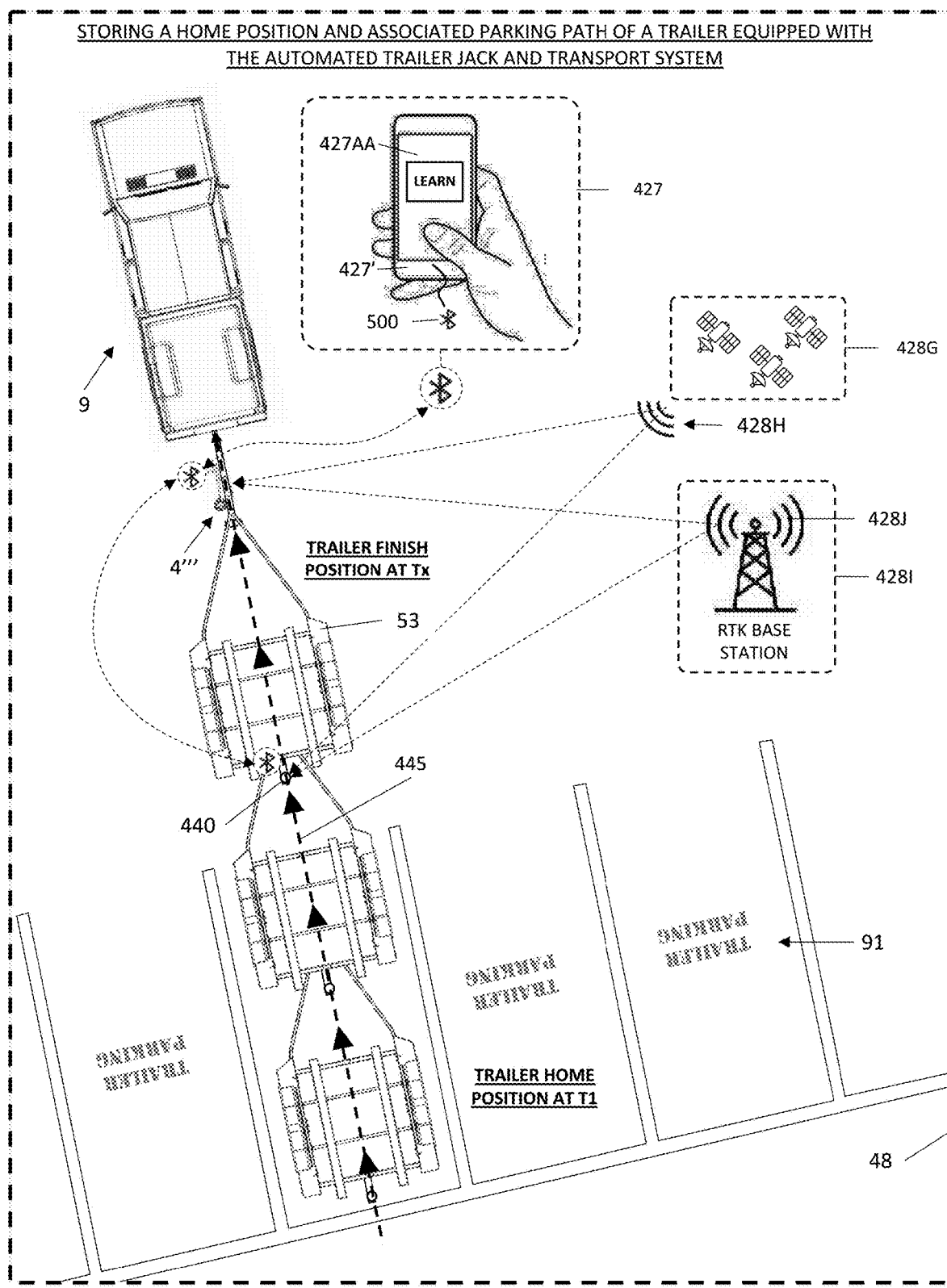
Figure 37:
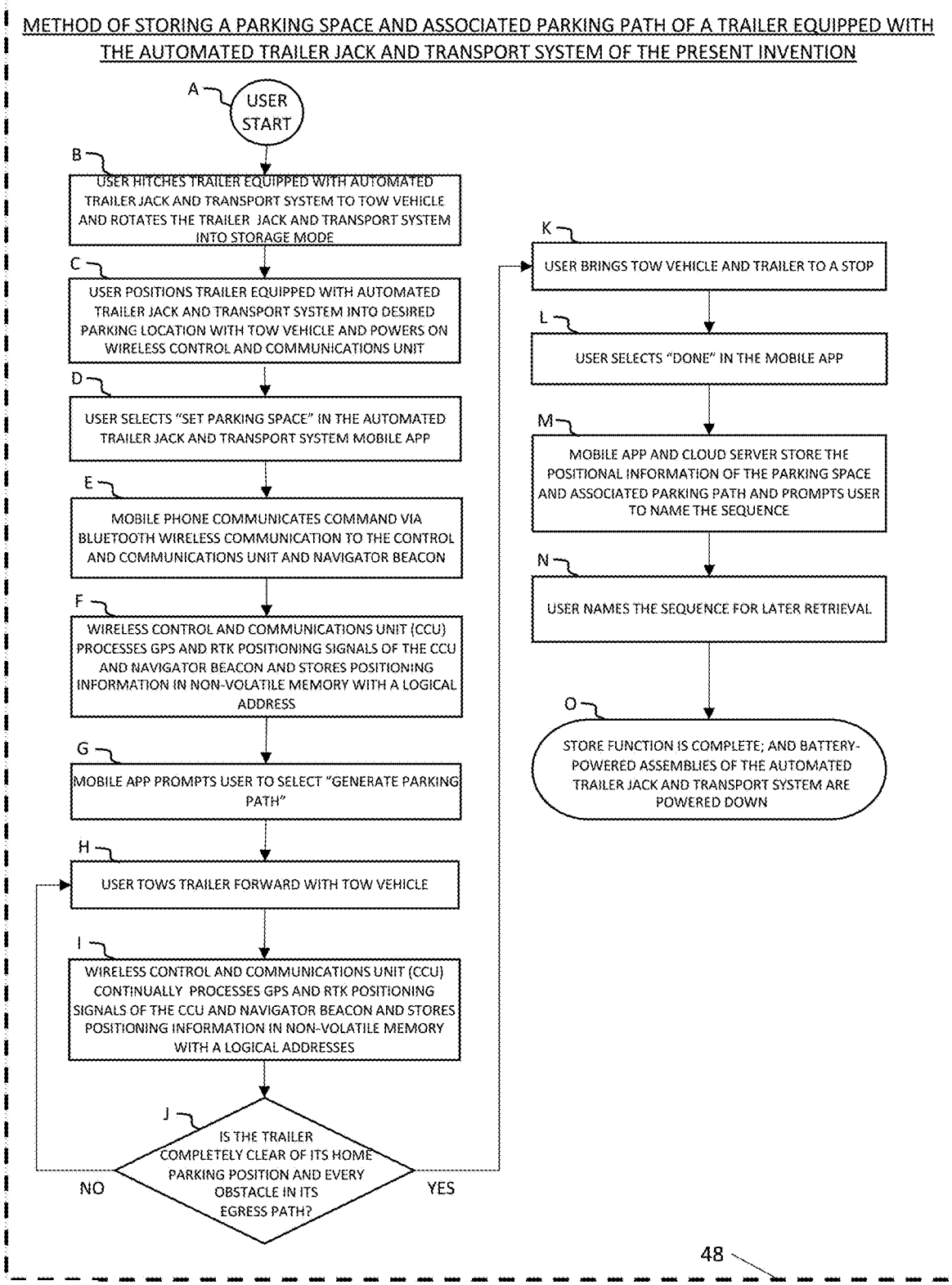
Figure 38:
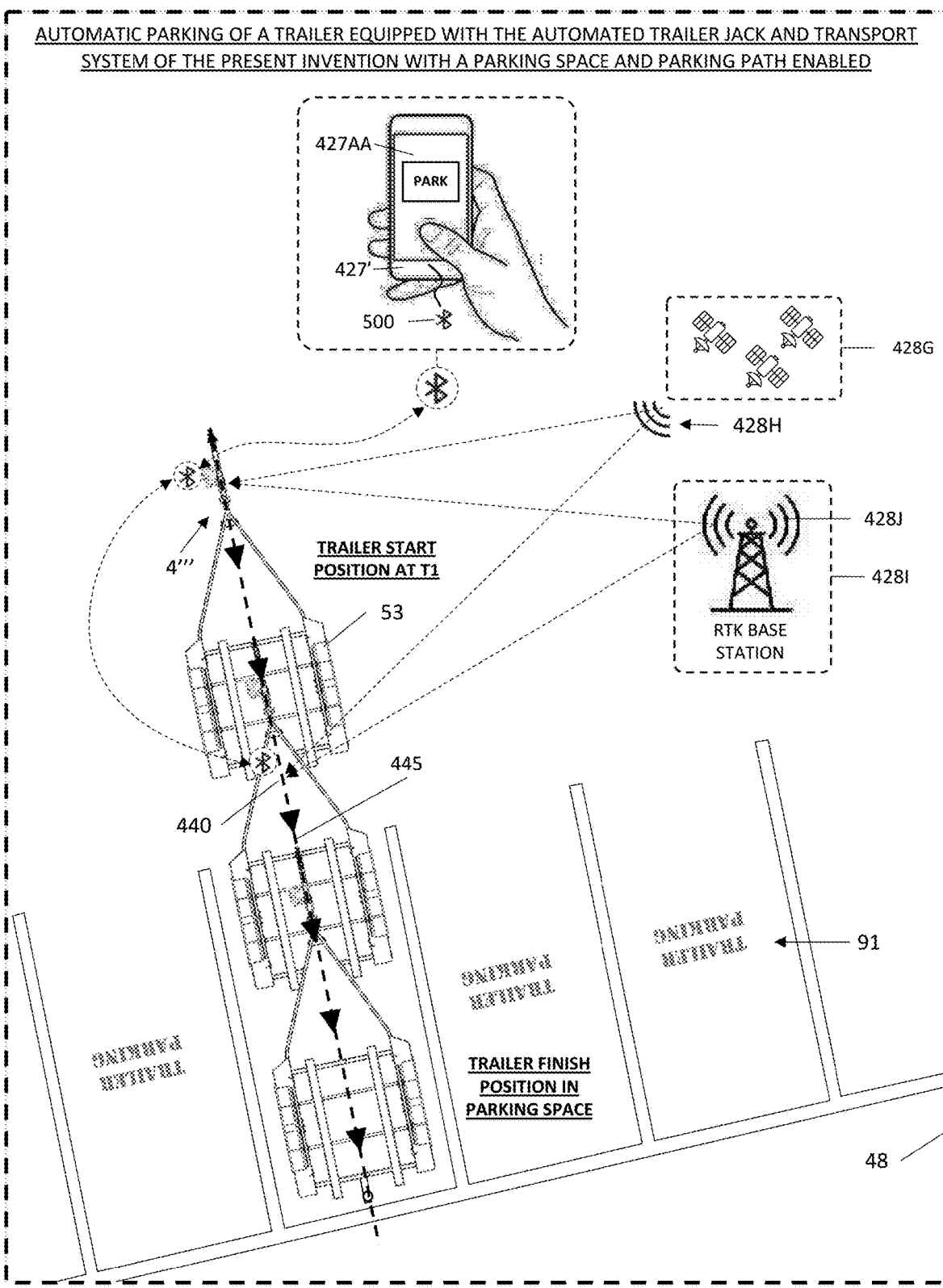
Figure 39:
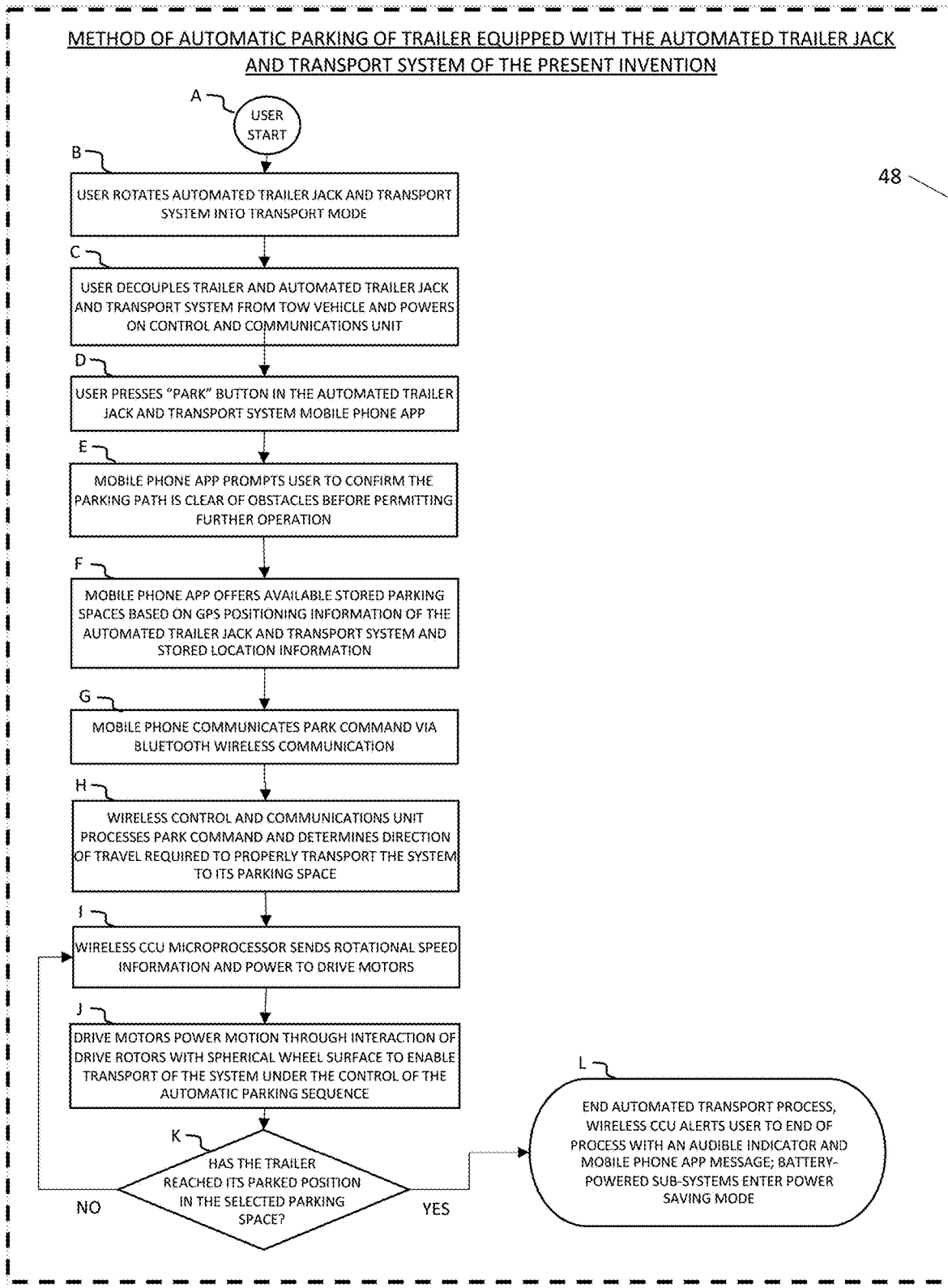
Figure 40A:
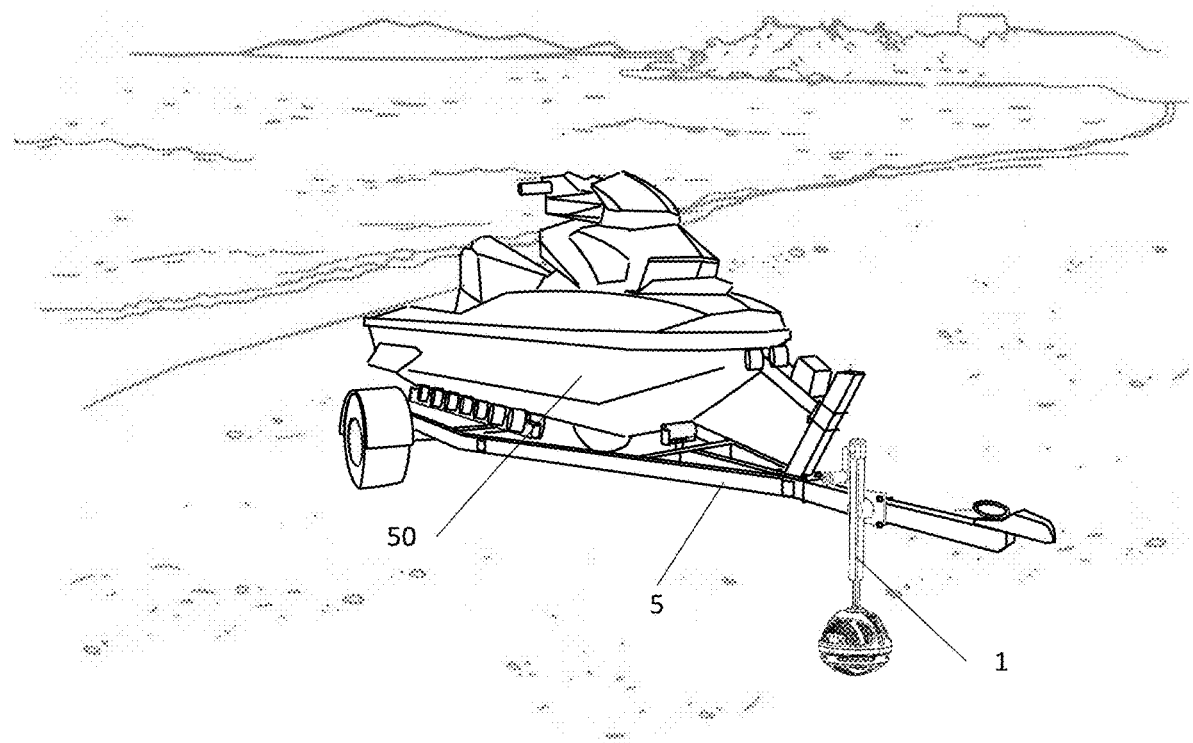
Figure 40B:
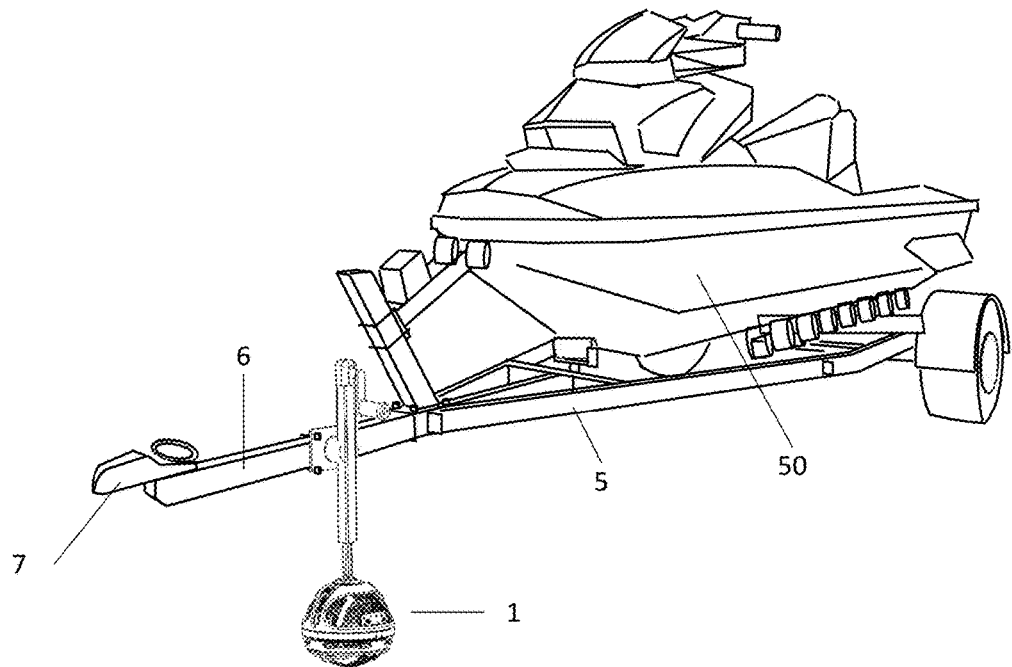
Figure 40C:
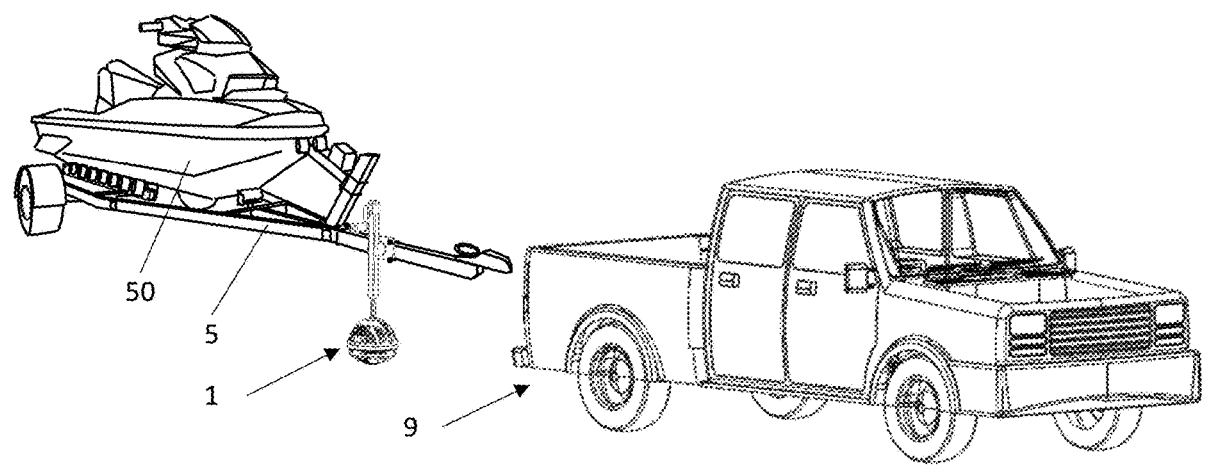
Figure 41A:
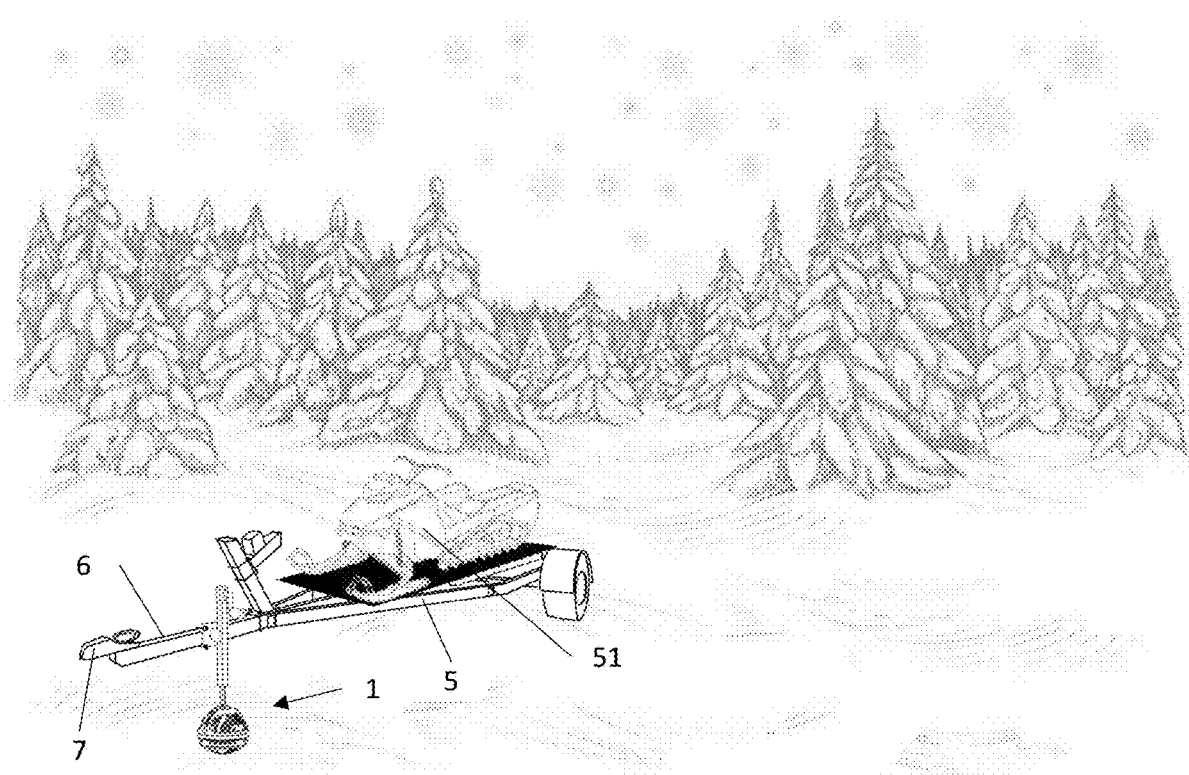
Figure 41B:
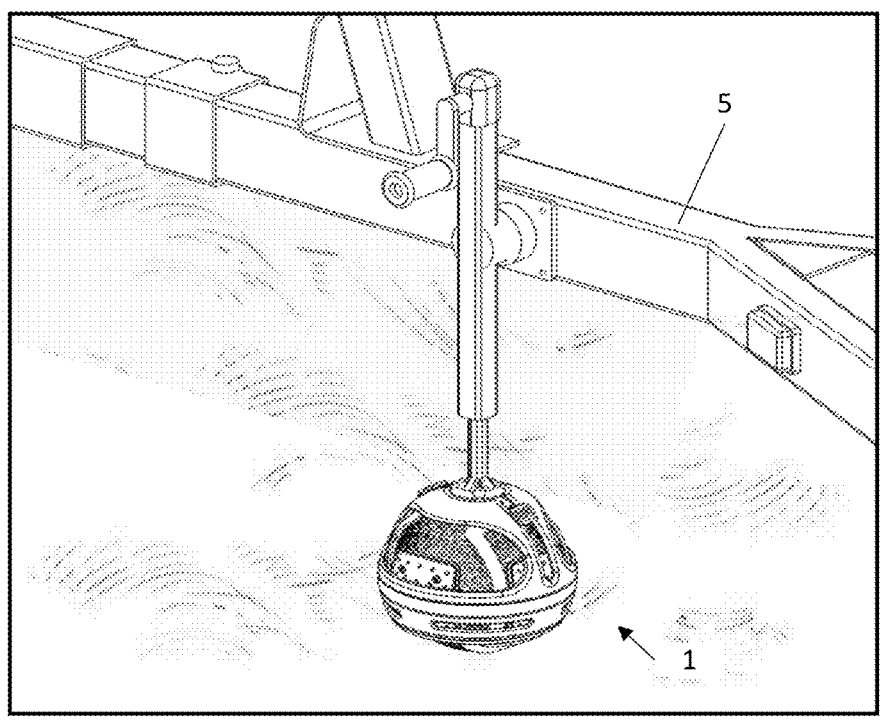
Figure 42A:
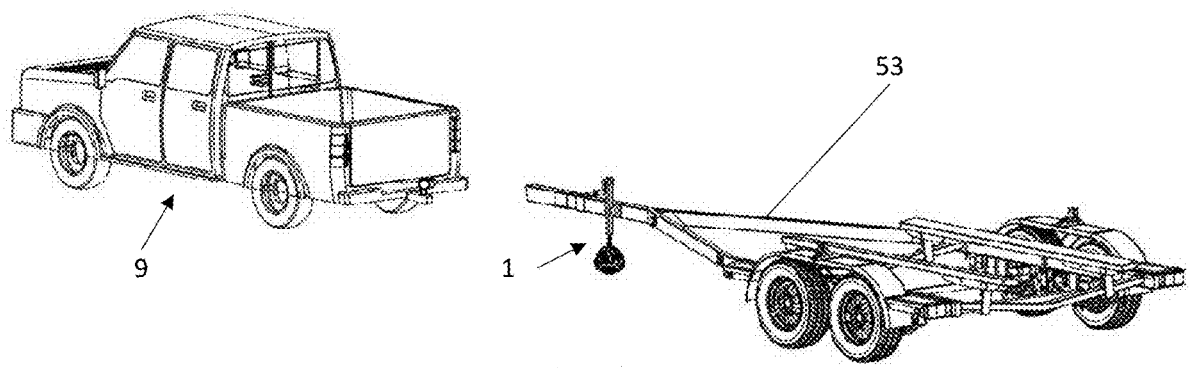
Figure 42B:
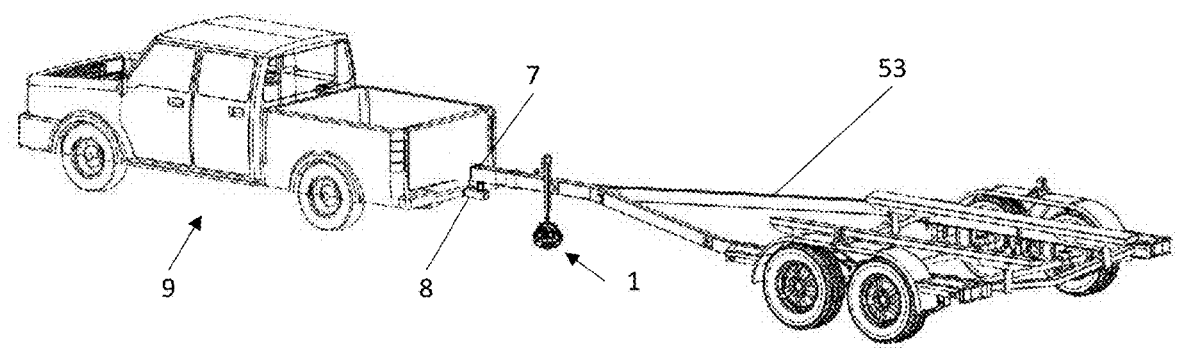
Figure 42C:
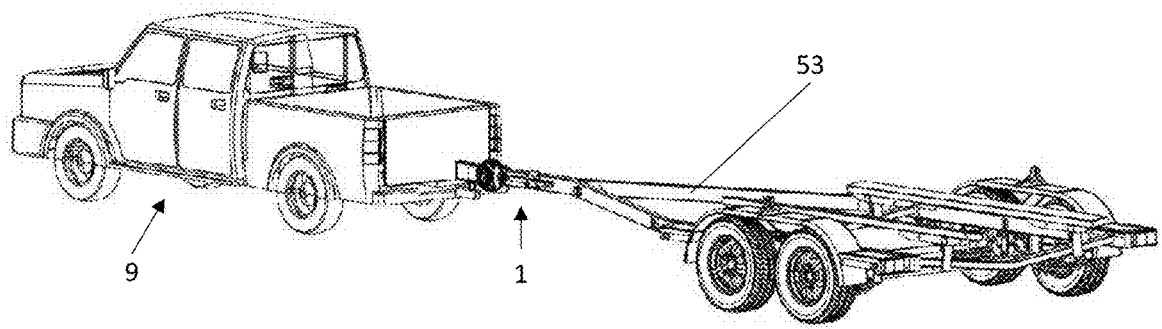
Figure 43A:
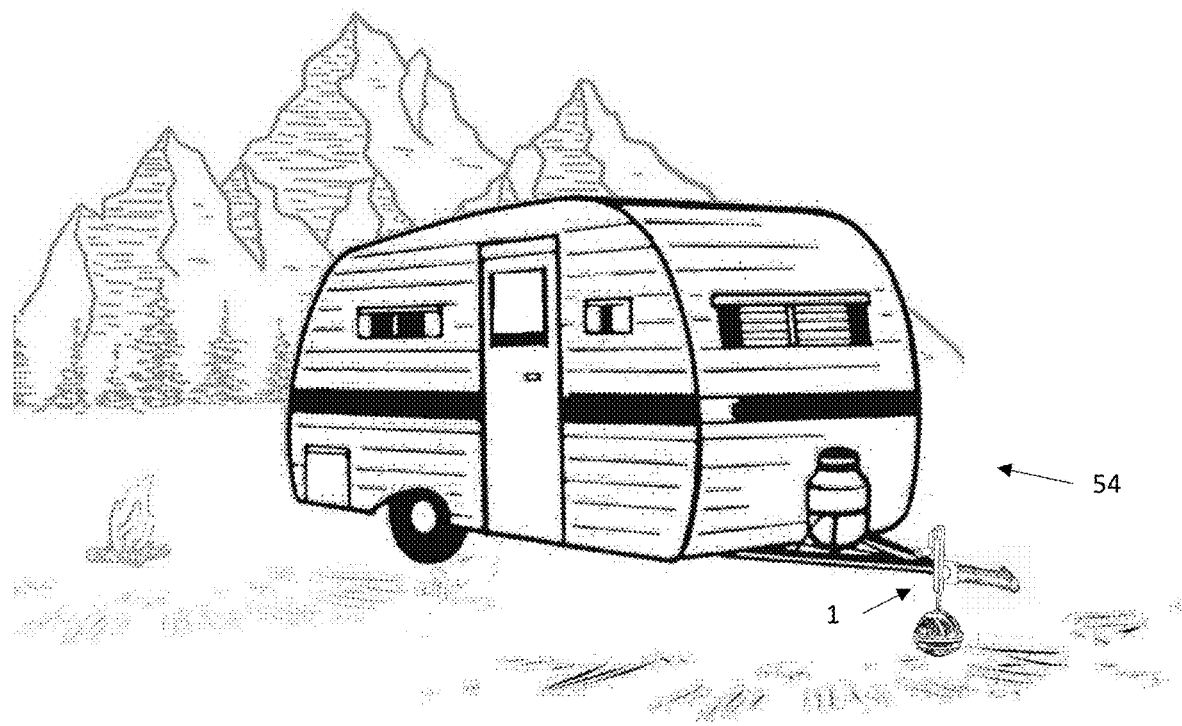
Figure 43B:
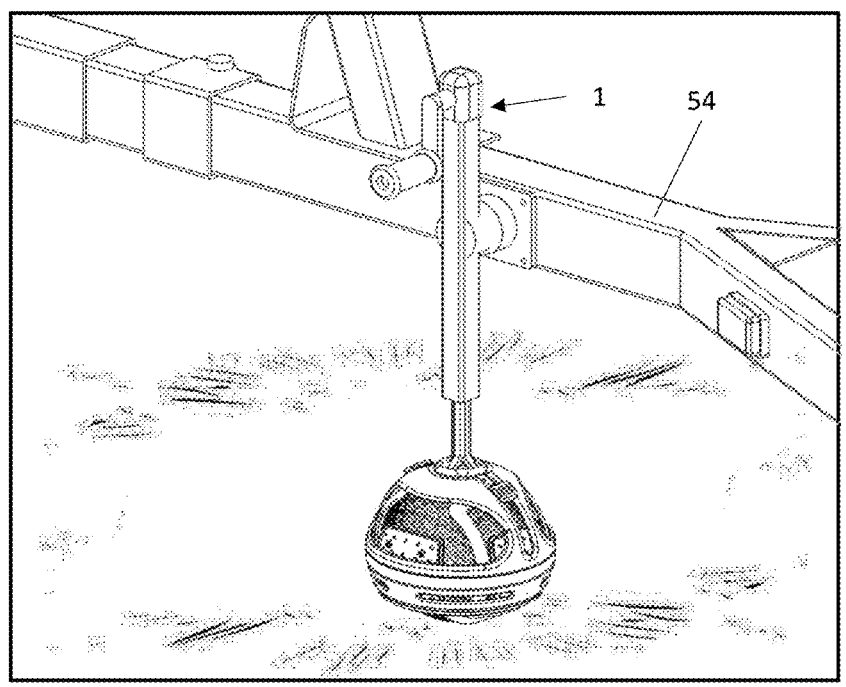
Figure 44A:
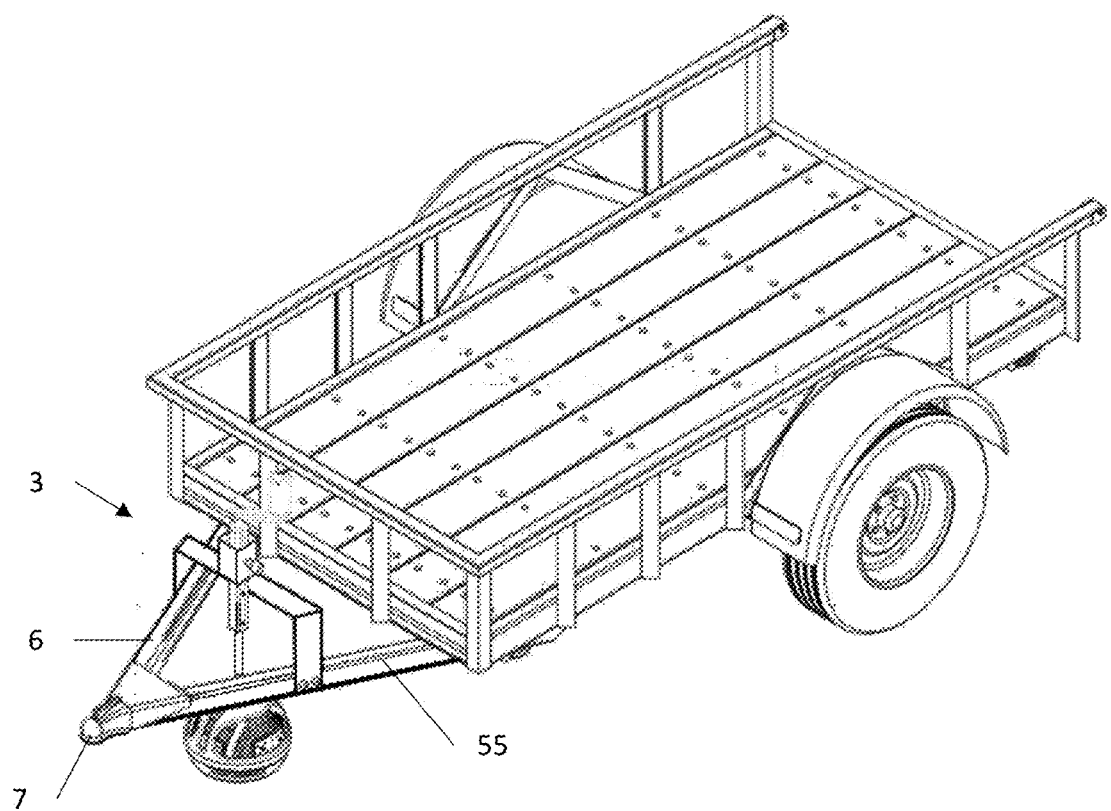
Figure 44B:
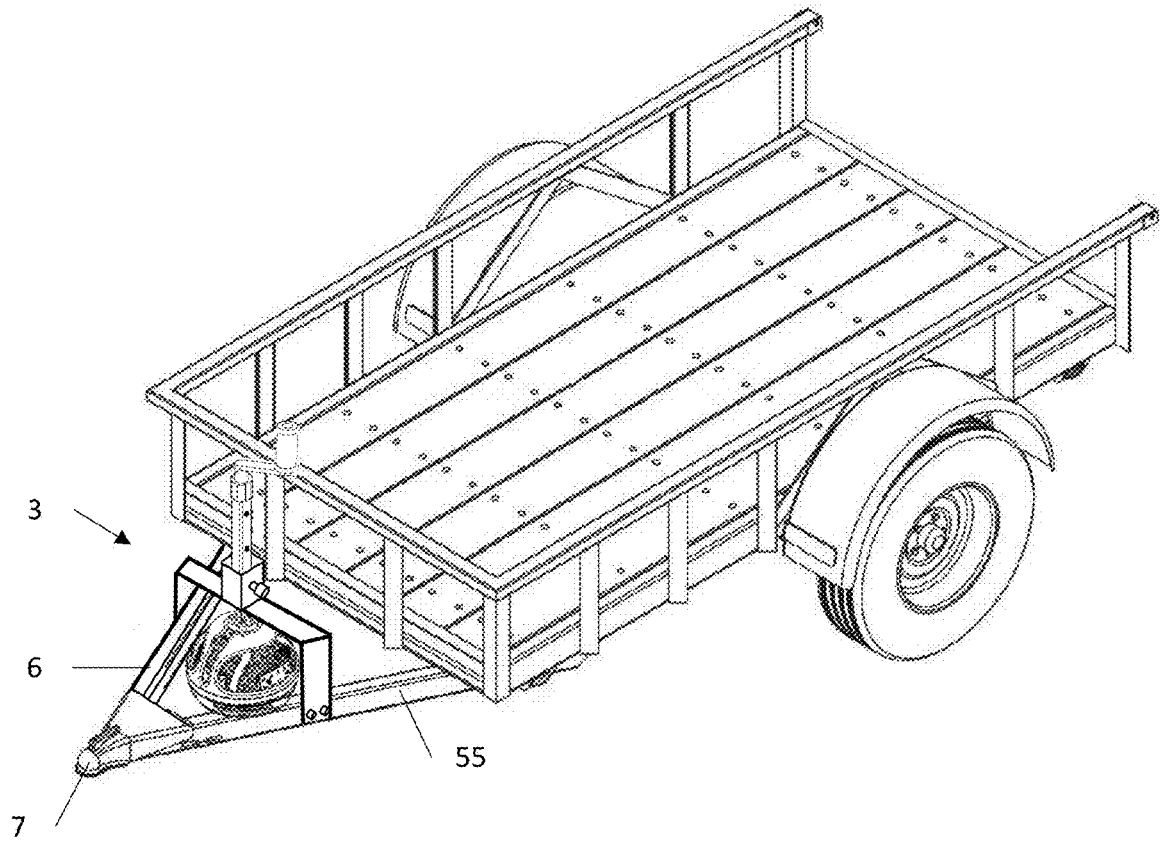
Figure 45A:
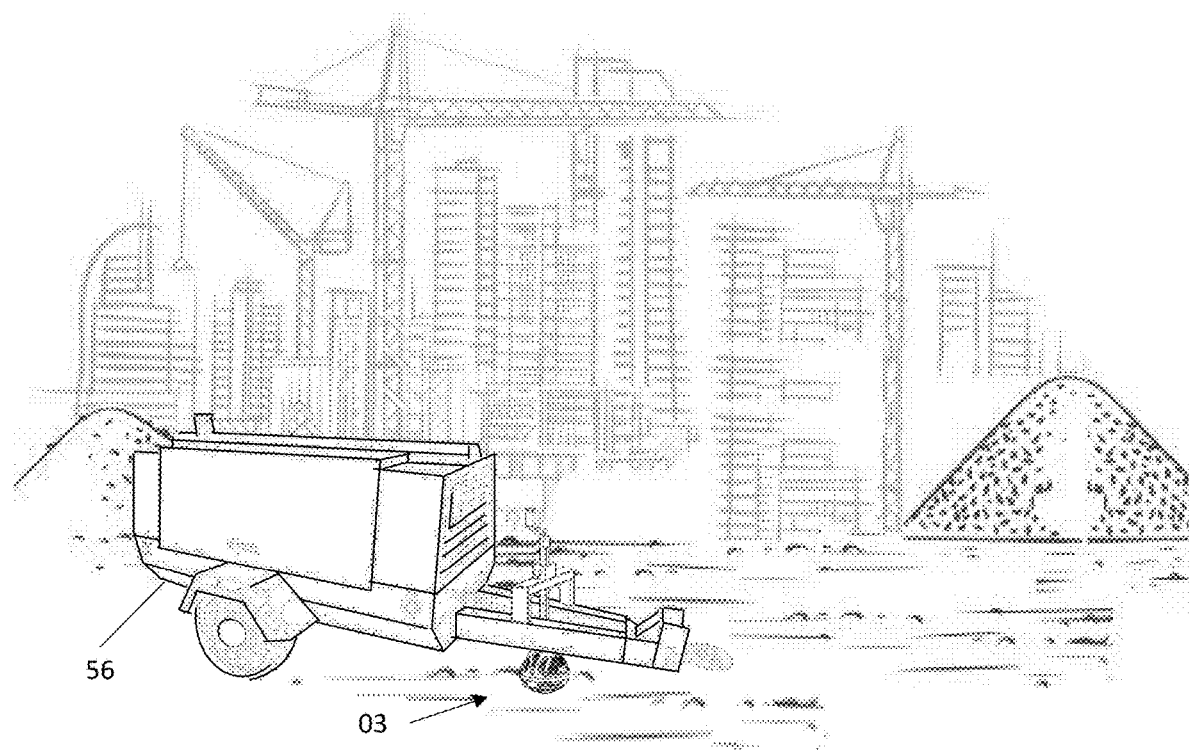
Figure 45B:
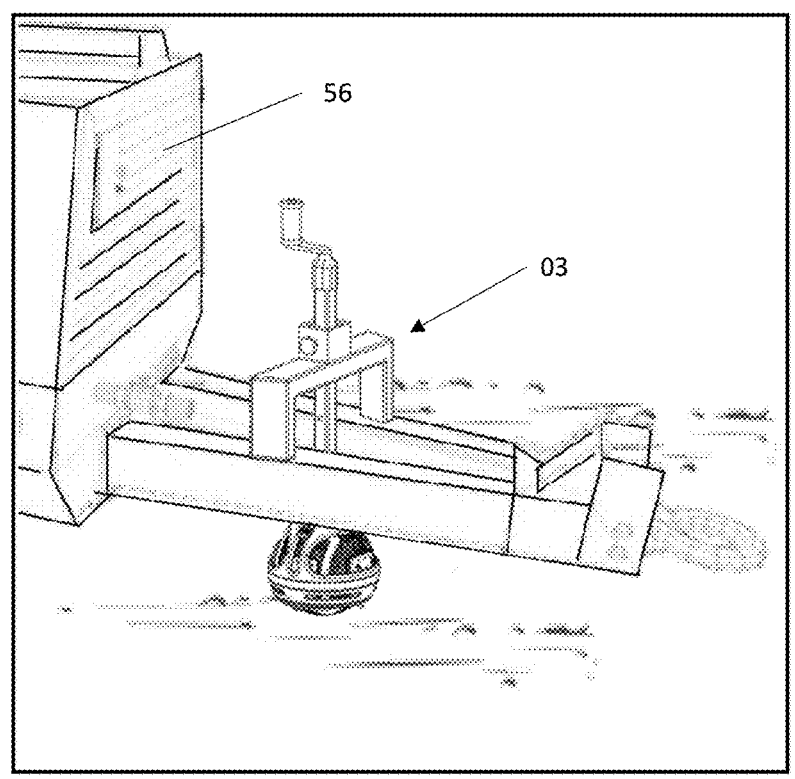
Figure 46A:
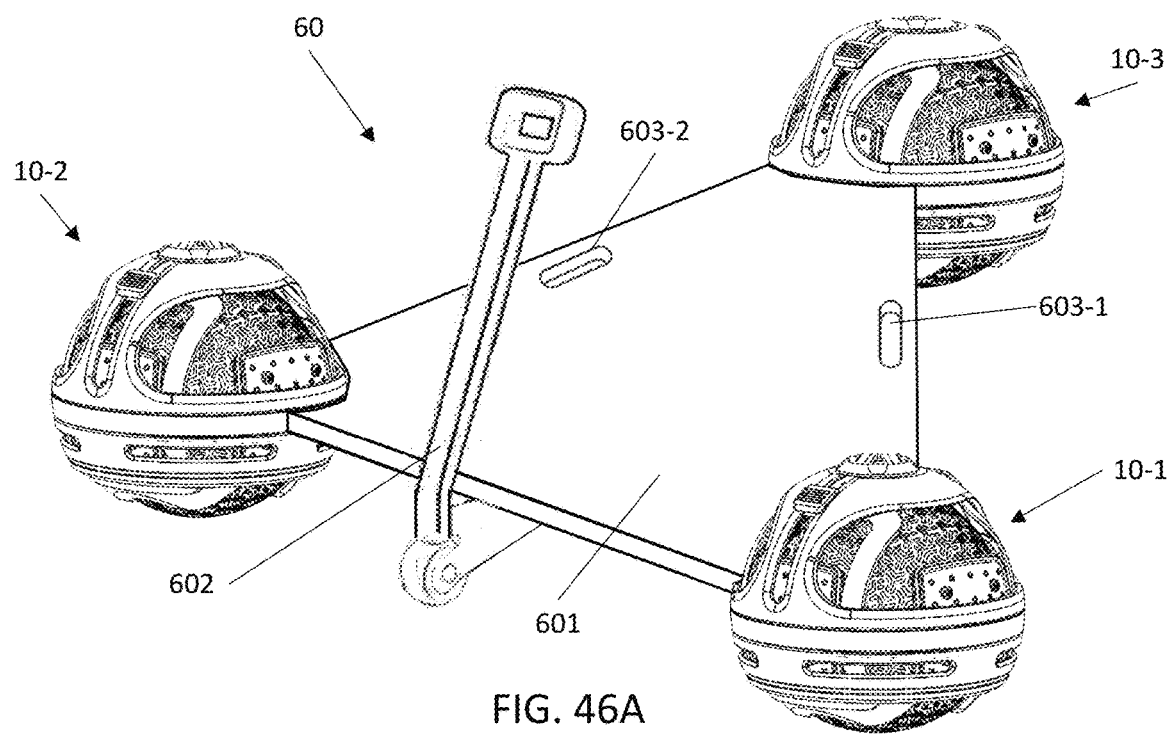
Figure 46B:
Figure 47A:
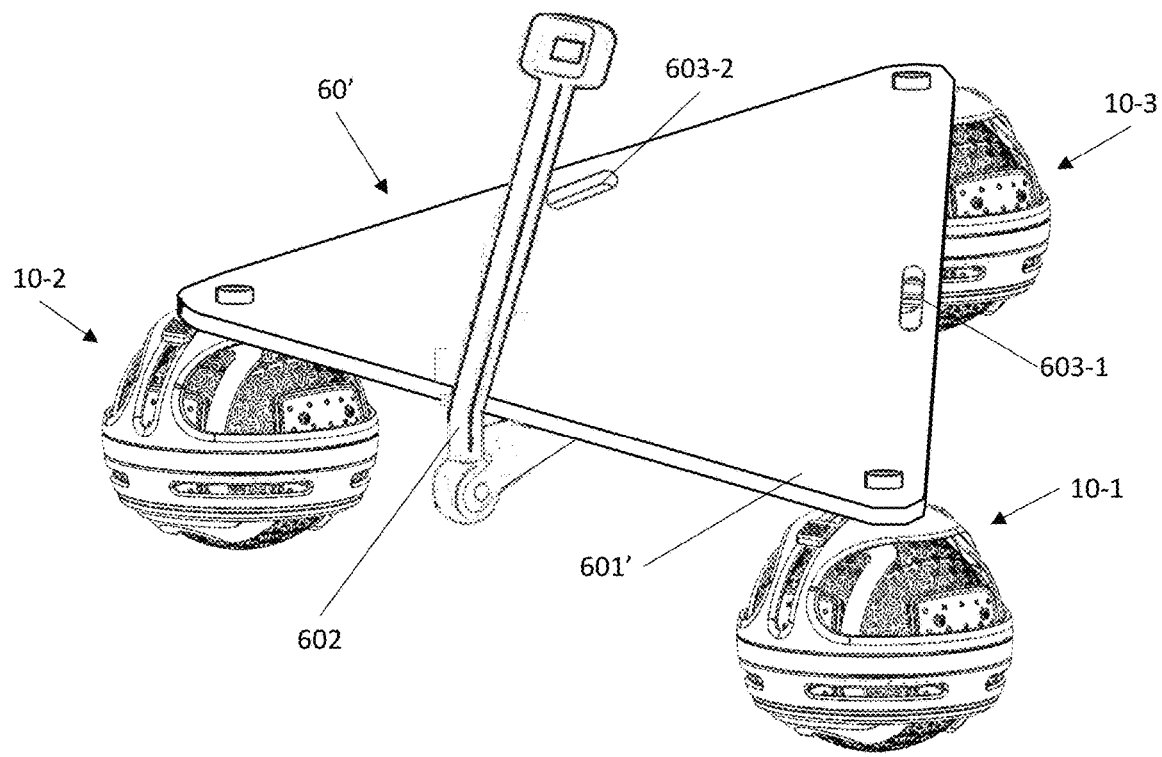
Figure 47B:
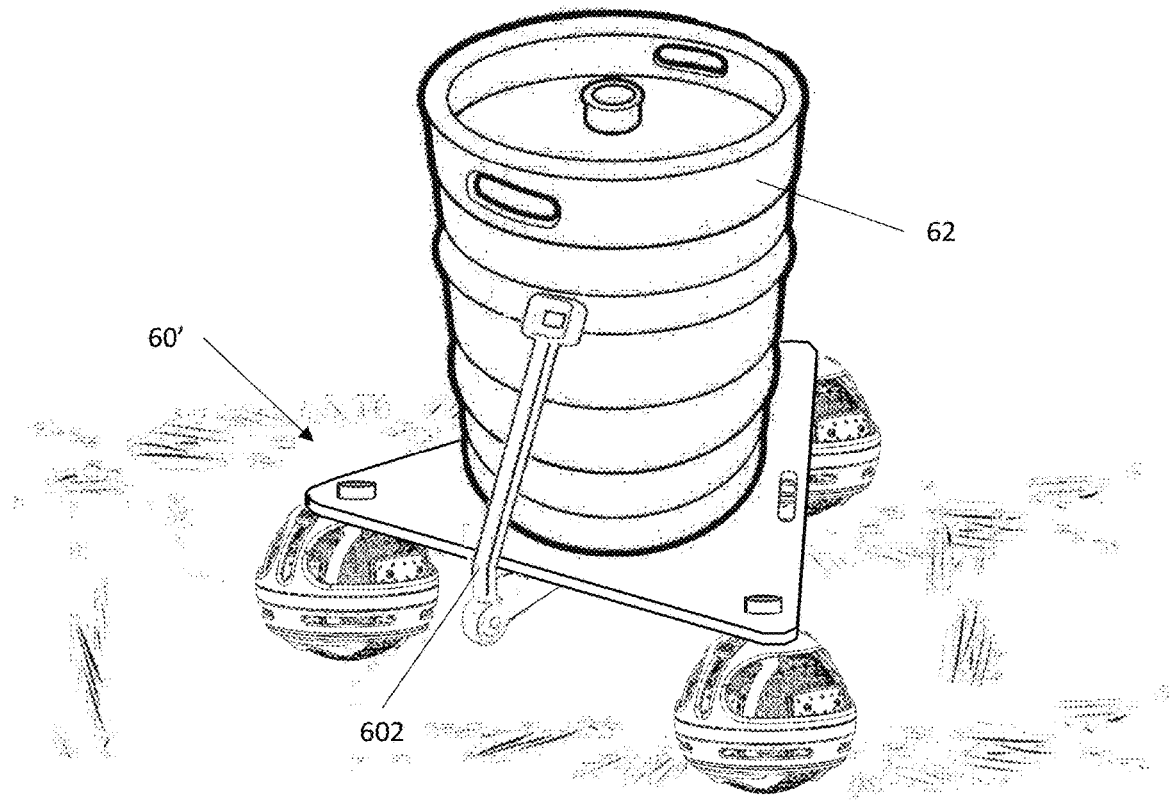
Figure 48A:
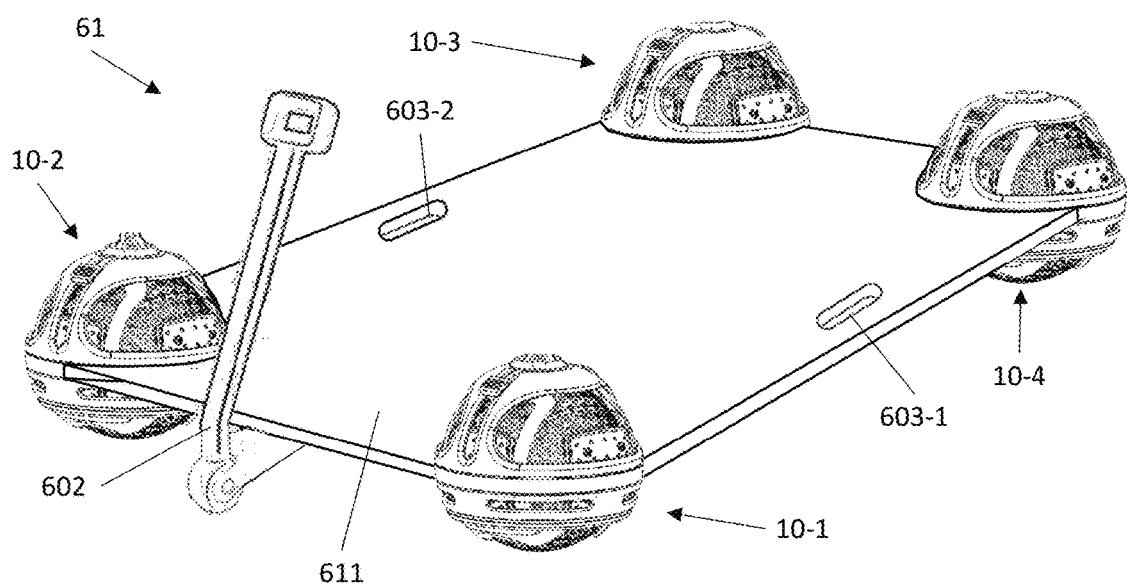
Figure 48B:
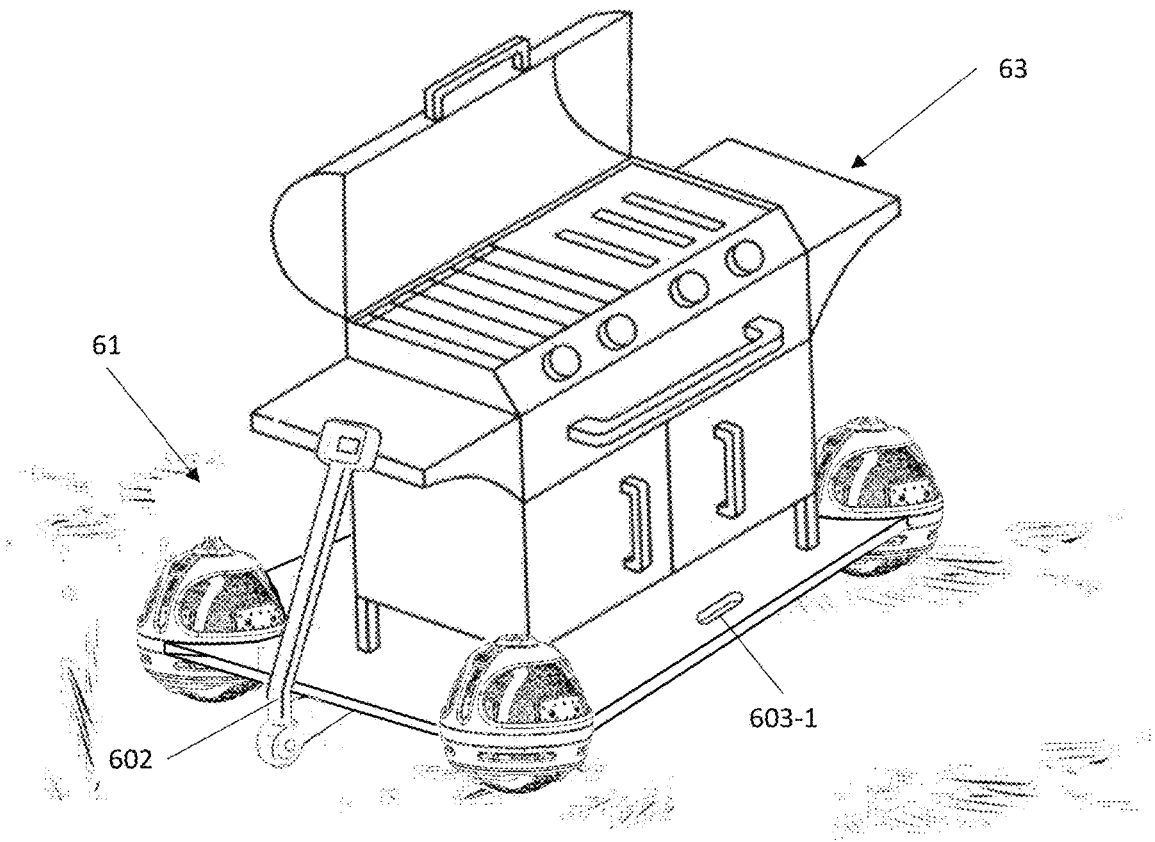
Figure 49A:
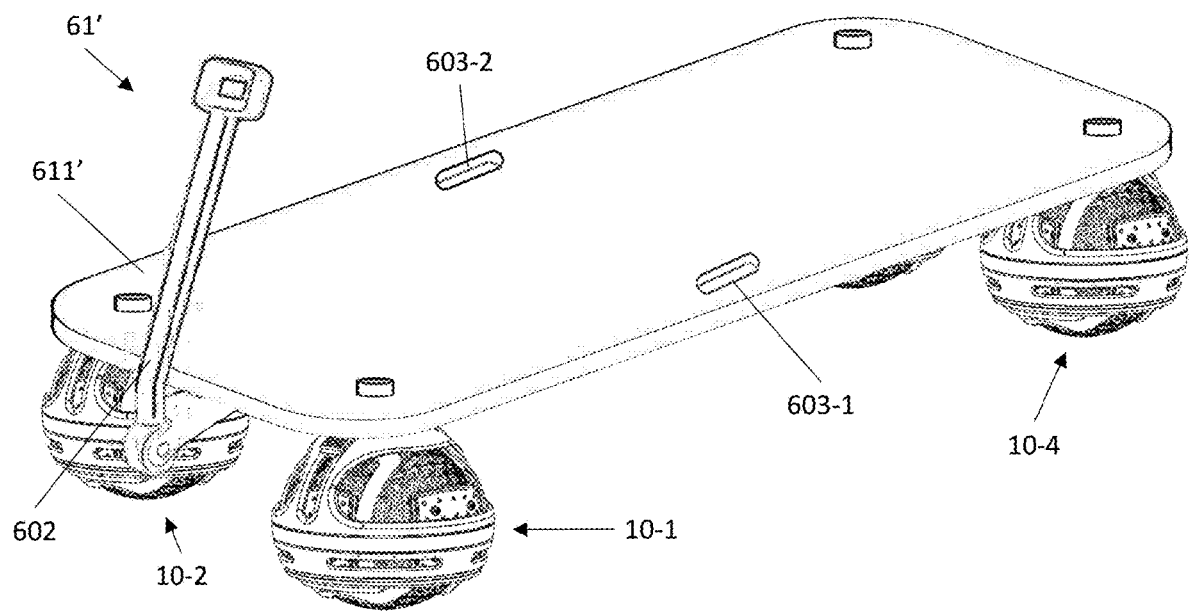
Figure 49B:
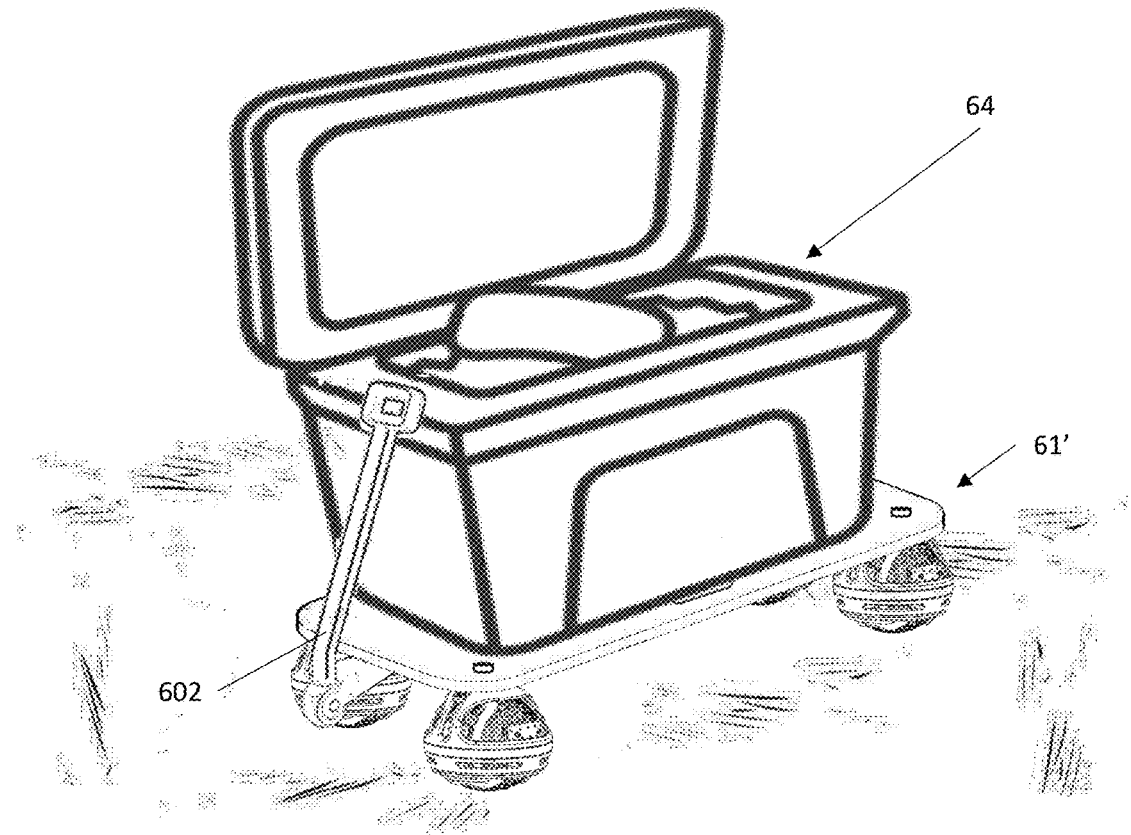
Figure 50A:
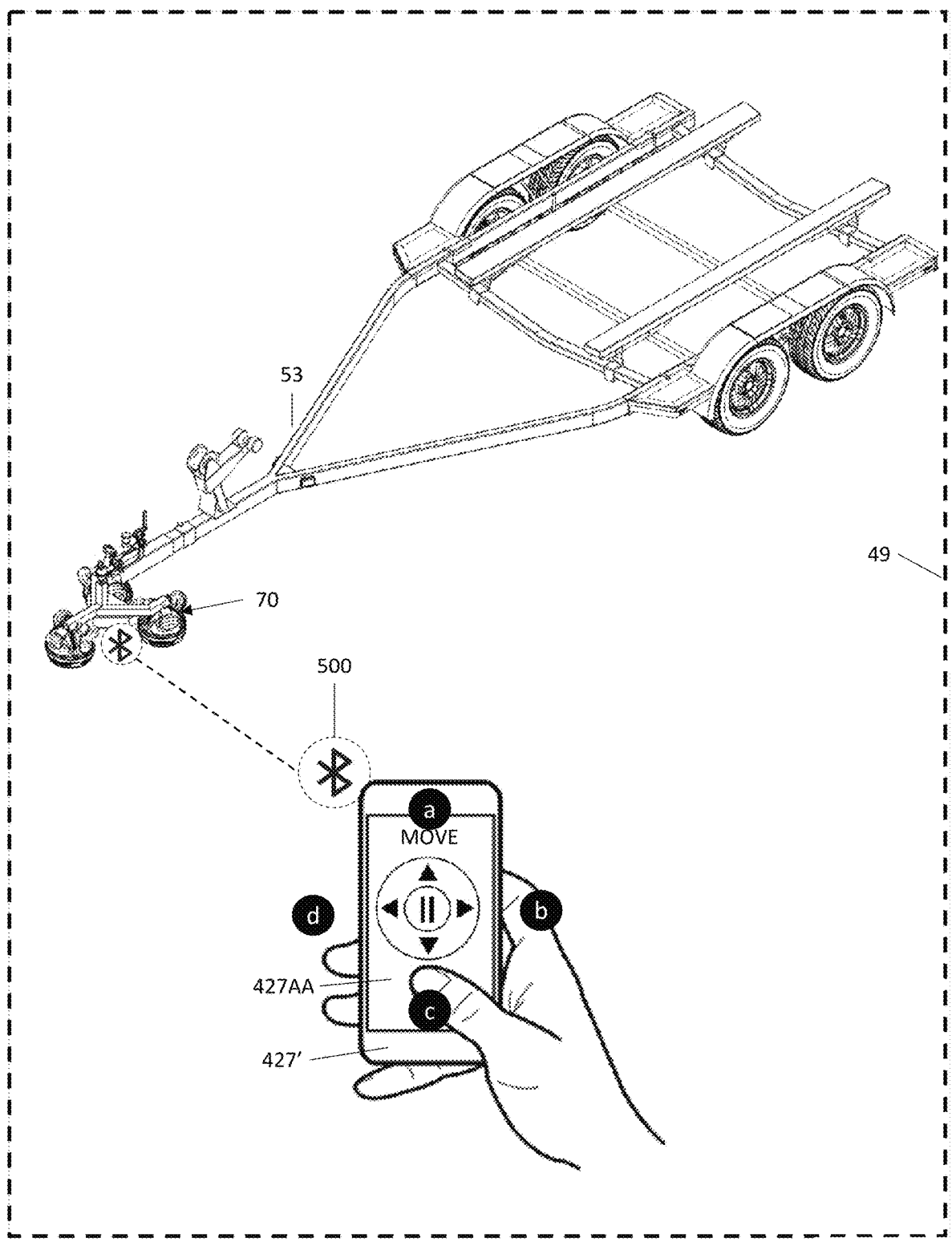
Figure 50B:
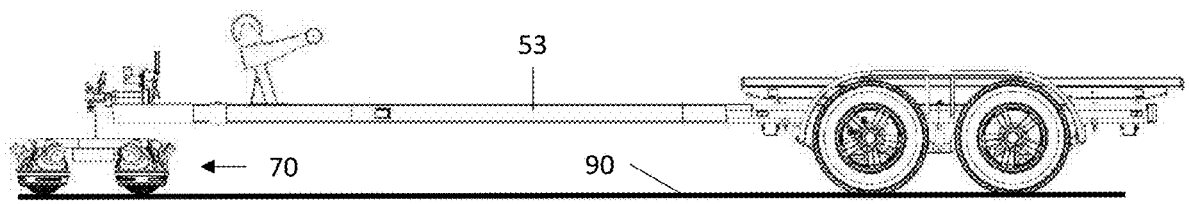
Figure 50C:
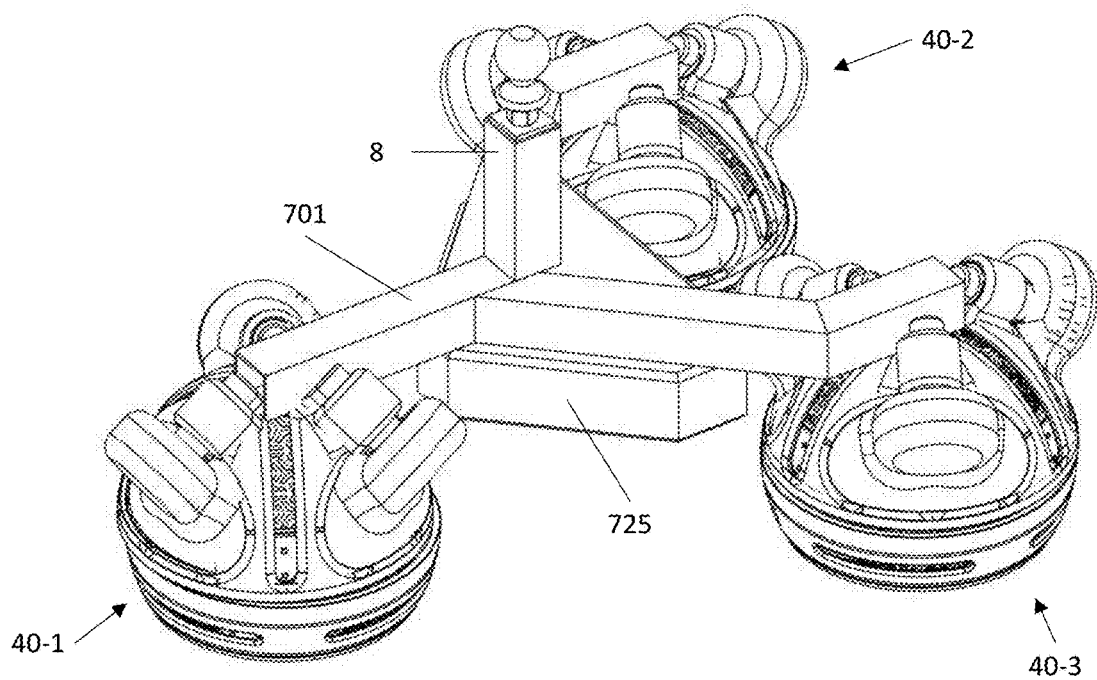

FIG. 12E is an elevated front plan view of the trailer jack and transport system of the alternative embodiment of the present invention shown in FIG. 13A, shown arranged in its transport mode, showing that the side-mounted trailer jack and transport system is physically offset from the trailer frame enabling the use of a simple rotational mounting mechanism, without telescopic or tilting mechanisms, and providing a trailer tongue clearance zone as shown;

FIG. 13A is a perspective view of the trailer jack and transport system of the alternative embodiment of the present invention whereby the jacking post member is tangent to the semispherical structure of the system (i.e., "offset"), shown arranged in its transport mode, while removed from any trailer, with its load-bearing transport ball contacting the ground surface;

FIG. 13B is a first elevated side view of the trailer jack and transport system of the alternative embodiment of the present invention shown in FIG. 13A, shown arranged in its transport mode, while removed from a trailer;

FIG. 13C is a second elevated side view of the trailer jack and transport system of the alternative embodiment of the present invention shown in FIG. 13A, shown arranged in its transport mode, while removed from a trailer;

FIG. 13D is an exploded perspective view of the trailer jack and transport system of the alternative embodiment of the present invention shown in FIG. 13A, comprising a semispherical framework integrated to an elongated jacking post member assembly having a rotational mounting and jacking mechanism, a set of five ball-bearing bearing surface pads mounted within a bearing pad mounting ring structure, a load-bearing transport ball, a set of braking shoes, and a transport ball retention ring structure;

FIG. 13E is an elevated side exploded view of the trailer jack and transport system of the alternative embodiment of the present invention shown in FIG. 13A, comprising a semispherical framework integrated to an elongated jacking post member assembly having a rotational mounting mechanism, a set of five ball-bearing bearing surface pads mounted within a bearing pad mounting ring structure, a load-bearing transport ball, a set of braking shoes, and a transport ball retention ring structure;

FIG. 14A is a first perspective view of a trailer equipped with a trailer jack and transport system of the present invention centrally mounted within the center of the A-frame portion of the trailer frame, and arranged in its transport configuration, by lowering the load-bearing transport ball within its semispherical framework to contact the ground surface and showing the direction of travel necessary to position the trailer coupler above the trailer hitch ball in preparation for coupling the trailer to the mobile vehicle's trailer hitch;

FIG. 14B is a second perspective view of the trailer equipped with the trailer jack and transport system of the present invention shown in FIG. 14A, with the trailer coupler positioned above the trailer hitch ball and being lowered onto the same during the hitching process by rotating the hand-crank mechanism to raise the jacking post member and correspondingly lower the trailer hitch;

FIG. 14C is a side view of the A-frame trailer equipped with the trailer jack and transport system of the present invention shown in FIGS. 14A and 14B, showing the semispherical framework and transport ball stored within the A-frame portion of the trailer frame, after the trailer and motor vehicle are hitched together and the external jacking post member is raised using its spring-loaded coarse adjusting pin and socket feature mounted on the A-frame mount;

FIG. 14D is a perspective view of FIG. 14C, namely the trailer equipped with the trailer jack and transport system of the present invention shown in FIGS. 14A and 14B with the semispherical framework and transport ball stored within the A-frame portion of the trailer frame and its own A-frame support structure, after the trailer and motor vehicle are hitched together;

FIG. 14E is a perspective view of the dual-axle A-frame trailer equipped with the trailer jack and transport system of the present invention shown in FIGS. 14A and 14B, with the semispherical framework and load-bearing transport ball stored within the A-frame jack and transport system support structure which creates ground clearance when in its storage mode, shown without any motor vehicle for illustrative purposes;

FIG. 14F is a perspective view of the dual-axle A-frame utility trailer equipped with the trailer jack and transport system of the present invention shown in FIG. 14E, with its semispherical framework and load-bearing transport ball lowered from the A-frame portion of the trailer frame and engaging the ground surface, so that the trailer can be manually transported and/or jacked up for hitching up with the trailer hitch mounted on the rear of a motor vehicle;

FIG. 14G is an elevated side view of the dual-axle A-frame utility trailer equipped with the trailer jack and transport system of the present invention shown in FIG. 14F, with its semispherical framework and load-bearing transport ball lowered from the A-frame portion of the trailer frame and engaging the ground surface, so that the trailer can be manually transported or jacked up for hitching to the trailer hitch mounted on the rear of a motor vehicle;

FIG. 14H is a plan view of the dual-axle A-frame utility trailer equipped with the trailer jack and transport system of the present invention shown in FIGS. 14F and 14G;

FIG. 15A is a perspective view of a trailer equipped with a motorized (i.e., motor-powered) trailer jack and transport system of the present invention, shown arranged in its transport configuration and mode of operation, with a human operator manually controlling the direction of powered motion of the trailer, via the trailer jack and transport system, towards the trailer hitch of a nearby motor vehicle;

FIG. 15B is a perspective view the powered trailer jack and transport system shown in FIG. 15A illustrating the use of the onboard mounted controllers on the top of the jacking post member, for moving the trailer in the direction of desired travel for transport and motor-driven jacking function for hitching operations;

FIG. 15C is a partially cut away perspective view of the semispherical framework portion of the motor-powered transport jack and semispherical framework portion shown in FIGS. 15A and 15B, showing in greater detail the three electric battery-powered motors, and rotocaster drive wheel rotors for driving omnidirectional rotation of the load-bearing transport ball supported within its semispherical framework;

FIG. 16 is a schematic block diagram of the motor-powered trailer jack and transport system of FIGS. 15A, 15B and 15C, shown comprising (i) a controller supporting a directional joystick, jacking controls, and controller electronics, (ii) a controller wiring harness, and (iii) a jack and transport drive subsystem supporting a control and comminutions unit provided with gears, jack motor, battery module, solar panel and a control and communications electronics including a processor, firmware, memory, battery charging unit, a position controller, and drive motors provided with a drive motor wiring interface;

FIG. 17 is a flow chart describing the primary steps involved in the method of operating the powered trailer jack and transport system with onboard controls mounted to a trailer according to the principles of the present invention, as shown in FIGS. 15A, 15B, and 15C;

FIG. 18A is a perspective view of the motorized (i.e. motor-powered) trailer jack and transport system shown in FIG. 15A, removed from the trailer and arranged its transport configuration, revealing the onboard controller mounted atop of its extendable jacking post member, and its load-bearing transport ball supported within its semispherical framework, and driven into controlled motion by its three battery-powered drive motors mounted external to the semispherical framework and controlled by the onboard controller;

FIG. 18B is a partially fragmented view of the semispherical framework portion of the powered trailer jack and transport system shown in FIG. 18A;

FIG. 18C is a top axial view of the powered trailer jack and transport system shown in FIG. 18A, demonstrating the spatial arrangement of the equally-spaced drive motors;

FIG. 18D is a bottom axial view of the powered trailer jack and transport system shown in FIG. 18A;

FIG. 18E is an elevated front view of the powered trailer jack and transport system shown in FIG. 18A;

FIG. 18F is a cross-sectional view of the powered trailer jack and transport system shown in FIG. 19E, taken along line 18F-18F;

FIG. 18G is an elevated side view of the powered trailer jack and transport system shown in FIG. 18A;

FIG. 18H is a cross-sectional view of the powered trailer jack and transport system shown in FIG. 18G, taken along line 18H-18H;

FIG. 18I is an exploded perspective view of the powered trailer jack and transport system shown in FIG. 18A, comprising (i) a load-bearing transport ball rotatably and freely mounted within a semispherical framework by way of a set of four ball-bearing bearing pads, (ii) a powered jacking post mounted and extending from the top central portion of the semispherical framework, and bearing a rotatable mounting mechanism around the midsection, and supporting an onboard controller, and (iii) a set of three battery-powered motors mounted on the semispherical framework, operably connection to the onboard controls, and configured for driving the transport ball into controlled motion in accordance with user operator controls provided through the onboard controller;

FIG. 18J is an exploded side view of the powered trailer jack and transport system shown in FIGS. 18A and 18I;

FIG. 18K shows a perspective view of the powered trailer jack and transport system shown in FIG. 18A, provided with drive motor protective housing covers, adapted for fitting over the rotating motor drive gears for user safety protection;

FIG. 18L shows a perspective view of the powered trailer jack and transport system shown in FIG. 18K, wherein a drive motor protective housing cover is shown being snap-fitted over one of the rotating motor drive gears for user safety protection;

FIG. 18M shows an enlarged partially-fragmented view of the powered trailer jack and transport system shown in FIG. 18L, wherein a drive motor protective housing cover is shown being snap-fitted over one of the rotating motor drive gears for user safety protection;

FIG. 18N shows a first elevated front view of the powered trailer jack and transport system shown in FIG. 18K;

FIG. 18O shows a second elevated side view of the powered trailer jack and transport system shown in FIG. 18K;

FIG. 19A is a schematic illustration of a system network of the present invention, showing a person using a mobile computing device (e.g. a mobile phone) equipped with a mobile application (i.e. mobile app) of the present invention to remotely control and navigate a trailer equipped with the motorized trailer jack and transport system of the present invention, in various applications namely, (i) a truck-trailer hitching operation illustrated in FIG. 19B, wherein the trailer is transported towards the hitching post of a truck or vehicle and then jacked up and placed on the trailer hitch/ball, and (ii) trailer parking operations illustrated in FIG. 19C, wherein the trailer is transported from a starting position in a parking lot, across the parking lot and into an intended parking space, without the need to physically handle the trailer during the parking operation;

FIG. 19B is a schematic illustration of a motor vehicle provided with a trailer hitch located near a trailer to be hitched to the motor vehicle, wherein the trailer is equipped with the powered trailer jack and transport system of the present invention as shown in FIG. 19A, and suitably modified so that the trailer jack and transport system employs a wireless outboard controller that is removable and hand-supportable within an operator's hand, and also remotely controllable by a mobile computing device (e.g. a mobile phone) running a suitable mobile application (APP) to enable wireless remote control operations within the trailer jack and transport system;

FIG. 19C is a plan view illustration showing the user in FIG. 19A transporting the trailer from its stationary starting position in the parking lot, disconnected from its tow vehicle, into its target parking space using the powered trailer jack and transport system remotely controlled by either the removeable wireless outboard controller or a mobile computing device equipped with the mobile application and in wireless communication with the control and communications module aboard the motor-powered trailer jack and transport system;

FIG. 20 is a schematic block diagram of the motor-powered trailer jack and transport system of FIG. 19A, shown comprising (i) a removable remote controller supporting a directional joystick, jacking controls, controller electronics, battery module, and wireless communications, (ii) a releasable electrical connector, and (iii) a jack and transport drive subsystem supporting a control and communications unit provided with gears, jack motor, and battery module, and a control and communications electronics a processor, firmware, memory, local wireless communications, wireless wide area communication (i.e. cellular communication), drive motor position controller, a battery charging unit, a solar panel and drive motors provided with a drive motor wiring interface; and (iv) a mobile computing device (e.g. mobile phone) equipped with a mobile app FIG. 21A shows a mobile phone type client computer system deployed on the system network of the present invention, comprising a touch-screen GUI screen;

FIG. 21B shows a tablet-type client computer system deployed on system network of the present invention, comprising a touch-screen GUI screen;

FIG. 21C shows a laptop-type client computer system deployed on the system network of the present invention, comprising a keyboard interface and GUI display screen;

FIG. 21D shows a schematic representation of the general system architecture of a mobile client system deployed on the system network of the present invention, as shown in FIGS. 21A, 21B and 21C, and comprising the system components: a Processor(s); a Memory Interface; Memory for storing Operating System Instructions, Electronic Messaging Instructions, Communication Instructions, GUI Instructions, Sensor Processing Instructions, Phone Instructions, Web Browsing Instructions, Media Processing Instructions, GPS/Navigation Instructions, Camera Instructions, Other Software Instructions, and GUI Adjustment Instructions; Peripherals Interface; Touch-Screen Controller; Other Input Controller(s); Touch Screen; Other Input/Control Devices; I/O Subsystem; Other Sensor(s); Motion Sensor; Light Sensor; Proximity Sensor; Camera Subsystem; Wireless Communication Subsystem(s); and Audio Subsystem;

FIG. 22 is a schematic illustration showing the use of the wireless hand-supportable remote controller removed from the powered trailer jack and transport system of the present invention mounted to a trailer, and being used to remotely control the jack and transport movement operations of the system, when transporting and/or hitching the trailer to a motor vehicle or the like, as the use case may be;

FIG. 23 is a flow chart describing the primary steps involved in the method of remotely controlling the powered trailer jack and transport system of FIGS. 19A, 19B and 22 mounted to a trailer, using a removable wireless controller according to the principles of the present invention illustrated in FIG. 22;

FIG. 24 is a schematic illustration showing the use of a mobile computing device (e.g., a mobile phone) running a suitable mobile application to remotely control the jack and transport movement operations of the system when transporting and/or hitching a trailer to a motor vehicle as the use case may be;

FIG. 25 is a flow chart describing the primary steps involved in the method of remotely controlling the powered trailer jack and transport system of FIGS. 19A, 19B, and 19C mounted to a trailer, using a mobile computing device running a suitable mobile application according to the principles of the present invention as illustrated in FIG. 24;

FIG. 26A is a schematic illustration of a cloud-based system network of the present invention, showing a motor vehicle provided with a trailer hitch located near a trailer to be hitched to the motor vehicle, wherein the trailer is equipped with a powered trailer jack and transport system of the present invention as shown in FIGS. 19A through 19B, suitably modified so that this trailer jack and transport system employs an intelligent GPS-tracked and IR-ranging controller on the trailer and a GPS-tracked and IR-ranging module about the trailer hitch on the motor vehicle, and wherein GPS-tracked and IR-ranging controller on the trailer and a GPS-tracked and IR-ranging module about the trailer hitch communicate together in a wireless manner and support automated transport, docking and hitching operations without user involvement after the user inputs an automated docking request to either the outboard controller or the mobile app running on the mobile computing device used by the user;

FIG. 26B is an elevated side view of the motor vehicle, trailer and wireless powered trailer jack and transport system shown in FIG. 26A, showing the GPS-tracking and IR ranging module mounted about the trailer hitch and performing the automated GPS-guided docking and hitching process of the present invention by receiving GPS signals and communicating dual IR range finding signals with the trailer jack and transport system using "time of flight" (TOF) calculations principles well known in the IR distance ranging art;

FIG. 26C is an elevated side view illustrating a method of mounting the GPS-tracking and IR ranging hitch finding module (HFM) of the system of the present invention about the trailer hitch ball mounted on the rear end of the motor vehicle in the system of FIG. 26A, intended to hitch to a trailer equipped with the trailer jack and transport system of the present invention;

FIG. 26D is a perspective view of the GPS-tracking and IR ranging hitch finding module (HFM) of the system of the present invention, showing its centrally positioned mounting aperture, through which the trailer ball mounting thread is allowed to pass and then secured by a suitable nut;

FIG. 26E is an elevated side view of the GPS-tracking and IR ranging hitch finding module (HFM) of the present invention, showing its IR light transmission window;

FIG. 26F is a cross-sectional view of the GPS-tracking and IR ranging hitch finding module (HFM) of the system taken along line 26F-26F in FIG. 26E, showing its left and right IR transceiver diodes spaced apart and allowed to transmit and receive left and right channel IR signals through the IR light transmission window formed in the compact device;

FIG. 26G is a plan view of the trailer jack and transport system and hitch finding module of FIGS. 26A and 26B in communication with each other during automated hitch finding, tracking and docking operations, wherein two channels of line of sight IR signal communications are shown unobstructed during system operation so that the two systems can share left and right channel distance information (L1 and L2) with the controller aboard the trailer jack and transport system and automatically generate drive control signals for the driving motors and accurately navigating the trailer towards the trailer hitch, using a hitch-finding algorithm running within the controller aboard the trailer jack and transport system;

FIG. 27 is a schematic block diagram of the automated motor-powered trailer jack and transport system of FIG. 26, interfaced with a cloud-computing environment and wireless communication infrastructure, and comprising (i) a controller module mounted upon the end of the jacking post member and supporting a directional joystick, jacking controls and automated finding, docking and hitching mode button, and controller electronics, battery storage module, and wireless communications, (ii) an electrical connector, (iii) a jack and transport drive subsystem supporting a control and comminutions unit provided with gears, jack motor, battery module, solar panel and control and communications electronics including a dual-channel IR finding transceiver, a GPS receiver, wireless wide area communications, local wireless communication, a battery charging unit, a position controller, and drive motors provided with a drive motor wiring interface, (iv) a mobile computing device equipped with a suitable mobile application (v) cloud computing and wireless data communication infrastructure and (vi) a wireless hitch finder supporting a GPS receiver, local wireless communication, dual-channel IR finding transceiver, docking switch, processor, firmware, memory and a battery module;

FIG. 28 is a flow chart describing the primary steps involved in the method of automated docking and hitching of a trailer to a hitching post on a motor vehicle, using an automated and electrically-powered trailer jack and transport system of FIGS. 26A and 27 mounted to the trailer, initiated by depressing a hard-key button on the outboard controller, and operated according to the principles of the present invention, as illustrated in FIG. 27;

FIG. 29 is a flow chart describing the primary steps involved in the method of automated docking and hitching of a trailer to a trailer hitch on a motor vehicle, using an automated and electrically-powered trailer jack and transport system of FIGS. 26 and 27 mounted to the trailer, initiated by depressing a button on the mobile computing device app controller, and operated according to the principles of the present invention, as illustrated in FIG. 27;

FIG. 30A is a schematic illustration of a cloud-based system network, showing a person standing in a marina parking lot near a parked vehicle and boat trailer equipped with the intelligent GPS-tracking motorized trailer jack and transport system of the present invention, that is remotely-controllable using a mobile computing system, such as a smartphone running a special mobile application, and operational in a programmable mode of operation including an automated trailer parking method illustrated in FIG. 32, wherein the trailer is equipped with a GPS-tracking motorized trailer jack and transport system of the present invention having a GPS-tracking trailer module mounted on the rear of the trailer and in wireless (Bluetooth) communication with the GPS-tracking motorized trailer jack and transport system mounted on the front of the trailer, and automatically transported from a starting position in a parking lot, across the parking lot and into an intended parking space, using the GPS coordinates of the trailer's boundaries and destination parking space captured prior to automated parking operations so as to enable automated GPS-guided transport of the trailer from a starting position in a parking lot, across the parking lot, and into an intended destination parking space, employing GPS-tracking and navigation methods without the need to physically handle the trailer during the parking operation;

FIG. 30B is a perspective illustration of the automated trailer jack and transport system shown in FIG. 24, configured and working in cooperation with a GPS-tracking and LIDAR-mapping navigator beacon module of the present invention mounted to the rear of the trailer, so as to establish and maintain a virtual trailer navigation axis, passing through the trailer, and about which the spatial boundaries of the trailer are defined and managed within local databases and cloud-based servers, for use to park the trailer into a destination parking space while avoiding collisions with neighboring objects with a GPS-tracking and LIDAR-mapping navigator beacon module of the present invention;

FIG. 30C is a perspective of the GPS-tracking and LIDAR-mapping (i.e., collision avoidance) navigator beacon module of the present invention shown in FIGS. 30A and 30B;

FIG. 31 is a schematic block diagram of the automated motor-powered trailer jack and transport system of FIGS. 30A through 30C, interfaced with a cloud-computing environment and wireless data communication infrastructure, and comprising (i) a wireless controller module mounted upon the end of the jacking post member and supporting a directional joystick, jacking controls and automated finding, docking and hitching mode button, and controller electronics, battery storage module, and wireless communications, (ii) a releasable electrical connector, (iii) a jack and transport drive subsystem supporting a control and communications unit (CCU) provided with gears, jack motor, and battery module, battery recharging module, solar panel and control and communications electronics including a processor, firmware, and memory (supporting all functions of the system), a dual-channel IR hitch finding module, a battery charging unit and a position controller, GPS signal receiver with antenna for receiving and processing GPS positioning signals, WWAN module, Bluetooth module, gears, jack motor, battery, battery recharging module, and solar panel for recharging battery, and drive motors provided with drive motors and a drive motor wiring interface, (iv) a GPS navigator beacon for mounting on rear of trailer provided with a GPS receiver and antenna, a Bluetooth communication module, a processor, firmware and memory, and LIDAR ToF range finder with 180 degree FOV, and (v) cloud computing and wireless data communication infrastructure;

FIG. 32 is a plan schematic illustration illustrating major steps carried out during the method of automatic parking of a registered trailer that is equipped with the automated trailer jack and transport system and GPG navigator beacon, showing the trailer's navigation vector at different stages along a projected pathway of travel towards the destination parking space;

FIG. 33 is a flow chart describing the primary steps carried out during the practice of the method of automatic parking of a registered trailer equipped with the automated trailer jack and transport system of the present invention;

FIG. 34A is a plan schematic illustration illustrating major steps carried out during the registration of GPS coordinate maps of a trailer equipped with the automated trailer jack and transport system and destination parking spaces;

FIG. 34B is a plan schematic illustration illustrating major steps carried out during the registration of GPS coordinate maps of keep out zones associated with automated parking of a trailer equipped with an automated trailer jack and transport system;

FIG. 35 is a flow chart describing the primary steps carried out during the method of registering of GPS coordinate maps of (i) a trailer equipped with the automated trailer jack and transport system of the present invention, (ii) destination parking spaces, and (iii) keep out (i.e., obstacle) zones, for storage in a network database system on a cloud-based system network;

FIG. 36 is a plan schematic illustration illustrating major steps carried out during the storing of a home position and associated parking path traversed by a trailer equipped with the automated trailer jack and transport system during a learning mode supported by the system for subsequent use in automated trailer parking operations;

FIG. 37 is a flow chart describing the primary steps carried out during the method of storing a home position and associated entrance path of a trailer equipped with the automated trailer jack and transport system of the present invention, illustrated in FIG. 36;

FIG. 38 is a plan schematic illustration illustrating major steps carried out during the method of automatic parking of a trailer equipped with the automated trailer jack and transport system of the present invention illustrated in FIGS. 30A, 30B and 31 and for which a home position has been learned by the system;

FIG. 39 is a flow chart describing the primary steps carried out during the method of automatic parking of trailer equipped with the automated trailer jack and transport system of the present invention illustrated in FIG. 38;

FIG. 40A is a first perspective view of a personal watercraft (PWC) and trailer equipped with the trailer jack and transport system of the present invention shown and described in FIGS. 2B through 2Q shown being used on a sandy beach surface;

FIG. 40B is a second perspective view of personal watercraft (PWC) and trailer equipped with the trailer jack and transport system of the present invention shown and described in FIGS. 2B through 2Q shown on a generally smooth surface such as concrete or asphalt;

FIG. 40C is a perspective view of a personal watercraft (PWC) and trailer equipped with the trailer jack and transport system of the present invention shown and described in FIGS. 2B through 2Q, arranged in its transport configuration, and located near a motor vehicle which is preparing to be hitched to the trailer via its hitch ball;

FIG. 41A is a perspective view of a snowmobile trailer equipped with the trailer jack and transport system of the present invention shown and described in FIGS. 2B through 2Q, arranged in its transport mode on a snow-covered surface;

FIG. 41B is a perspective enlarged view of a section of the snowmobile trailer shown in FIG. 41A, equipped with the trailer jack and transport system of the present invention shown and described in FIGS. 2B through 2Q, while arranged in its transport configuration (i.e., mode of operation);

FIG. 42A is a perspective view of a dual-axle boat trailer equipped with the trailer jack and transport system of the present invention shown and described in FIGS. 2B through 2Q, arranged in its transport mode, and not hitched to the motor vehicle;

FIG. 42B is a perspective view of the dual-axle boat trailer equipped with the trailer jack and transport system of FIG. 2B through 2Q, shown arranged in its transport mode, with the trailer hitched to the motor vehicle;

FIG. 42C is a perspective view of the dual-axle boat trailer equipped with the trailer jack and transport system of FIG. 2B through 2Q, shown arranged in its storage mode, with the trailer hitched to the motor vehicle;

FIG. 43A is a perspective view of a camper trailer equipped with the trailer jack and transport system of the present invention shown and described in FIGS. 2B through 2Q, arranged in its transport mode, and shown on a grassy and gravel surface;

FIG. 43B is a perspective enlarged view of a section of the camper trailer shown in FIG. 43A, equipped with the trailer jack and transport system of the present invention shown and described in FIGS. 2B through 2Q, while arranged in its transport configuration (i.e., mode of operation);

FIG. 44A is a perspective view of an A-frame flatbed utility trailer equipped with the trailer jack and transport system of the present invention shown and described in FIGS. 14A through 14H, arranged in its storage mode, and shown not hitched to any motor vehicle;

FIG. 44B is a perspective view of the flatbed trailer of FIG. 44A equipped with the trailer jack and transport system shown and described in FIGS. 14A through 14H, arranged in its transport mode, and not hitched to any motor vehicle;

FIG. 45A is a perspective view of an A-frame industrial tool trailer equipped with the trailer jack and transport system of the present invention shown and described in FIGS. 14A through 14H, arranged in its transport mode and shown on a gravel surface FIG. 45B is a perspective view of the flatbed trailer of FIG. 44A equipped with the trailer jack and transport system shown and described in FIGS. 14A through 14H, arranged in its storage mode, but not hitched to any motor vehicle;

FIG. 46A is a perspective view of a first transportable system having trapezoidal platform of rigid construction, with three corners, each having a load-bearing transportation ball construction side-mounted from the side surface of each platform corner, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.);

FIG. 46B is a perspective view of the first transportable system of FIG. 45A, shown carrying and transporting a heavy cylindrical beer keg or barrel across a lawn surface;

FIG. 47A is perspective view of a second transportable system having a trapezoidal platform of rigid construction, with three corners, each having a load-bearing transportation ball construction of the present invention top-mounted through the top surface of each platform corner, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.);

FIG. 47B is perspective view of the second transportable system of FIG. 47B, shown carrying and transporting a heavy cylindrical beer keg or barrel across a lawn surface;

FIG. 48A is perspective view of a third transportable system having trapezoidal platform of rigid construction, with four corners, each having a load-bearing transportation ball construction of the present invention edge-mounted to the side surface of each platform corner, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.);

FIG. 48B is perspective view of the third trapezoidal transportable platform of FIG. 48A, shown carrying and transporting a heavy object, such as barbeque gas grill, across a lawn surface;

FIG. 49A is perspective view of a fourth transportable system having trapezoidal platform of rigid construction, with four corners, each having a load-bearing transportation ball construction of the present invention top-mounted through the top surface of each platform corner, defining a plane of load-bearing support for carrying a load (e.g. such as an ice chest, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.);

FIG. 49B is a perspective view of the third transportable system of FIG. 49A, shown carrying and transporting a heavy object, such as an ice chest, across a lawn surface;

FIG. 50A is a perspective illustration of a remote-controlled (RC) powered transport system utilizing a configuration of multiple load-bearing spherical wheel assemblies of the present invention, shown arranged and hitched to a trailer, or other recreational or work vehicle, and being remotely controlled by a user using a mobile phone running associated mobile app configured for supporting navigation, (optionally jacking) and transport functions in accordance with the principles of the present invention;

FIG. 50B is an elevated side view of the remotely controllable (RC) powered spherical wheel transport system of the present invention, operatively coupled to the boat trailer as shown in FIG. 50A; and FIG. 50C is a perspective view of the remotely controllable powered spherical wheel transport system of the present invention shown in FIGS. 50A and 50B, but not coupled to a trailer, for purposes of illustration.

DETAILED DESCRIPTION OF THE PREFERRED EMBODIMENTS OF THE PRESENT INVENTION

Referring to the figures in the accompanying Drawings, the illustrative embodiments of the system will be described in great detail, wherein like elements will be indicated using like reference numerals.

As a primary object of the present invention, each of the illustrative embodiments of the trailer jack and transport system of the present invention 1 is equipped with a load-bearing spherical object 101 such as a load-bearing spherical transport ball that provides and supports improved rolling and steerable motion to sport, recreational and utility trailers 5, when operating on diverse kinds of ground surfaces 90, including pavement, dirt, sand and mud, without the use of caster-style wheels.

Functioning as a wheeling device, the load-bearing spherical transport ball 101 is supported within a framework assembly 103, preferably having a spherical or other suitable geometry, and configured to allow the spherical wheel to freely rotate with 360 degrees of freedom, in any orientation on bearing surfaces 102 of a diverse nature, that may come in contact with and engage a portion of the spherical wheel during system operation.

As illustrated in FIG. 2A, the load-bearing spherical transport ball 101 has infinite number of virtual axes of rotation passing through a single virtual centroid 141 located and embedded within the center of the spherical ball 101 about which all motion is accomplished-both directional and rotational.

In one preferred embodiment, the height-adjusting jack assembly 12 is centered above the spherical wheel 101, providing 360-degree direction of travel. In another illustrative embodiment, the height-adjusting jack assembly 12 is offset from the center of the spherical wheel 101, reducing the complexities of rotating the wheeled jack into a storage position.

By virtue of its design, the spherical wheel assembly 10 creates the opportunity to drive the wheel through battery-powered means for maximum convenience.

By virtue of its design, the spherical load-bearing transport ball (e.g., spherical wheel) 101 distributes an associated tongue weight of the trailer 5 over an increasingly larger area when the ground surface 90 is soft, providing defense over gravel, sand, snow, grass, dirt and mud.

These and other features and benefits of the present invention will become more apparent hereinafter and in the Claims.

Before specifying the technical details of each illustrative embodiment of the trailer jack and transport system of the present invention, it will be helpful to provide an overview of a primary use case or end-user application for the system. Additional end-user applications for the trailer jack and transport system of the present invention, shown across different fields of human activity and recreational, commercial, and industrial (including military) activity over varied terrain can be found in FIGS. 40 through 45.

Figure 1A:
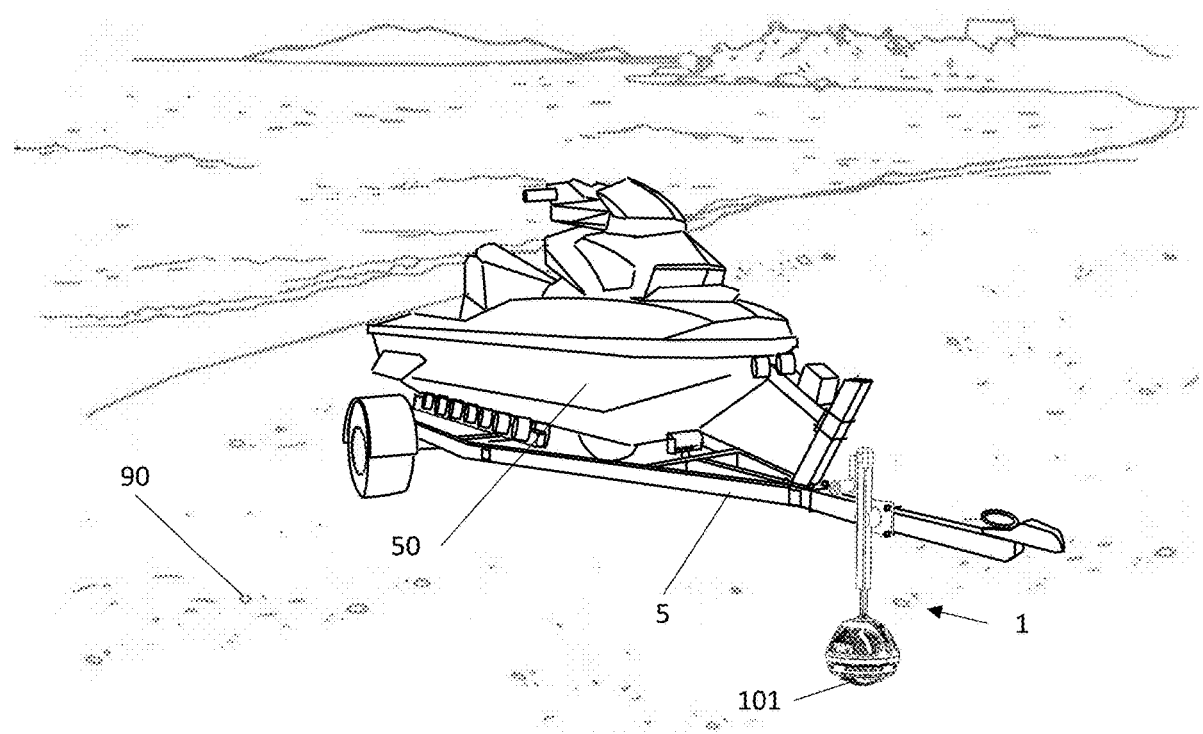
FIG. 1A is a first perspective view of a sport trailer carrying a personal water craft (PWC) 50 (commonly associated with brand names in the marketplace such as Jet-Ski®, Waverunner® or Sea Doo®) to which a trailer jack and transport system of the present invention is mounted and operated according to a first illustrative embodiment of the present invention, wherein the trailer jack and transport system is arranged in its jack and transport configuration, with the load-bearing transport ball contacting and supported upon a ground surface formed on a coastal region or beachfront made from sand and crushed rock.

Specification of a Sport Trailer Carrying a Personal Watercraft (PWC), to which a Trailer Jack and Transport System of the Present Invention is Mounted and Operated According to a First Illustrative Embodiment of the Present Invention FIG. 1A shows a sport trailer 5 carrying a personal watercraft (PWC) 50, to which a trailer jack and transport system of the present invention 1 is mounted and operated according to a first illustrative embodiment of the present invention. As shown, the trailer jack and transport system 1 is arranged in its jack and transport configuration, with the load-bearing transport ball 101 contacting and supported upon a ground surface 90 formed on a coastal region or beachfront made from sand and crushed rock.

Figure 1B:
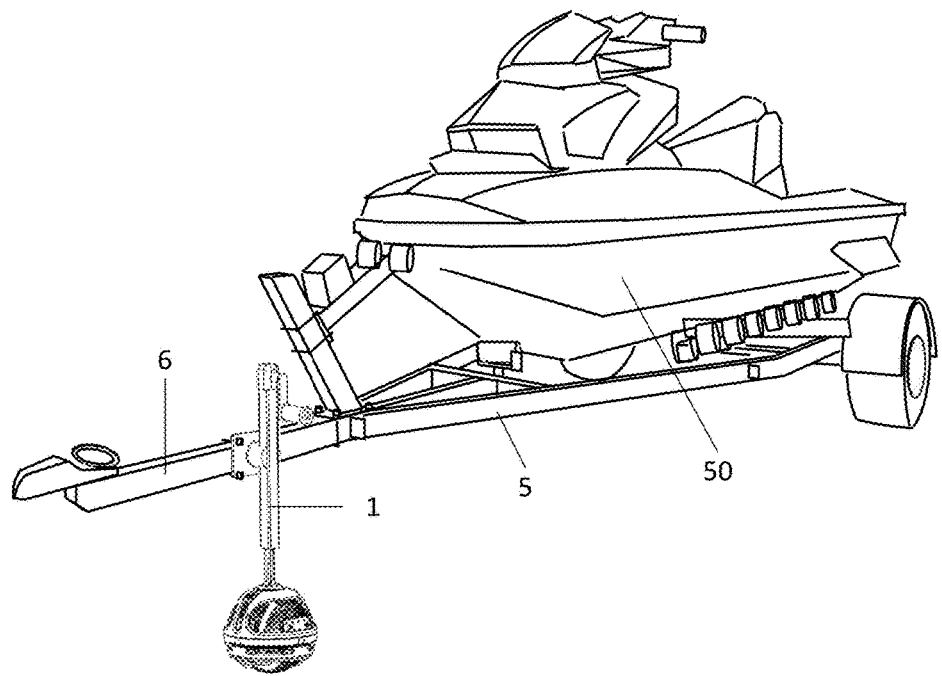
FIG. 1B is a second perspective view of the sports trailer of FIG. 1A shown supported on a smooth ground surface while not being hitched to any motor vehicle.

FIG. 1B shows the sports trailer 5 of FIG. 1A supporting a personal watercraft 50 and resting on a smooth ground surface while not hitched to any motor vehicle with its free end 6 (i.e., "trailer tongue") supported.

Figure 1C:
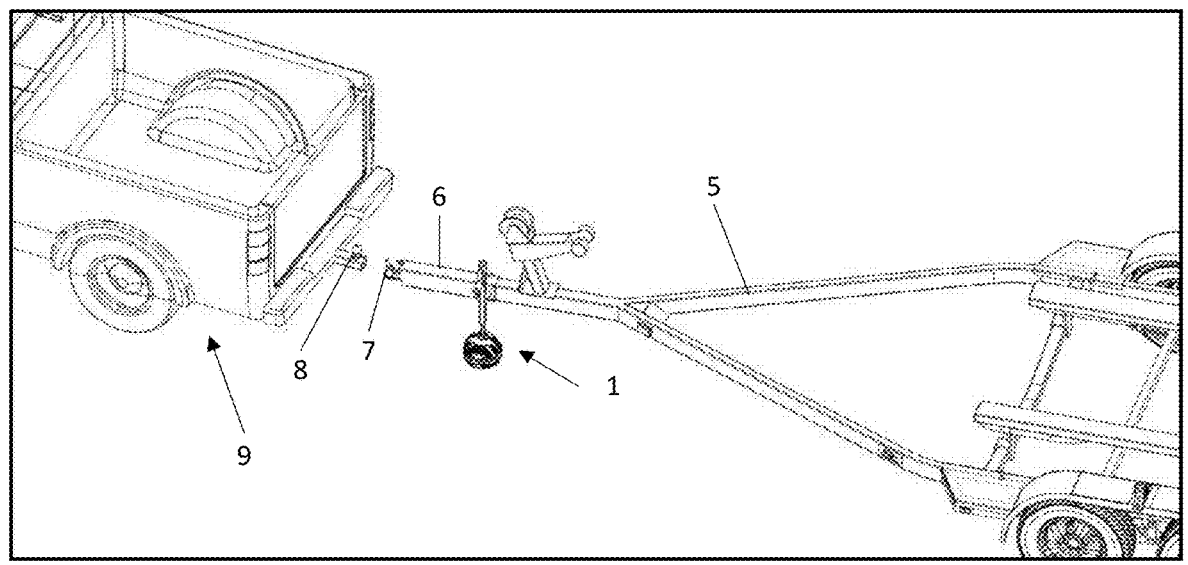
FIG. 1C is a perspective view of the sports trailer of the present invention shown in FIGS. 1A and 1B involved in the process of its coupler being hitched to a trailer hitch mounted to a mobile vehicle (e.g., pickup truck), while the trailer jack and transport system of the present invention is mounted on and supporting the free end of the trailer (i.e. "trailer tongue")

FIG. 1C shows a sports trailer of the present invention 5 shown in FIGS. 1A and 1B being hitched to a mobile vehicle (e.g., pickup truck) 9. As shown, the trailer hitch 8 mounted on the bumper of the motor vehicle 9 is located in close proximity to the trailer coupler (ball socket) 7 mounted on the tongue of the trailer frame 6, while the trailer 5 is jacked and transported by the trailer jack and transport system 1 of the present invention.

Figure 1D:
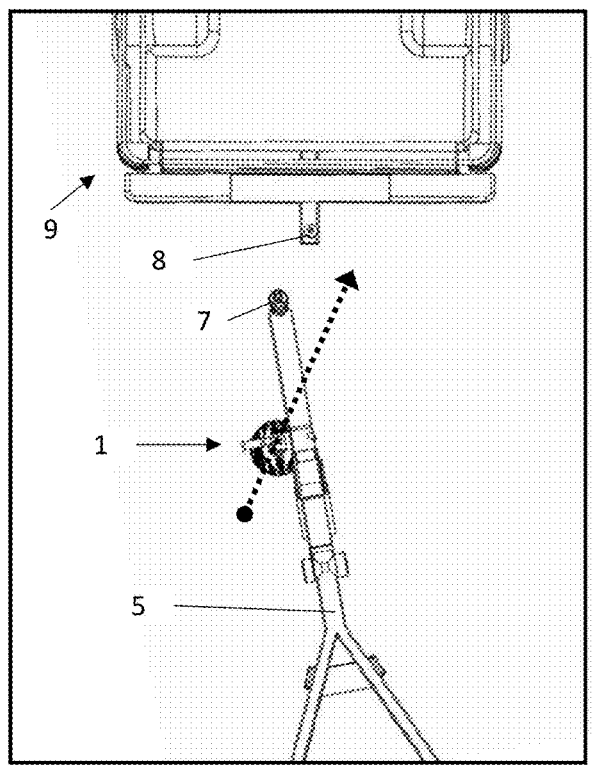
FIG. 1D is a first plan view of the sport trailer in the process of being hitched to the trailer hitch of the mobile vehicle in FIG. 1C, with the intended direction of travel to position the trailer coupler above the ball of the trailer hitch identified by a dashed arrow.

FIG. 1D shows the trailer 5 and the path along which the trailer jack and transport system 1 needs to be transported to position the coupler 7 above the ball of the trailer hitch 8 during the process of hitching the sport trailer of the present invention to the mobile vehicle 9 as shown.

Figure 1E:
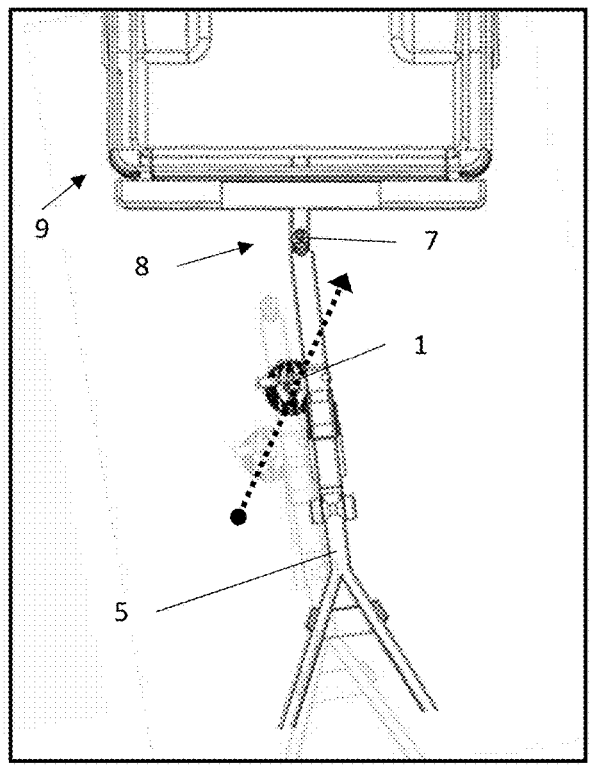
FIG. 1E is a second plan view showing the sport trailer having been transported along its path by the trailer jack and transport system to position the trailer coupler directly above the ball of the trailer hitch connected to the mobile vehicle during the process of hitching the sport trailer shown in FIGS. 1A, 1B, 1C and 1D.

FIG. 1E shows the trailer coupler 7 positioned directly above the trailer hitch 8, having been transported along the direct path identified in FIG. 1D.

Figure 1F:
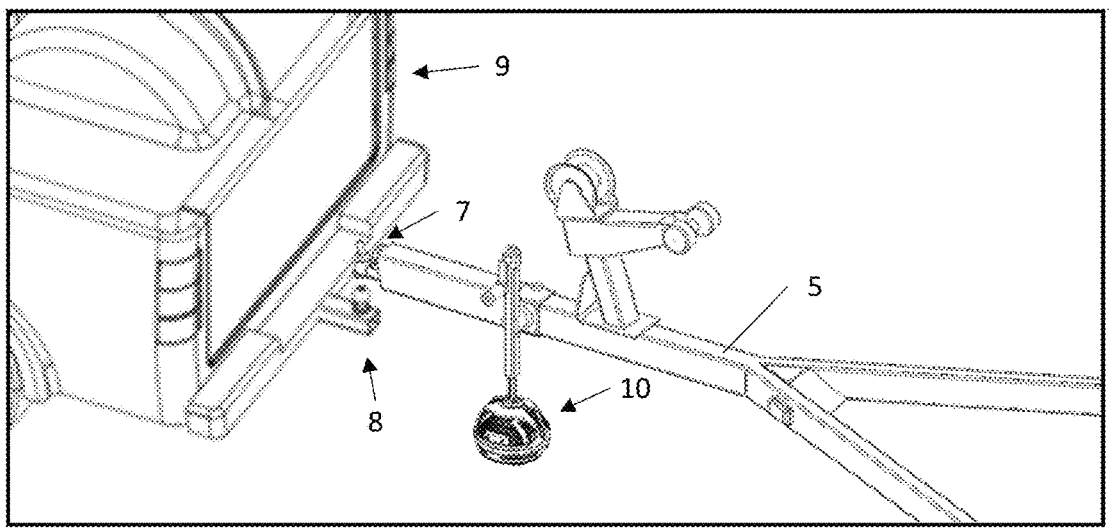
FIG. 1F is a perspective view of FIG. 1E showing the trailer coupler and trailer jack and transport system in transport mode with the trailer coupler positioned directly above the ball of the trailer hitch of the mobile vehicle, ready to be lowered onto said ball for coupling the trailer to the hitch.

FIG. 1F shows the relationship of the trailer coupler 7 to the trailer hitch 8 as described in of FIG. 1E, whereby the trailer jack and transport system 1 is arranged in its transport/jacking mode of operation and is now ready to be lowered onto the ball of the trailer hitch 8.

Figure 1G:
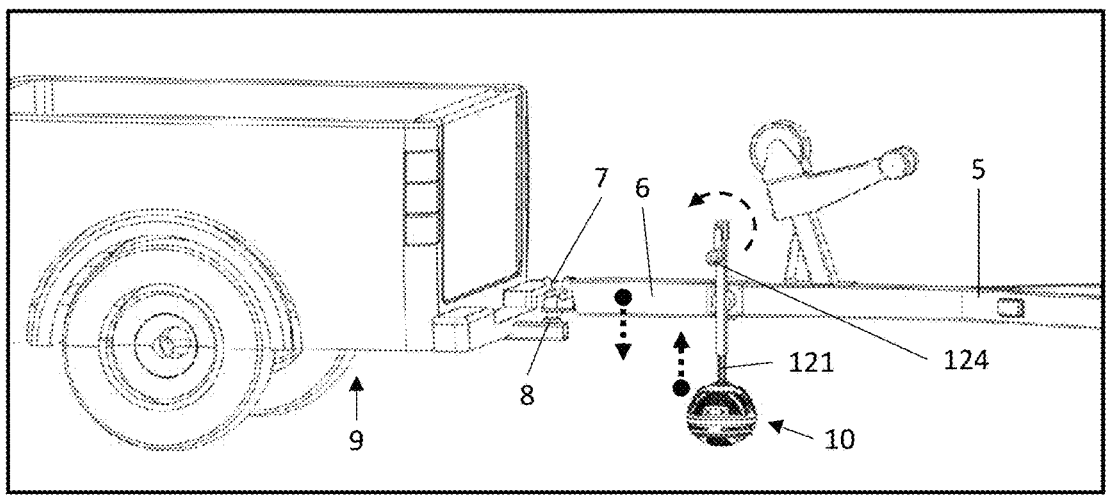
FIG. 1G is a perspective view showing the trailer of FIG. 1C being lowered onto the ball of the trailer hitch by rotating the mechanical crank of the trailer jack and transport system counterclockwise to complete the coupling (hitching) process.

FIG. 1G shows the trailer tongue 6 and trailer coupler 7 of FIG. 1F lowered onto the trailer hitch 8 through counter-clockwise motion of the jacking crank 124 and corresponding retraction of the jacking post member 121 and load-bearing spherical wheel assembly 10 to which it is fixedly attached.

Figure 1H:
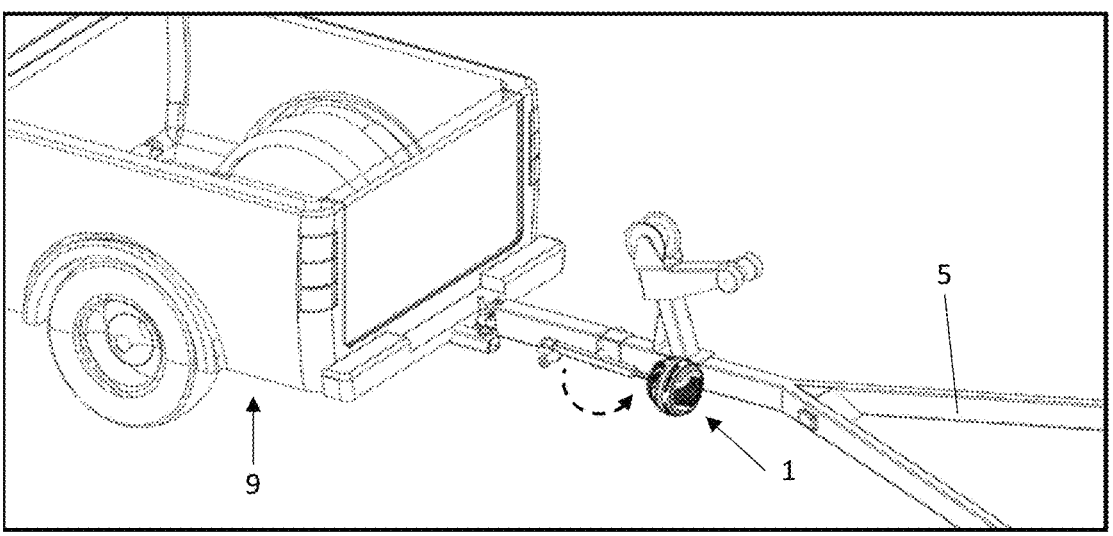
FIG. 1H is a perspective view showing the trailer hitched up to the motor vehicle shown in FIGS. 1C, 1D, 1E, 1F and 1G while the trailer jack and transport system is shown rearranged into its storage mode of operation.

FIG. 1H shows the trailer 5 of FIG. 1C hitched up to the motor vehicle 9, while the trailer jack and transport system 1 is shown rearranged into its storage mode of operation, closely arranged against the frame of the trailer.

Specification of the Trailer Jack and Transport Subsystem of the Present Invention FIG. 2A shows the trailer jack and transport system of the present invention 1 arranged shown removed from a trailer, and in which a coordinate reference system 140 is symbolically embedded for referencing the omni-directional motion of the load-bearing transport ball 101 within its spherical wheel assembly 10. As shown, the coordinate reference system 140 is shown characterized by polar rotational coordinate directions 142 and 143, defined about a virtual center located at point 141 in the center of the spherical wheel assembly 10, mounted to a rotatable extendable hand-operated jacking post member assembly 12.

FIG. 2B shows the trailer jack and transport system of the present invention 1 shown removed from any trailer, while arranged in its jack and transport configuration, with its load-bearing transport ball contacting the ground surface. As shown, the trailer jack and transport system 1 comprises: (i) a spherical wheel assembly 10 having a semispherical framework 103 supporting a rigid load-bearing transport ball 101 rotatably supported by bearing surfaces 102-1 through 102-5 mounted in the semispherical framework 103 and ring structure 104, and retained in the framework by a ball retainer ring structure 105; (ii) a set of braking frames 106-1 and 106-2 mounted between the semispherical framework 103 and the load-bearing ball 101 and each having an aperture for the bearing surfaces 102-2 and 102-4, and having thumb or foot-slidable levers 106A-1 and 106A-2 extending through the semispherical framework 103, and operable to be arranged in a braking-configuration or a non-braking configuration; and (iii) a hand-operated and rotatably jacking post assembly 12 rigidly mounted to the top center of the semispherical framework 103 by welding or other fastening means, and having a rotatable mounting mechanism 123 that allows the outer post member 122 to rotate through at least 90 degrees of movement, from a storage configuration shown in FIGS. 7B, 7C and 7D, to a transport configuration shown in FIG. 7A, and a hand-crank 124 that extends or retracts the inner jacking post 121 relative to the outer jacking post member 122 in response to rotation of the hand-crank 124.

FIG. 2C shows the trailer jack and transport system of the first illustrative embodiment 1 in FIG. 2B. As shown, the load-bearing transport ball 101 is shown in greater detail (i) supported by a set of bearing pads 102-5 mounted directly beneath the top center of the semispherical framework 103 and bearing pads 102-1 through 102-4 mounted along the perimeter of the interior space of the semispherical framework 103 and ring structure 104 and extending from its bottom aperture to allow physical engagement with and rolling support on a ground surface, and (ii) embraced within a dual-sided ball braking system 106-1 and 106-2 mounted between the load-bearing transport ball 101 and the interior surfaces of the semispherical framework 103.

FIG. 2D shows the trailer jack and transport system of the first illustrative embodiment 1 shown in FIG. 2B. As shown, the dual-sided ball braking system 106 is shown arranged in its non-braking (i.e., unlocked) mode of operation, between the load-bearing transport ball and the interior surfaces of the semispherical framework, while the extendable jacking post member 121 is shown extended and in a jack mode of operation.

FIG. 2E shows the trailer jack and transport system of the first illustrative embodiment 1 shown in FIG. 2B. As shown, the dual-sided ball braking system 106 is shown arranged in its non-braking (i.e., unlocked) mode of operation, between the load-bearing transport ball 101 and the interior surfaces of the semispherical framework 103, while the extendable jacking post member 121 is shown extended and in a jack mode of operation.

FIG. 2F shows the semispherical framework portion of the trailer jack and transport system of the first illustrative embodiment 1 shown in FIG. 2B. As shown, the dual-sided ball braking system 106 is shown arranged in its non-braking (i.e., unlocked) mode of operation, between the load-bearing transport ball 101 and the interior surfaces of the semispherical framework 103.

FIG. 2G shows the trailer jack and transport system of the first illustrative embodiment 1 shown in FIG. 2B. As shown, the dual-sided ball braking system 106 is shown arranged in its non-braking (i.e., unlocked) mode of operation, between the load-bearing transport ball 101 and the interior surfaces of the semispherical framework 103.

FIG. 2H shows the semispherical framework portion 103 of the trailer jack and transport system of the first illustrative embodiment 1 shown in FIG. 2B. As shown, the dual-sided ball braking system 106 is shown arranged in its non-braking (i.e., unlocked) mode of operation, between the load-bearing transport ball 101 and the interior surfaces of the semispherical framework 103.

Figure 2R:
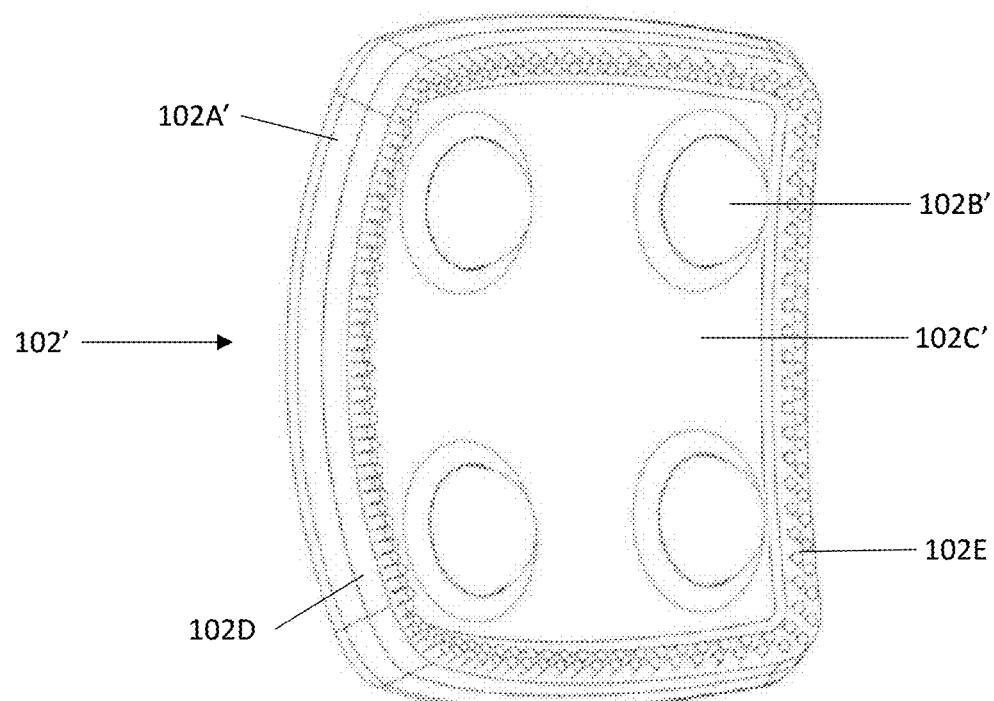
FIG. 2R is a perspective front view of a first alternative bearing surface (e.g., ball bearing pad) adapted for installation in the trailer jack and transport system of the first illustrative embodiment shown in FIG. 2B, for rotatably supporting the load-bearing transport ball in an omni-directional manner.
Figure 2S:
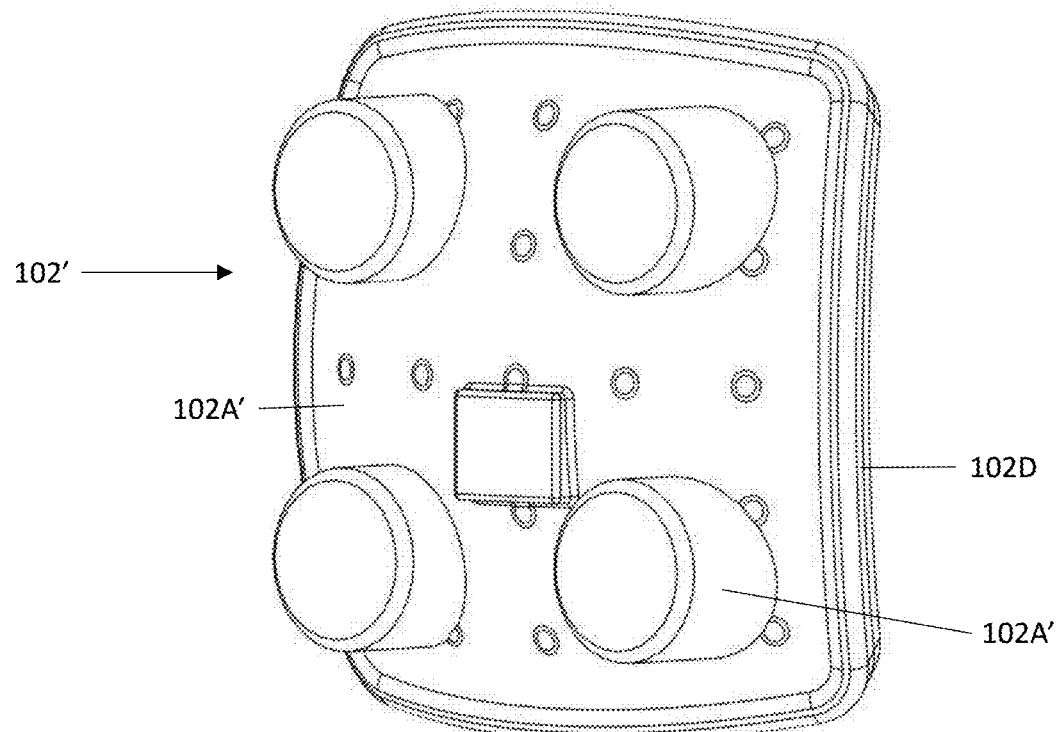
FIG. 2S is a perspective rear view of the first alternative bearing surface (e.g., ball bearing pad) shown in FIG. 2R.
Figure 2T:
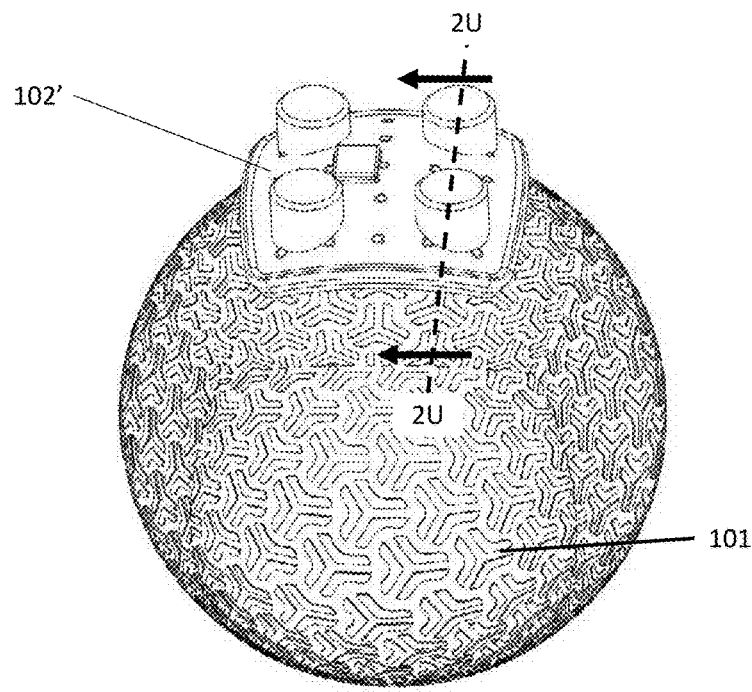
FIG. 2T is a perspective view of the first alternative bearing surface (e.g., ball bearing pad) in FIG. 2R, shown engaging the load-bearing transport ball of the present invention while removed from its semispherical framework, for purposes of illustration.
Figure 2U:
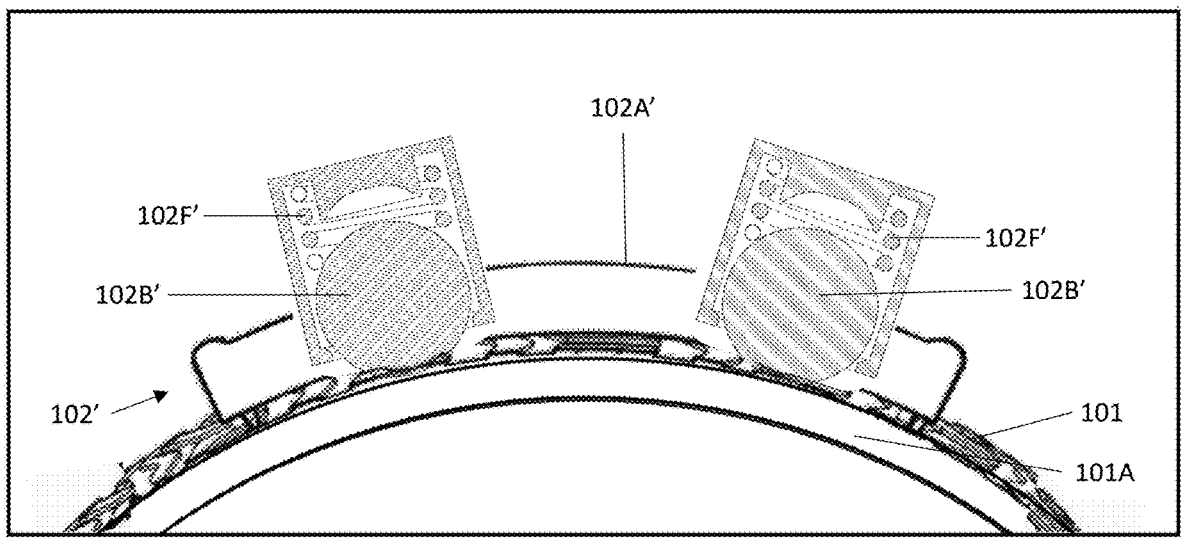
FIG. 2U is a cross-sectional fragmented view of the first alternative bearing surface engaging the load-bearing transport ball of the present invention, taken along viewing line 2U-2U in FIG. 2T.
Figure 2V:
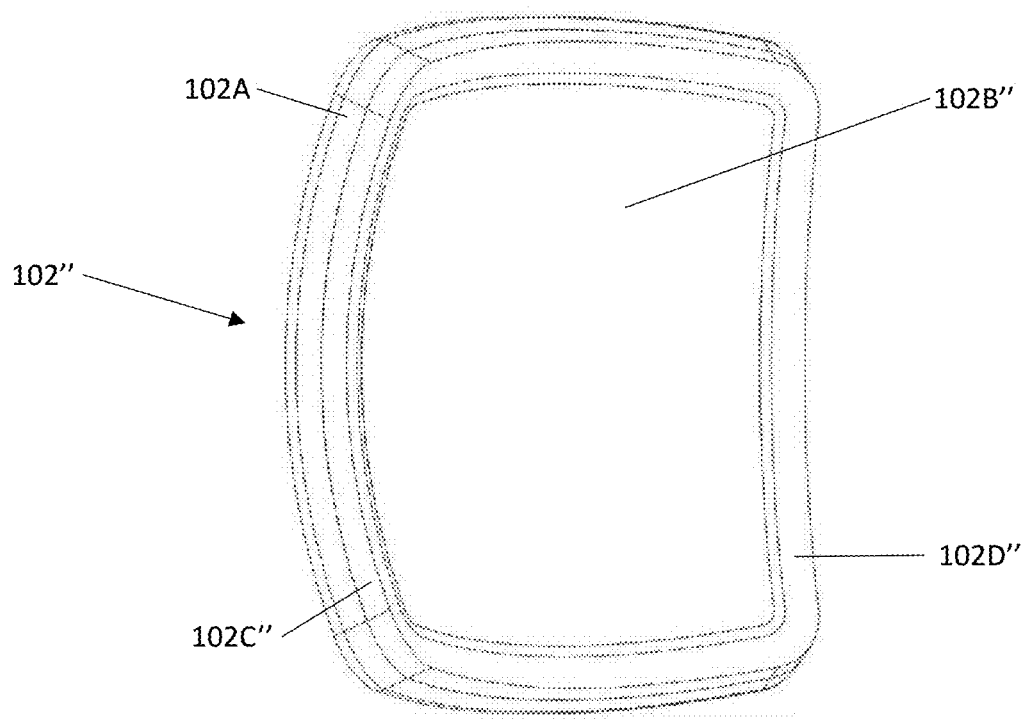
FIG. 2V is a perspective front view of a second alternative bearing surface (e.g., self-lubricating plastic bearing pad, such as Nylon plastic) adapted for installation in the trailer jack and transport system of the first illustrative embodiment shown in FIG. 2B, for rotatably supporting the load-bearing transport ball in an omni-directional manner.
Figure 2W:
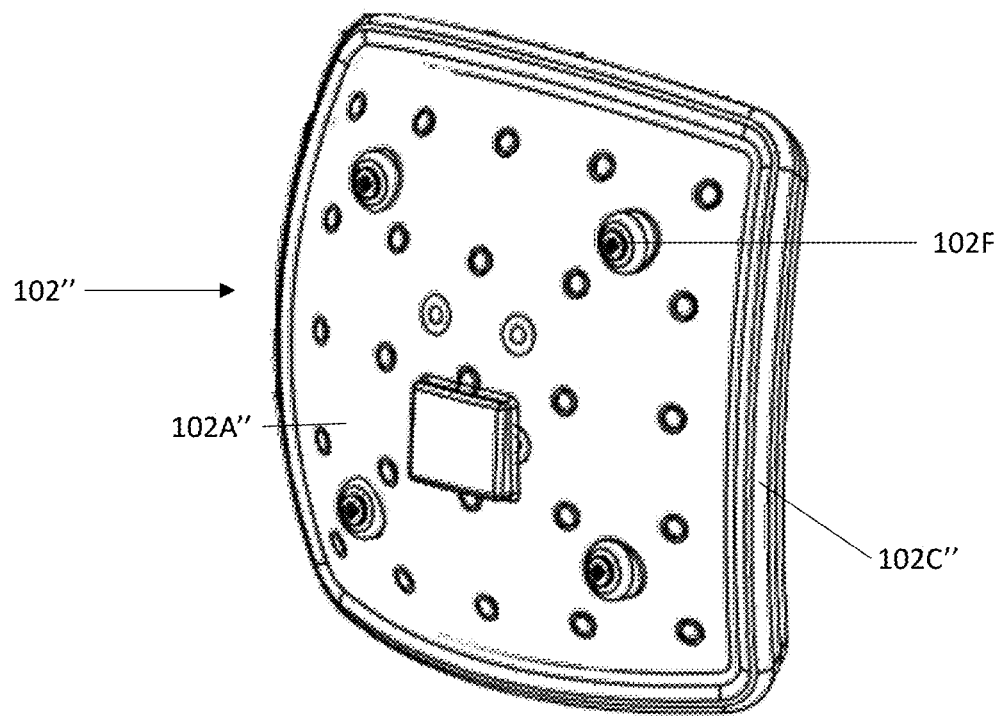
FIG. 2W is a perspective rear view of the second alternative bearing surface (e.g., Nylon plastic ball bearing pad) shown in FIG. 2V.
Figure 2X:
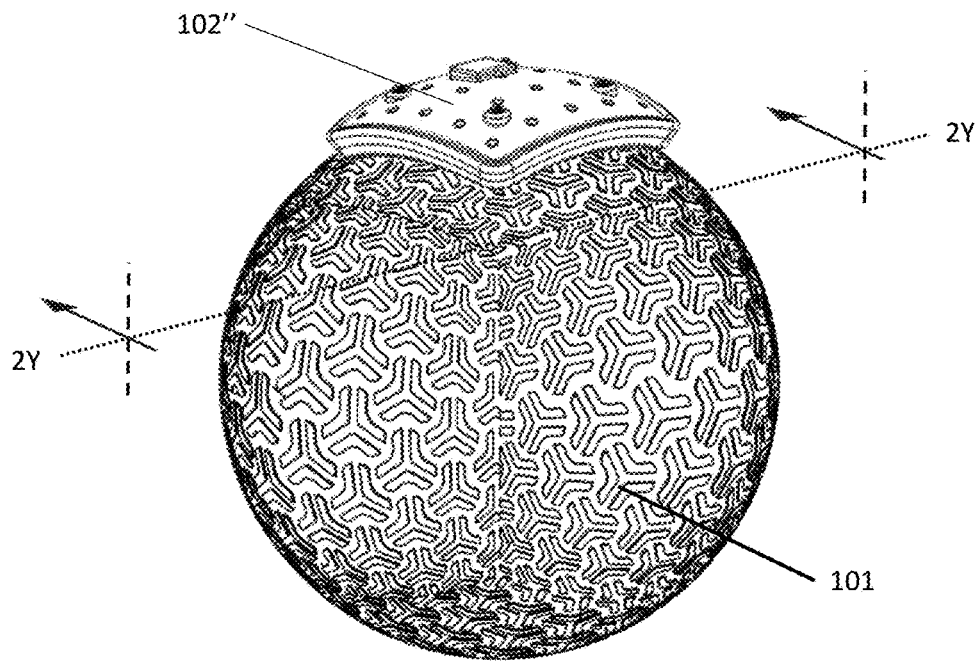
FIG. 2X is a perspective view of the second alternative bearing surface (e.g., ball bearing pad) in FIG. 2V, shown engaging the load-bearing transport ball of the present invention, while removed from its semispherical framework for purposes of illustration.
Figure 2Y:
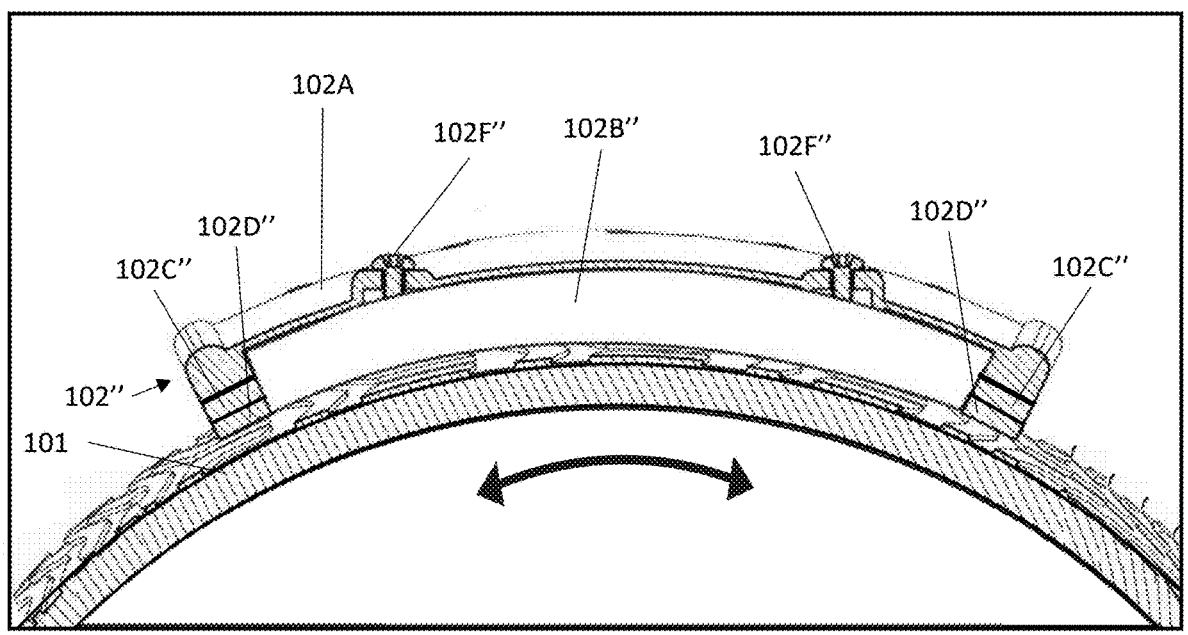
FIG. 2Y is a cross-sectional view of the second alternative bearing surface engaging the load-bearing transport ball of the present invention, taken along line 2Z-2Z in FIG. 2Y.
Figures 2H, 2I:
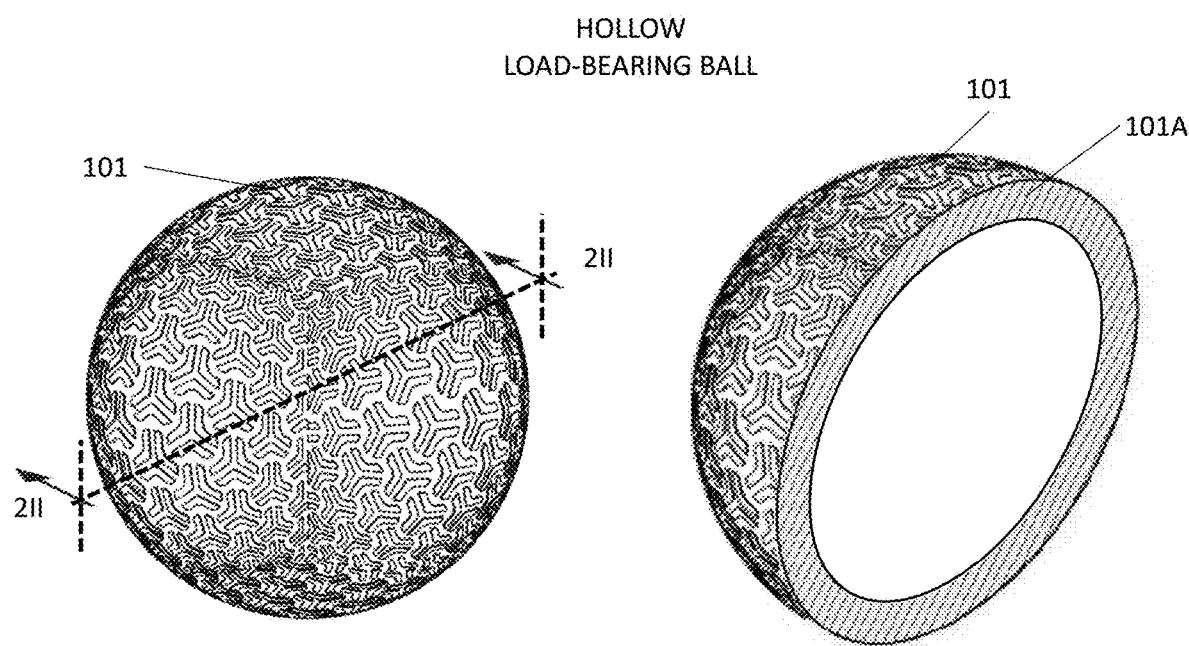
FIG. 2I is an exploded perspective view of the trailer jack and transport system of the first illustrative embodiment shown in FIG. 2B, shown comprising a semispherical framework for supporting a set of bearing surfaces (e.g. ball bearing pads) between the interior surfaces of the semispherical framework and a load-bearing transport ball supported by bearing surfaces, and a dual-sided ball braking system mounted about the load-bearing transport ball while retained within the semispherical framework using a retaining ring structure.

FIG. 2I shows the trailer jack and transport system of the first illustrative embodiment 1 shown in FIG. 2B. As shown, the system comprises: a semispherical framework 103 and ring structure 104 for supporting a set of bearing surfaces (e.g. ball bearing pads) 102-1 through 102-5 between the interior surfaces of the semispherical framework 103 and a load-bearing transport ball 101 supported by bearing surfaces 102, and a dual-sided ball braking system 106-1 and 106-2 mounted about the load-bearing transport ball 101, all of which is captured by the ball retainer ring structure 105, retaining the transport ball 101 in manner that allows it to rotate freely.

FIG. 2J shows the trailer jack and transport system of the first illustrative embodiment 1 shown in FIG. 2B. As shown, the system comprises: a semispherical framework 103 for supporting a set of bearing surfaces (e.g. ball bearing pads) 102-1 through 102-5 between the interior surfaces of the semispherical framework 103 and a load-bearing transport ball 101 supported by bearing surfaces 102-1 through 102-5 using support ring structure 104, and retaining ring structure 105, also within said assembly is a dual-sided ball braking system 106-1, 106-2 mounted about the load-bearing transport ball 101 while the transport ball 101 is retained within the semispherical framework 103 and the bearing pads 102 arranged about its perimeter;

FIG. 2K shows the load-bearing transport ball supported by the bearing surfaces (e.g. ball-bearing pads) installed in the trailer jack and transport system of the first illustrative embodiment 101 shown in FIG. 2B, shown without its semispherical framework 103, dual-sided ball braking system 106, pad mounting ring structure 104, and ball retaining ring structure 105, each being removed for purposes of exposition and illustration of how the bearing pads 102-1 through 102-5 engage the surface of the load-bearing transport ball 101 to enable and allow free low-frictional rotational movement within the spherical wheel assembly 10 of the system 1.

FIG. 2L shows the load-bearing transport ball 101 supported by the bearing surfaces (e.g., ball-bearing pads) 102-1 through 102-5 installed in the trailer jack and transport system of the first illustrative embodiment 1 shown in FIG. 2B, shown without its semispherical framework 103, dual-sided ball braking system 106-1, 106-2, pad mounting ring structure 104, and retaining ring structure 105 each removed for purposes of exposition and illustration.

FIG. 2M is a cross-section of the FIG. 2L showing the concentric bearing surfaces 102 supporting the load-bearing transport ball 101 taken from a few along 2M-2M shown in FIG. 2K FIG. 2N shows the set of bearing surfaces 102-1 through 102-5 shown employed in FIGS. 2K and 2L, with the load-bearing transport ball 101 removed for purposes of exposition and illustration purposes.

FIG. 2O shows a single bearing surface engaging with a portion of the load-bearing transport ball 101 employed in the trailer jack and transport system of the first illustrative embodiment 101 shown in FIG. 2B.

FIG. 2P shows one of the five (5) bearing surfaces (e.g., ball bearing pads) 102 installed in the trailer jack and transport system of the first illustrative embodiment 101 shown in FIG. 2B, to rotatably support the load-bearing transport ball 101 in an omni-directional manner.

FIG. 2Q shows one of the five (5) bearing surfaces (e.g., ball bearing pads) 102-1 through 102-5 installed in the trailer jack and transport system of the first illustrative embodiment 1 shown in FIG. 2B. As shown, each bearing pad 102 comprises: a set of ball bearings 102B mounted between a slightly arcuate support base portion 102A and an apertured arcuate surface plate 102C, through which each ball bearing 102B is permitted to project while mounted within the bearing surface pad 102, by screws 102F passing through support base 102A and threaded into bearing aperture plate 102C. Snapped thereto is a brush frame 102D that secures bristles 102E about the perimeter of the apertured arcuate surface plate 102C and ball bearings 102B.

As shown, replaceable flexible bristles 102E are mounted about the perimeter region of each pad on a user-replaceable snap-fit brush ring 102D to scrape, flick and remove debris such as sand, dirt, and grit from entering between the bearing surfaces 102 and the exterior surface of the transport ball 101. By removing sand and debris from entering the engaging bearing surfaces of the transport ball 101, during normal operation of the trailer jack and transport system 1, the bearing pads 102 are less likely to wear away and more likely to minimize frictional abrasion and extend the operating lifetime and need for servicing and/or replacement of the bearing surface pads.

Specification of First Alternative Bearing Surface (e.g. Ball Bearing Pad) Adapted for Installation in the Trailer Jack and Transport System of the First Illustrative Embodiment of the Present Invention FIG. 2R shows a first alternative bearing surface (e.g., ball bearing pad) 102' adapted for installation in the trailer jack and transport system 1 shown in FIG. 2B, for rotatably supporting the load-bearing transport ball 101 in an omni-directional manner.

FIG. 2S shows the rear surface of the first alternative bearing surface (e.g., ball bearing pad) 102' shown in FIG. 2R.

FIG. 2T shows the first alternative bearing surface (e.g., ball bearing pad) 102' in FIG. 2S engaging the load-bearing transport ball 101, while removed from its semispherical framework 103 and other system components for purposes of illustration.

FIG. 2U shows the first alternative bearing surface 102 engaging the load-bearing transport ball of the present invention, from a view taken along line 2U-2U in FIG. 2T. As shown, each bearing pad 102' comprises a base portion 102A' through which are formed apertures that permit steel ball bearings 102B' to project slightly while retained in a spring-biased 102F' chamber integrated with the base portion 102A', thereby enabling the transport ball 101 to roll about on ball bearing surfaces 102B' projecting from the base portion 102A of the bearing pad arranged about the transport ball 101 within the semispherical framework 103.

As shown, replaceable flexible bristles 102E are mounted about the perimeter region of each pad on a user-replaceable snap-fit brush ring 102D to scrape, flick and remove debris such as sand, dirt, and grit from entering between the bearing surfaces 102 and the exterior surface of the transport ball 101. By removing sand and debris from entering the engaging bearing surfaces of the transport ball 101, during normal operation of the trailer jack and transport system 1, the bearing pads 102' are less likely to wear away and more likely to minimize frictional abrasion and extend the operating lifetime and need for servicing and/or replacement of the bearing surface pads.

Specification of Second Alternative Bearing Surface (e.g. Self-Lubricating Bearing Pad) Adapted for Installation in the Trailer Jack and Transport System of the First Illustrative Embodiment of the Present Invention FIG. 2V is a perspective front view of a second alternative bearing surface (e.g., self-lubricating plastic bearing pad, such as Nylon plastic) adapted for installation in the trailer jack and transport system of the first illustrative embodiment shown in FIG. 2B, for rotatably supporting the load-bearing transport ball in an omni-directional manner.

FIG. 2W is a perspective rear view of the second alternative bearing surface (e.g., Nylon plastic ball bearing pad) shown in FIG. 2V.

FIG. 2X is a perspective view of the second alternative bearing surface (e.g., ball bearing pad) in FIG. 2V shown engaging the load-bearing transport ball of the present invention, while removed from its semispherical framework for purposes of illustration.

FIG. 2Z is a cross-sectional view of the first alternative bearing surface engaging the load-bearing transport ball of the present invention, taken along line 2Z-2Z in FIG. 2Y.

As shown, a replaceable dense bristle pad 102D" is mounted about the perimeter region of each pad on a user-replaceable snap frame 102C" to scrape, flick and remove debris such as sand, dirt, and grit from entering between the self-lubricating bearing surfaces 102 and the exterior surface of the transport ball 101. By removing sand and debris from entering the engaging bearing surfaces of the transport ball 101, during normal operation of the trailer jack and transport system 1, the self-lubricating bearing pads 102" are less likely to wear away and more likely to minimize frictional abrasion and extend the operating lifetime and need for servicing and/or replacement of the bearing surface pads.

Specification of Internal Construction of Load-Bearing Transport Balls of the Illustrated Embodiments of the Present Invention FIGS. 2Z and 2AA shows the first illustrative embodiment of the load-bearing transport ball, characterized by having a solid core fabricated from one or more durable materials designed to withstand the expected loads bearing down on the transport ball during operation.

FIGS. 2BB and 2CC show a second illustrative embodiment of the load-bearing transport ball of the present invention, characterized by having a multi-layer core fabricated from different layers of durable material designed to withstand the expected loads bearing down on the transport ball during operation.

FIGS. 2DD and 2EE shows a third illustrative embodiment of the load-bearing transport ball of the present invention, characterized by having a spline-core fabricated from durable material that can withstand the expected loads bearing down on the transport ball during operation.

FIGS. 2FF and 2GG show a fourth illustrative embodiment of the load-bearing transport ball of the present invention, characterized by having a honeycomb-core fabricated from durable material that can withstand the expected loads bearing down on the transport ball during operation.

FIGS. 2HH and 2II show a fifth illustrative embodiment of the load-bearing transport ball of the present invention, characterized by having a hollow-core fabricated from durable material that can withstand the expected loads bearing down on the transport ball during operation.

Specification of External Surface of Load-Bearing Transport Ball of the Illustrated Embodiments of the Present Invention As shown in FIGS. 2Z through 2II, the load-bearing transport ball 101 employs a textured or patterned surface for, among other things, channeling water to prevent slippage and sliding while rolling on the ground surface. It is also understood that said surface texture or pattern can be crafted to offer traction for engagement with the drive rotors of the powered (i.e. motorized) alternative embodiment of the present invention as taught in FIG. 15A and shown in detail in FIG. 15C.

Figure 3A:
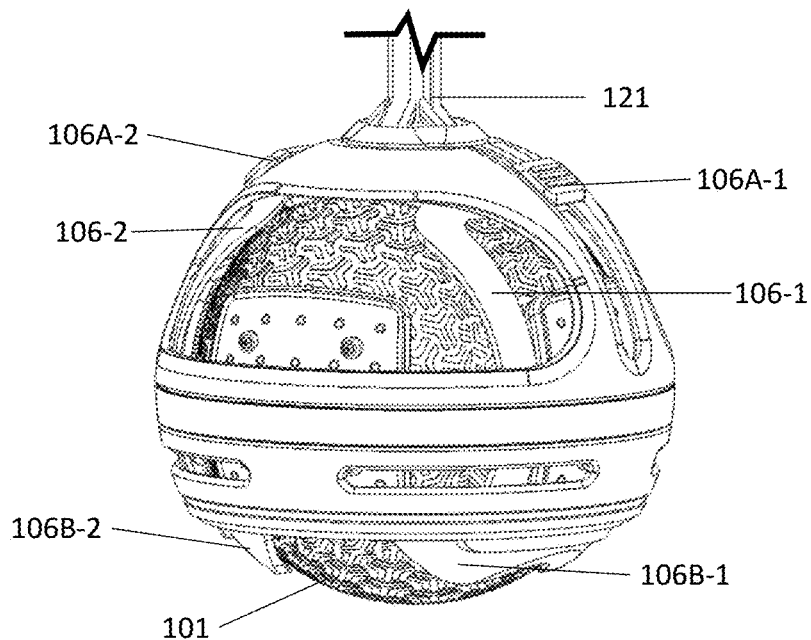
FIG. 3A is a perspective, partially cut away view of the trailer jack and transport system of the first illustrative embodiment of the present invention shown in FIG. 2B. showing the spherical wheel assembly of the present invention, wherein the dual-sided ball braking system is shown arranged in its non-locking or non-braking mode of operation, with the braking shoes retracted in an upward manner.
Figure 3B:
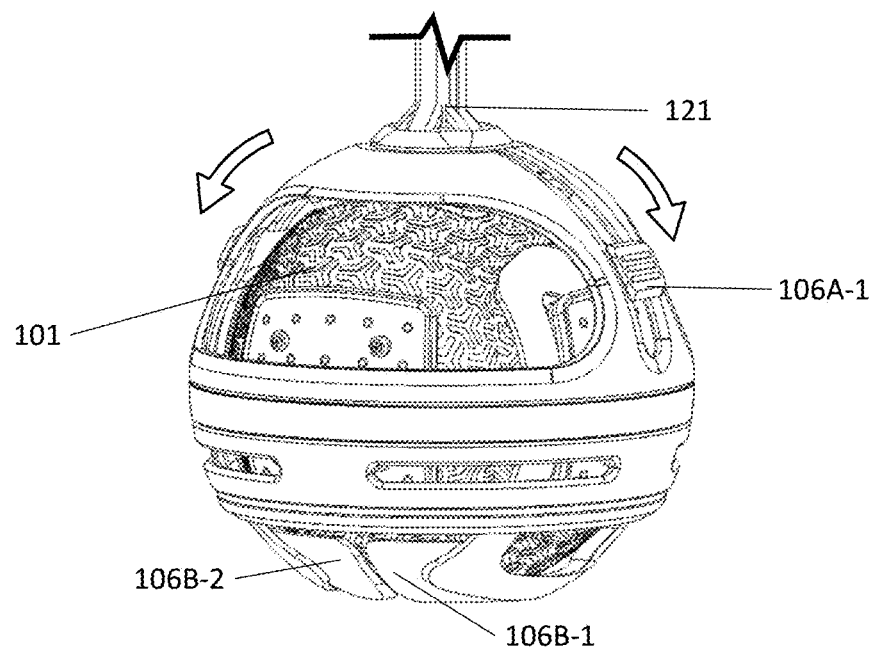
FIG. 3B is a perspective, partially cut away view of the trailer jack and transport system of the first illustrative embodiment shown in FIG. 2B, wherein the dual-sided ball braking system is shown arranged in its locking or braking mode of operation, with the braking shoes retracted in a downward manner.
Figure 3C:
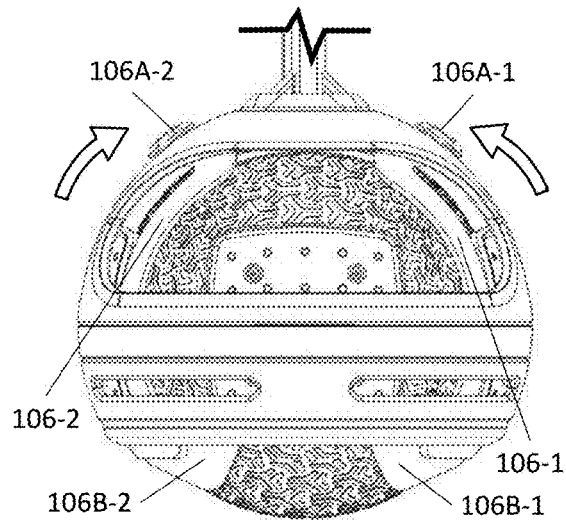
FIG. 3C is an elevated side view of the trailer jack and transport system of the first illustrative embodiment of the present invention shown in FIG. 2B, wherein the dual-sided ball braking system is shown arranged in its non-locking or non-braking mode of operation, with the braking shoes retracted in an upward manner.
Figure 3D:
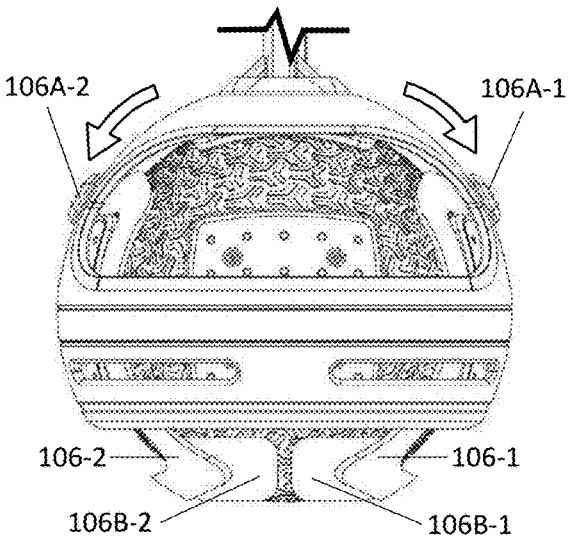
FIG. 3D is an elevated side view of the trailer jack and transport system of the first illustrative embodiment of the present invention shown in FIG. 2B, wherein the dual-sided ball braking system is shown arranged in its locking or braking mode of operation, with the braking shoes protracted in a downward manner.
Figure 3E:
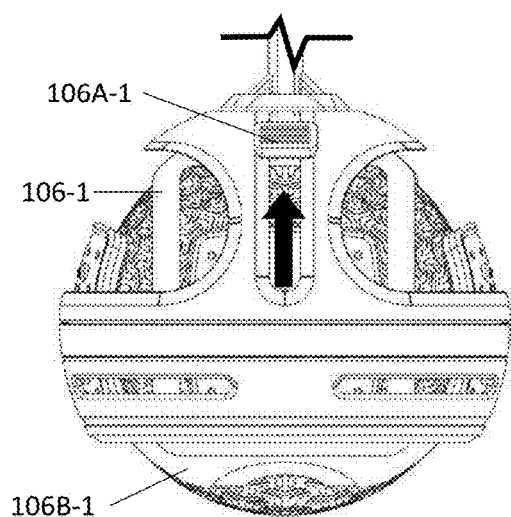
FIG. 3E is another elevated side of view of the trailer jack and transport system of the first illustrative embodiment of the present invention shown in FIG. 2B, wherein the dual-sided ball braking system is shown arranged in its non-locking or non-braking mode of operation, with the braking shoes retracted in an upward manner.

Specification of the Trailer Jack and Transport System, Wherein the Dual-Sided Ball Braking System is Arranged for Locking and Non-Braking Modes of Operation FIGS. 3A, 3C and 3E show the trailer jack and transport system of the first illustrative embodiment of the present invention shown in FIG. 2B, wherein the dual-sided ball braking system is shown arranged in its non-locking or non-braking mode of operation, with the braking shoes retracted in an upward manner.

Figure 3F:
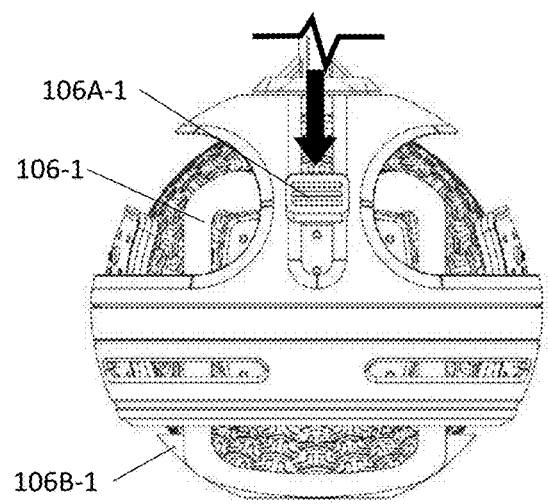
FIG. 3F is another elevated side view of the trailer jack and transport system of the first illustrative embodiment of the present invention shown in FIG. 2B, wherein the dual-sided ball braking system is shown arranged in its locking or braking mode of operation, with the braking shoes protracted in a downward manner.

FIGS. 3B, 3D and 3F show the trailer jack and transport system of the first illustrative embodiment of the present invention shown in FIG. 2B, wherein the dual-sided ball braking system is shown arranged in its locking or braking mode of operation, with the braking shoes protracted in a downward manner.

As shown, these braking shoes can be manually deployed into their respective positions using the user's hand or fingers, or foot-operations, as the case may be. Below, alternative methods of braking operation are taught with great advantage and benefit.

Figure 3G:
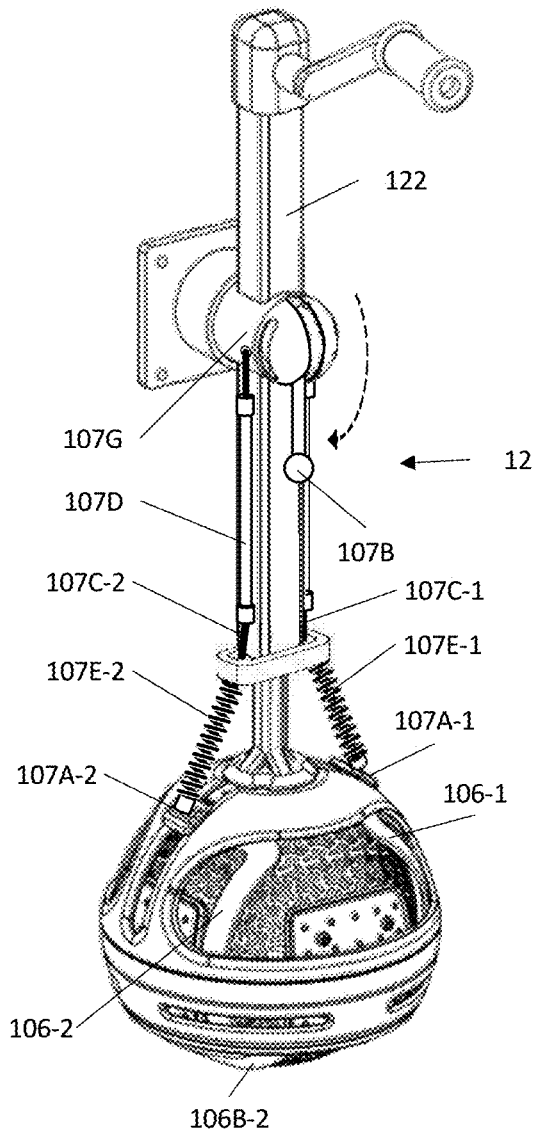
FIG. 3G is a first perspective side view of the trailer jack and transport system of a modified embodiment of the present invention shown in FIG. 2B, wherein a side-pull type of transport ball braking system is provided with a mechanically-operated safety-lever shown arranged in its non-locking or non-braking mode of operation, wherein the dual-sided braking shoes are spring-biased in their locking configuration by a pair of brake compression springs, and retracted in an upward manner by a pair of cables that are pulled against the brake compression springs, on the sides of the jacking post member assembly, and taken-up on a cable take-up mechanism mounted along the outer jacking post member, while mechanically-operated by a safety lever.

Specification of the Trailer Jack and Transport System of the Present Invention, Wherein the Dual-Sided Side-Pull Type of Transport Ball Braking System is Provided with a Mechanically-Operated Safety-Lever for Locking and Non-Braking Modes of Operation FIG. 3G shows the trailer jack and transport system of a modified embodiment of the present invention shown in FIG. 2B, wherein the dual-sided ball braking system is provided with a mechanically-operated side-pull cabling system with safety-lever 107B shown arranged in its non-locking or non-braking mode of operation. As shown, the braking shoes 106B-1 and 106B-2 are spring-biased in their locking configuration by a pair of brake compression springs 107E-1 and 107E-2, and retracted in an upward manner by a pair of cables 107C-1 and 107C-2 that are pulled against the brake compression springs 107E-1 and 107E-2, on the sides of the jacking post member assembly 12, and taken-up on a cable take-up mechanism 107G mounted along the outer jacking post member 122, while mechanically-operated by a safety lever 107B.

Figure 3H:
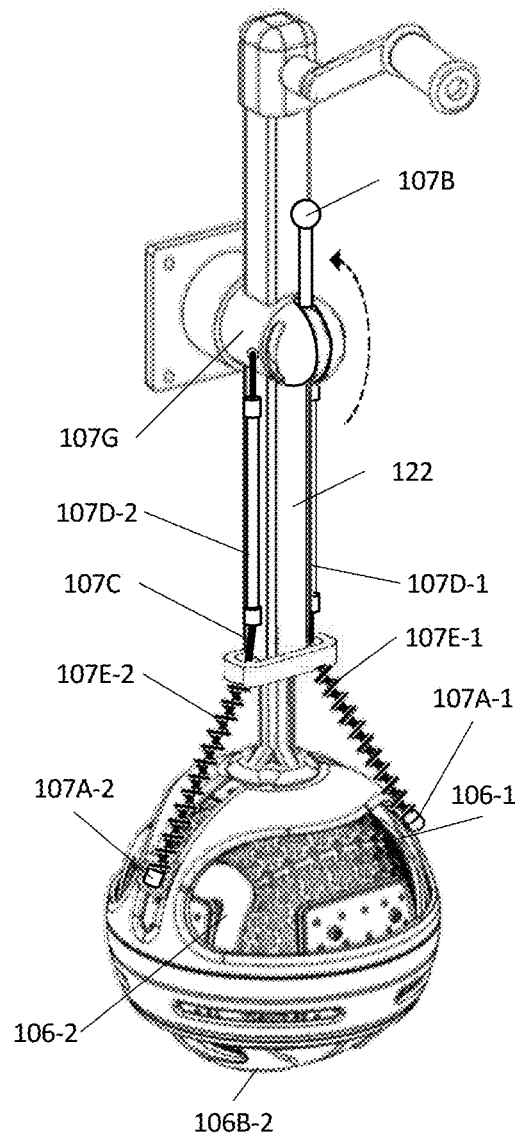
FIG. 3H is second perspective view of the trailer jack and transport system of the modified embodiment shown in FIG. 3G, wherein the side-pull type of transport ball braking system is provided with a mechanically-operated safety-lever shown arranged in its locking or braking mode of operation, wherein the dual-sided braking shoes are spring-biased in their locking configuration by a pair of brake compression springs, and protracted in a down manner while the pair of cables are not pulled against the brake tension springs and are released from a cable take-up mechanism mounted along the outer jacking post member, while mechanically-operated by the safety lever.

FIG. 3H shows the trailer jack and transport system of modified embodiment of the present invention shown in FIG. 2B, wherein the dual-sided ball braking system is provided with a mechanically-operated side-pull cabling system with safety-lever 107B shown arranged in its locking or braking mode of operation. As shown, the braking shoes 106B-1 and 106B-2 are spring-biased in their locking configuration by a pair of brake compression springs 107E-1 and 107E-2, and are protracted in a downward manner when the pair of cables 107C-1 and 107C-2 are not pulled against the brake compression springs 107E-1 and 107E-2, and the cables are released from the cable take-up mechanism 107G mounted along the outer jacking post member 122, while mechanically-operated by a safety lever 107B.

Figure 3I:
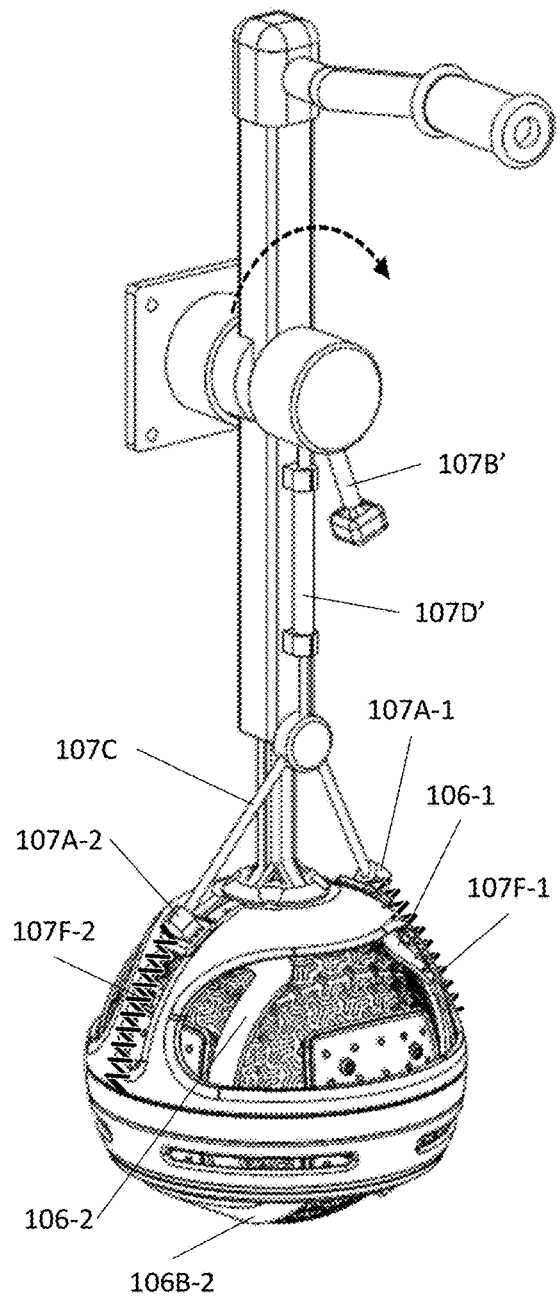
FIG. 3I is a first perspective side view of the trailer jack and transport system of a modified embodiment of the present invention shown in FIG. 2B, wherein a d center-pull type of transport ball braking system is provided with a mechanically-operated safety-lever shown arranged in its non-locking or non-braking mode of operation, wherein the dual-side braking shoes are spring-biased in their locking configuration by a pair of brake tension springs, and retracted in an upward manner by a pair of cables that are pulled against the brake tension springs, on the sides of the jacking post member assembly, and taken-up on a cable take-up mechanism mounted along the outer jacking post member, while mechanically-operated by a safety lever.

Specification of the Trailer Jack and Transport System of the Present Invention, Wherein the Dual-Sided Center-Pull Type of Transport Ball Braking System is Provided with a Mechanically-Operated Safety-Lever for Locking and Non-Braking Modes of Operation FIG. 3I shows the trailer jack and transport system of a modified embodiment of the present invention shown in FIG. 2B, wherein the dual-sided ball braking system is provided with a mechanically-operated center-pull cabling system 107D' with safety-lever 107B' shown arranged in its non-locking or non-braking mode of operation. As shown, the braking shoes 106B-1 and 106B-2 are spring-biased in their locking configuration by a pair of brake tension springs 107F-1 and 107F-2, and retracted in an upward manner by a pair of cables 107C-1' and 107C-2' that are pulled against the brake tension springs 107F-1 and 107F-2, on the sides of the jacking post member assembly 12, and taken-up on a cable take-up mechanism 107G' mounted along the outer jacking post member 122, while mechanically-operated by a safety lever 107B' _.

Figure 3J:
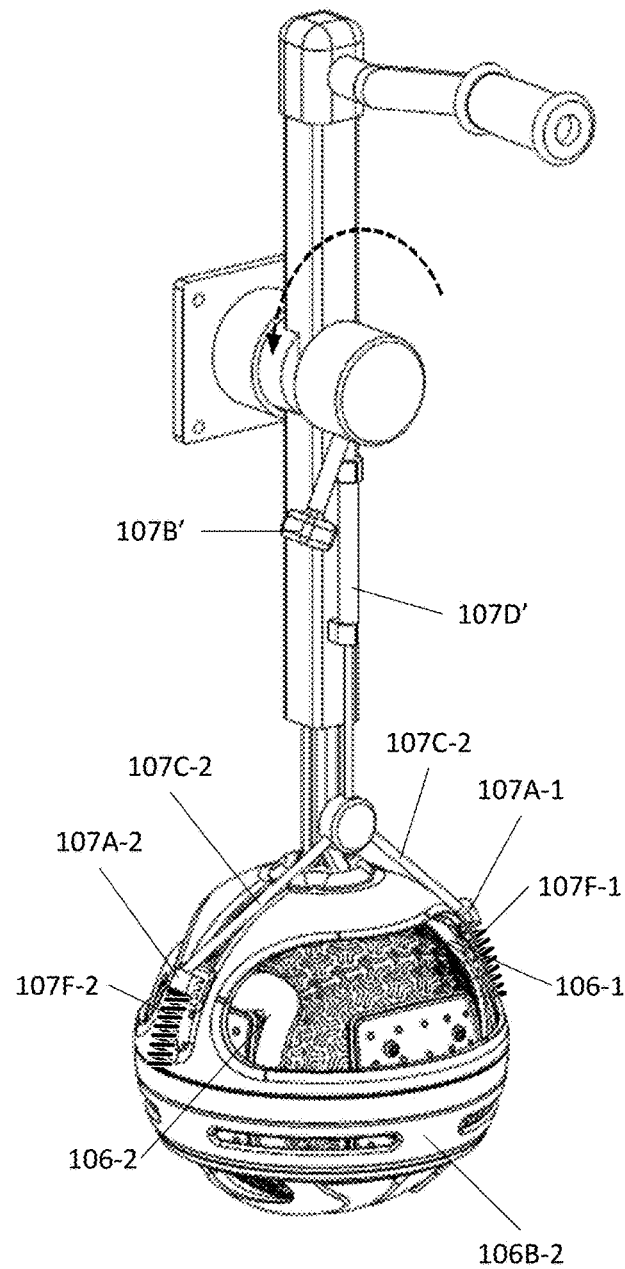
FIG. 3J is a second perspective view of the trailer jack and transport system of the first illustrative embodiment shown in FIG. 3I, wherein the center-pull type of transport ball braking system is provided with a mechanically-operated safety-lever shown arranged in its locking or braking mode of operation, wherein the dual-sided braking shoes are spring-biased in their locking configuration by a pair of brake tension springs, and protracted in an down manner while the pair of cables are not pulled against the brake tension springs and are released from a cable take-up mechanism mounted along the outer jacking post member, while mechanically-operated by the safety lever.
Figure 4A:
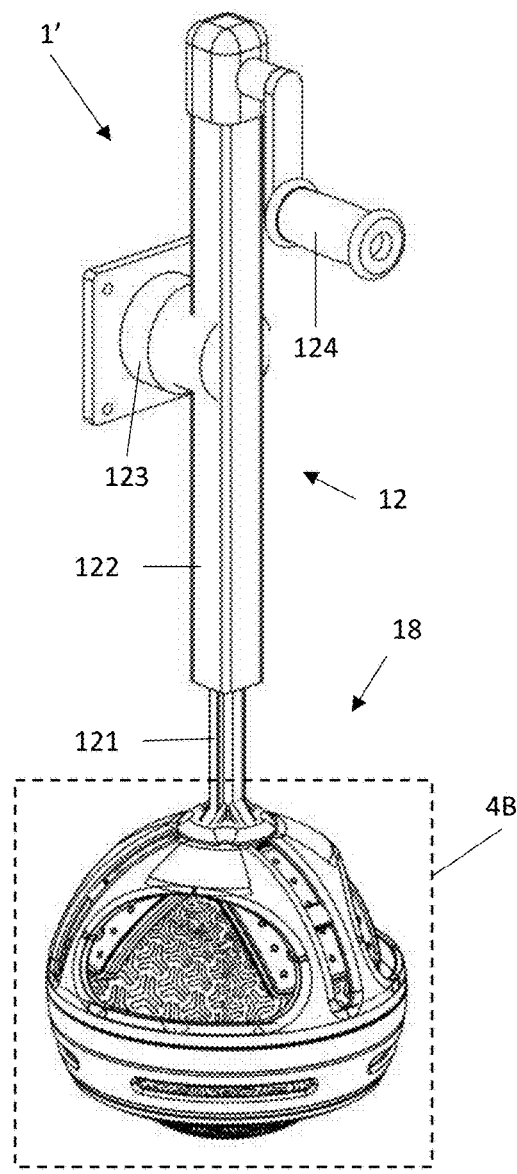
FIG. 4A is a perspective view of the trailer jack and transport subsystem of a modified embodiment of the present invention shown removed from its trailer and arranged in its transport configuration mode, in which the load-bearing transport ball is supported by three symmetrically spaced apart bearing pads as illustrated in FIGS. 4G through 4K, to more evenly distribute trailer loads across these three (or more) load bearing pads in an advantageous manner.
Figure 4B:
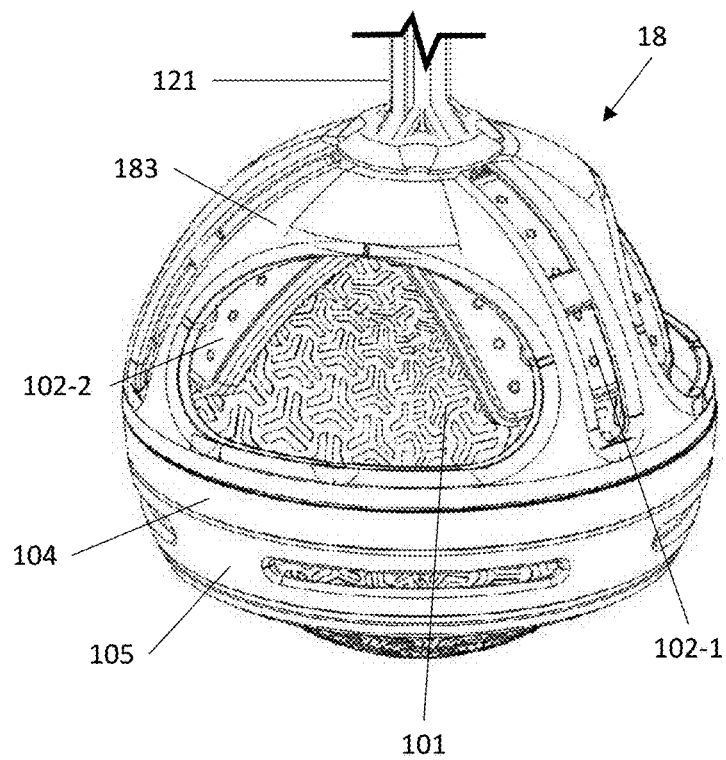
FIG. 4B is a partially fragmented view of the trailer jack and transport subsystem shown in FIG. 4A, representing a modified spherical wheel assembly of the present invention.
Figure 4C:
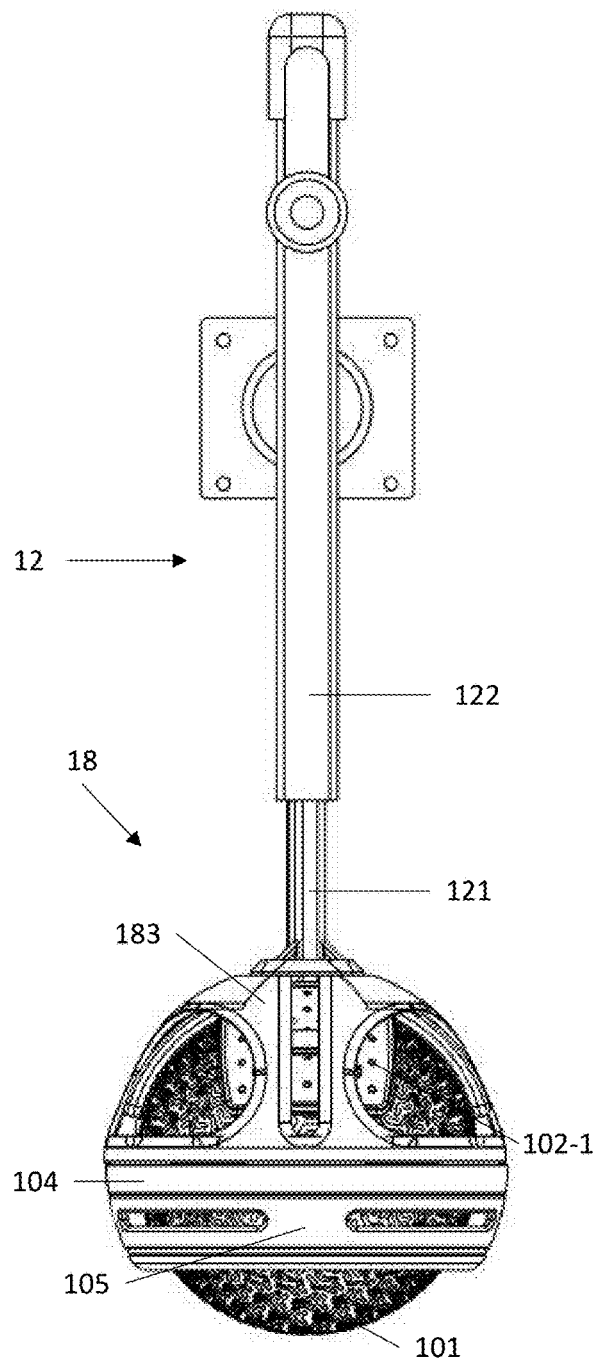
FIG. 4C is a first elevated side view of the trailer jack and transport system of FIG. 4A, wherein the load-bearing transport ball is shown in greater detail supported by a set of three bearing pads mounted along and within the upper interior space of the semispherical framework.
Figure 4D:
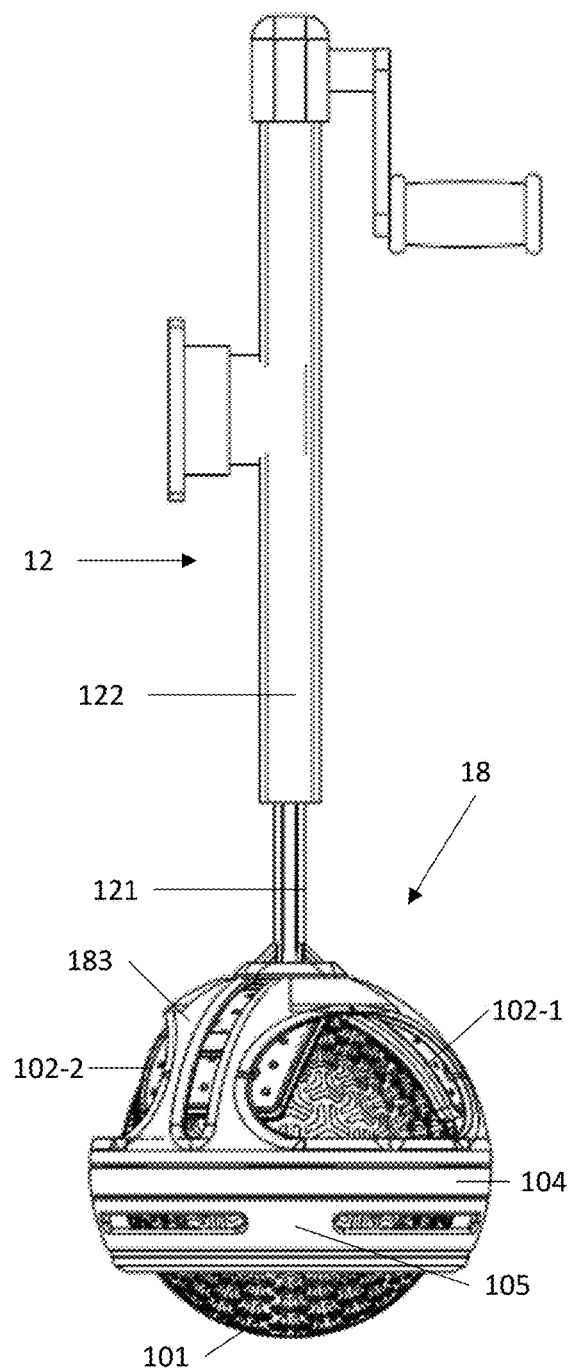
FIG. 4D is a second elevated side view of the trailer jack and transport system of FIG. 4A, wherein the load-bearing transport ball is shown in greater detail supported by a set of three bearing pads mounted along the upper space of the semispherical framework.
Figure 4E:
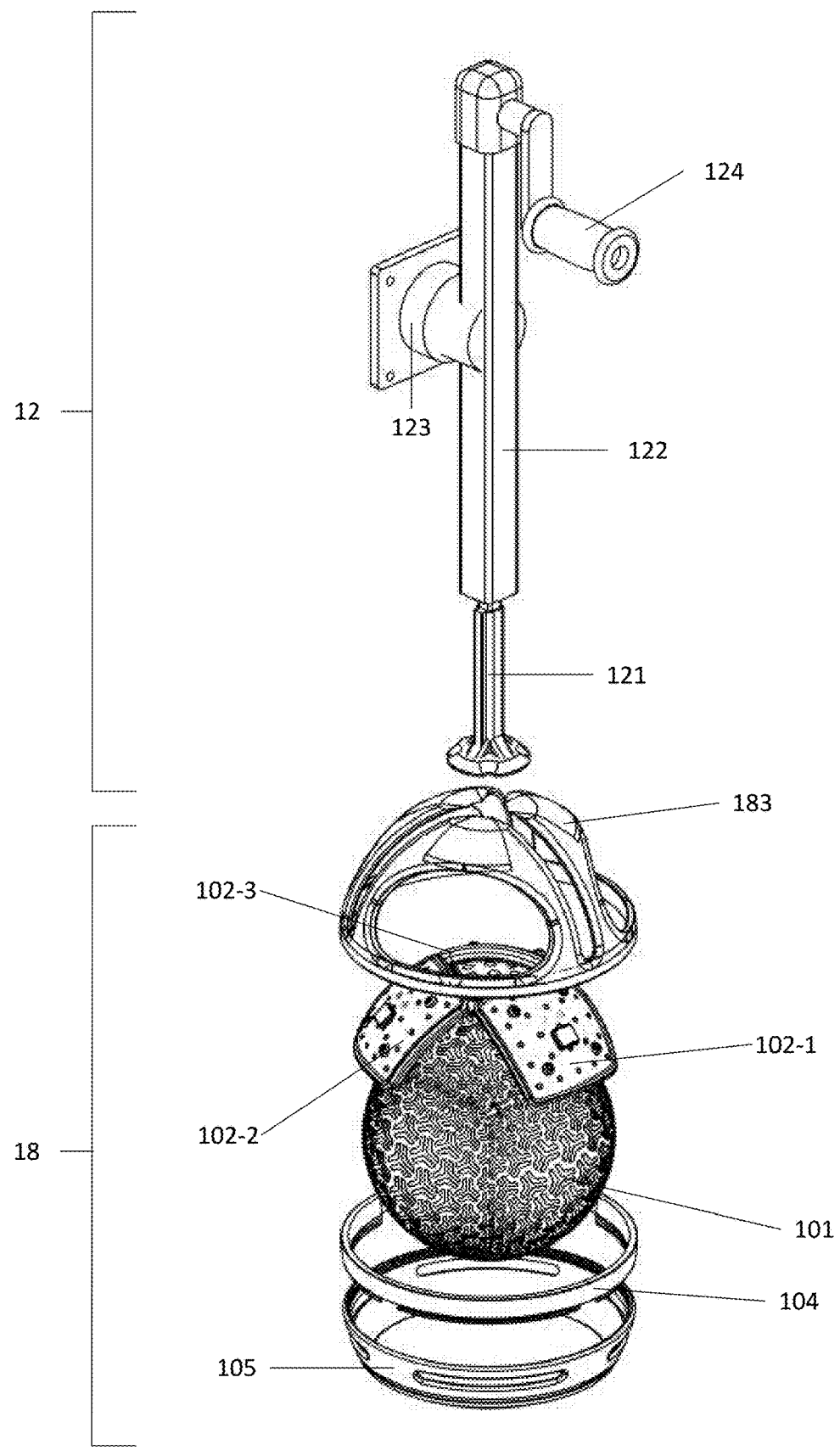
FIG. 4E is a perspective exploded view of the trailer jack and transport system shown in FIG. 4A, wherein the load-bearing transport ball is shown supported by three symmetrically-spaced apart bearing pads mounted between the interior surfaces of the semispherical framework and the outer surface of the transport ball.
Figure 4F:
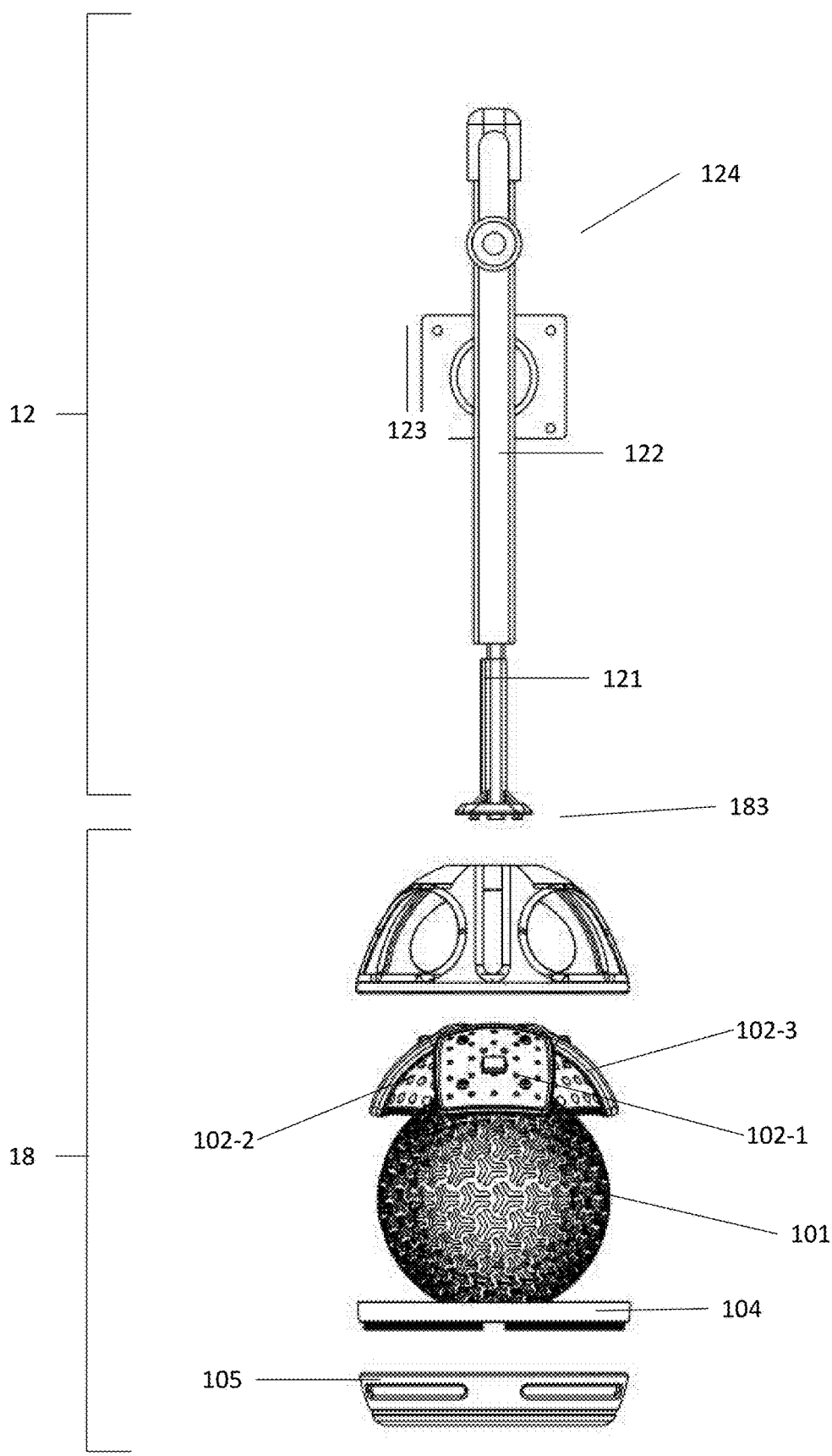
FIG. 4F is an elevated side exploded view of the trailer jack and transport system shown in FIG. 4A, wherein the load-bearing transport ball is shown supported by three symmetrically-spaced apart bearing pads mounted between the interior surfaces of the semispherical framework and the outer surface of the transport ball, retained by the ball retainer ring structure.
Figure 4G:
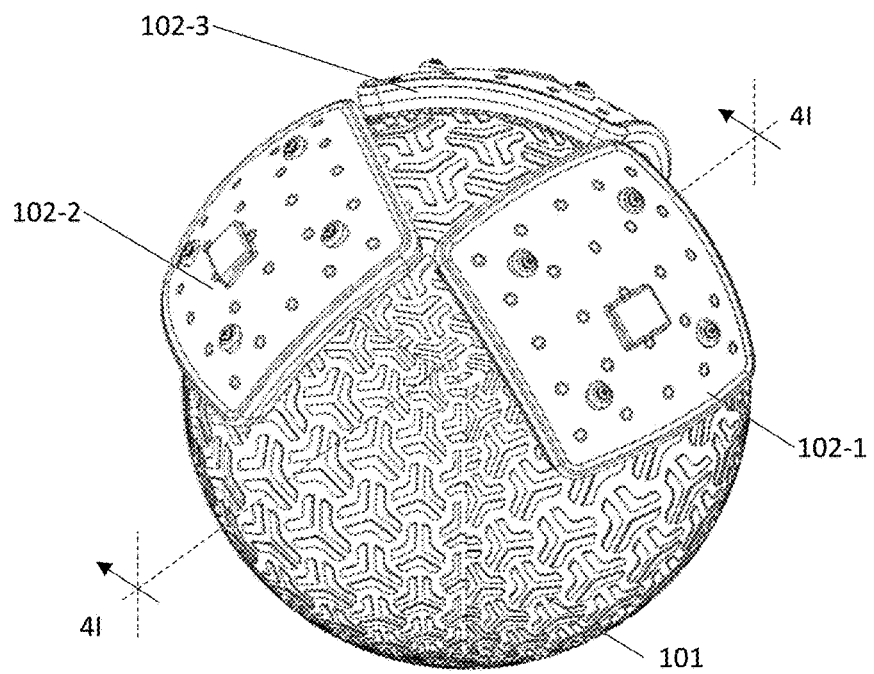
FIG. 4G is a perspective view of the three symmetrically-spaced apart bearing pads mounted about the outer surface of the load-bearing transport ball, removed from the semispherical framework structure for purposes of illustration.
Figures 4H, 4I:
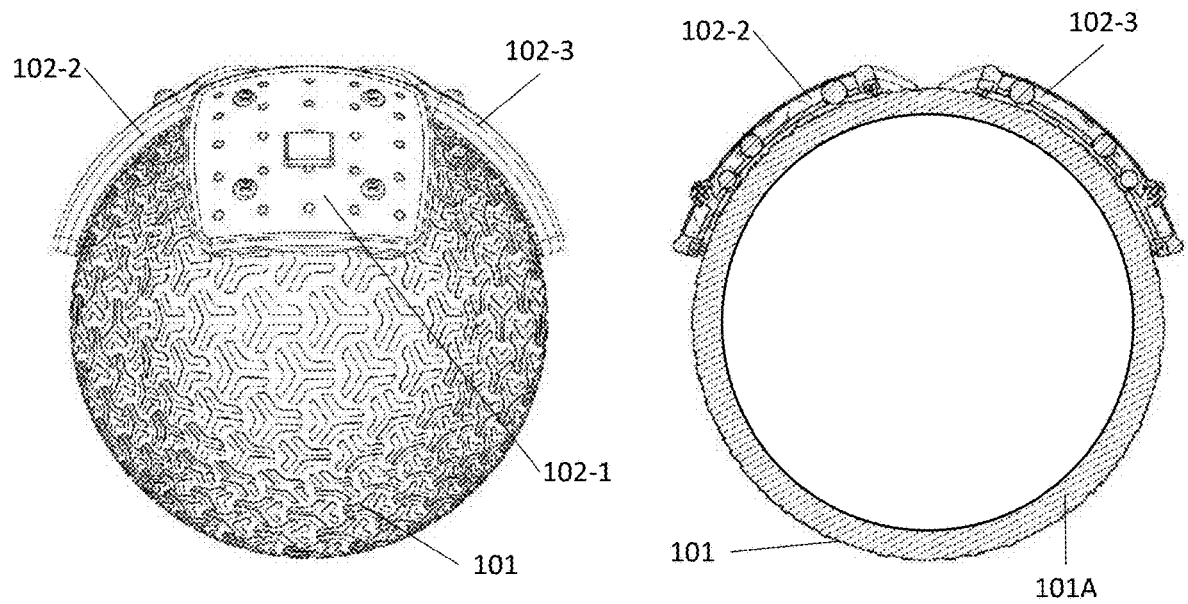
FIG. 4H is an elevated side view of the three symmetrically-spaced apart bearing pads mounted about the outer surface of the load-bearing transport ball shown in FIG. 4G, removed from the semispherical framework structure for purposes of illustration.
FIG. 4I is a cross-sectional side view of the three symmetrically-spaced apart bearing pads mounted about the outer surface of the load-bearing transport ball, taken along the viewing line 4I-4I shown in FIG. 4G.
Figure 4J:
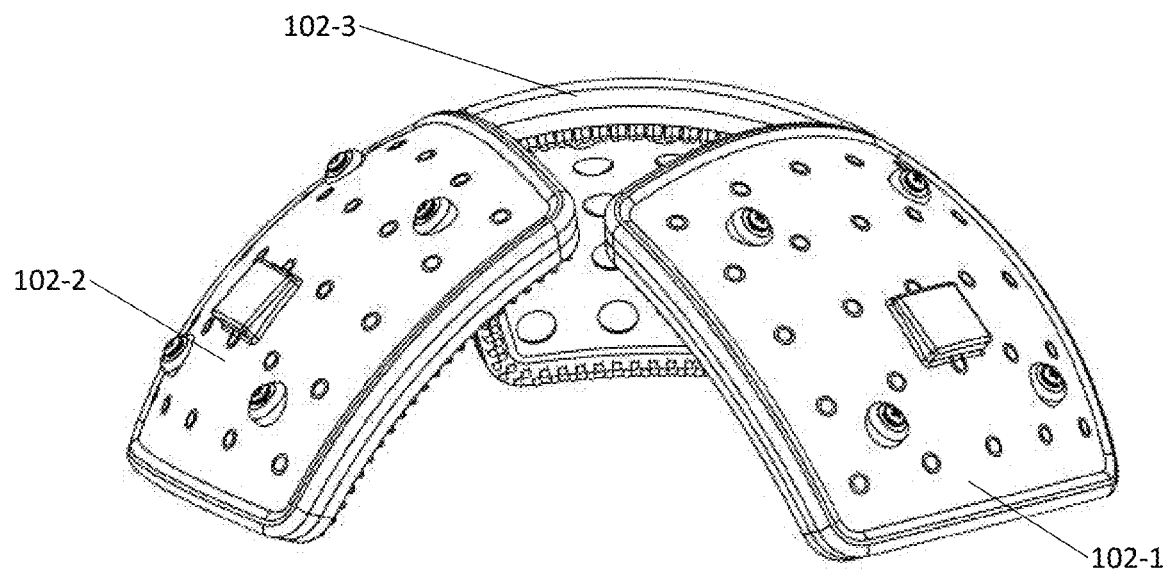
FIG. 4J a first perspective view of the spatial arrangement of bearing surfaces (e.g., ball bearing pads) shown employed in FIGS. 4A and 4G, with the load-bearing transport ball and spherical framework both removed for purposes of exposition and illustration purposes.
Figure 4K:
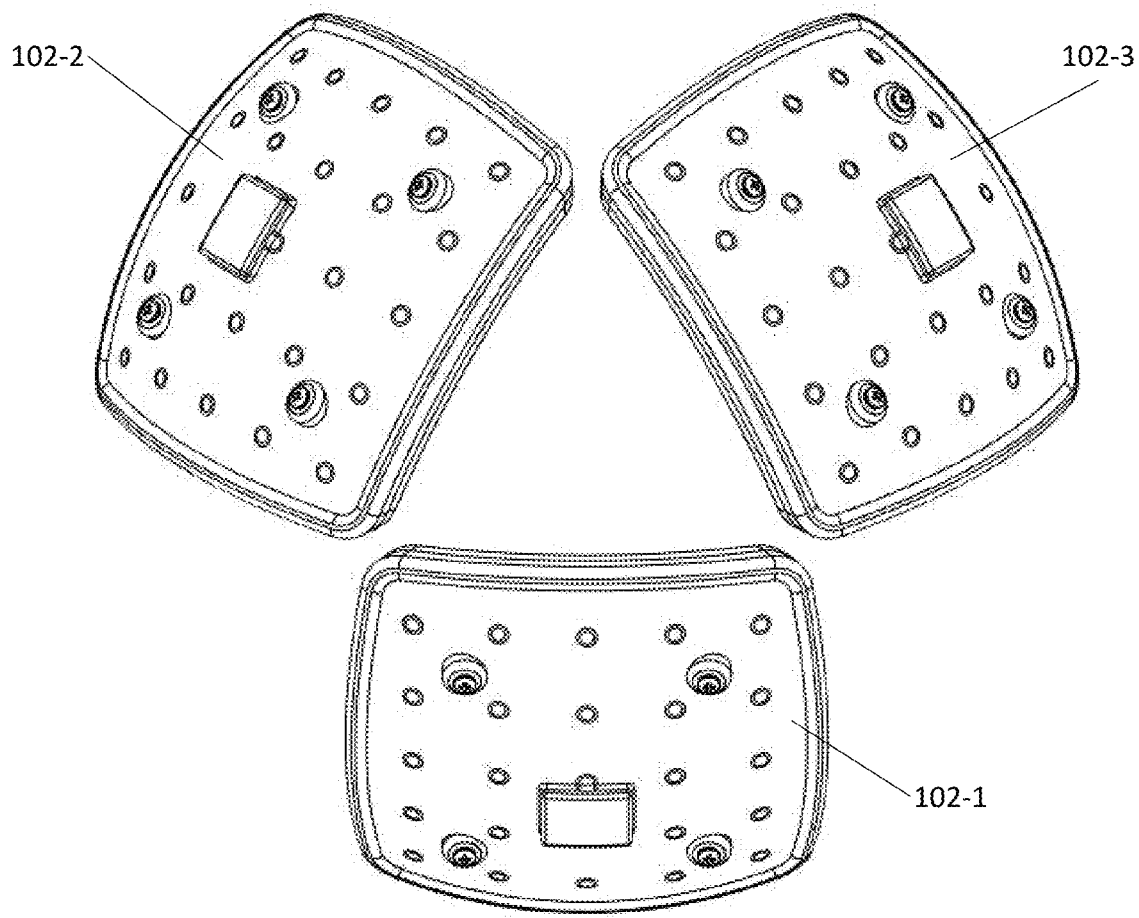
FIG. 4K is a second perspective view of the three symmetrically-spaced apart bearing pads shown mounted in FIG. 4G, with the load-bearing transport ball and spherical framework both removed for purposes of exposition and illustration purposes

FIG. 3J shows the trailer jack and transport system of a modified embodiment of the present invention shown in FIG. 2B, wherein the dual-sided ball braking system is provided with a mechanically-operated center-pull cabling system with safety-lever 107B' shown arranged in its locking or braking mode of operation. As shown, the braking shoes 106B-1 and 106B-2 are spring-biased in their locking configuration by a pair of brake tension springs 107F-1 and 107F-2, and are retracted in a downward manner by the tension springs 107F-1 and 107F-2 when the safety lever 107B' is turned to allow the cable to be released by the cable take-up mechanism 107G' mounted along the outer jacking post member 122.

Figure 5A:
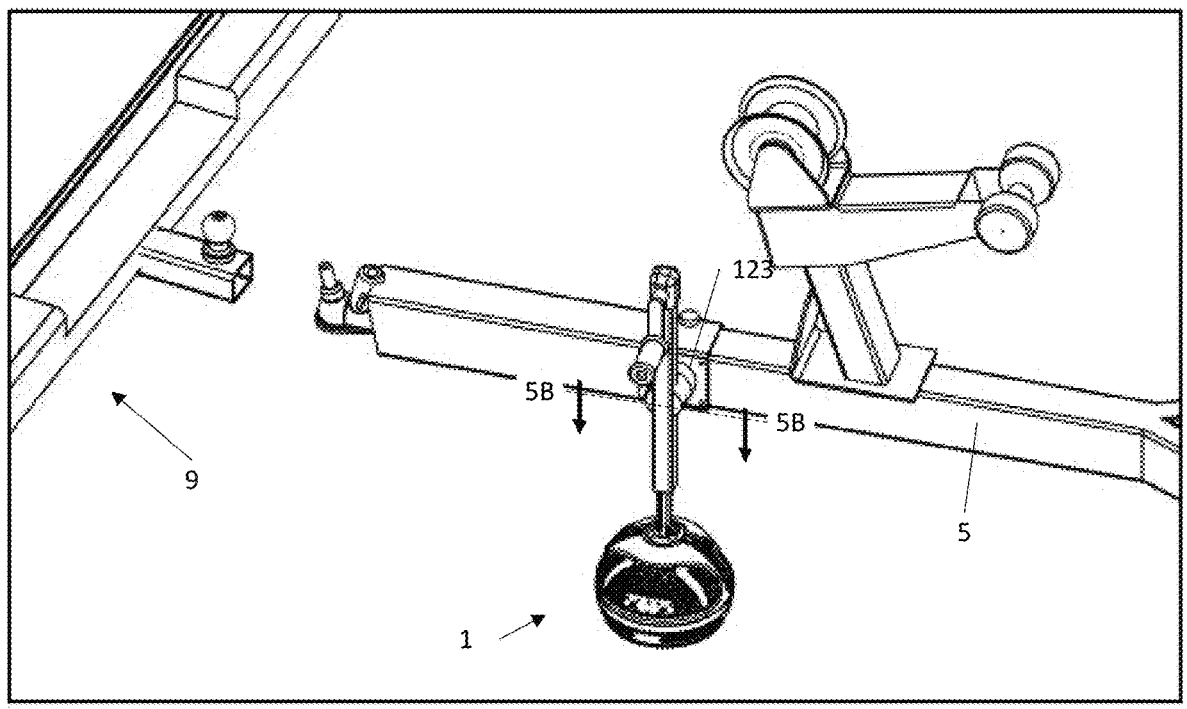
FIG. 5A is a perspective view of a trailer equipped with the trailer jack and transport system of the first illustrative embodiment of the present invention, shown being hitched to a mobile vehicle having a trailer hitch and ball for connection with the end of the trailer, and the trailer jack and transport system mounted to the trailer frame and having an auto-tilting rotational mounting mechanism according to the present invention.

Specification of Alternative Trailer Jack and Transport System of the Present Invention Having a Tripodal Bearing Surface System Installed about the Load-Bearing Transport Ball FIGS. 4A through 4F show the trailer jack and transport system of a modified embodiment of the present invention 1' shown removed from its trailer and arranged in its transport configuration mode. As shown, the load-bearing transport ball 101 is supported by three symmetrically spaced apart bearing pads. 102-1, 102-2, and 102-3 as illustrated in FIGS. 4G through 4K, to evenly distribute trailer tongue weight loads across these three bearing pads 102-1, 102-2, and 102-3 in an advantageous manner. As shown, the load-bearing transport ball 101 is supported by a set of three bearing pads 102-1, 102-2, and 102-3 mounted along the upper space of the semispherical framework. FIGS. 4G through 4K illustrate how the symmetrically-spaced apart bearing pads, mounted about the outer surface of the load-bearing transport ball 101, allows for even distribution of loads imposed on the transport ball Specification of an Angled Rotatable Mounting Mechanism for the Trailer Jack and Transport System of the First Illustrative Embodiment of the Present Invention FIG. 5A shows a trailer equipped with the trailer jack and transport system of the first illustrative embodiment 1, shown decoupled from a mobile vehicle 9 having a trailer hitch adapted for connection with the end of the trailer. As shown, the trailer jack and transport system 1 mounted to the trailer frame and having an auto-tilting rotational mounting mechanism 123, and being arranged in its transport configuration, with its jacking post 122 disposed away from the frame of the trailer 5.

Figure 5B:
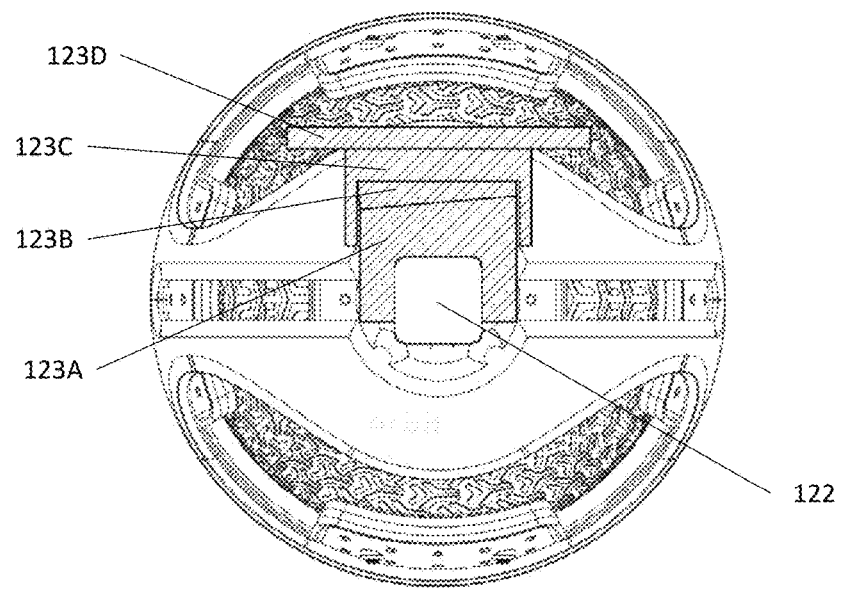
FIG. 5B is a plan view of the trailer jack and transport system of the first illustrative embodiment of the present invention shown in FIG. 5A, taken along line 5B-5B in FIG. 5A, showing the set of rotational blocks comprising rotational mechanism being disposed at an angle of tilt of about 5 degrees to accommodate the semispherical framework of the system when rotated into its storage/transport configuration.

FIG. 5B shows how the post rotational mounting mechanism 123 has angled plate components 123A and 123B stacked and rotatably mounted to bracket 123C by way of a mounting post. As shown, the angled rotational mechanism comprises: a set of rotational blocks 123A and 123B mounted along a common axis and disposed at an angle of tilt of about 5 degrees to accommodate the semispherical framework of the system. The mounting bracket 123C is welded to mounting plate 123D that is fixed to the trailer frame 5 using bolts, welding and/or other fastening methods well known in the art.

Figure 5C:
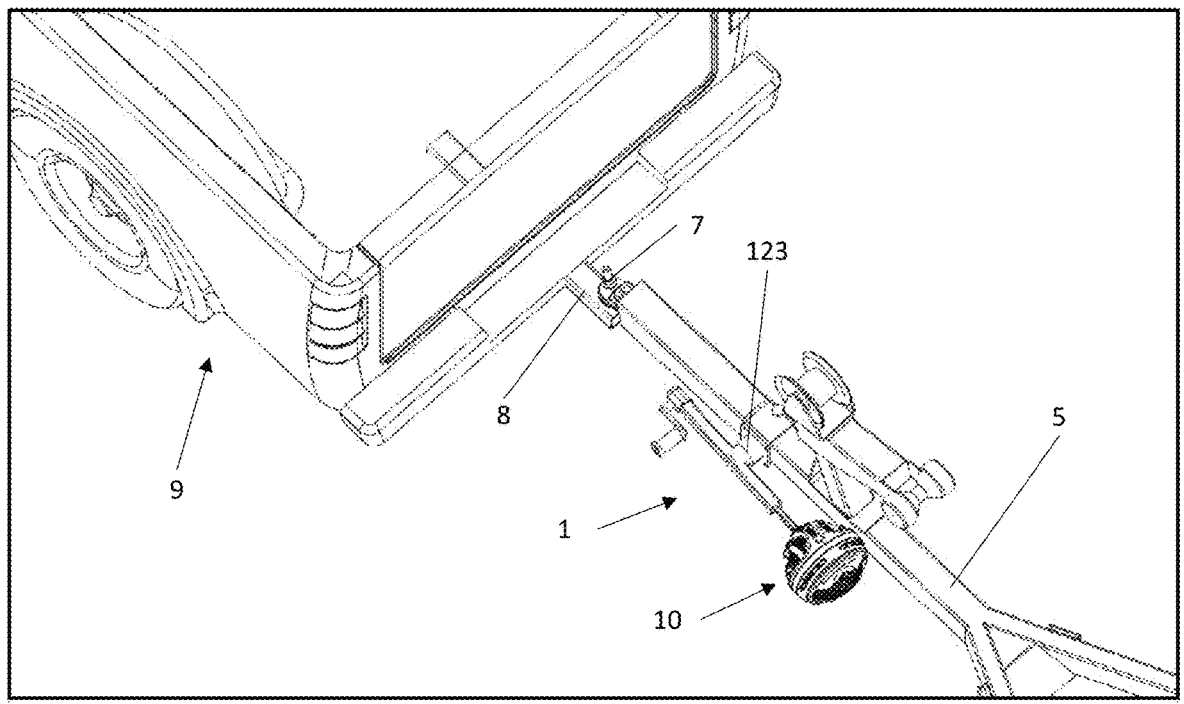
FIG. 5C is a perspective view of the trailer shown in FIG. 5A, equipped with the trailer jack and transport system arranged in its storage configuration and hitched to a motor vehicle demonstrating the clearance created for the semispherical framework of the system by the angled rotational mechanism, creating an acute angle between the plane of the trailer and the plane of the jacking plane.

FIG. 5C shows a trailer equipped with the trailer jack and transport system of the first illustrative embodiment 1, shown hitched to a mobile vehicle 9 equipped with a trailer hitch. As shown, the trailer jack and transport system 1 is mounted to the frame of trailer 5 and has an auto-tilting rotational mounting mechanism 123, shown arranged in its storage configuration, with its jacking post 122 closely aligned and creating an acute angle (e.g. about 5 degrees) with the trailer frame 5 so as to offer clearance for the spherical wheel assembly 10 of the trailer jack and transport system 1.

Figure 5D:
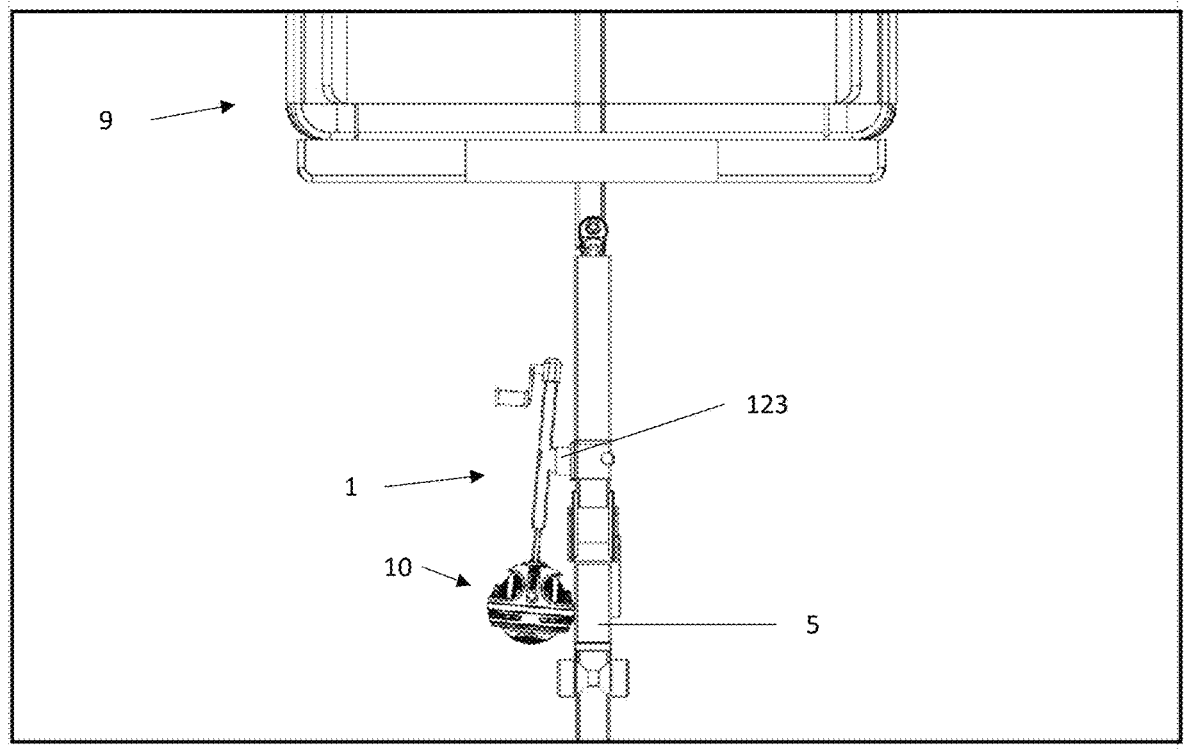
FIG. 5D is a plan view of the trailer, trailer jack and transport system and tow hitch-equipped motor vehicle shown in FIG. 5C.

FIG. 5D shows the trailer 5 shown in FIG. 5C, hitched to a motor vehicle 9 with the trailer jack and transport system 1 arranged in its storage configuration, rotated about the rotational mounting mechanism 123 so that the jacking post 122 is within the plane of the trailer frame 5 and being disposed at an angle so as to create clearance for the spherical wheel assembly 10 against the frame of trailer 5

Figure 5E:
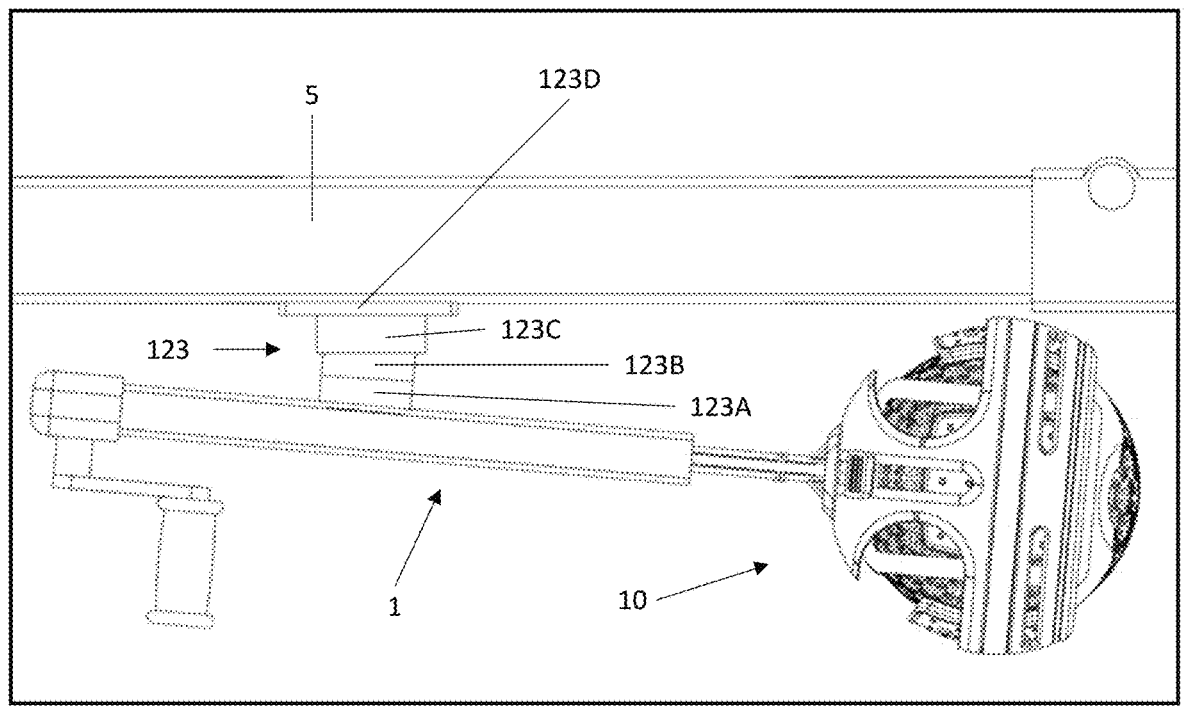
FIG. 5E is a plan view of the trailer shown in FIG. 5D, with the trailer jack and transport system arranged in its storage configuration depicting the angled orientation of the trailer jack and transport system relative to the trailer as created by the set of rotational blocks comprising the rotational mechanism being disposed at an angle of tilt.
Figure 5F:
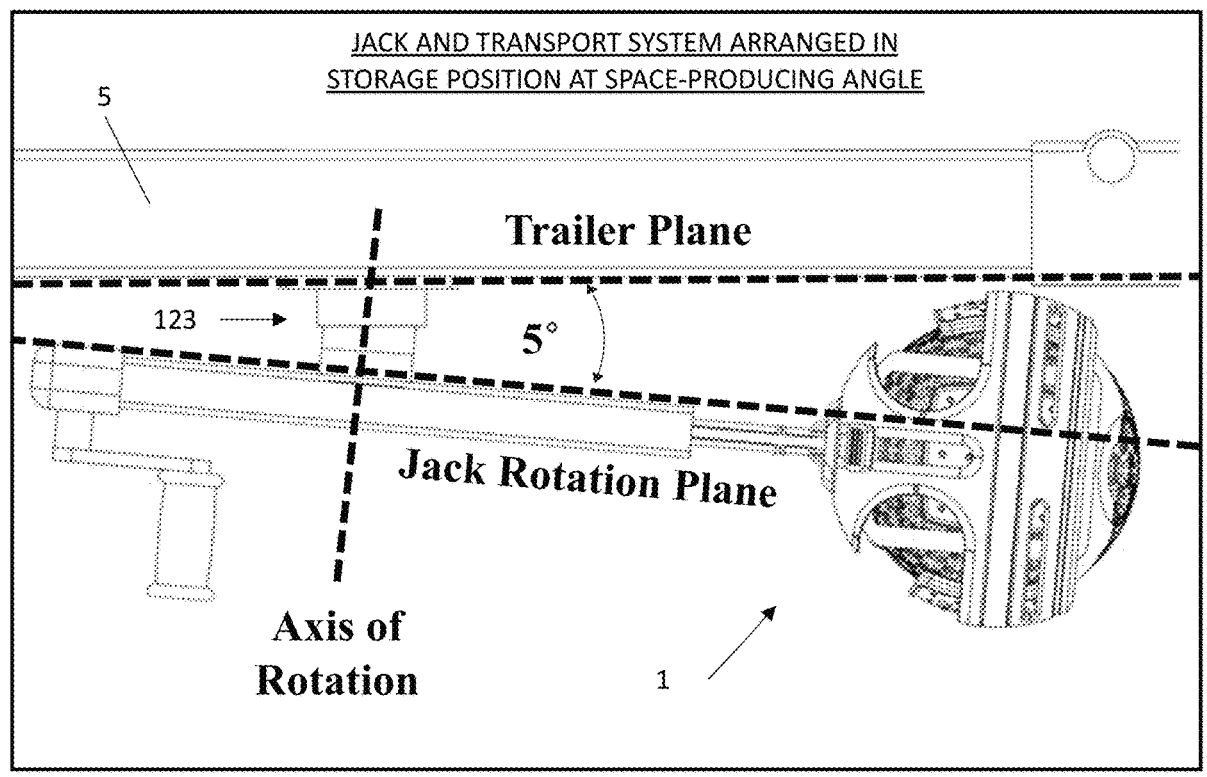
FIG. 5F is the plan view of the trailer jack and transport system shown in FIG. 5E, with the trailer jack and transport system arranged in its storage configuration highlighting the plane of the trailer and the trailer jack and transport system rotational plane, an about 5-degree acute angle between the jack rotation plane and the trailer plane, as shown.

FIG. 5E shows the trailer 5 in FIG. 5A, with the trailer jack and transport system 1 arranged in its storage configuration whereby the rotational mounting mechanism 123 and its angled plate components 123A and 123B work in concert to create clearance for the spherical wheel assembly 10 of the trailer jack and transport system 1 when rotated 90 degrees from its transport orientation. FIG. 5F shows the trailer 5 in FIG. 5D, with the trailer jack and transport system 1 arranged in its storage configuration, rotated 90 degrees from its transport orientation as shown in FIG. 5A about the rotational mounting mechanism 123 with a jack rotation plane approximately 5 degrees as measured to the plane of the trailer frame 5. The 5 degrees of tilting enabled by the rotational mounting mechanism 123 allows the semi-spherical framework portion 103 of the system 1 be accommodated during its storage mode.

Figure 6A:
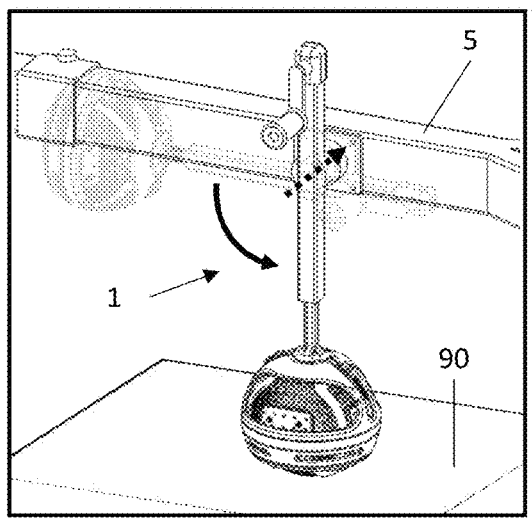
FIG. 6A is a perspective view of a portion of a trailer equipped with the trailer jack and transport system of the present invention, having a telescoping rotational mounting mechanism, and shown arranged in its transport configuration so that the jacking post is arranged perpendicular to the plane of the trailer frame.

Specification of the Trailer Jack and Transport System of the Present Invention Having a Telescoping Rotational Mounting Mechanism FIG. 6A shows a trailer 5 equipped with the trailer jack and transport system of the present invention 1, having a telescoping rotational mounting mechanism 123', and shown arranged in its transport configuration so that the jacking post 122 is arranged substantially perpendicular to the ground surface 90.

Figure 6B:
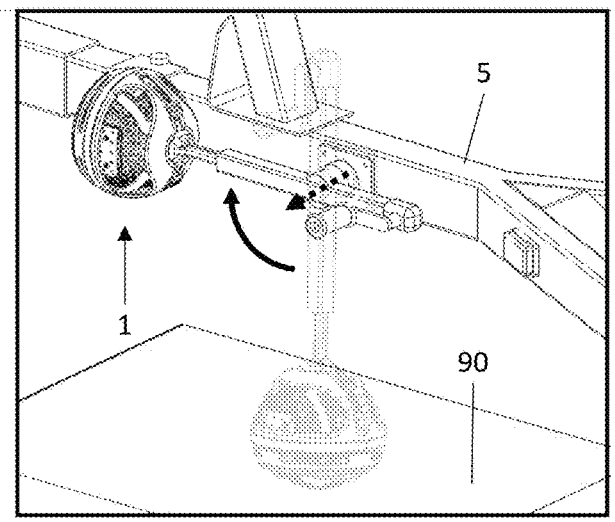
FIG. 6B is a perspective view of a portion of the trailer equipped with the trailer jack and transport system of the present invention shown in FIG. 6A, having a telescoping rotational mounting mechanism, and shown being rotatably arranged in its storage configuration so that the jacking post is arranged parallel to the plane of the trailer frame.
Figure 6C:
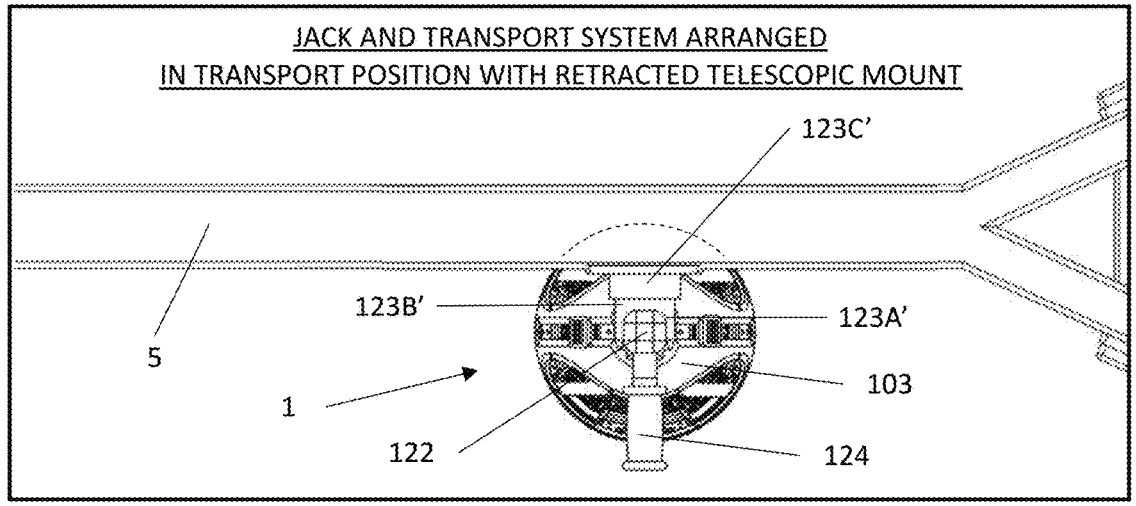
FIG. 6C is a plan view of the trailer shown in FIG. 6A, equipped with the trailer jack and transport system of the present invention, having a telescoping rotational mounting mechanism, and shown arranged in its transport configuration so that the jacking post is arranged perpendicular to the plane of the trailer frame and its telescoping rotational mounting mechanism in the retracted position.
Figure 6D:
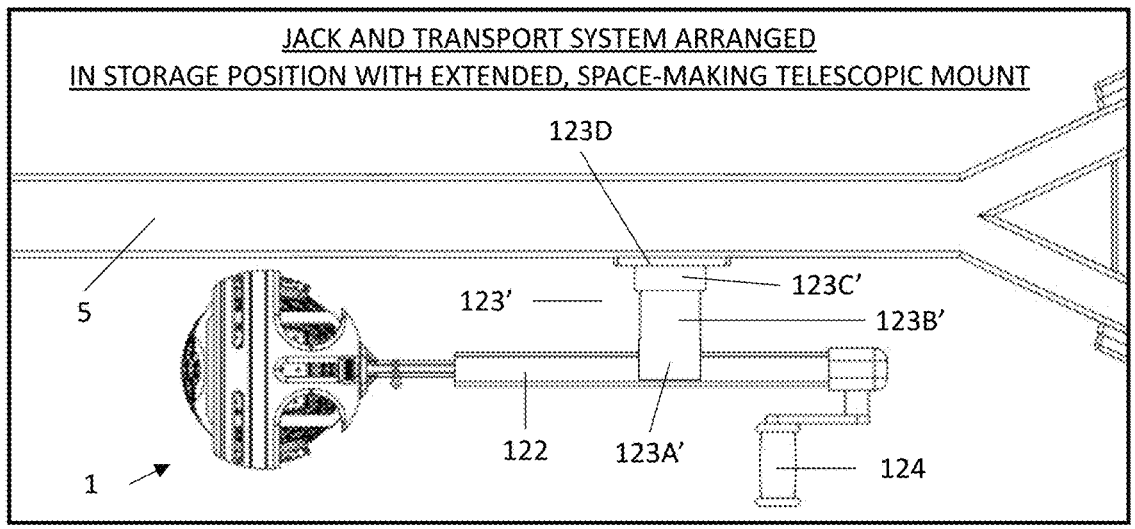
FIG. 6D a plan view of a portion of the trailer shown in FIG. 6B, equipped with the trailer jack and transport system of the present invention, having a telescoping rotational mounting mechanism, and shown being rotatably arranged in its storage configuration so that the jacking post is arranged parallel to the plane of the trailer frame and its telescoping rotational mounting mechanism in the extended position, creating clearance for the semispherical structure of the trailer jack and transport system.

FIGS. 6B, and 6D show the trailer equipped with the trailer jack and transport system 1 shown in FIG. 6A, having a telescoping rotational mounting mechanism 123', and shown being rotatably arranged in its storage configuration so that the jacking post 122 is arranged parallel to the plane of the trailer frame 5. By virtue of the telescopic rotational mounting mechanism 123', the extended mechanism 123' allows the larger semispherical framework portion 103 to be accommodated when arranged in its storage mode or configuration, as so clearly shown and illustrated in FIGS. 6B, and 6D

FIG. 6C show the trailer equipped with the trailer jack and transport system 1 shown in FIG. 6A in its transport mode with the telescoping rotational mounting mechanism 123' in its retracted position with the load-bearing spherical wheel 101 and semispherical framework portion 103 partially beneath the trailer frame 5 for minimized cantilever torque on the rotational mechanism mount 123C'

Figure 6E:
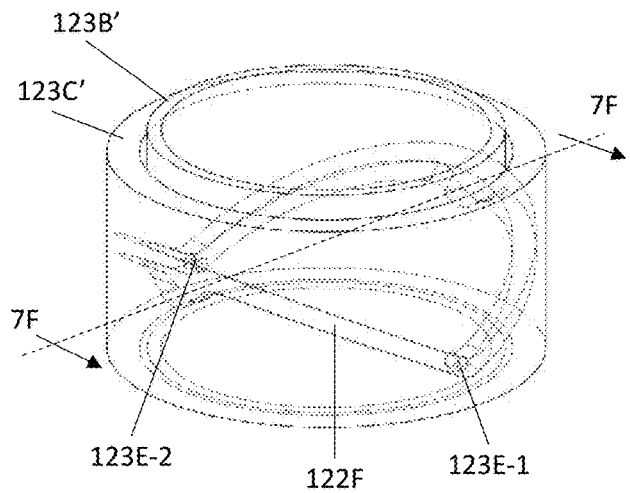
FIG. 6E is a perspective view of the telescoping rotational mounting mechanism employed in the trailer jack and transport system of FIG. 6A, arranged in its retracted configuration.
Figure 6F:
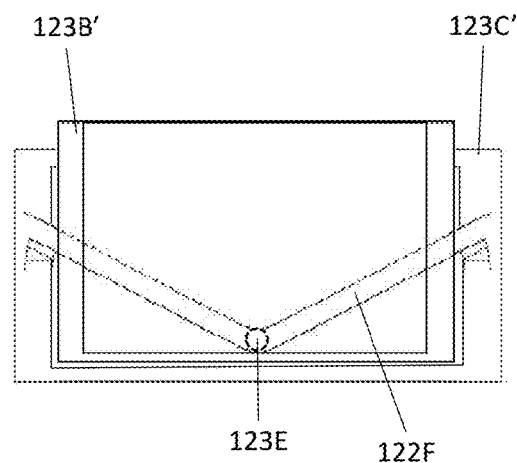
FIG. 6F is a cross-sectional view of the telescoping rotational mounting mechanism employed in the trailer jack and transport system of FIG. 6A, taken along line 6F-6F in FIG. 6E.
Figure 7A:
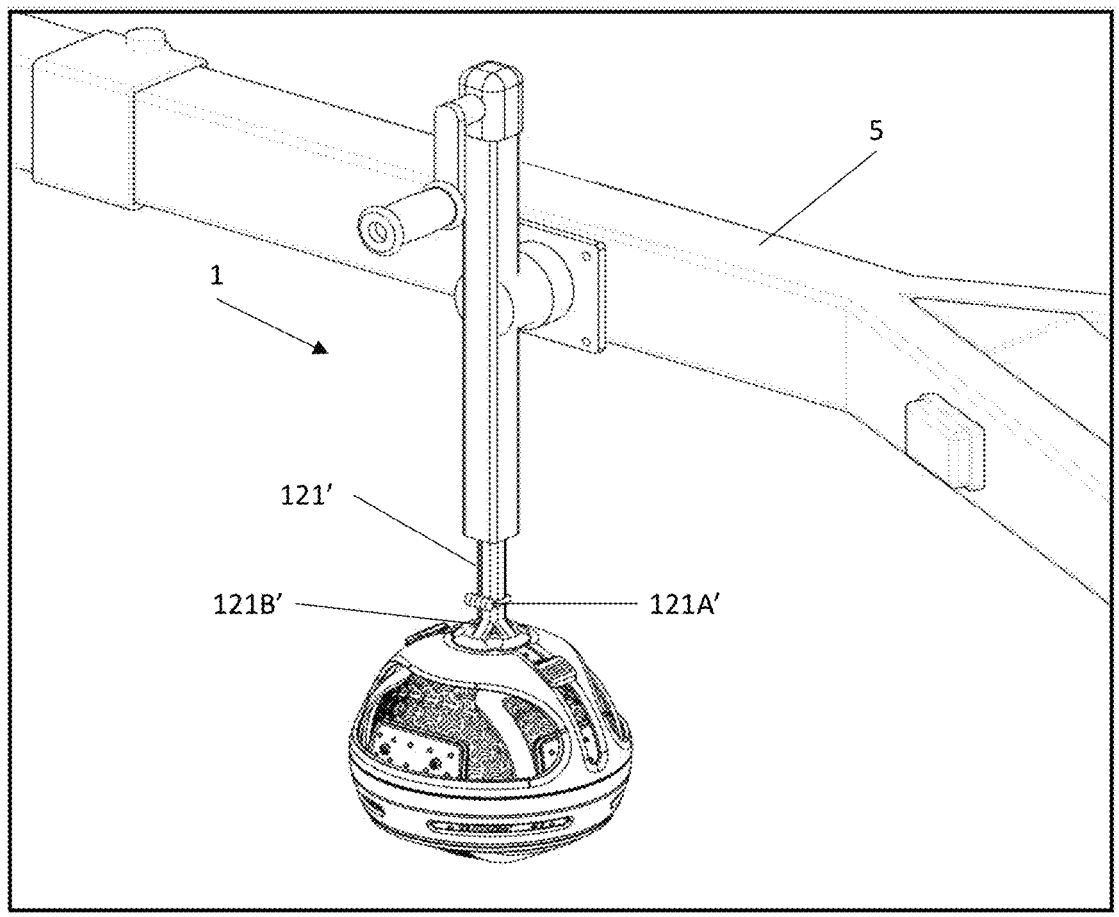
FIG. 7A a perspective view of a portion of the trailer equipped with the trailer jack and transport system of the present invention as shown in FIG. 2B, having a rotational mounting mechanism and modified with a hinged jacking post member, being shown rotatably arranged in its transport configuration so that the jacking post is arranged perpendicular to the plane of the trailer frame.

FIGS. 6E and 6F show the telescoping rotational mounting mechanism 123' employed in the trailer jack and transport system 1 of FIG. 7A, shown without select additional parts for illustrative purposes, arranged in its retracted configuration. In the transport mode, the shortened length of the mounting mechanism 123' brings the semispherical framework portion 103 and transport ball 101 of the system closer to the trailer's principal plane to provide improved balance and load balancing.

Figure 6G:
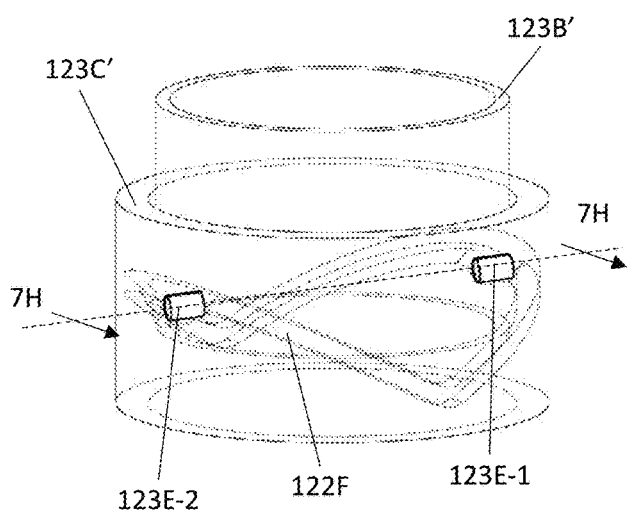
FIG. 6G is a perspective view of the telescoping rotational mounting mechanism employed in the trailer jack and transport system of FIG. 6A, arranged in its protracted or extended configuration.
Figure 6H:
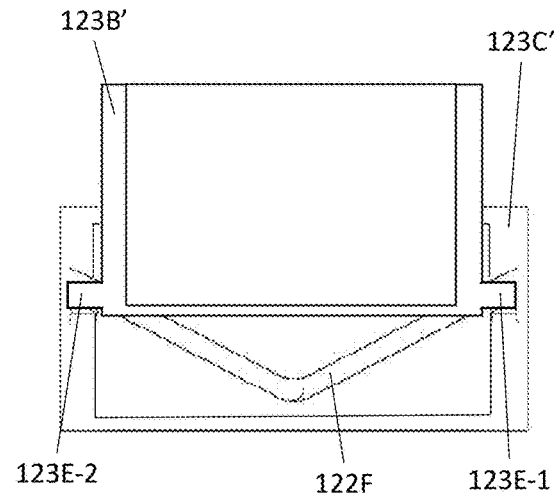
FIG. 6H is a cross-sectional view of the telescoping rotational mounting mechanism employed in the trailer jack and transport system of FIG. 6A, taken along line 6H-6H in FIG. 6G.

FIGS. 6G and 6H shows the telescoping rotational mounting mechanism 123' employed in the trailer jack and transport system of FIG. 7A, shown without select additional parts for illustrative purposes, arranged in its protracted or elongated configuration. In the storage mode, the elongated length of the mounting mechanism 123' maintains the semispherical framework portion 103 and transport ball 101 of the system at the correct distance from the trailer's frame 5 to enable compact and stable storage.

Specification of a Trailer Equipped with the Trailer Jack and Transport System of the Present Invention Having a Rotational Mounting Mechanism Modified with a Hinged Jacking Post Member FIG. 7A shows the trailer 5 equipped with the trailer jack and transport system 1 as shown in FIG. 2B, having a rotational mounting mechanism 123 and modified with a hinged jacking post member 121', and being shown rotatably arranged in its transport configuration so that the inner and outer jacking post members 121' and 122' is arranged perpendicular to the plane of the trailer frame 5.

Figure 7B:
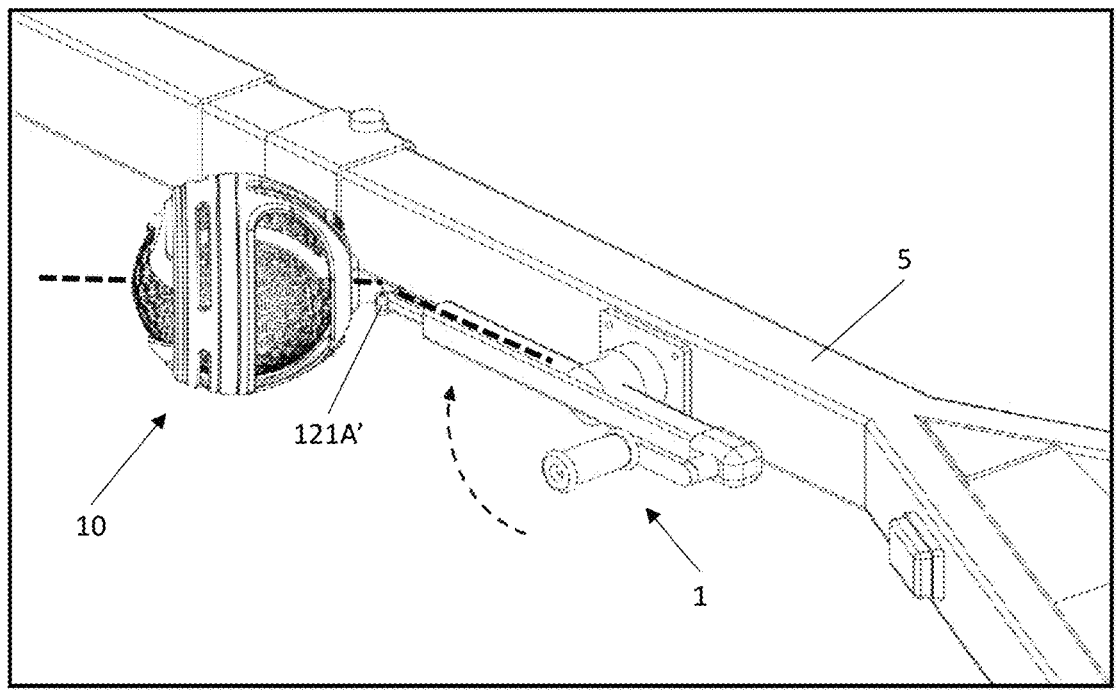
FIG. 7B is a perspective view of a portion of the trailer equipped with the trailer jack and transport system of the present invention as shown in FIG. 7A, having a rotational mounting mechanism and modified with a hinged jacking post member, and being shown rotatably arranged in its storage configuration so that the jacking post is arranged in the plane of the trailer frame and arranged so that its hinge allows the semispherical framework to adapt to the storage space provided in this configuration.

FIG. 7B shows the trailer 5 equipped with the trailer jack and transport system as shown in FIG. 7A. The trailer jack and transport system 1 has a rotational mounting mechanism 123 that is modified with a hinged inner jacking post member 121', and is shown rotatably arranged in its storage configuration, so that the inner jacking post 121' is arranged parallel to the plane of the trailer frame 5 and arranged so that its hinge members 121A' and 121B' allow the spherical wheel assembly 10 to adapt to the storage space provided in this configuration.

Figure 7C:
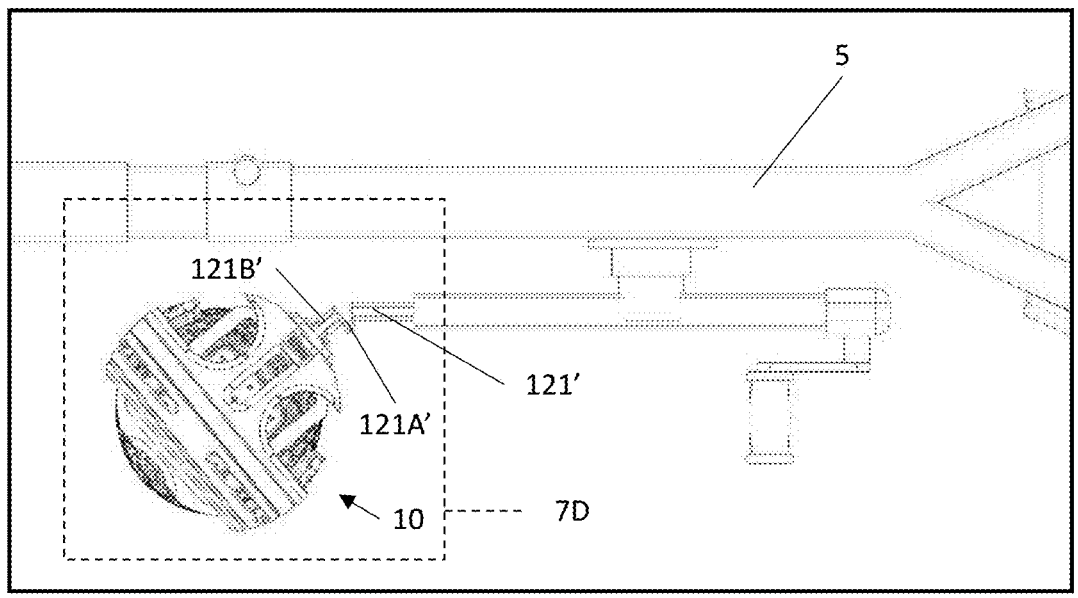
FIG. 7C is a plan view of a portion of the trailer equipped with the trailer jack and transport system of the present invention as shown in FIG. 7B, having a rotational mounting mechanism and modified with a hinged jacking post member, and being shown rotatably arranged in its storage configuration so that the jacking post is arranged parallel to the plane of the trailer frame and arranged so that its hinge allows the semispherical framework to adapt to the storage space provided in this configuration.
Figure 7D:
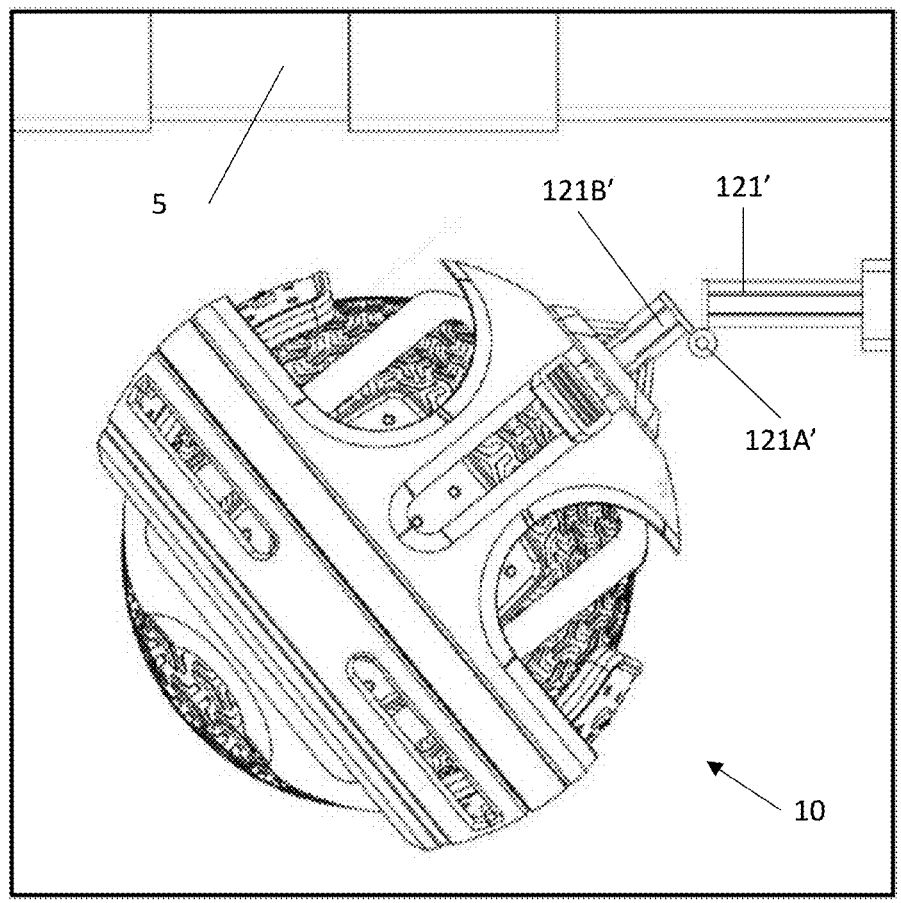
FIG. 7D is an enlarged view of the trailer jack and transport system of the present invention as shown in FIG. 7C, wherein the jacking post is arranged parallel to the plane of the trailer frame and arranged so that its hinge allows the semispherical framework to adapt to the storage space provided in this configuration.

FIGS. 7C and 7D show the trailer 5 equipped with the trailer jack and transport system 1 as shown in FIG. 7B. The trailer jack and transport system 1 has a rotational mounting mechanism 123 and modified with a hinged jacking post member 121', and is shown rotatably arranged in its storage configuration so that the jacking post 121' is arranged parallel to the plane of the trailer frame 5 and arranged so that its hinge 121A', 121B' allows the spherical wheel assembly 10 to adapt to the storage space provided in this configuration.

FIG. 7E shows the trailer jack and transport system 1 in FIG. 7A, with its hinged jacking post member 121', arranged in its transport configuration. FIG. 7F shows the trailer jack and transport system 1 of FIG. 7E, in greater detail, with its hinged inner post member 121' mounted to the top central portion of the hemispherical framework 103.

Figure 8A:
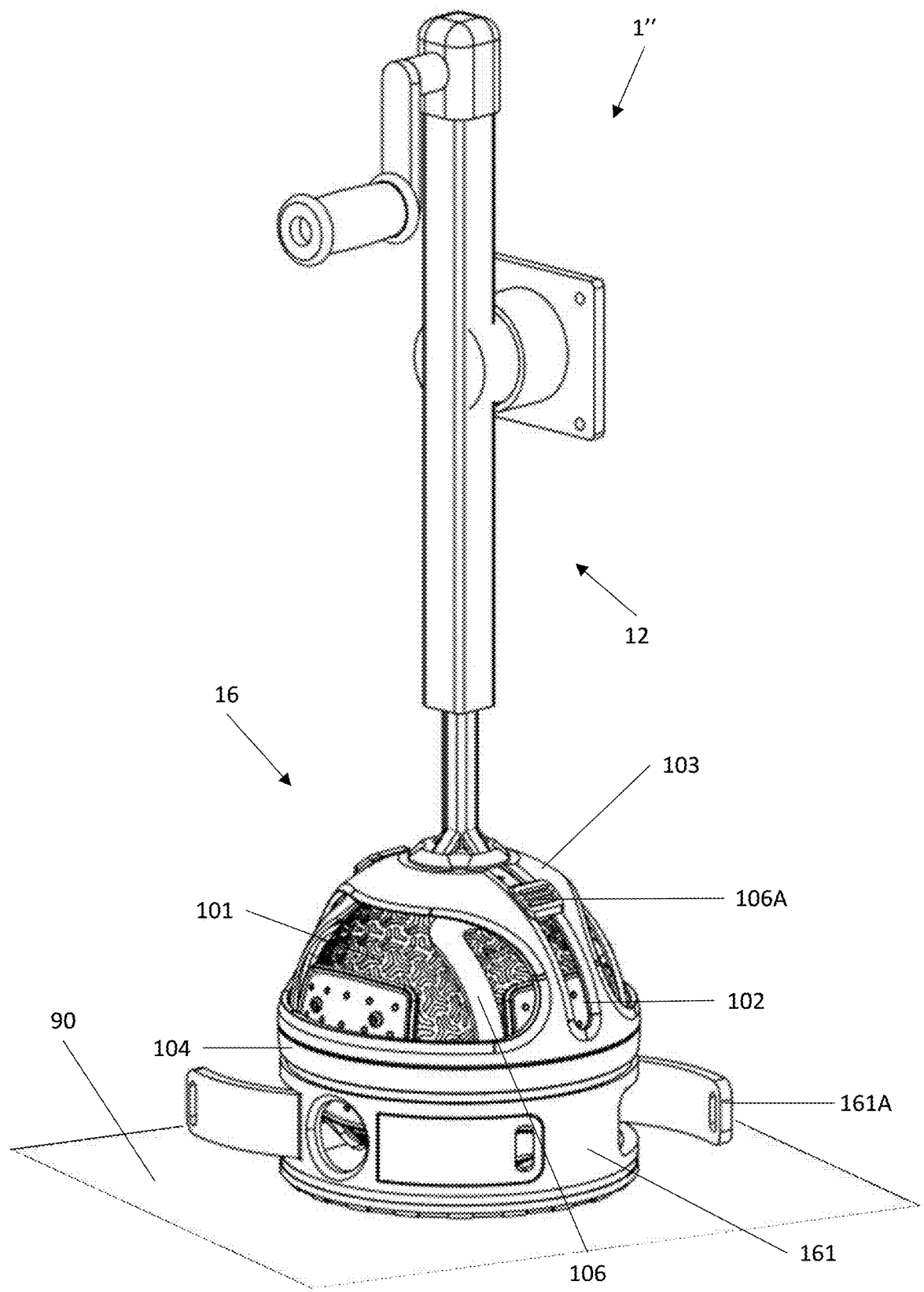
FIG. 8A is a perspective view of the trailer jack and transport subsystem of the present invention arranged shown removed from a trailer, and having a cylindrical ring structure with a torque generation system removably attached to the end portion of the semispherical framework for use in rotating the cylindrical portion and extending its position along the semi-spherical framework, so as to lift the load-bearing transport ball from the ground surface and prevent rolling and/or movement.

Specification of the Trailer Jack and Transport System of the Present Invention in which a Torque Generation System is Provided at the End Portion of the Semispherical Framework for Rotating the Cylindrical Portion, Extending its Position Along the Framework, and Lifting the Load-Bearing Transport Ball from the Ground Surface to Prevent Rolling and/or Movement FIG. 8A shows the trailer jack and transport system 1" shown removed from a trailer, and in which a torque generation system 161 is attached to the ring structure 104 for rotating a cylindrical portion and extending its position along the central axis of the spherical wheel assembly 16. By virtue of this extension operation, the load-bearing transport ball 101 is lifted off of and away from the ground surface 90 so as to prevent rolling and/or movement along the ground surface. This device effectively prevents the trailer jack and transport system from rolling without the use of blocks or chocks.

Figure 8B:
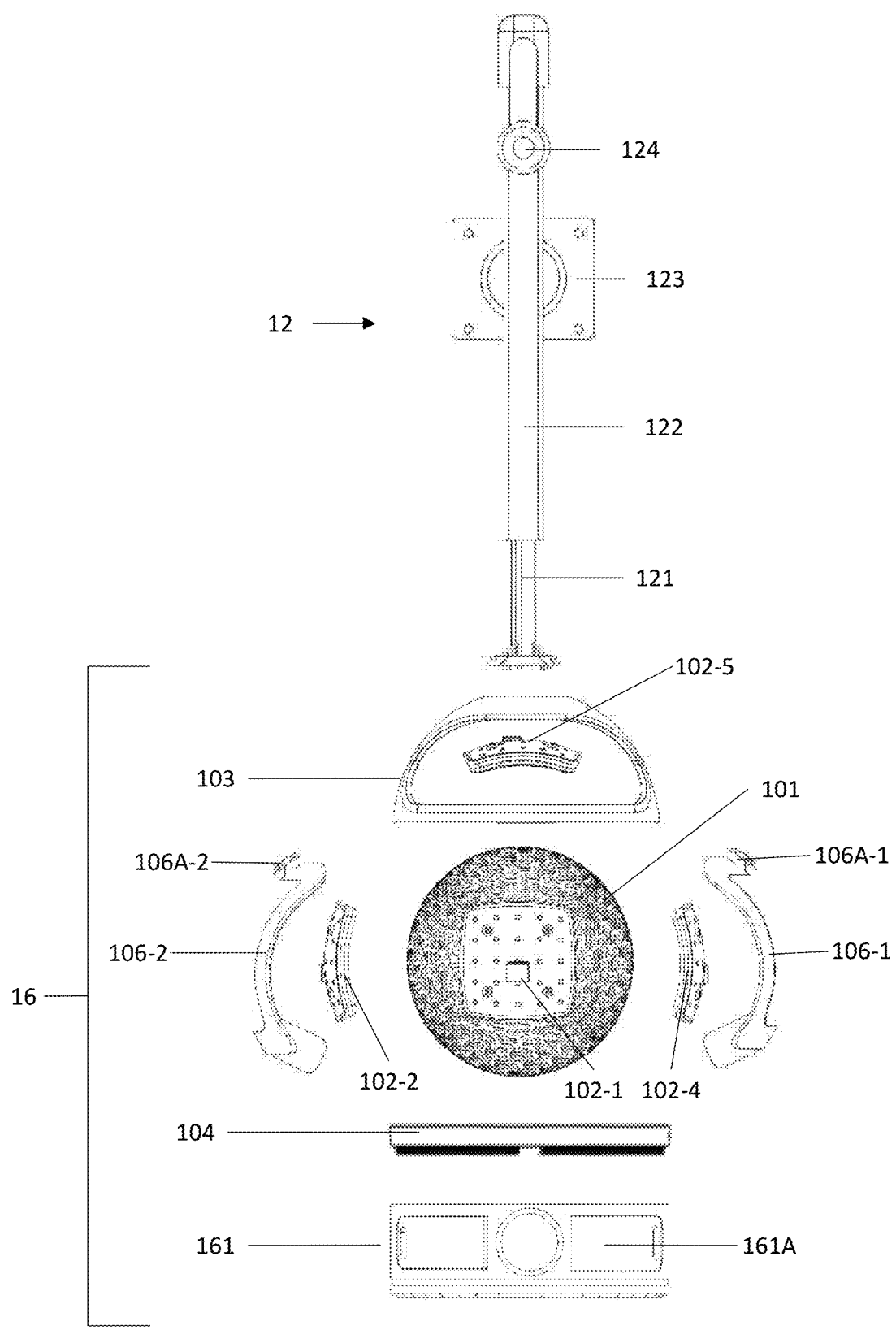
FIG. 8B is a side exploded view of the trailer jack and transport subsystem of the present invention in FIG. 8A, showing all of its components including semispherical framework, bearing surfaces, bearing surface retention ring structure, jacking post member and rotational mounting mechanism, a set of braking shoes for gripping the load-bearing transport ball, and a cylindrical ring structure with a torque generation system for lifting the load-bearing ball off the ground for long term storage applications.

FIG. 8B shows the trailer jack and transport system 1" shown removed from a trailer, showing all of its components comprising: a hemi-semispherical framework 103; bearing surfaces 102-1 through 102-5; a load-bearing transport ball 103; bearing surface retention ring structure 104; inner and out jacking post members 121 and 122; a rotational mounting mechanism 123; a set of brakes 106-1 and 106-2 for gripping the load-bearing transport ball 101 in the braking mode of operation; and a cylindrical parking ring structure (i.e. cylindrical support structure) 161 having an integrated torque generation system 161A and 161B, for use in rotating the cylindrical structure 161 to raise or lower its position along the longitudinal axis of the spherical wheel assembly 16, and thereby lifting the load-bearing ball 101 off the ground surface for long term storage applications, and lowering back down thereunto when it is desired to transport the trailer, once again.

Figure 8C:
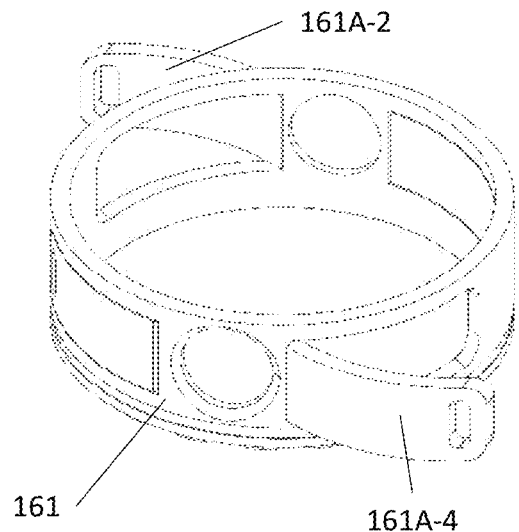
FIG. 8C is a perspective view of the cylindrical parking ring structure (i.e. extendible foot) having a first set of foldable torque generating handles adapted for arranging the cylindrical ring structure in a non-rolling configuration, and a second set of foldable torque generating handles adapted for arranging the cylindrical ring structure in a rolling configuration, wherein the first set of handles are being used to arrange the ring structure in its non-rolling configuration.
Figure 8D:
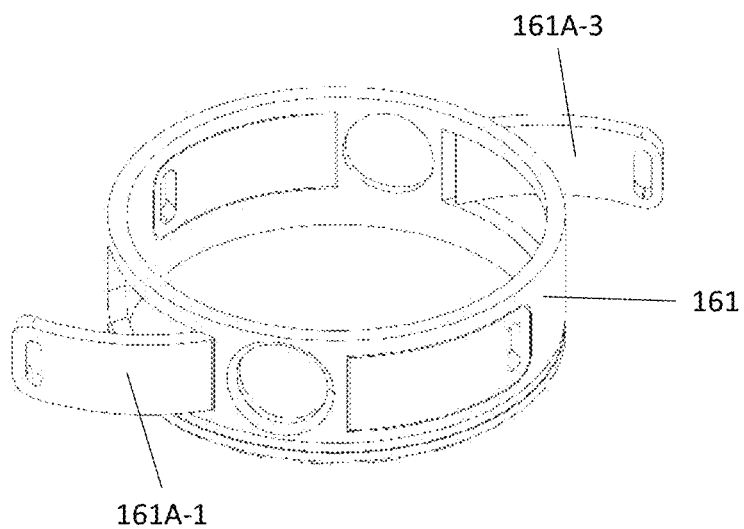
FIG. 8D is a perspective view of the cylindrical parking ring structure (i.e. extendible foot) having a first set of foldable torque generating handles adapted for arranging the cylindrical ring structure in a non-rolling configuration, and a second set of foldable torque generating handles adapted for arranging the cylindrical ring structure in a rolling configuration, wherein the second set of handles are being used to arrange the ring structure in its rolling configuration.

FIG. 8C shows the cylindrical parking ring structure (i.e., an extendible foot) comprising: a first set of foldable torque generating handles 161A-2 and 161-A4 adapted for arranging the cylindrical ring structure in a non-rolling configuration; and a second set of foldable torque generating handles 161A-1 and 161-A3 adapted for arranging the cylindrical ring structure 161 in a rolling configuration. As shown in FIG. 8D, the second set of handles 161A-1 and 161-A3 are used to arrange the ring structure in its rolling configuration. By simply grabbing these pairs of handles, the user can simply rotate the cylindrical ring structure 161 and raise and lower the transport ball 101 off the ground surface as desired.

Figure 8E:
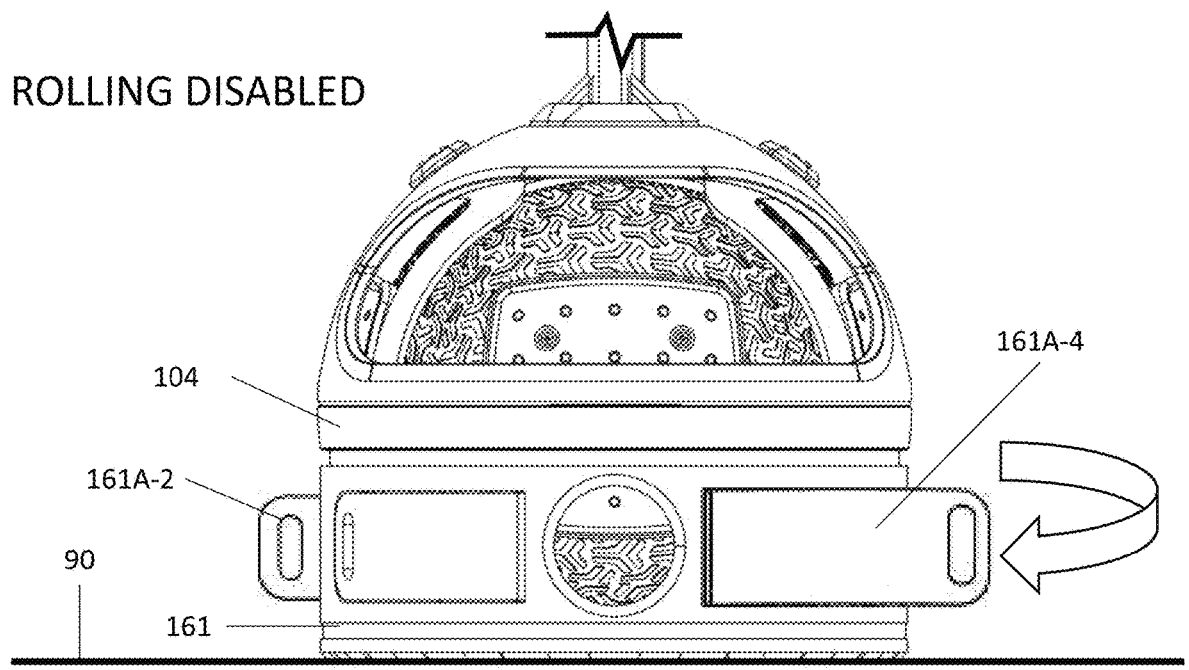
FIG. 8E is an elevated side view of the trailer jack and transport system of the present invention as shown in FIG. 8A, wherein the first set of handles are being used to arrange the cylindrical ring structure in its non-rolling configuration.

FIG. 8E shows the trailer jack and transport system 1″ in FIG. 8A, wherein the first set of handles 161A-1 and 161-A3 are used to rotate the cylindrical ring structure 161, lower the transport ball 101 onto the ground surface 90, and arrange the ring structure in its rolling-enabled configuration.

Figure 8F:
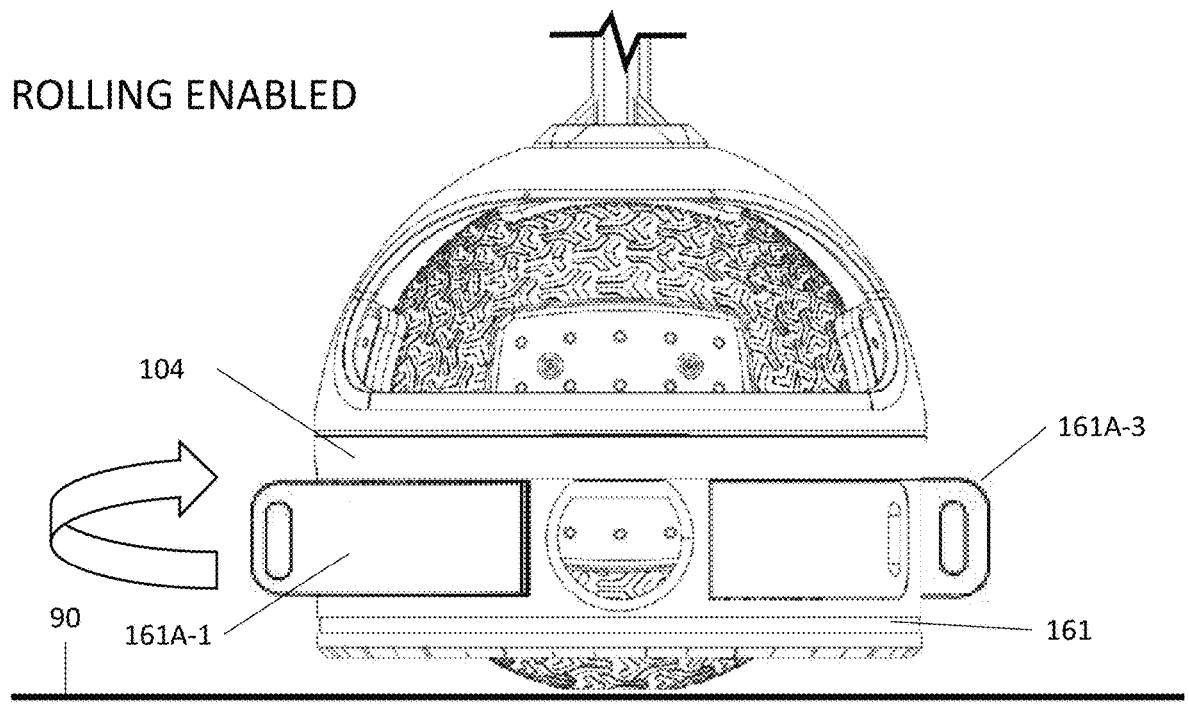
FIG. 8F is an elevated side view of the trailer jack and transport system of the present invention as shown in FIG. 8A, wherein the second set of handles are being used to arrange the cylindrical ring structure in its rolling configuration.

FIG. 8F shows the trailer jack and transport system 1″ in FIG. 8A, wherein the second set of handles 161A-2 and 161-A4 are used to lift the transport ball 101 off the ground surface 90 and arrange the ring structure in its rolling-disabled (i.e., non-rolling) configuration.

Figure 9A:
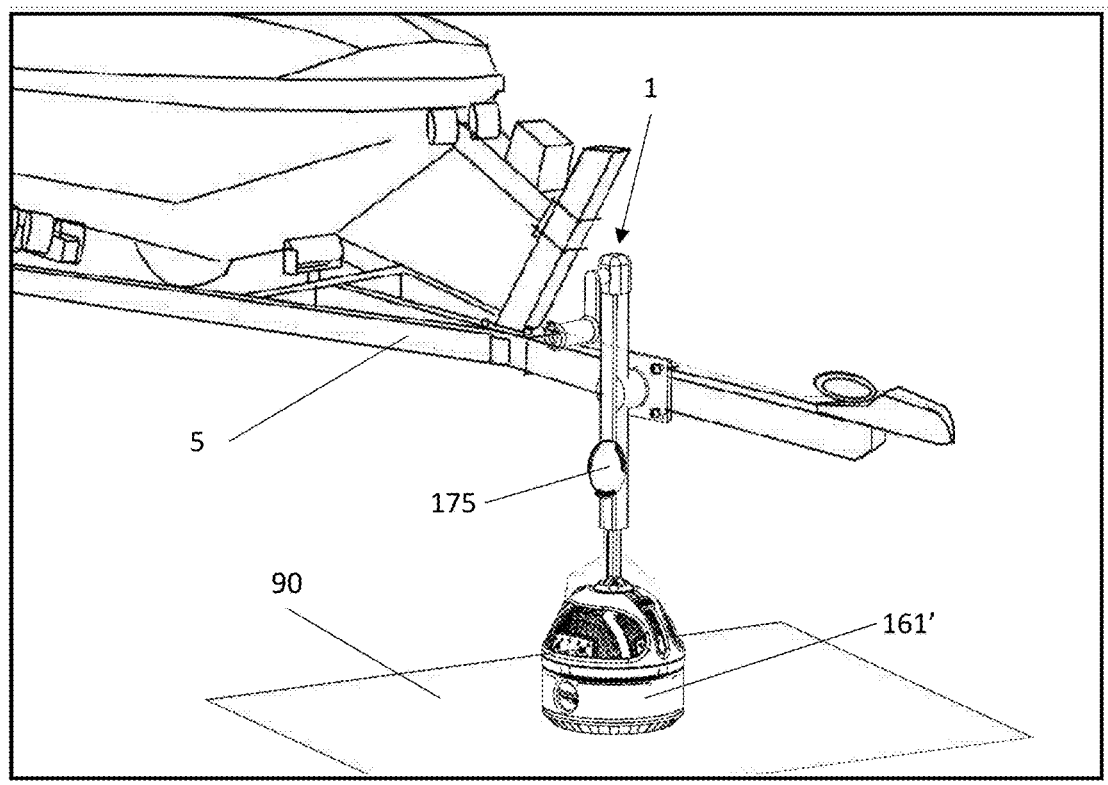
FIG. 9A is a perspective view of the trailer jack and transport system of the present invention as shown mounted on a boat trailer with an accessory cylindrical ring structure (i.e., "parking foot") snapped onto the semispherical structure to create a stationary system.

Specification of the Trailer Jack and Transport System of the Present Invention Mounted on a Boat Trailer, Wherein a Snappable Accessory Cylindrical Ring (i.e. Stationary Foot) is Arranged to Create a Non-Rolling Load-Bearing Trailer Jack with Large Surface Area FIG. 9A shows the trailer jack and transport system 1 in FIG. 2B mounted on a boat trailer 5. As shown, a snap-on stationary foot accessory 161' is attached to the spherical wheel assembly 10 to transform the transport system into a stationary jack, preventing rolling or other movement on the ground surface 90 and creating a circular landing area approximately the diameter of the transport ball to avoid sinking into the ground surface 90 under the weight of the trailer 5.

Figure 9B:
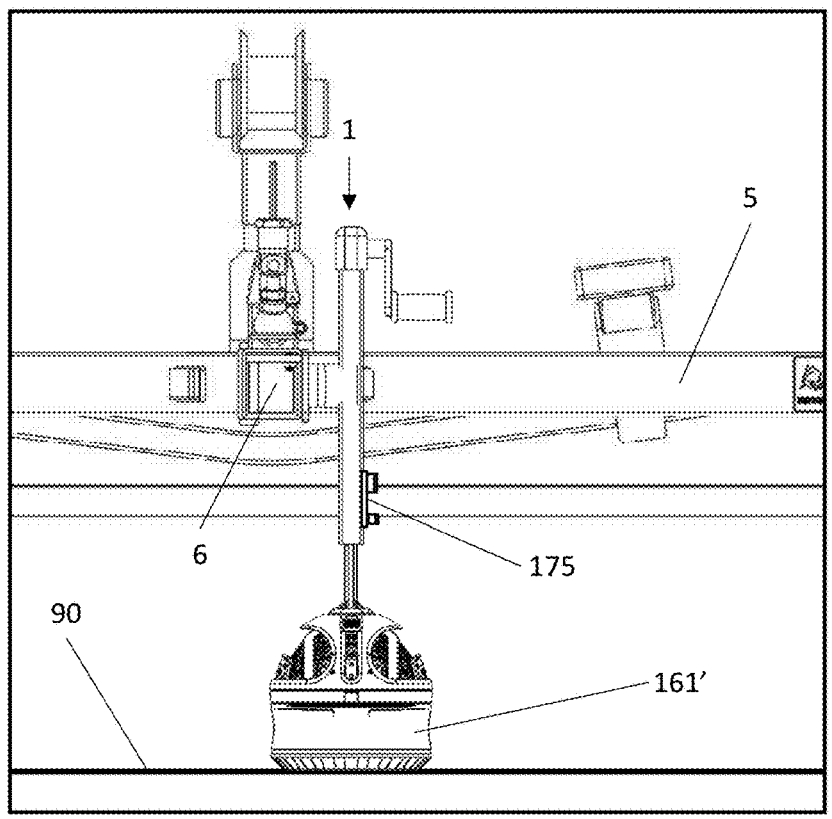
FIG. 9B is an elevated side view of the trailer jack and transport system of the present invention as shown in FIG. 9A mounted on a boat trailer, wherein the parking foot accessory is snapped onto the bottom portion of the bearing surface retention ring structure to create a stationary system.

FIG. 9B shows the trailer jack and transport system in FIG. 9A mounted on the boat trailer 5 in its stationary jacking configuration whereby its load-bearing transport ball 101 is prevented from reaching the ground surface, instead the weight of trailer tongue 6 is distributed on the ground surface by the stationary foot 161'.

Figure 9C:
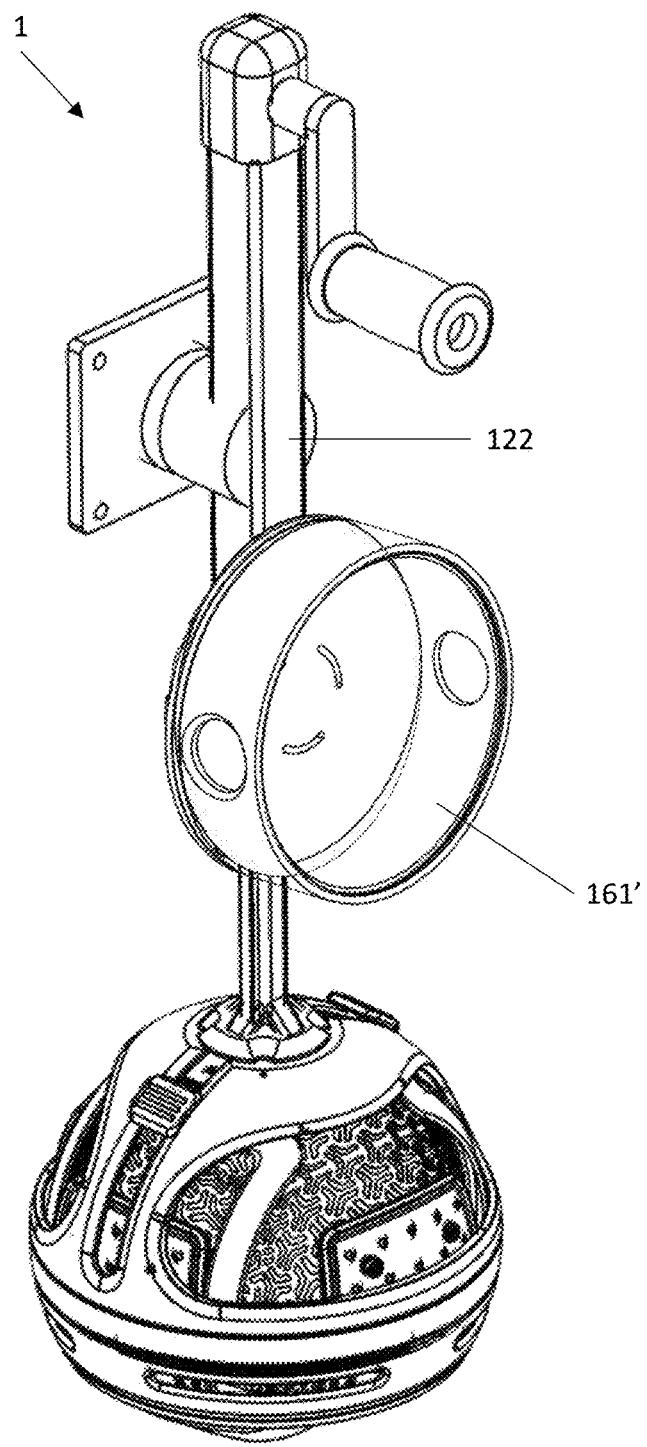
FIG. 9C is a perspective view of the trailer jack and transport system of the present invention as shown in FIG. 9A, removed from any trailer for purposes of illustration, and provided with a bracket supporting the parking foot accessory that has been removed from the semispherical structure.

FIG. 9C shows the trailer jack and transport system 1 in FIG. 9A, removed from any trailer for purposes of illustration, and provided with a bracket for storing the removable stationary foot 161' when disconnected from the bottom portion of the ball retention ring structure 105, suitably adapted for snap-fit connection and removal.

Figure 9D:
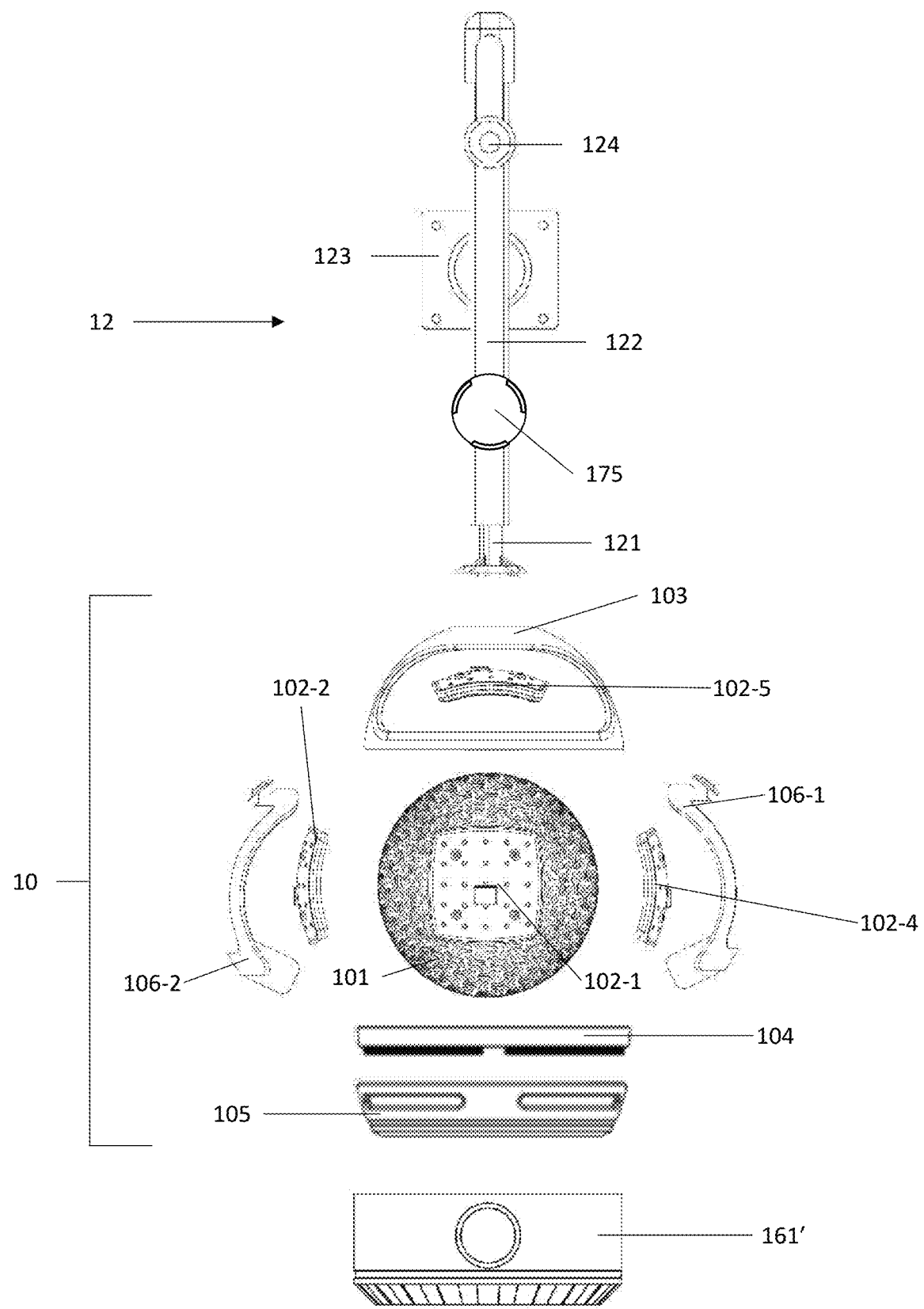
FIG. 9D is an exploded view of the trailer jack and transport system of the present invention as shown in FIG. 9C, comprising the primary components employed in prior described embodiments of the present invention, including an accessory cylindrical parking foot adapted for snap-on attachment to the bottom portion of the bearing surface retention ring structure.

FIG. 9D shows the trailer jack and transport system 1 in FIG. 9C, comprising: the primary components employed in prior embodiments, described above, in addition to a removable stationary foot 161' adapted for snap-fit attachment onto the bottom portion of the ball retention ring structure 105 and the addition of a storage mounting feature 175 fixedly mounted to the outer jacking post member 122

FIGS. 9E and 9F show the trailer jack and transport system in FIG. 9C, with its parking foot device 161' stored on the storage mounting feature 175 fixed attached to the jacking post portion 122 of the system.

FIGS. 9G and 9H show the trailer jack and transport system in FIG. 9C, with its parking foot device removed from the jacking post portion 122 of the system.

Figure 9I:
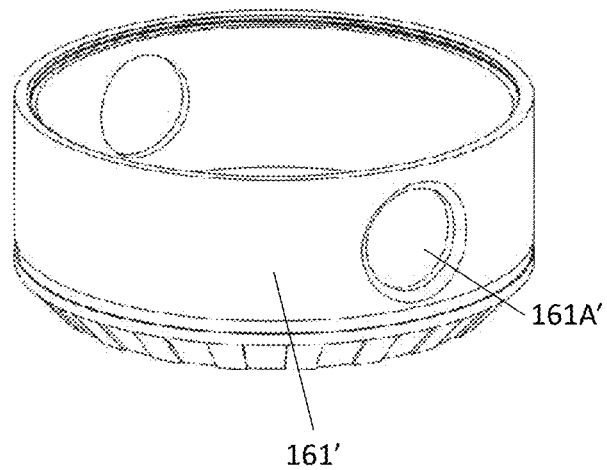
FIG. 9I is a top perspective view of the removable cylindrical parking foot device used with the trailer jack and transport system of the present invention shown in FIG. 9C.
Figure 9J:
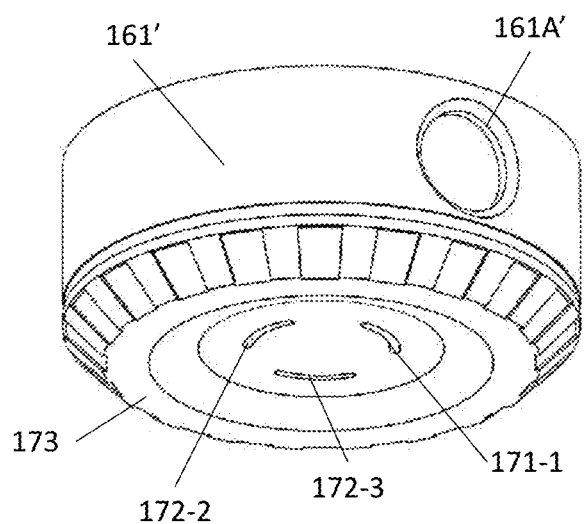
FIG. 9J is a bottom perspective view of the removable parking foot device used with the trailer jack and transport system of the present invention shown in FIG. 9C.

FIGS. 9I and 9J show the removable parking foot device 161' for use with the trailer jack and transport system 1 shown in FIG. 9C.

Figure 9K:
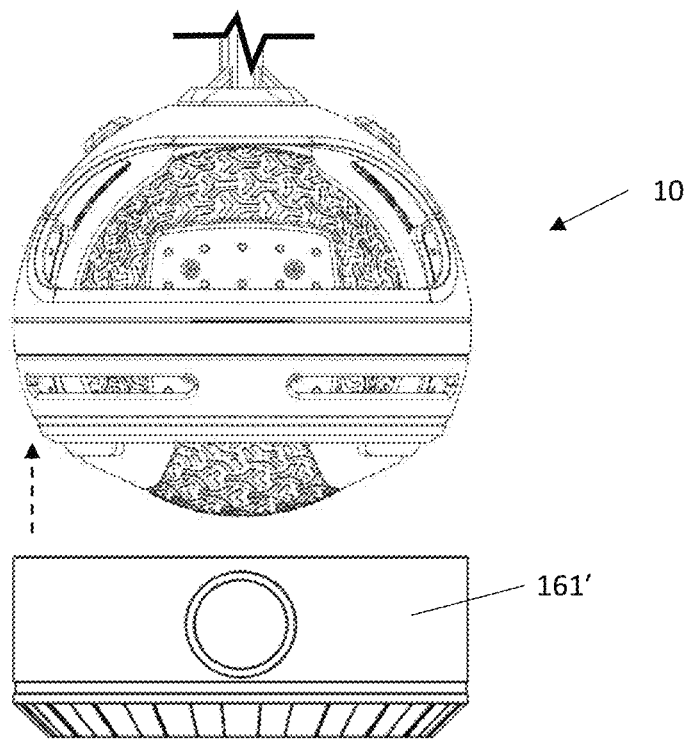
FIG. 9K is a first elevated side view showing the removable cylindrical parking foot device being connected to the bottom portion of the trailer jack and transport system of the present invention shown in FIG. 9C.

FIG. 9K shows the removable parking foot device 161' in the process of being connected to the bottom portion of the trailer jack and transport system 1 shown in FIG. 9C.

Figure 9L:
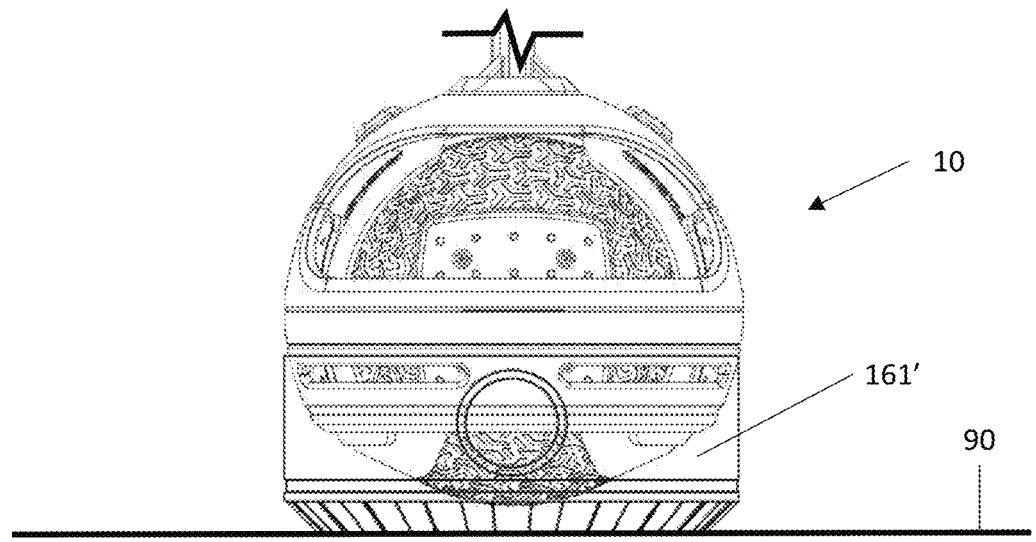
FIG. 9L is a second elevated side view showing the removable cylindrical parking foot device being snap-connected to the bottom portion of the trailer jack and transport system of the present invention shown in FIG. 9C.

FIG. 9L shows the removable parking foot device being snap-connected to the bottom of the spherical wheel assembly 10 of the trailer jack and transport system 1 shown in FIG. 9C.

Figure 10A:
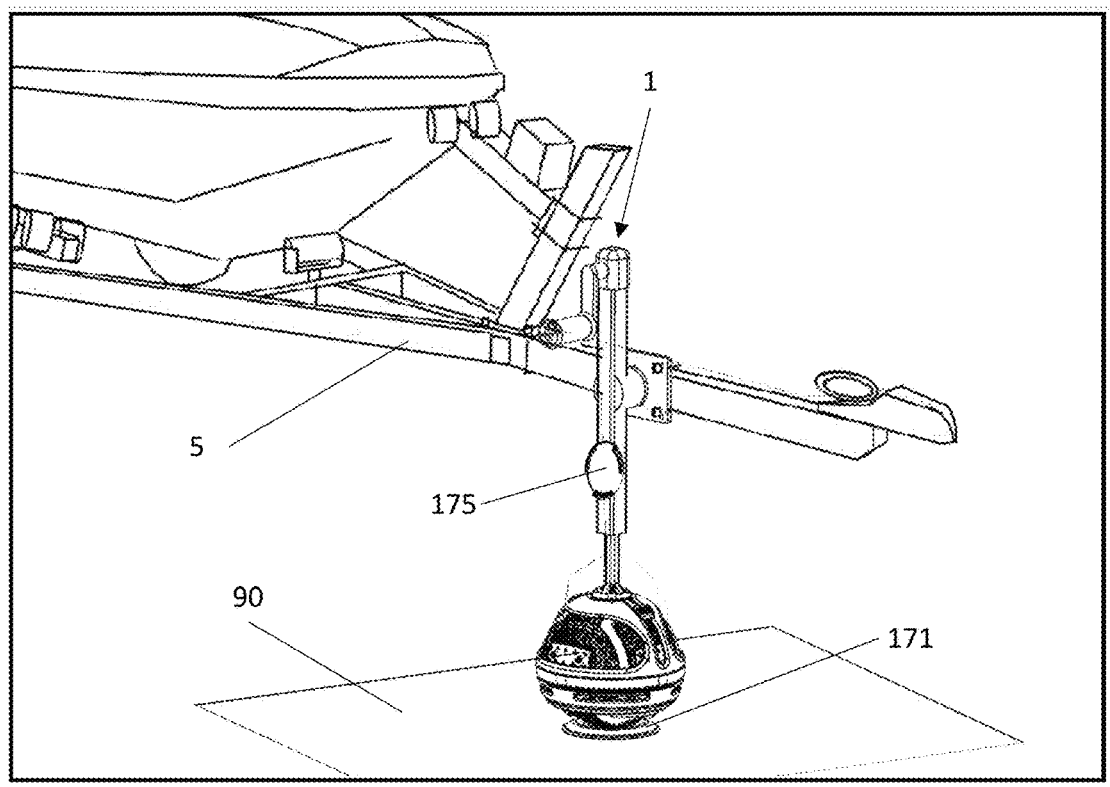
FIG. 10A is a perspective view of the trailer jack and transport system of the present invention in FIG. 2A shown mounted on a boat trailer, wherein an anti-rolling disc (i.e., chock) is placed beneath its load-bearing transport ball to prevent rolling or other movement.
Figure 10B:
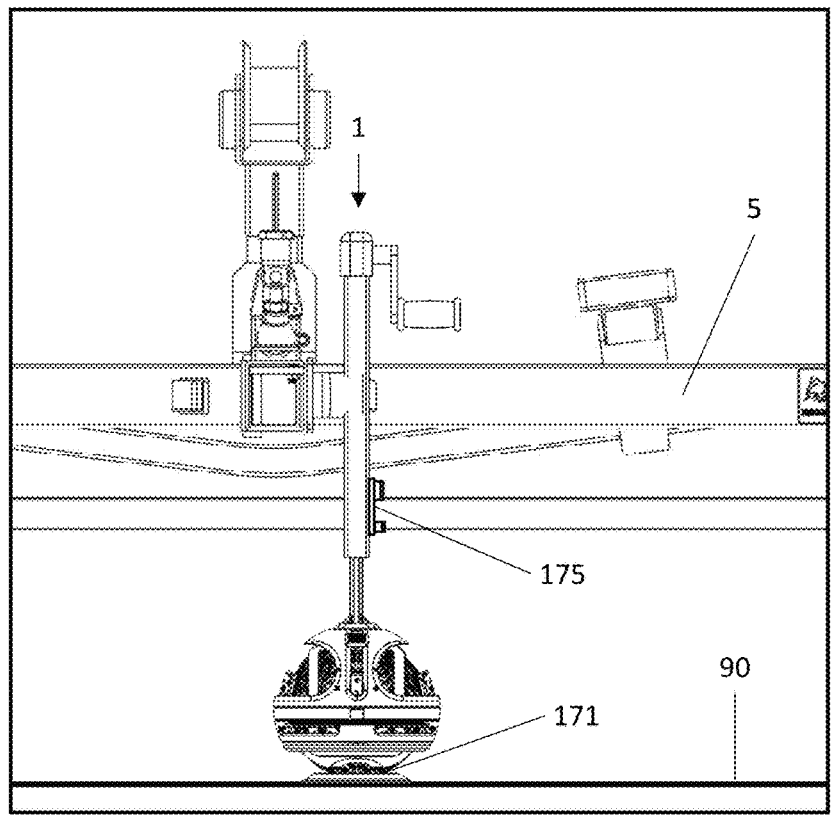
FIG. 10B is an elevated side view of the trailer jack and transport system of the present invention in FIG. 2A shown mounted on a boat trailer, wherein an anti-rolling disc is placed beneath its load-bearing transport ball to prevent rolling or other movement.

Specification of the Trailer Jack and Transport System of the Present Invention Mounted on a Boat Trailer, Wherein an Anti-Rolling Disc is Placed Beneath its Load-Bearing Transport Ball to Prohibit Rolling or Other Movement FIGS. 10A and 10B show the trailer jack and transport system 1 in FIG. 2B mounted on a boat trailer 5. As shown, an anti-rolling disc (i.e., spherical wheel chock) 171 is placed beneath its load-bearing transport ball 101 to prohibit rolling or other movement.

Figure 10C:
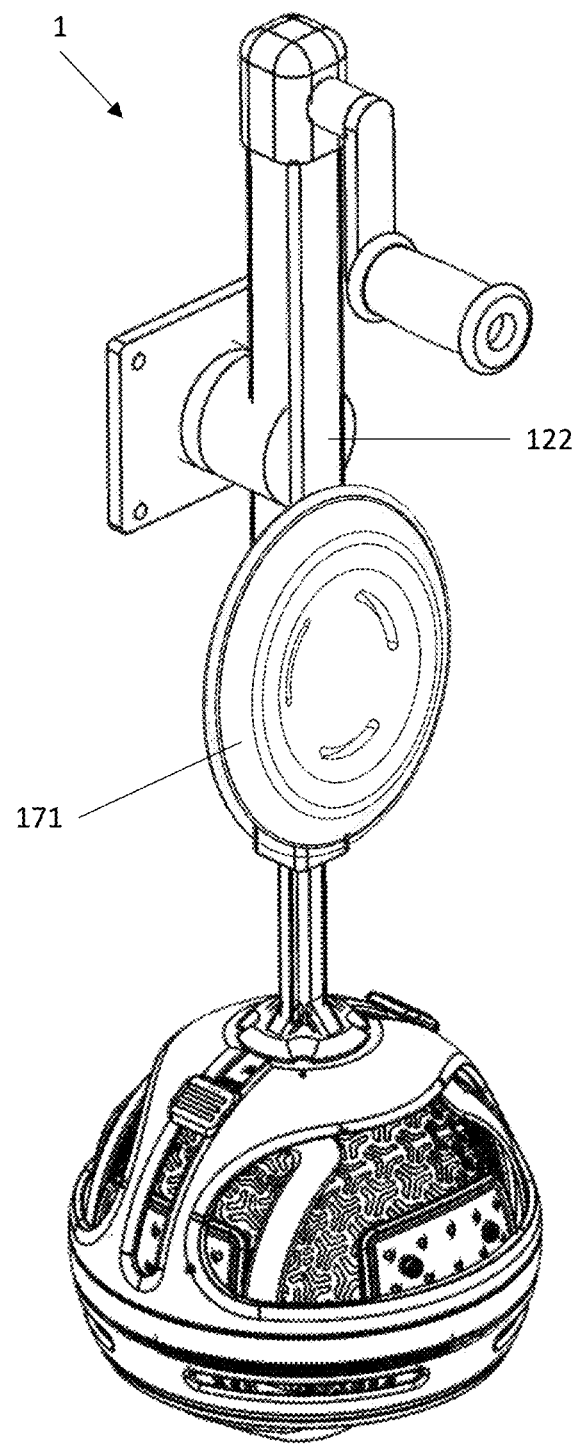
FIG. 10C is a perspective view of the trailer jack and transport system of the present invention in FIG. 2A shown removed from a trailer, its spherical wheel chock disc is shown stored on the jacking post member of the system.
Figure 10D:
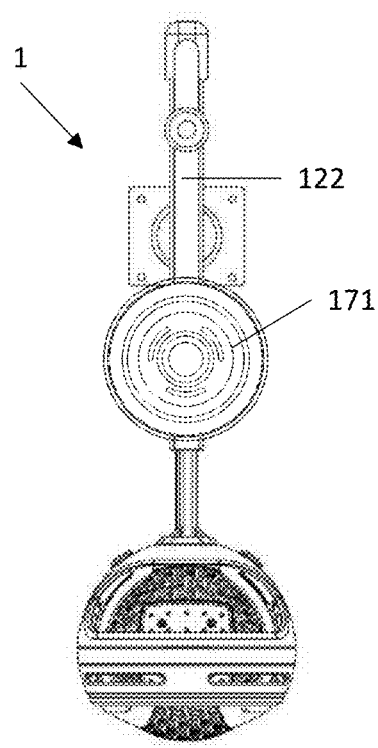
FIG. 10D is an elevated front view of the trailer jack and transport system of the present invention in FIG. 2A shown removed from a trailer, with its spherical wheel chock disc shown stored on the bracket of the jacking post member of the system.
Figure 10E:
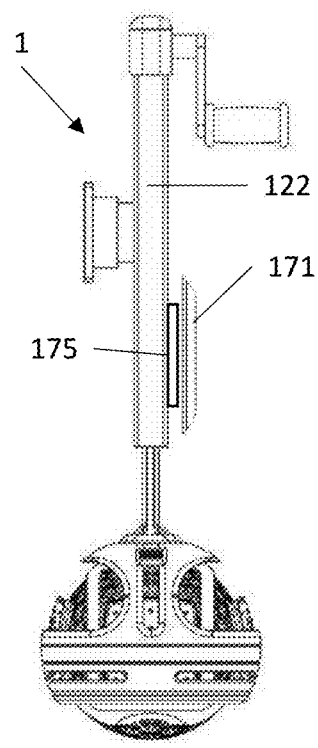
FIG. 10E is an elevated side view of the trailer jack and transport system of the present invention in FIG. 2A shown removed from a trailer, with its spherical wheel chocking disc shown stored on the bracket of the jacking post member of the system.

FIGS. 10C, 10D and 10E show the trailer jack and transport system in FIGS. 10A and 10B removed from the trailer 5, with its spherical wheel chock 171 shown stored on the storage mounting feature 175 fixed attached to the jacking post member 122 of the system.

Figure 10F:
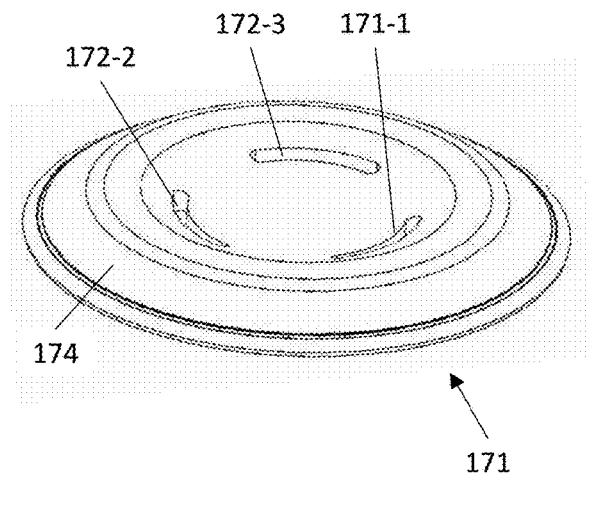
FIG. 10F is a front perspective view of the spherical wheel chocking disc removed from storage on the jacking post member of the system, and applied to a ground surface, for preventing movement of the load-bearing transport ball supported within the trailer jack and transport system of the present invention shown in FIG. 10A.
Figure 10G:
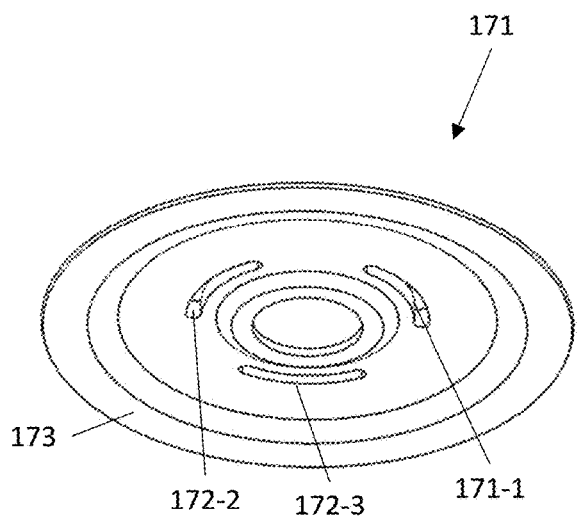
FIG. 10G is a rear perspective view of the spherical wheel chock shown in FIG. 10F.

FIGS. 10F and 10G show the spherical wheel chock 171 removed from physical connection to the trailer jack and transport system, and applied to a ground surface, for preventing movement of the load-bearing transport ball 101 supported within the trailer jack and transport system 1 in FIG. 10A when placed thereupon.

Figure 10H:
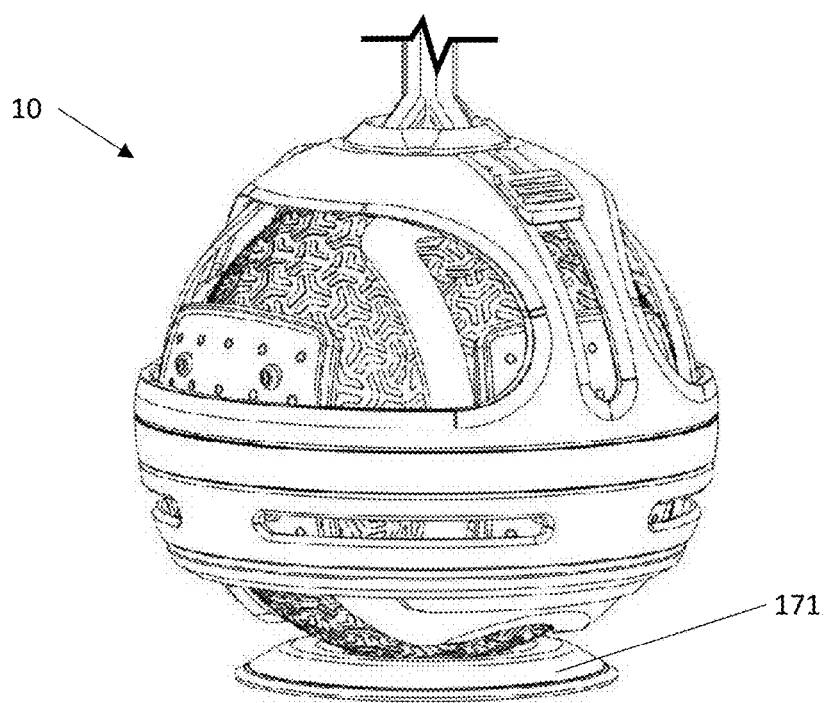
FIG. 10H is a perspective partially cut away view of the trailer jack and transport system of the present invention as shown in FIG. 10 shown with its load-bearing transport ball supported within the spherical wheel chocking disc, preventing movement of the system relative to the ground surface.

FIG. 10H shows the spherical wheel assembly 10 of the trailer jack and transport system 1 in FIG. 10A, with its load-bearing transport ball 101 supported within the disc-like anti-rolling wheel chock 171, preventing movement of the system relative to the ground surface.

Figure 11A:
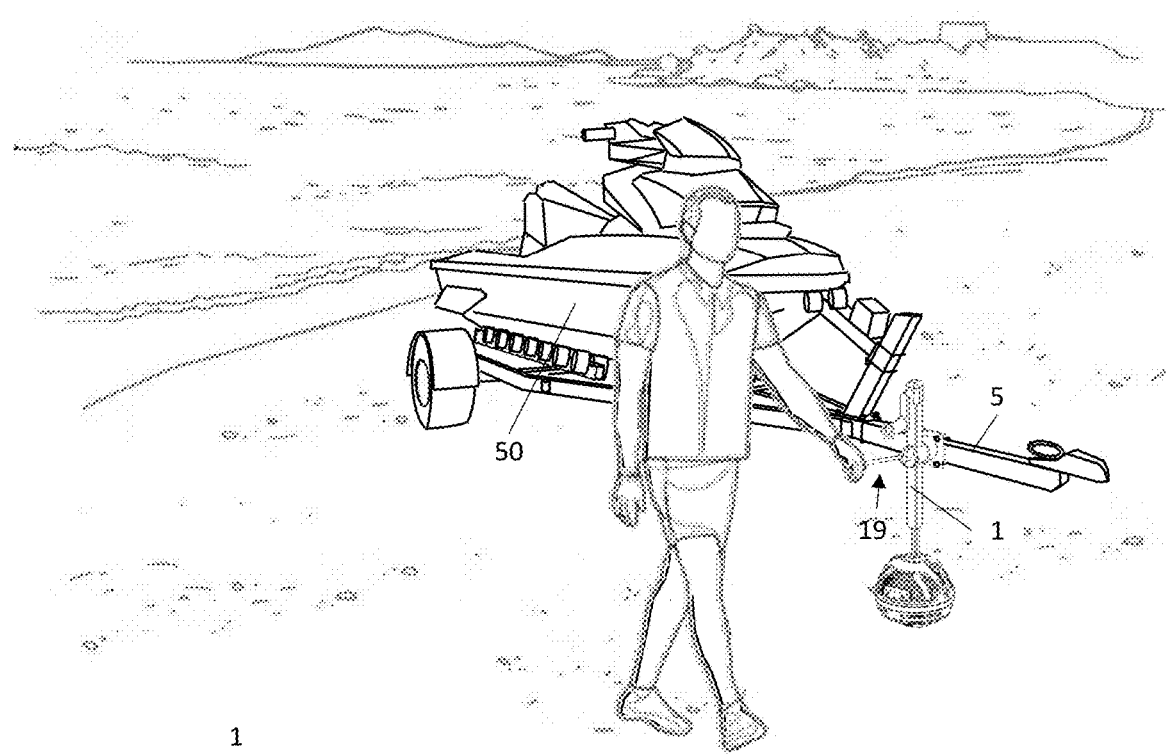
FIG. 11A is a perspective view of the personal watercraft (PWC) and trailer equipped with the trailer jack and transport system of the present invention shown and described in FIGS. 2B through 2Q, wherein a hinged or ball-and-socket push-bar type handle is mounted on the jacking post member of the system, to enable a human operator to simply push and move the trailer in a desired direction while the trailer jack and transport system is arranged in its transport configuration (i.e. mode of operation)

Specification of the Trailer Jack and Transport System of the Present Invention Having a Manually-Extendable Push-Type Hand Bar Assembly, for Safely Pushing a Trailer in a Desired Direction of Travel FIG. 11A shows a modified trailer jack and transport system 1 in FIG. 1A, arranged in its transport mode and being used to transport and jack a PWC trailer 5 located on a beach surface with a sandy ground.

Figure 11B:
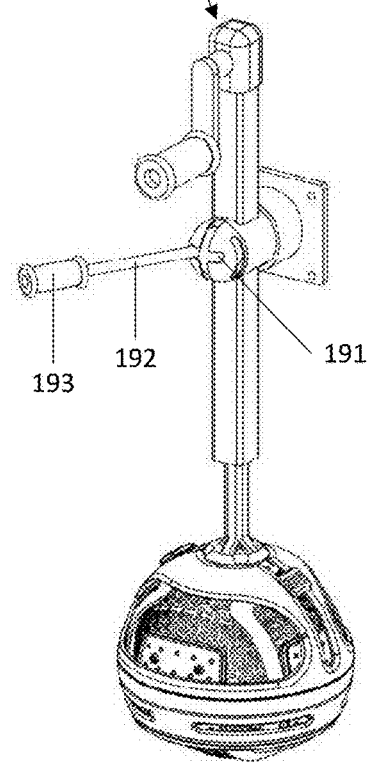
FIG. 11B is a perspective view of the modified trailer jack and transport system of FIG. 11A, shown arranged in its transport mode, removed from any trailer system or assembly, and having a push-type handlebar accessory mounted on the jacking post assembly.
Figure 11C:
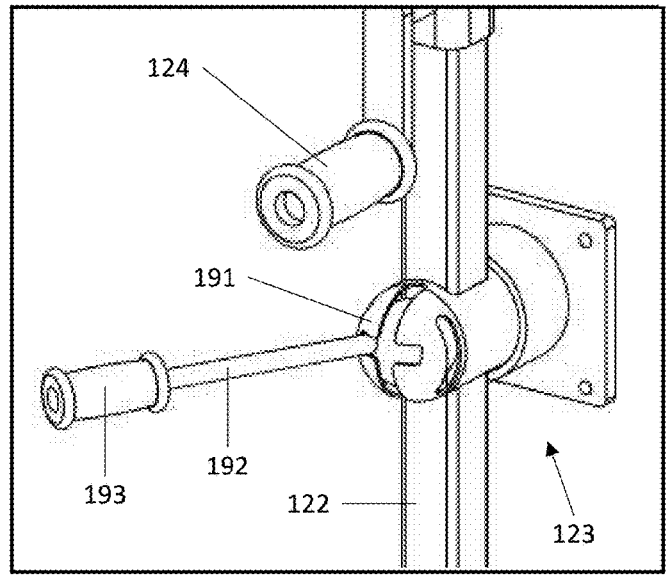
FIG. 11C is a partially fragmented perspective view of the push-type handlebar accessory mounted on the jacking post assembly shown in FIG. 11B.
Figure 11D:
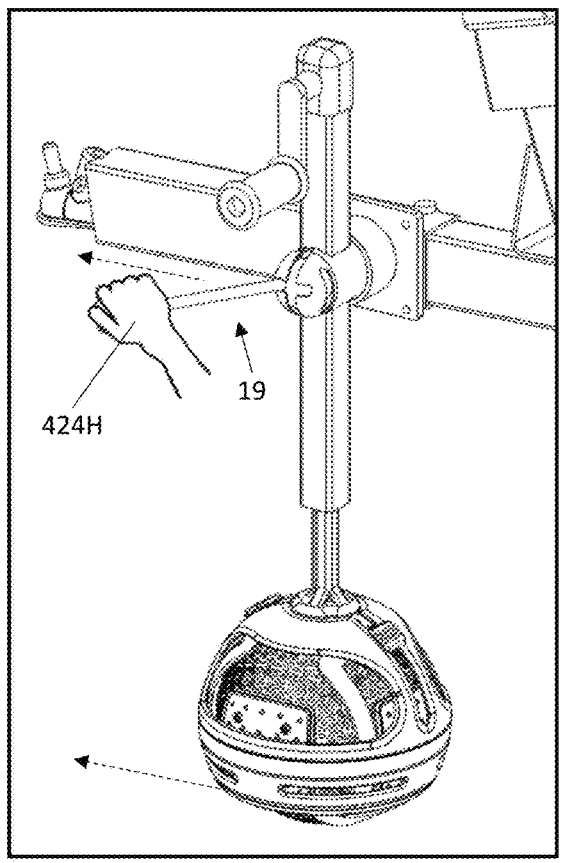
FIG. 11D is partially fragmented perspective view of a trailer to which the trailer jack and transport system of FIG. 11A is mounted, showing the push-type handlebar assembly configured for and being manually pushed in a forward direction (e.g., towards trailer hitch)
Figure 11E:
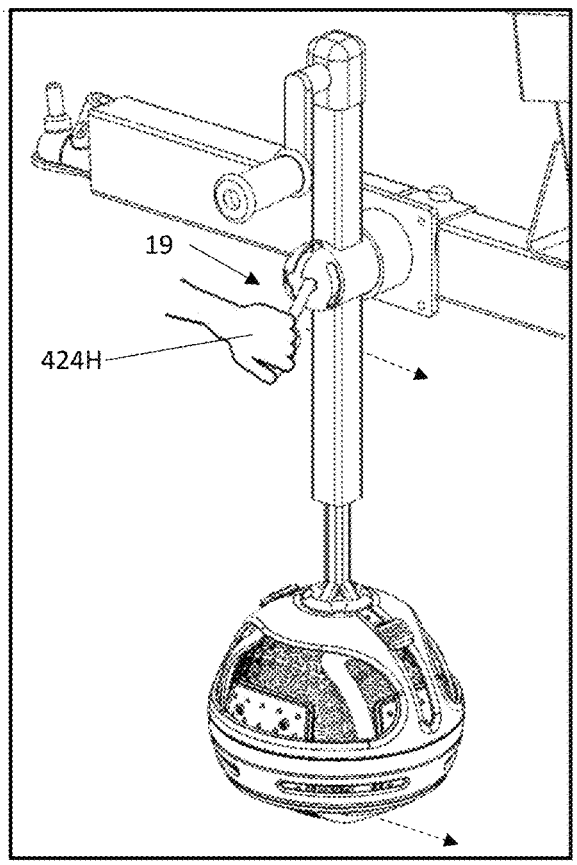
FIG. 11E is partially fragmented perspective view of a trailer to which the trailer jack and transport system of FIG. 11A is mounted, showing the push-type handlebar assembly configured for and being manually pushed in a reversed direction (e.g., away from trailer hitch)
Figure 11F:
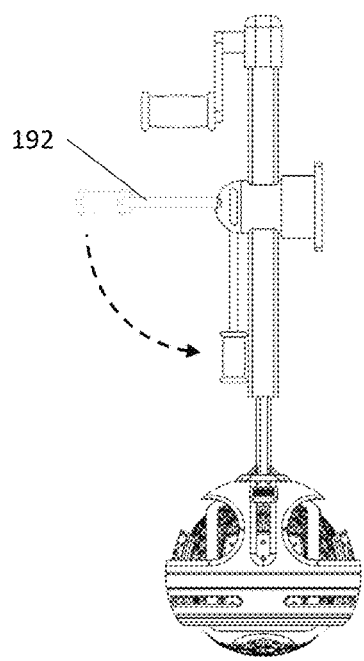
FIG. 11F is an elevated side view of the trailer jack and transport system shown mounted in FIG. 11A, showing its push-type handlebar assembly being configured for storage.
Figure 11G:
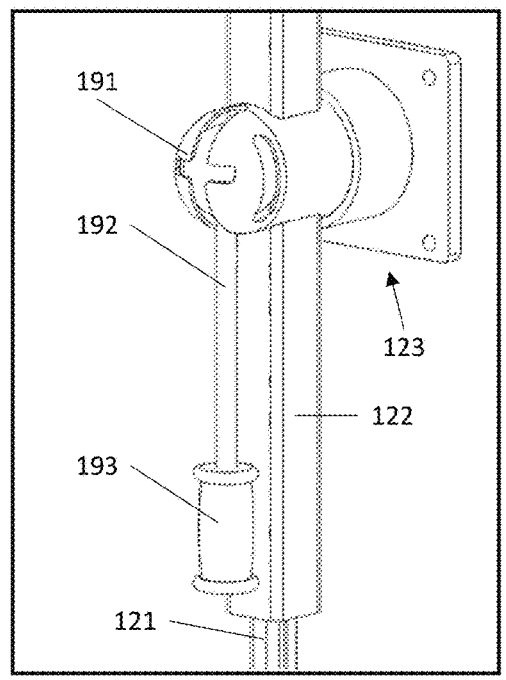
FIG. 11G is a perspective partially-fragmented view of the trailer jack and transport system shown mounted in FIG. 11A, showing its push-type handlebar assembly arranged in its storage configuration.

FIG. 11B shows the trailer jack and transport system 1 of FIG. 11A, arranged in its transport mode, removed from any trailer system or assembly, and having a push-type handle bar accessory 19, with handle 193 and its rod 192 mounted on the jacking post assembly using a directional mount 191 allowing for the handle rod to be arranged in several different directions: (i) forward direction illustrated in FIG. 11D; (ii) reverse direction illustrated in FIG. 11E; and (iii) downward storage direction illustrated in FIGS. 11F and 11G.

Specification of the Trailer Jack and Transport System of the Present Invention Having a Push-Type Ball Assembly for Safely Pushing a Trailer in a Desired Direction of Travel FIG. 11H shows the trailer jack and transport system 1 shown mounted in FIG. 1C, with a push-type ball assembly 19' atop the external jacking post member 122 for pushing, pulling or steering the trailer 5 to which it is attached.

FIGS. 11I and 11J show the trailer jack and transport system 1 shown mounted in FIG. 11H, with the push-type ball assembly 19'.

Specification of the Trailer Jack and Transport System of the Alternative Embodiment of the Present Invention with Simplified Rotational Mounting Mechanism Made Possible by Side-Mounted Jacking Post FIGS. 12A and 12C show the trailer jack and transport system of the alternative embodiment of the present invention 2 arranged in its transport mode and being used to transport and jack a trailer 5 during the hitching of the trailer to a hitching post mounted on a mobile vehicle such as a truck 9.

FIGS. 12B and 12D show the trailer jack and transport system of the alternative embodiment 2 shown in FIG. 12A, arranged in its storage mode with the trailer 5 coupled to the trailer hitch 8 of the mobile vehicle 9 to demonstrate, by virtue of its design, the absence of interference between the spherical wheel assembly 20 and the frame of the trailer 5, enabling compact storage.

FIG. 12E shows the trailer jack and transport system of the alternative embodiment 2 in FIG. 12A, arranged in its transport mode, with the side-mounted trailer jack and transport system 2 offset from the trailer frame enabling the use of a simple rotational mounting mechanism, without telescopic or tilting mechanisms.

Specification of the Trailer Jack and Transport System of the Present Invention Having Side-Mounted Design FIG. 13A shows the trailer jack and transport system of the alternative embodiment 2 shown in FIG. 12A, arranged in its transport mode, and removed from any trailer. The major difference of this system design 2 from the prior system design 1 is that the extendable jacking post assembly 22 is rigidly mounted to the side of the semispherical framework 203, in contrast to axial mounting of the jacking post assembly 12 in system design 1 shown in FIG. 2B.

FIGS. 13B and 13C show the trailer jack and transport system 2 in FIG. 13A, arranged in its transport mode, removed from any trailer.

As shown in FIGS. 13D and 13E, the trailer jack and transport system 2 comprises: (i) a semispherical framework assembly 20 having a semispherical framework 203 supporting a rigid load-bearing transport ball 101 rotatably supported by bearing surfaces 102-1 through 102-5 mounted in ring structure 104, and retained in the framework by a ball retainer ring structure 105; (ii) a set of braking frames 106-1 and 106-2 mounted between the semispherical framework 203 and the load-bearing transport ball 101, and having thumb slidable levers 106A-1 and 106A-2 extending through the semispherical framework 203, and operable to be arranged in a braking-configuration or a non-braking configuration; and (iii) a hand-operated and rotatably jacking post assembly 22 rigidly mounted to the side of the semispherical framework 203 by welding or other fastening means, and having a rotatable mounting mechanism 223 that allows the outer post member 122 to rotate through at least 90 degrees of movement, from a storage configuration shown in FIGS. 12B and 12D, to a transport configuration shown in FIGS. 12A, 12C and 12E, and a hand-crank 124 that extends the inner jacking post 221 relative to the outer jacking post member 122 in response to rotation of the hand-crank 124.

FIG. 13E is an elevated side view of the trailer jack and transport system 2 shown in FIG. 13A, comprising a semispherical framework integrated to an elongated jacking post member assembly having a rotational mounting mechanism, a set of five ball-bearing bearing surface pads mounted within a bearing pad mounting ring structure, a load-bearing transport ball, a set of braking frames and shoes, and a transport ball retention ring structure.

Specification of a Trailer Equipped with a Jack and Transport System of the Present Invention Centrally Mounted within the Center of the A-Frame Portion of the Trailer FIGS. 14A and 14B show a trailer 55 equipped with a jack and transport system of the present invention 3 centrally mounted within the center of the A-frame tongue portion of the trailer frame 6, and arranged in its transport configuration, by lowering its load-bearing transport ball 101 within its semispherical framework 103 to contact the ground surface, when the coarse-adjusting pin 323C is positioned high on the outer jacking post member 322 and the hand-crank mechanism 324 is rotated to lower the transport ball accordingly.

As shown in FIGS. 14C and 14D, the A-frame portion of the trailer frame 6 is rotated into position with a trailer hitch 8 on a mobile vehicle 9, and the trailer coupler 7 is lowered onto the same during the hitching process by rotating the hand-crank mechanism 324 to raise the spherical wheel assembly 10 and lower the trailer coupler 7 onto the hitch 8 o the motor vehicle 9. The coarse adjustment pin 323C is then disengaged and the outer jacking post member 322 is lifted until the spherical wheel assembly is arranged within the confines of the A-frame 6 and the A-frame trailer jack mount 323A so as to provide ample ground clearance. The coarse adjustment pin 323C is then inserted into a lower socket to securely position the trailer jack and transport system 3 in its storage position.

FIG. 14E shows the jack and transport system 3 in FIGS. 14A and 14B, with the semispherical framework and load-bearing transport ball stored within the A-frame portion of the trailer frame 6, while the trailer is unhitched from any motor vehicle.

FIGS. 14F, 14G and 14H show the jack and transport system 3 in FIG. 14E, with its semispherical framework 103 and load-bearing transport ball 101 lowered from the A-frame portion of the trailer frame 6 and engaging the ground surface, so that the trailer is supported for transport thereupon or can be jacked up for hitching purposes.

Specification of a Motorized Jack and Transport System of the Present Invention Arranged in its Transport Configuration with a Human Operator Manually Controlling the Direction of Powered Motion of the Trailer, Via the Trailer Jack and Transport System, Towards the Hitching Post of a Nearby Motor Vehicle FIG. 15A shows a trailer 5 equipped with a motorized (i.e. motor-powered) trailer jack and transport system 4 of an alternative embodiment of the present invention, shown arranged in its transport configuration and mode of operation, with a human operator manually controlling the direction of powered motion of the trailer, via the onboard controller 424 mounted on the top of the trailer jack and transport system, and guiding its travels towards the trailer hitch 8 on a nearby motor vehicle 9.

FIG. 15B illustrates a trailer 5 for hitching to a motor vehicle and equipped with the powered trailer jack and transport system of the present invention 4 shown in FIGS. 15, 16 and 17, and illustrating the use of the onboard mounted controller 424 on the top of the jacking post member 422, for moving the trailer 5 in the direction of desired travel for transport and hitching operations as applicable.

FIG. 15C shows the motor-powered jack and transport system spherical wheel assembly 40 in FIG. 18A, showing in greater detail the three electric battery-powered motors 407-1, 407-2 and 407-3 driving the load-bearing transport ball 101 supported within its semispherical framework 403. The drive motors 407 may be spring biased, thereby maximizing and maintaining consistent engagement with the surface of the load-bearing transport ball 101. Notably, in this embodiment, the braking system is not show as the electric motors can be operated so as to provide a safety braking function on the load-bearing transport ball 101 supported within the system 4.

Specification of a Method and System for Hitching a Trailer to a Motor Vehicle Using a Powered Trailer Jack and Transport System Having an Onboard Mounted Controller on the Top of the Jacking Post Member for Moving the Trailer in the Direction of Desired Travel for Transport and Jacking Operations FIG. 16 shows the motor-powered trailer jack and transport system 45 of FIG. 15, comprising: (i) a controller 424 supporting a directional joystick, jacking controls, and controller electronics; (ii) a controller wiring harness 435; and (iii) a jack and transport drive subsystem 44 supporting a control and comminutions unit 425 provided with gears 425C, jack motor 425B, and battery module 425D, and a control and communications electronics including a processor, firmware and memory 425E, a battery charging unit 425G and a position controller 425H, and three drive motors 407-1 through 407-3 consisting each of a DC-powered motor 407A and drive roller 407C provided with a drive motor wiring interface 425J.

FIG. 17 describes the primary steps involved in the method of operating the powered trailer jack and transport system with onboard controls 45 mounted to a trailer according to the principles of the present invention.

As shown in FIG. 17, the system user starts at Block A and progresses to Block B and powers on the remote controller unit 424.

At Block C, the user controls powered transport of the trailer with the onboard joystick controller 424B.

At Block D, the user controls trailer jacking (i.e., raising and lowering relative to ground surface) with the jacking toggle switch 424C on the remote controller 424.

At Block E, control signals are communicated to the control and communications unit (CCU) 425 via the controller wiring 425K illustrated in FIG. 16.

At Block F, the controller determines whether or not the CCU has received an input signal from the joystick directional controller. If yes, the control process proceeds to Block G, and if not, the control process flow proceeds to Block L.

At Block G, the CCU microprocessor 425E receives input from joystick directional controller.

At Block H, the CCU microprocessor 425E processes directional information from joystick directional controller.

At Block I, the CCU microprocessor 425E sends directional information to position controller 425H.

At Block J, rotational speed information and power are transmitted to the KIWI drive motors 407-1, 407-2 and 407-3.

At Block K, the drive motors 407-1, 407-2 and 407-3 power and drive rotational motion of the transport ball through interaction of drive rotors 407C-1, 407C-2 and 407C-3 and the surface of the spherical wheel 101 so as to enable transport of the system under the control of the user operator.

At Block L, if the CCU has received an input signal from the jacking control toggle switch 424C then at Block M these input signals are received by the CCU microprocessor from the jacking control toggle switch 424C At Block N, the CCU microprocessor processes the directional information from the jacking control toggle switch 424C At Block O, the CCU microprocessor sends rotational direction information to the jack motor 425B At Block P, the driven jack motor 425B raises or lowers the spherical wheel shaft (i.e., inner jacking post member) 121 through interaction of the gears 425C with the telescoping jacking post members 422 and 121, for use during hitching and other trailer related functions such as raising the front section of the trailer to allow water runoff of the trailer or its contents.

If at Block L, the CCU 425 has not received an input signal from the jacking control toggle switch 424C, then at Block Q, the powered trailer jack and transport system 4 remains stationary relative to the ground surface.

At Block R, the CCU microcontroller 425E determines whether or not power has been on without control signals received by the CCU, for more than the pre-configured time period. If power has not been supplied to the system without input control signal within the prespecified time period, then the control flow returns to Block F, where the controller determines whether or not the CCU has received an input signal from the joystick directional controller.

At Block S, if power has been supplied to the system without input control signal (i.e., no user input has been detected when the system has been activated), then the powered trailer jack and transport system 4 is automatically deactivated (i.e., power is turned off) within the CCU module 425.

Specification of Motor-Powered Trailer Jack and Transport System of the Present Invention FIGS. 18A, 18B and 18C show the motorized (i.e. motor-powered) trailer jack and transport system 4 in FIG. 15A, but removed the trailer 5 and arranged in its transport configuration, revealing onboard controller 424 mounted atop of its extendable jacking post, 422 and its load-bearing transport ball 101 supported within its semispherical framework 403, and driven into controlled motion by its three battery-powered drive motors mounted external to the semispherical framework 403 and controlled by the onboard controller 424.

FIG. 18D reveals how the transport ball 101 is retained within the framework 403 by retaining ring structure 105 employed in the powered trailer jack and transport system 4 in FIG. 19A.

FIGS. 18E, 18F, 18G and 18H reveal the extendable electrical power cord/harness 425J that extends from the battery-powered control and communications module 425, to the electric motors 407-1, 407-2 and 407-3 provided in the system 4.

FIGS. 18I and 18J show that the powered trailer jack and transport system in FIG. 19A, comprises: (i) a load-bearing transport ball 101 rotatably and freely mounted within a semispherical framework 403 by way of a set of four ball-bearing bearing pads 102-1 through . . . 102-4 by way of bearing pad mounting/support ring structure 104 and the semispherical framework 403; (ii) a powered jacking post 422 mounted and extending from the top central portion of the semispherical framework 403, and bearing a rotatable mounting mechanism 123 around midsection of post member 422, and supporting an onboard controller 424; (iii) a set of three battery-powered motors 407-1, 407-2, 407-3 mounted on the semispherical framework 403, operably connected to the onboard controls and the solar-charged control and communications unit 425, and having rubber drive gears or bearing wheels 407C-1, 407C-2 and 407C-3 configured for engaging the outer surface of the transport ball 101 as the motors and bearing gears/wheels rotate driving the transport ball into controlled motion in accordance with user-operator controls provided through the controller 424; and (iv) a transport ball retention ring structure 105 that is threaded on matching threads formed on the end of the bearing pad mounting ring structure 104.

Specification of Powered Trailer Jack and Transport System Provided with Drive Motor Protective Housing Covers Adapted for Fitting Over the Rotating Motor Drive Gears FIGS. 18K, 18L, 18M, 18N and 18O show the powered trailer jack and transport system 4 shown in FIG. 18A, provided with drive motor protective housing covers 404 adapted for fitting over the rotating motor drive wheels 407C for user safety protection. These covers may be fabricated from high impact plastic material, casted metal material, rubber materials and any combination of the above. While shown as individual housing covers 404, alternative designs may call for a single housing that covers two or more of the motor drive gears to promote safety. Also, a single cover housing may be fabricated and mounted over the entire powered spherical wheel assembly 40, to cover and shroud the technical machinery (e.g., drive motors 407B and drive wheels 407C) disposed beneath the housing covering, while providing an aesthetically pleasing, if not beautiful, industrial design for the trailer jack and transport system 4 of the present invention.

Specification of a Method of and System for Remotely Controlling Transport and Jacking Functions of a Powered Trailer Jack and Transport System Employing an Outboard Controller Removable and Hand-Supportable within the Hand of an Operator, and Also Controllable by a Mobile Smartphone Running a Suitable Mobile Application (APP)

FIG. 19A shows a person 80 using a mobile phone 427' equipped with a mobile application of the present invention 427AA illustrated in FIGS. 21B through 21E, to control and navigate a trailer 53 equipped with the motorized trailer jack and transport system of the present invention 4', configured to serve and support various applications namely: (i) trailer-vehicle hitching operations illustrated in FIG. 19B, wherein the trailer 53 is transported towards the trailer hitch of a truck or vehicle 9 and then jacked up so the trailer coupler 7 can be placed on the trailer hitch 8; and (ii) trailer parking operations illustrated in FIG. 19C, wherein the trailer 53 equipped with the jack and transport system 4' is transported from a starting position in a parking lot, across the parking lot and into an intended parking space, without the need to physically handle the trailer during the parking operation.

As shown in FIG. 19B, a motor vehicle 9 is provided with a trailer hitch located near a trailer 53 to be hitched to the motor vehicle. The trailer is equipped with a powered trailer jack and transport system of the present invention 4', as shown in FIGS. 19A through 19J, but suitably modified so that the trailer jack and transport system 4' employs an outboard controller 424' that is removable and hand-supportable within an operator's hand for wireless remote control, and which is also controllable by a wirelessly-interfaced mobile smartphone 427' running a suitable mobile application (APP) 427AA and Bluetooth communications 500 to enable remote control operations with the trailer jack and trailer system 4' paired with the mobile phone system 427. The remotely-controlled trailer-vehicle hitching process is shown using the wireless handheld controller 424' in FIG. 22.

As shown in FIG. 19C, using the motorized trailer jack and transport system 4', the user uses her mobile phone 427' and mobile app 427AA to operate the system 46 and navigate the motorized/powered transport of the trailer 53 from its stationary starting position in the parking lot, disconnected from its truck, across the parking lot surface and ultimately into its target parking space using the powered trailer jack and transport system 46 remotely and wirelessly controlled by the mobile app 427AA running on mobile phone 427' in communication with the control and communications system 425' aboard the trailer jack and transport system 4'.

As shown in FIG. 20, the motor-powered trailer jack and transport system 46 in FIG. 19A, comprises: (i) a removable remote controller 424' supporting a directional joystick 424B, jacking controls 424C, controller electronics including processor, firmware and memory 424E', battery storage module 424D, recharging module 424G, and wireless communications 424F; (ii) a releasable electrical connector 425L; (iii) a jack and transport drive subsystem 44 supporting a control and comminutions unit 425' provided with gears 425C, jack motor 425B, and battery module 425D, and control and communications electronics including a processor, firmware and memory 425E', Bluetooth wireless communication module 424F, Wireless Wide Area Networking module 425W, a battery charging unit 425G, a Solar Panel 435S for trickle charging the battery and a position controller 425H, and drive motors 407-1, 407-2 and 407-3; each provided with a motor 407A and drive wheels 407C and provided with a drive motor wiring interface 425J; and (iii) a mobile computing system 427 (e.g. mobile smartphone as shown in FIG. 21A, tablet computer such an Apple® iPad in FIG. 21B, and/or a laptop computer in FIG. 21C) with a touch-screen GUI display and running a mobile app 427AA of the present invention, and equipped with the features and sensors shown in FIG. 21D, including GPS tracking, Bluetooth communications and other communication features.

As shown FIG. 21D, each mobile client system 427 deployed on the system network of the present invention, comprises: a Processor(s) 427L; a Memory Interface 427M; Memory 427N for storing Operating System Instructions 4270, Electronic Messaging Instructions 427T, Communication Instructions 427P, GUI Instructions 427Q, Sensor Processing Instructions 427R, Phone Instructions 427S, Web Browsing Instructions 427U, Media Processing Instructions 427V, GPS/Navigation Instructions 427W, Camera Instructions 427X, Other Software Instructions 427Y, and GUI Adjustment Instructions 427Z; Trailer Jack and Transport App Instructions; 427AA; Peripherals Interface 427K; Touch-Screen Controller; Other Input Controller(s) 427B; Touch Screen 427A; Other Input/Control Devices; I/O Subsystem 427C; Other Sensor(s) 427J; Motion Sensor 427I; Light Sensor 427H; Proximity Sensor 427G; Camera Subsystem 427F; Wireless Communication Subsystem(s) 427E; and Audio Subsystem 427D. Details regarding the mobile computing devices of the present invention 427 can be found in U.S. Pat. No. 8,631,358 incorporated herein by reference.

FIG. 21D shows the system architecture of an exemplary mobile client computing system 427 that is deployed on the system network and supporting the many services offered by system network servers. As shown, the mobile smartphone device 427 can include a memory interface 427M, one or more data processors, image processors and/or central processing units 427L, and a peripherals interface 427K. The memory interface 427M, the one or more processors 427L and/or the peripherals interface 427K can be separate components or can be integrated in one or more integrated circuits. The various components in the mobile device can be coupled by one or more communication buses or signal lines. Sensors, devices, and subsystems can be coupled to the peripherals interface 427K to facilitate multiple functionalities. For example, a motion sensor 427I, a light sensor 427H and a proximity sensor 427G can be coupled to the peripherals interface 427K to facilitate the orientation, lighting, and proximity functions. Other sensors 427J can also be connected to the peripherals interface 427K such as a positioning system (e.g., GPS receiver), a temperature sensor, a biometric sensor, a gyroscope, or other sensing device, to facilitate related functionalities. A camera subsystem 427F and an optical sensor 427J, e.g., a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 427E, which can include radio frequency receivers and transmitters and/or optical (e.g., infrared) receivers and transmitters. The specific design and implementation of the communication subsystem 427E can depend on the communication network(s) over which the mobile device is intended to operate. For example, the mobile device 427 may include communication subsystems designed to operate over a GSM network, a GPRS network, an EDGE network, a Wi-Fi or WiMax network, and a Bluetooth™ network. In particular, the wireless communication subsystems 427E may include hosting protocols such that the device 427 may be configured as a base station for other wireless devices. An audio subsystem 427D can be coupled to a speaker and a microphone to facilitate voice-enabled functions, such as voice recognition, voice replication, digital recording, and telephony functions. The I/O subsystem 427C can include a touch screen controller and/or other input controller(s). The touch-screen controller can be coupled to a touch screen 246. The touch screen 427A and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 427A. The other input controller(s) 427B can be coupled to other input/control devices 427B, such as one or more buttons, rocker switches, thumb wheel, infrared port, USB port, and/or a pointer device such as a stylus. The one or more buttons (not shown) can include an up/down button for volume control of the speaker and/or the microphone. Such buttons and controls can be implemented as hardware objects, or touch-screen graphical interface objects, touched and controlled by the system user. Additional features of mobile smartphone device 427 can be found in U.S. Pat. No. 8,631,358 incorporated herein by reference in its entirety.

Specification of Method of Using Hand-Supportable Remote Controller to Remotely Control the Jack and Transport Movement Operations of the System Via a Wireless Communication Protocol FIG. 22 shows the use of the hand-supportable remote controller 424' removed from the powered trailer jack and transport system 4' mounted to a trailer 53 and being used to remotely control the jack and transport movement operations of the system, when transporting and/or hitching the trailer 5 to a motor vehicle 9 or the like.

FIG. 23 describes the method of remotely-controlling the powered trailer jack and transport system 4' in FIG. 21 mounted to a trailer 5, using a removable wireless controller 424' as illustrated in FIG. 22.

As shown in FIG. 23, Block A indicates the user starts, and progresses to Block B and powers on the handheld wireless controller 424'.

At Block C, the wireless remote controller 424' powers on the control and communications unit 425'

At Block D, the user unlocks the wireless hand-held controller 424' from the trailer jack and transport system 4.

At Block E, the user controls the powered transport system 4' with the joystick of the wireless handheld controller 424'.

At Block F, the user controls the powered jacking (raising and lowering) with the jacking toggle switch 424C of the wireless handheld controller 424'.

At Block G, the control signals are communicated from the handheld controller 424' to the control and communications unit 425' via Bluetooth wireless communications 500.

At Block H, the CCU microcontroller 425E' determines whether or not it has received an input signal from the joystick directional controller 424B.

At Block I, the wireless CCU microprocessor 425E' receives input from joystick directional controller.

At Block J, the wireless CCU microprocessor 425E' processes directional information from joystick directional controller 424B.

At Block K, the wireless CCU microprocessor 425E' sends rotational speed information and power to drive the kiwi electric motors 407 via the position controller 425H.

At Block L, the drive motors 407 power rotational motion through interaction of drive rotors 407C-1, 407C-2, and 407C-3 with the surface of spherical wheel (i.e., transport ball) 101 to enable transport of the system under the control of the user operator.

At Block M, the CCU microcontroller 425E' determines whether or not there is any input signal received from the jacking control toggle switch 424C, and if so then proceeds to Block N, and if not, then proceeds to Block R.

At Block N, the wireless CCU microprocessor 425E' receives input from jacking control toggle switch 424C.

At Block O, the wireless CCU microprocessor 425E' processes directional information from jacking control toggle switch 424C.

At Block P, the wireless CCU microprocessor 425E' sends rotational direction information to jack motor 425B.

At Block Q, the jack motor 425B raises or lowers the inner jacking post member 121 through interaction of the gears with the telescoping spherical outer shaft 422 and then the control flow returns to back to Block H.

At Block M, after the CCU microprocessor 425E' determines there is no input signal from the jacking control toggle switch 424C, then at Block R the powered trailer jack transport system 4' remains stationary.

As Block S, the CCU microprocessor 425E' determines whether or not power has been on, without control signals being received by the wireless CCU, for more than a predefined time period, and if so, then the system control progresses to Block T, where the battery powered subsystems of the trailer jack and transport system 4' are automatically turned off to conserve electrical power, and if not, then system control returns to Block H, as shown.

Specification of Method of Using Mobile Smart Phone Running a Suitable Mobile Application to Remotely Control the Jack and Transport Movement Operations of the System Via a Wireless Communication Protocol FIG. 24 shows the use of the mobile smart phone 427' running a suitable mobile application 427AA being used to remotely control the jack and transport movement operations of the system 4' via a wireless communication protocol (e.g., Bluetooth Wireless) 500, when transporting and/or hitching the trailer 5 to a motor vehicle or the like.

FIG. 25 describes the primary steps involved in the method of remotely controlling the powered trailer jack and transport system 4' of FIG. 19A mounted to a trailer 53, using a mobile smart phone system 427' running a suitable mobile application 427AA according to the principles of the present invention.

As shown in FIG. 24, Block A indicates the user starts, and progresses to Block B ad powers on the handheld controller 424.

At Block C, the controller powers on the control and communications unit (CCU) 425.

At Block D, the user powers on mobile phone and opens trailer jack and transport system app 427AA.

At Block F, the user controls the powered jack and transport system 4' with arrow buttons on the mobile phone app 427AA "move" GUI screen.

At Block G, the user controls the powered jacking (raising and lowering) operations of the system with the jacking toggle switch 424C provided the wireless handheld controller 424'.

At Block H, the control signals are communicated from the handheld controller 424' to the control and communications unit (CCU) 425' via Bluetooth wireless communication or like protocols.

At Block I, the CCU microcontroller 425E' determines whether or not it has received an input signal from the mobile phone "Move" GUI screen; if so, then the control flow proceeds to Block J, and if not, then the control flow proceeds to Block N.

At Block J, the wireless CCU microprocessor receives input from the mobile phone "Move" GUI screen.

At Block K, the wireless CCU microprocessor process directional information from the mobile phone "Move" GUI screen.

At Block L, the wireless CCU microprocessor sends rotational speed information and power to drive the kiwi electric motors 407-1, 407-2 and 407-3.

At Block M, the drive motors power rotational motion through interaction of drive rotors 407C with the surface of the spherical wheel to enable transport of the system under the control of the user operator.

At Block N, the CCU microcontroller 425E' determines whether or not there is any input signal received from the mobile phone app "Lift" GUI screen, and if so then proceeds to Block O, and if not, then proceeds to Block S.

At Block O, the wireless CCU microprocessor 425E' receives input from the mobile phone "Lift" GUI screen.

At Block P, the wireless CCU microprocessor 425E' processes directional information from the mobile phone "Lift" GUI screen.

At Block Q, the wireless CCU microprocessor 425E' sends rotational direction information to jack motor 425B.

At Block R, the jack motor raises or lowers the inner jacking post member 121 through interaction of the gears 425C with the inner jacking post, and then the control flow returns to back to Block I.

At Block S, after the CCU microprocessor determines there is no input signal from the mobile phone "Move" or "Lift" GUI screens of the mobile app 427AA, then at Block S the powered trailer jack transport system remains stationary.

As Block T, the CCU microprocessor 425E' determines whether or not power has been on, without control signals being received by the wireless CCU, for more than a predefined time period, and if so, then the system control progresses to Block U, where the battery powered subsystems of the trailer jack and transport system 4' are automatically turned off to conserve electrical power, and if not, then system control returns to Block H, as shown in FIG. 25.

Specification of an Automated Method of and System for Hitching a Trailer to a Motor Vehicle Using an Automated Trailer Jack and Transport System Employing an Intelligent GPS-Tracked and IR-Ranging Controller on the Trailer and a GPS-Tracked and IR-Ranging Module about the Trailer Hitch on the Motor Vehicle, During Wireless and Automated Transport, Docking and Hitching Operations FIG. 26A shows a motor vehicle 9 provided with a trailer hitch 8 located near a trailer 53 to be hitched to the motor vehicle 9 via its coupler 7. As shown, the trailer 53 is equipped with a powered trailer jack and transport system 4" of the present invention as shown in FIGS. 19A through 19J, but suitably modified so that this alternative trailer jack and transport system employs an intelligent GPS-tracked, IR-ranging, WWAN-connected wireless control and communications unit 425" and a GPS-tracked and IR-Ranging module 428 which mounts about the trailer hitch 8 on the motor vehicle 9, that communicate in a wireless manner and support automated transport, docking and hitching operations, without user involvement after the user inputs an automated docking request to the wireless outboard controller 424', or to a suitable mobile application running on a smartphone 427' operated by the user.

FIG. 26B shows the motor vehicle shown in FIG. 26, showing the GPS-tracking and IR ranging module 428 mounted about the trailer hitch 8, receiving GPS signals and IR ranging signals, and communicating with the trailer jack and transport system 4" during the automated docking and hitching process of the present invention.

FIG. 26C illustrates a method of mounting the GPS-tracking and IR ranging hitch finding module (HFM) 428 about the trailer hitch (namely the ball thereof) 8 mounted on the rear end of the motor vehicle 9 in the system of FIG. 26, intended to hitch to a trailer 53 equipped with the trailer jack and transport system 4".

FIG. 26D shows the GPS-tracking and IR ranging hitch finding module (HFM) 428 showing its centrally positioned mounting aperture, through which the shank of a trailer hitch ball is allowed to pass and then secured by a suitable nut.

FIGS. 26E and 26F show the GPS-tracking and IR ranging hitch finding module (HFM) 428 with its left and right spaced apart IR transceiver diodes 425I-1 and 425I-2 spaced apart and allowing left and right channel IR signals to be received/transmitted through the IR light transmission window 428K formed in the compact device housing.

FIG. 26G shows the trailer jack and transport system 4' and the hitch finding module 428 in wireless communication with each other during its automated hitch finding, tracking and docking operations. As shown, two channels of line-of-sight IR signal communications are established for unobstructed wireless communication during system operation. This allows the controller 425" aboard the trailer jack and transport system 4" to acquire (i) left and right channel distance information (L1 and L2) from the IR signal channels, and (ii) GPS coordinate information from the GPS-hitch module 428 via Bluetooth wireless communication link 500. Using this acquired information from the hitch module 428, the control and communications unit 425" aboard the trailer jack and transport system 4" can automatically generate drive control signals that are used to drive motors and accurately navigate the trailer towards the trailer hitch, using a hitch-finding algorithm running within the processor 425E" aboard the trailer jack and transport system.

As shown in FIG. 27, the automated motor-powered trailer jack and transport system 47 of FIG. 26, interfaced with a cloud-computing environment and wireless data communication infrastructure 430, and comprise: (i) a controller module 424' mounted upon the end of the jacking post member 422 and supporting a directional joystick, jacking controls and automated finding, docking and hitching mode button, and controller electronics, battery storage module, and wireless communications; (ii) an electrical connector 425L; and (iii) a jack and transport drive subsystem 44 supporting a control and comminutions unit provided with gears, jack motor, and battery module, and control and communications electronics including a processor, firmware and memory 425E", an IR finding transceiver 425I, a battery charging unit 425G, a position controller 425H, WWAN communication 425W, local Bluetooth wireless communication 424F, GPS receiver 425M and solar charging panel 425S

FIG. 28 describes a method of automated docking and hitching of a trailer 53 to a trailer hitch 8 on a motor vehicle 9, using an automated electrically-powered, GPS- and IR-ranging-equipped trailer jack and transport system 4" of FIGS. 26 and 27 and operated with the removable wireless handheld controller 424' according to the principles of the present invention, as illustrated in FIG. 27.

As shown in FIG. 28, Block A indicates the user starts, and progresses to Block B ad powers on the wireless handheld controller 424'.

At Block C, the wireless handheld controller 424' powers on the control and communications unit (CCU) 425" provided with a programmed processor and memory controlling most operations within the system.

At Block D, the user unlocks the wireless handheld controller 424' from the trailer jack and transport system 4'.

At Block E, the user powers on the wireless hitch LIDAR finding and GPS positioning unit 428.

At Block F, the wireless hitch LIDAR finding and GPS positioning module 428 receives GPS positioning signals from the GNSS satellites 428G, and local RTK station 428I to provide position correction signals to enable more precise positioning at the module 428 and controller 425"

At Block G, the user presses and holds the "automatic find and hitch" button on the wireless handheld controller 424'.

At Block H, the control signals are communicated from the handheld controller 424' to the control and communications unit 425" via Bluetooth wireless communication or like protocols.

At Block I, the CCU microcontroller 425E" determines whether or not a "hitch finding" signal is being received by the wireless CCU microprocessor, from the wireless hitch finding module 428 mounted on the motor vehicle participating in the local hitching process; if so, then the control flow proceeds to Block J, and if not, then the control flow proceeds to Block T, as shown in FIG. 28.

At Block J, the wireless CCU microprocessor receives relational positioning input from the wireless hitch finder GPS positioning module 428.

At Block K, the CCU microprocessor receive GPS signals from the GNSS satellite system 428G and RTK station 428I.

At Block L, the wireless CCU microprocessor processes relational positioning input, GPS and RTK signals, so as to determine direction of travel required to properly position the transport system relative to the hitch finder module 428.

At Block M, the wireless CCU microprocessor send rotational speed information and power to drive motors 407-1, 407-2 and 407-3.

At Block N, the drive motors power motion through interaction of drive rotors 407C-1, 407C-2, and 407C-3 with spherical wheel surface to enable transport of the system under the control of the user operator.

At Block O, the CCU microprocessor determines whether or not the trailer jack transport system has reached its final destination as determined by GPS positioning signals, and if no, then the control flow returns to Block I, and if so, then the control process proceeds to Block P.

At Block P, the CCU microprocessor stops delivery of electrical power to the drive motors 407-1, 407-2 and 407-3 so as to bring the trailer jack and transport system 4" to a stop.

At Block Q, the CCU microprocessor sends signal to jack motor 425B to lower trailer 53 by retracting the load-bearing spherical wheel assembly 40.

At Block R, the jack motor 425B retracts the spherical wheel shaft by rotating the gears which are in mechanical communication with the telescoping jack shafts 121, 422.

At Block S, the CCU microprocessor determines whether or not the docking switch has been activated so as to signal successful hitching operations, and if so, the process proceeds to Block T, and if not, then returns the control flow to Block Q, as shown in FIG. 28.

At Block T in FIG. 28, the CCU microprocessor 425E" ends (i.e., terminates) the automated transport process and sends wireless CCU alerts to user to signal end of the process with audible indication, and then powers down the battery-powered subsystem 44 to conserve electrical battery power.

FIG. 29 describes a method of automated docking and hitching of a trailer 53 to a trailer hitch 8 on a motor vehicle 9, using an automated, electrically-powered, GPS- and IR-ranging-equipped trailer jack and transport system 4" of FIGS. 26 and 27 and operated with a mobile phone 427' running an appropriate mobile app 427AA according to the principles of the present invention, as illustrated in FIG. 27.

As shown in FIG. 29, Block A of the method indicates that the user starts and progresses to Block B and powers on the handheld controller 424'.

At Block C, the wireless handheld controller 424' powers on the control and communications unit (CCU) 425".

At Block D, the user powers on mobile phone 427', opens trailer jack and transport system app 427AA, and pairs wireless Bluetooth communication 500 with the wireless CCU 425".

At Block E, the user powers on the wireless IR and GPS positioning hitch finding module 428.

At Block F, the wireless hitch IR finding and GPS positioning module 428 receives GPS positioning signals from the GNSS satellites (and local RTK station for more precise positioning), while IR signals are communicated between the CCU of the trailer jack and transport and the GPS hitch finding module 428.

At Block G, the user presses and holds the "automatic find and hitch" button on the mobile phone app 427AA.

At Block H, the control signals are communicated from mobile phone 427' to the control and communications unit (CCU) via Bluetooth wireless communication or like protocols.

At Block I, the CCU 425" determines whether or not a "hitch finding" signal is being received by the wireless CCU microprocessor 425E", from the wireless hitch finding module 428 mounted on the motor vehicle 9 participating in the local hitching process; if so, then the control flow proceeds to Block J, and if not, then the control flow proceeds to Block T, as shown in FIG. 29.

At Block J, the wireless CCU microprocessor receives relational positioning input from the wireless hitch finder GPS positioning module 428.

At Block K, the CCU microprocessor receive GPS signals from the GNSS satellite system 428G and RTK station 428I.

At Block L, the wireless CCU microprocessor processes relational positioning input, GPS and RTK signals, so as to determine direction of travel required to properly position the transport system relative to the hitch finder module 428.

At Block M, the wireless CCU microprocessor 425E' sends rotational speed information and power to drive motors 407-1, 407-2 and 407-3.

At Block N, the drive motors power motion through interaction of drive rotors 407C-1, 407C-2, and 407C-3 with the surface of spherical wheel (i.e., transport ball) 101 to enable transport of the trailer jack and transport system 4" under the control of the user operator.

At Block O, the CCU microprocessor determines whether or not the trailer jack transport system 4' has reached its final destination as determined by GPS positioning signals and local IR ranging signals 428F, and if not, then the control flow returns to Block I, and if so, then the control process proceeds to Block P.

At Block P, the CCU microprocessor stops delivery of electrical power to the drive motors 407-1, 407-2 and 407-3 so as to bring the trailer jack and transport system 4" to a stop.

At Block Q, the CCU microprocessor sends signal to jack 425B to lower trailer 53 by retracting the jack post member 121 within 422, and thus raise the load-bearing spherical (transport ball) wheel assembly 40.

At Block R, the jack motor 425B retracts the spherical wheel shaft by rotating the gears which are in mechanical communication with the telescoping spherical wheel shaft (i.e., inner jacking post member) 121.

At Block S, the CCU microprocessor 425E" determines whether or not the docking switch 428D on the module 428 has been activated so as to signal successful hitching operations, and if so, then proceeds to Block T, and if not, then returns the control flow to Block Q, as shown in FIG. 29.

At Block T in FIG. 29, the CCU microprocessor 425E" ends (i.e., terminates) the automated transport process, and sends wireless CCU alerts to user to signal end of the process with audible indication, and a message on the mobile phone 427' and then powers down the battery-powered subsystem 44 to conserve electrical battery power. Specification of a Method of and System for Jacking and Transporting a Trailer Employing an Intelligent GPS-Tracked Trailer Jack and Transport System Remotely Controllable Using a Mobile Computing System Running a Mobile Application of the Present Invention FIG. 30A shows a person standing in a marina parking lot near a parked vehicle and boat trailer 53 equipped with the intelligent GPS-tracking motorized trailer jack and transport system 4''', that is remotely-controllable using a mobile computing system, such as a smartphone 427' running a special mobile application 427AA, and operational in a programmable mode of operation including an automated trailer parking method illustrated in FIG. 38.

As shown in FIG. 30A, the trailer 53 is equipped with a GPS-tracking motorized trailer jack and transport system 4''' having a GPS-tracking trailer module (i.e. navigator beacon) 440 mounted on the rear of the trailer and in wireless (Bluetooth) communication 500 with the GPS-tracking motorized trailer jack and transport system 4''' mounted on the front of the trailer 53 creating a navigation axis 444 to enable automatic transport from a starting position in a parking lot, across the parking lot and into an intended parking space.

Also, the GPS-coordinates of the trailer's boundaries, destination parking space and keep out zones are captured prior to automated parking operations so as to enable automated GPS-guided transport of the trailer 53 from a starting position in a parking lot, across the parking lot, and into an intended destination parking space using GPS-tracking and navigation methods without the need to physically handle the trailer during the parking operation.

FIG. 30B illustrates the automated trailer jack and transport system 4''' when configured and working in cooperation with a GPS-tracking and LIDAR-mapping navigator beacon module 440 mounted to the rear of the trailer 53. As configured, these systems 4''' and 440 establish and maintain a virtual trailer navigation axis 444, passing through the central axis of the trailer. About this virtual trailer navigation axis 444, the spatial boundaries of the trailer are predefined and managed within local databases 425E''' and cloud-based servers 430, for use when parking the trailer into a destination parking space while avoiding collisions in cooperation with the GPS-tracking and LIDAR-mapping navigator beacon module 440 mounted at the rear of trailer 53 to detect and prevent collisions with obstacles that may be presented along the trailer parking pathway computed by the system network.

FIG. 30C shows in more detail the GPS and LIDAR-mapping navigator beacon 440 used to create the virtual axis 444 when in communication and working in cooperation with the trailer jack and transport system 4''' as part of the system 48 as described in FIG. 30A.

FIG. 31 shows the automated motor-powered trailer jack and transport system 4''' of FIGS. 30A through 30C, interfaced with a cloud-computing environment and wireless data communication infrastructure 430 and further comprising: (i) a wireless controller module 424' mounted upon the end of the jacking post member and supporting a directional joystick 424B, jacking controls 424C and automated finding, docking and hitching mode button, and controller electronics including a processor, firmware and memory 424E', battery storage module 424D, battery charging circuit 424G and wireless communications 424F; (ii) a releasable electrical connector 425L; (iii) a jack and transport drive subsystem 44 supporting a control and communications unit (CCU) 425''' provided with gears 425C, jack motor 425B, and battery module 425D, battery recharging module 425G, solar panel 425S, and control and communications electronics including a processor, firmware, and memory (supporting all functions of the system) 425E''', a dual-channel IR hitch finding module 425I, and a position controller 425H, GPS signal receiver 425M with antenna for receiving and processing GPS positioning signals, WWAN module 425W, Bluetooth module 425F, and drive motors 407-1, 407-2, 407-3 and a drive motor wiring interface 425J; (iv) a GPS navigator beacon 440 for mounting on the rear of the trailer provided with a GPS receiver 425M and antenna, a Bluetooth communication module 424F, a processor, firmware and memory 440C, and LIDAR ToF range finder 440D with 180 degree FOV; and (v) cloud computing and wireless data communication infrastructure 430 having communication, application and database servers.

FIG. 32 illustrates a method of automatic parking of a registered trailer (i.e. its GPS-coordinate-based virtual axis and boundary have been captured as described in FIGS. 34A, 34B and 35) that is equipped with the automated trailer jack and transport system 4''' and GPS navigator beacon 440, showing the trailer's navigation vector at different stages along a projected pathway of travel towards the destination parking space.

FIG. 33 describes the primary steps carried out during the practice of the method of automatic parking of a registered trailer 53 equipped with the automated trailer jack and transport system of the present invention 4''' controlled within the cloud-based computing and communications infrastructure 430 of system 48.

As indicated at Block A, the user starts by progressing to Block B and user powers on wireless handheld controller of the registered automated trailer jack and transport system 4'''

At Block C, wireless handheld controller powers on wireless control and communications unit (CCU).

At Block D, the user powers on mobile phone 427', opens trailer jack transport system app 427AA, and pairs Bluetooth comm with the wireless CCU 425".

At Block E, the user powers on the GPS navigator beacon 440, and at Block F, the GPS navigator beacon receives GPS signals and communicates position information to CCU.

At Block G, the user selects the "park" button in the mobile phone app 427AA.

At Block H, control signals are communicated from the mobile phone 427' to the wireless control and communications unit (CCU) 425''' via Bluetooth wireless communications 500.

At Block I, the CCU 425''' determines whether or not the position of the automated trailer jack and transport system and navigator beacon is known to the cloud server and mobile app, and if not, then the control returns to the start Block A and if so, the proceeds to Block J.

At Block J, the CCU 425''' determines whether or not the path between the trailer and target parking space is visually clear of obstacles, and if not, returns to Block I, and if so, then proceeds to Block K.

At Block K, the user executes the "park" command in the automated trailer jack and transport system mobile phone app.

At Block L, the mobile phone 427' communicates park command to the wireless CCU via Bluetooth communications.

At Block M, the wireless control and communications unit (CCU) microprocessor 425E''' processes park command, GPS signals, relative position of navigator beacon 440, beacon LIDAR signals, trailer boundary, parking space boundary and keep-out (i.e., obstacle) zone boundaries.

At Block N, the wireless CCU 425''' determines direction of travel required to transport the trailer system 4''' to the selected parking space At Block O, the CCU 425' determines whether or not the path as determined by the CCU and the navigator beacon LIDAR is clear of obstacles, and if not, the returns to Block J, and if so, then proceeds to Block P.

At Block P, the wireless CCU microprocessor 425E''' sends rotational speed information and power to drive motors 407-01, 407-2, 407-3.

At Block Q, the drive motors 407-01, 407-2, 407-3 power motion through interaction of drive rotors with the surface of spherical wheel (i.e., transport ball 101) to enable transport of the system 4''' under the control of the GPS-assisted control system.

At Block R, the wireless CCU 425''' processes GPS position with the GPS position of the navigator beacon 440 to determine and maintain direction of intended travel.

At Block S, the CCU 425''' determines whether or not the intended travel path is clear of intersections between the trailer boundary and keep out boundaries as determined by the CCU, and if so, the proceeds to Block T, and if not advances to Block V.

At Block T, the CCU 425''' determines whether or not the travel path is clear of clear of obstacles as determined by the LIDAR range finder in module 440, and if yes, then proceeds to Block U, and if not, then proceeds to Block V.

At Block U, the CCU 425''' determines whether or not the GPS coordinates of the trailer boundary is positioned within the set of GPS coordinates of the parking space boundary as determined by the CCU 425''' and the cloud-computing system 430, and if not then returns to Block P, and if yes, then proceeds to Block V.

At Block V, the CCU 425''' terminates the automated transport process and generates wireless CCU alerts to user to indicate the end of process with an audible indicator and mobile phone app message.

Specification of the Method of Registering of GPS Coordinate Maps of a Trailer Equipped with the Automated Trailer Jack and Transport System, Destination Parking Spaces, and Keep Out (i.e., Obstacle) Zones, for Storage in a Network Database System on a Cloud-Based System Network FIG. 34A illustrates the process of registering GPS coordinate maps of (i) the trailer 53 equipped with the automated trailer jack and transport system 4''' of the present invention and navigator beacon 440 and (ii) a destination parking space 91 associated with automated parking of so-equipped trailer 53.

FIG. 34B illustrates the process of registering GPS coordinate maps of keep out (i.e., obstacle) zones (e.g., motorcycles, picnic table) associated with automated parking of a trailer 53 equipped with the automated trailer jack and transport system 4''' of the present invention.

FIG. 35 describes a method of registering of GPS coordinate maps of several system network components, namely: (i) a trailer 53 equipped with the automated trailer jack and transport system 4''' illustrated in FIG. 32; (ii) destination parking spaces 91 as illustrated in FIG. 34A; and (iii) keep out (i.e., obstacle) zones 443 as illustrated in FIG. 34B. Once captured, these GPS coordinate maps are stored in a database system maintained on the cloud-based system network.

As shown in FIG. 35, at Block A, the user starts the process and proceeds to Block B, and powers on the wireless control and communications unit (CCU) 425''' of the automated trailer jack and transport system 4'''.

At Block C, the user powers on mobile phone 427', opens trailer jack transport system app 427AA and pairs Bluetooth comm 500 with the CCU 425'''.

At Block D, the mobile phone 427' and the CCU 425''' establishes a connection to the cloud-based server via wireless wide area network.

At Block E, the wireless CCU 425''' and the mobile phone 427' each receive positioning data from the GNSS satellite system 428G and RTK station 428I

At Block F, the user powers on GPS navigator beacon 440 which receives positioning data and communicates the same to the CCU via its established Bluetooth wireless communication link 500.

At Block G, the user enables "register trailer GPS boundary" function of the mobile app 427AA.

At Block H, the system determines whether or not the position of the automated trailer jack and transport system 4''' and navigator beacon 440 is known to the cloud server 430 and mobile app 427AA, and if not, returns to Block B, and if so, then advances to Block I.

At Block I, the user is prompted by images within the mobile app 427AA to place the phone in a geospatial location relative to the trailer 53.

At Block J, the user selects "store point."

At Block K, the mobile app communicates stored position to the cloud via the mobile phone WWAN 425W.

At Block L, cloud-based server 430 stores position information as a point of the boundary.

At Block M, the cloud server 430 determines whether or not the minimum number of points have been captured to produce the property boundary.

At Block N, the user selects "generate trailer boundary" command and function supported by the system.

At Block O, the cloud server 430 processes the command, generates and stores the GPS coordinate boundary data 441 with respect to automated trailer jack and transport system 4′″ and navigator beacon 440.

At Block P, the cloud server 430 sends boundary data 441 to automated trailer jack and transport system 4′″ for local storage.

At Block Q, the user enables "register parking space GPS boundary" function of the mobile app 427AA.

At Block R, the user is prompted by the mobile app to place the mobile phone 427′ in a geospatial location relative to the target space among parking spaces 91.

At Block S, the user selects "store point."

At Block T, the mobile app 427AA communicates stored position to the cloud server 430 via the mobile phone WWAN 425W.

At Block U, the cloud-based server 430 stores position information as a point (e.g., GPS coordinate data) along the parking space boundary.

At Block V, the cloud server determines whether or not the minimum number of points have been captured to produce the parking boundary.

At Block W, the user selects "generate parking space boundary" and names the space for later recall.

At Block X, cloud server processes the command, generates and stores the boundary 442.

At Block Y, the cloud server 430 sends GPS-specified boundary data 442 to automated jack and transport system 4′″ for local storage.

At block A, the user enables "keep out zone GPS boundary" function of the mobile app 427AA.

At Block AA, the user is prompted by the mobile app 427AA to place the mobile phone 427′ in a geospatial location relative to the keep out zone.

At Block BB, the user selects "store point."

At Block CC, the mobile app 427AA communicates stored position to the cloud server 430 via the mobile phone WWAN 425W.

At Block DD, the cloud server 430 determines whether or not the minimum number of points have been captured to produce the keep-out (i.e., obstacle) boundary or space.

At Block EE, the user selects "generate keep out boundary" and names the space for later recall.

At Block FF, the cloud server 430 processes the command, generates and stores the GPS coordinate boundary data 443 set to specify the keep-out (i.e., obstacle) space; and then sends the same to the CCU 425′″ for local storage aboard the trailer jack and transport system 4′″

Specification of Method of Training an Automated Trailer Jack and Transport System During a Learning Mode Supported by the System for Subsequent Use in Automated Trailer Parking Operations Referring now to FIGS. 36 through 39, a method will now be described for training the cloud-based trailer jack and transport system 4′″ in FIGS. 30A through 31 (System 48), while configured in an automated learning mode so as to automatically capture and store the GPS coordinates of a trailer 53 and parking locations 442 where the trailer 5 has been parked by a human driver during training operations, as illustrated in FIG. 36. The method involves using cloud-based servers 430 and/or local memory of an automated trailer jack and transport system 4′″. Subsequently, when operating the trailer jack and transport system 4′″ in its automated parking mode illustrated in FIG. 38 and taught in FIG. 39, the captured GPS coordinates stored in the cloud-based server system 430 are then used by motorized trailer jack and transport system 4′″ to automatically guide and transport the trailer 53 safely to its intended parking location without the use of a human driver, as illustrated in FIG. 38.

The details of this alternative method and mode of system operation will be described in great technical detail below.

FIG. 36 illustrates the method of training the automated trailer jack and transport system 53 in FIG. 30A during the learning mode supported by the system, for subsequent use in automated trailer parking operations illustrated in FIG. 38. As illustrated in FIG. 36, training of the system starts when the trailer 53 located at a trailer home position at time T1, while the trailer is being towed by a motor vehicle 9 along a pathway to a trailer finish position at time Tx at some later time period. As illustrated, the cloud-based system 48 comprises the RTK base station 428i, GNSS satellite system 428G, mobile computing system 427, trailer jack and transport drive subsystem 44, and other system components configured as shown in FIG. 31. When operating together, the system 48 is capable of capturing the GPS position of the trailer equipped with system 4′″, the tow vehicle 9, and parking spaces 91 down to centimeter resolution.

FIG. 37 describes the method of training the system 48 to capture and store the GPS coordinates of a home position (i.e., trailer start position) and points along an associated entrance path of the trailer 53 equipped with the automated trailer jack and transport system 48, all the way towards the trailer finish position at some time later.

As shown in FIG. 37, the user starts at Block A, and proceeds to Block B.

At Block B, the user hitches a trailer 53 equipped with automated trailer jack and transport system 4′″ to tow vehicle 9 and rotates the jack and transport system 4′″ into its storage mode.

At Block C, the user positions the trailer equipped with automated trailer jack and transport system 4′″ into a desired parking location with tow vehicle and powers on the wireless control and communications unit (CCU) 425′″.

At Block D, the user selects "set parking space" in the automated trailer jack and transport system mobile app 427AA.

At Block E, the mobile phone 427′ communicates command via Bluetooth wireless communication 500 to the control and communications unit 425′″ and further to navigator beacon 440.

At Block F, the wireless CCU 425′″ processes GPS and RTK positioning signals of the CCU itself and the navigator beacon 440 and stores the same in non-volatile memory with a logical address as well as in the cloud servers 430.

At Block G, the mobile app 427AA prompts user to select "generate parking path".

At Block H, the user tows trailer 53 forward with tow vehicle 9.

At Block I, the wireless control and communications unit (CCU) 425′″ continually processes GPS and RTK positioning signals of the CCU and navigator beacon and stores positioning information in non-volatile memory 425E′″ in the CCU and the cloud servers 430, with logical addresses.

At Block J, the driver of tow vehicle 9 determines whether or not the trailer 53 completely clear of its home parking position and every obstacle in its egress path.

At Block K, the user brings tow vehicle 9 and trailer 53 to a stop.

At Block L, user selects "done" in the mobile app.

At Block M, the mobile app and cloud server store the positional information of the parking space and associated parking path and prompts user to name the sequence.

At Block N, the user names the sequence for later retrieval.

At Block O, the store function is complete; and battery-powered assemblies of the automated trailer jack and transport system 4' are powered down.

By virtue of the method of the present invention, it is now possible for the system to automatically learn, capture and store/remember the GPS coordinates of a trailer's parking path, including a parking boundary 442 and the opposite end of the path at T (x), and other parking locations where the trailer 53 may be parked by a human driver. These GPS coordinates specifying the geometrical boundaries of each spatial region where the trailer 53 can or may be stored along its journey, can be stored in cloud-based servers 430, and/or local memory of an automated trailer jack and transport system 4'''. Subsequently, when operating in an automated parking mode, these GPS-specified trailer parking boundary coordinates stored on cloud servers 430 or locally can be quickly accessed and used by the cloud system 430 and/or transport system 4''' to automatically guide and transport the trailer 53, via transport system 4''', safely to its intended registered parking location 442 without the use of a human driver, thereby advancing the state of the art in cloud-based trailer parking automation.

Specification of Method of Automatic Parking of Trailer Equipped with the Automated Cloud-Based Trailer Jack and Transport System of the Present Invention and a Registered Parking Path FIG. 38 illustrates an automated method of and system 48 for parking of trailer 53 equipped with the automated cloud-based trailer jack and transport system 4''' of system 48 with a registered (stored) parking path as described in FIGS. 37 and 38.

FIG. 39 describes the method of automatic parking of trailer 53 of the automated trailer jack and transport system 48 illustrated in FIG. 38.

As shown in FIG. 39, at Block A, the user starts and proceeds to Block B.

At Block B, the user rotates automated trailer jack and transport system 4''' from its storage mode/configuration, into its transport mode so there is contact between the ground surface and its load-bearing transport ball 101, and is capable of rolling freely under motor control.

At Block C, the user decouples trailer and automated trailer jack and transport system 4''' from tow vehicle 9 and powers on control and communications unit (CCU) 425''.

At Block D, the user presses "park" button in the trailer jack and transport system mobile phone app 427AA.

At Block E, the mobile phone app 427AA prompts user to confirm the parking path is clear of obstacles before permitting further operation.

At Block F, the mobile phone app 427AA offers available stored parking spaces based on GPS positioning information of the automated trailer jack and transport system 4''' and stored location information.

At Block G, the mobile phone 427' communicates park command via Bluetooth wireless communication 500.

At Block H, the wireless control and communications unit (CCU) 425''' processes park command and determines direction of travel required to properly transport the trailer 53 to its parking space 442.

At Block I, the wireless CCU microprocessor 425E''' sends rotational speed information and power to drive motors.

At Block J, the drive motors 407-1, 407-2 and 407-3 power motion through interaction of drive rotors with the surface of the spherical wheel 101 to enable transport of the system 4''' under the control of the cloud-based automated trailer parking system 48.

At Block K, system cloud servers 430 automatically monitor and determines whether or not the trailer has reached its parked position in the selected parking space.

At Block L, to terminate the automated transport process, wireless CCU 425''' alerts user about the end of process with an audible indicator and generating a mobile phone app message, and driving the battery-powered sub-systems 44 to their power saving mode.

By virtue of the method of the present invention, it is now possible for a person to use a cloud-based trailer jack and transport system 4''' to automatically learn, capture and store the GPS coordinates of a trailer 53 and parking locations 442 where the trailer has been parked by a human driver using cloud-based servers 430 and/or local memory of an automated trailer jack and transport system 4''', as illustrated in FIG. 36. Subsequently, when operating the trailer jack and transport system 4''' in its automated parking mode, the stored GPS coordinates can be used to automatically guide and transport the trailer 53 safely to its intended parking location without the use of a human driver or a mobile vehicle 9, as illustrated in FIG. 38.

Specification of a Personal Watercraft (PWC) Trailer Equipped with the Trailer Jack and Transport System of the Present Invention FIGS. 40A and 40B show a personal watercraft (PWC) 50 and trailer 5 equipped with the trailer jack and transport system 1 shown and described in FIGS. 2B through 2Q.

FIG. 40C shows a personal watercraft (PWC) and trailer 5 equipped with the trailer jack and transport system 1 shown and described in FIGS. 2B through 2Q, arranged in its transport configuration, and located near a motor vehicle 9 preparing to be hitched to the trailer 5 via its hitch ball.

Specification of a Snowmobile Trailer Equipped with the Trailer Jack and Transport System of the Present Invention FIGS. 41A and 41B show the snowmobile trailer 5 carrying a snowmobile 51 and equipped with the trailer jack and transport system 1, shown arranged in its transport mode, and not hitched to any motor vehicle 9.

By virtue of the large surface area of the transport ball 101 contacting the snow surface, surface pressure can be reduced in such use applications and the reduce the likelihood of the trailer from getting stuck in the snow.

Specification of a Multi-Axle Boat Trailer Equipped with the Trailer Jack and Transport System of the Present Invention FIG. 42A shows a multi-axle boat trailer 53 equipped with the trailer jack and transport system 1 arranged in its transport mode and preparing for hitching up with a motor vehicle 9.

FIG. 42B shows the multi-axle boat trailer 53 equipped with the trailer jack and transport system 1 shown arranged in its transport mode, with the trailer coupler 7 positioned over and lowered onto the trailer hitch 8 of the motor vehicle 9, ready to be fully hitched.

FIG. 42C shows the multi-axle boat trailer 53 equipped with the trailer jack and transport system 1 shown arranged in its storage mode, with the trailer 53 hitched to the motor vehicle 9.

Specification of a Camper Trailer Equipped with the Trailer Jack and Transport System of the Present Invention FIGS. 43A AND 43B show a camper trailer 54 equipped with the trailer jack and transport system 1, arranged in its transport mode, having been positioned after being decoupled from a tow vehicle.

By virtue of the large surface area of the transport ball 101 contacting the dirt campground surface, surface pressure can be reduced in such use applications and the reduce the likelihood of the trailer from getting stuck in the dirt.

Specification of a Flatbed Utility Trailer Equipped with the Trailer Jack and Transport System of the Present Invention Mounted within its A-Frame Structure FIG. 44A shows the flatbed trailer 55 equipped with the trailer jack and transport system 3 arranged in its transport mode, and not hitched to any motor vehicle.

FIG. 44B shows the flatbed trailer 55 equipped with the trailer jack and transport system 3, arranged in its storage mode, shown not hitched to any motor vehicle for illustrative purposes.

Specification of an Industrial Tool with Integrated Trailer Equipped with the Trailer Jack and Transport System of the Present Invention Mounted within its A-Frame FIGS. 45A and 45B show an industrial tool (e.g., a towable generator) 56 equipped with the trailer jack and transport system 3 arranged in its transport and jack mode, shown on a construction site with a heavy gravel ground surface.

By virtue of the large surface area of the transport ball 101 contacting the gravel surface, surface pressure can be reduced in such applications, reducing the likelihood of the trailer jack and transport system of getting stuck.

Specification of First Transportable System Equipped with Load-Bearing Transport Ball Constructions of the Present Invention Mounted within the Corners of the Platform FIG. 46A shows a first transportable system 60 having trapezoidal platform of rigid construction 601, with three corners and built-in grab handles 603-1 and 603-2. Each platform corner has a load-bearing transportation ball construction 10-1, 10-2, 10-3, side-mounted from its side surface, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.).

FIG. 46B shows the first transportable system 60 of FIG. 45A, carrying and transporting a heavy cylindrical beer keg or barrel 62 across a lawn surface. A hinged handle 602 is attached to the platform, for easy pulling of the platform across ground, sandy and lawn surfaces. Apertures 603-1 and 603-2 are formed in the side edges of the platform for fastening straps or ropes that may be used to fasten any object being transported by the transportable system.

Specification of Second Transportable System Equipped with Load-Bearing Transport Ball Constructions of the Present Invention Mounted within the Corners of the Platform FIG. 47A shows a second transportable system 60' having trapezoidal platform 601' of rigid construction, with three corners and built-in grab handles 603. Each platform corner has a load-bearing transportation ball construction 10-1, 10-2, 10-3, top-mounted through its top surface, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.).

FIG. 47B shows the second transportable system, 60' of FIG. 47A, carrying and transporting a heavy cylindrical beer keg or barrel across a lawn surface. A hinged handle 602 is attached to the platform, for easy pulling of the platform across ground, sandy and lawn surfaces. Apertures 603-1 and 603-2 are formed in the side edges of the platform for fastening straps or ropes that may be used to fasten any object being transported by the transportable system.

Specification of Third Transportable System Equipped with Load-Bearing Transport Ball Constructions of the Present Invention Mounted within the Corners of the Platform FIG. 48A shows a third transportable system 61 having trapezoidal platform of rigid construction 611, with four corners and integrated grab handles 603. Each platform corner has a load-bearing transportation ball construction 10-1, through 10-4, edge-mounted to its side surface, defining a plane of load-bearing support for carrying a load (e.g. such as barrel, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.).

FIG. 48B shows the third trapezoidal transportable platform of FIG. 48A, carrying and transporting a heavy object, such as barbeque gas grill 63, across a lawn surface. A hinged handle 602 is attached to the platform, for easy pulling of the platform across ground, sandy and lawn surfaces. Apertures 603-1 and 603-2 are formed in the side edges of the platform for fastening straps or ropes that may be used to fasten any object being transported by the transportable system.

Specification of Fourth Transportable System Equipped with Load-Bearing Transport Ball Constructions of the Present Invention Mounted within the Corners of the Platform FIG. 49A shows a fourth transportable system 61' having trapezoidal platform of rigid construction 611', with four corners and integrated grab handles 603. Each platform corner has a load-bearing transportation ball construction 10-1 through 10-4, top-mounted through its top surface as shown, defining a plane of load-bearing support for carrying a load (e.g. such as an ice chest, container, vessel, tools, or other objects) to be transported across ground surfaces that may be smooth and hard (e.g. concrete, asphalt, wooden, etc.) as well as rough and soft (e.g. lawns, dirt paths, and sandy ground surfaces such as beaches, etc.).

FIG. 49B shows the fourth transportable system 61' of FIG. 49A, carrying and transporting a heavy object, such as a full ice chest, across a lawn surface. A hinged handle 602 is attached to the platform, for easy pulling of the platform across ground, sandy and lawn surfaces. Apertures 603-1 and 603-2 are formed in the side edges of the platform for fastening straps or ropes that may be used to fasten any object being transported by the transportable system.

Specification of the Battery-Powered Remotely-Controlled (RC) Transportable System Equipped with any Arrangement of Multiple Load-Bearing Transport Ball Constructions of the Present Invention Mounted within a Framework Supporting Trailer Hitching Apparatus Referring to FIGS. 50A and 50C, there is shown another alternative embodiment of the present invention in the form of a battery-powered remotely-controlled (RC) transportable system 70 equipped with an arrangement of multiple load-bearing transport ball constructions of the present invention 40-1, 40-2, and 40-3, mounted within a framework or chassis 701 and integrated within a computer-based control system, supported by battery power storage module and control electronics 725 for supporting trailer hitching apparatus 8 and its various jacking, transport and navigation functions described hereinabove, in connection with a trailer 53.

As shown, the battery-powered remotely-controlled (RC) transport system 49 comprises: f a dual-axle boat trailer 53 operably coupled to a remotely controlled powered (i.e., motorized) transport system 70 being controlled by a human operator remotely controlling the direction of powered motion of the transport system and hitched trailer via a Bluetooth wireless connection 500 from a mobile phone 427' equipped with a suitable mobile app 427AA.

As shown, the remote-controlled (RC) powered transport system 70 utilizes a configuration of multiple load-bearing spherical wheel assemblies of the present invention 40-1, 40-2 and 40-3, mounted on a strong chassis 701 for mounting and supporting the spherical wheel assemblies, and preferably supporting a common battery storage cell and control and navigation electronics 725 illustrated in the system diagrams of FIGS. 20 and/or 27, both of which are incorporated herein by reference to this illustrative embodiment. Its jacking post 8 is centrally mounted within the central portion of the chassis 701, with a trailer ball at its top, and may include automated/powered hydraulics or linear motors, to enable the automated raising and lowering of the hitching post 8 as required to couple up with its target trailer 53. Preferably, this function will be remotely controlled using the mobile app 427AA along with trailer transport and navigation function of the present invention, disclosed herein.

In FIG. 50B, the system 70 is shown arranged and hitched to a trailer 53, or other recreational or work vehicle, is being remotely controlled by a user using a mobile phone 427' running associated mobile app 427AA configured for supporting navigation, (optionally jacking) and transport functions in accordance with the principles of the present invention, on a ground surface 90 that may be hard (e.g., concrete, asphalt, wooden, etc.) as well as rough and soft (e.g. lawns, dirt paths, and sandy ground surfaces such as beaches, etc.).

FIG. 50C shows the battery-powered remotely-controlled transport system 70 comprising: a rugged weight/load-bearing frame/chassis 701 supported and driven by three battery-motor powered spherical wheel assemblies 40-1, 40-2, and 40-3; a trailer hitch and ball 8; and a battery-powered control and communications unit 725 electrically connected to and driving the electric-drive motors 407 employed in the powered spherical wheel assemblies 40, adapted for pulling and transporting (i.e. trucking) a trailer 53 equipped with a coupler, without the use of a traditional motor vehicle.

As shown, the system 70 supports all of the automated navigation and transport functions of all other power system embodiments described herein using a single powered spherical wheel assembly of the present invention, but just performs such function using a cluster of spherical wheel assemblies to support great trailer loads and great pulling power required by the application at hand. Powered spherical wheel clusters, comprising two, three, four or more powered spherical wheel assemblies of the present invention, may be configured and deployed about any kind of framework structure such as 701, to suit and support the trailer trucking and transport application at hand. The chassis framework 70, made from welded metal materials, or composite materials having high strength for the application at hand, may be realized as a standalone unit as shown in FIG. 50C, or the chassis framework 70 may also be mounted to the trailer frame 53 and support both transport and storage modes of configuration and operation, as described in the single battery-powered spherical wheel assembly embodiments of the present invention, specified in great technical detail hereinabove.

It is understood that the battery-powered remotely-controlled transport system 70 may be integrated within the A-type or other frame portion of a trailer framework, and adapted for retraction within the trailer frame or body during the storage mode as taught in FIG. 14A through 14D, and protracted from the trailer body during the transport mode of operation when configured and operation in such a manner.

Also instead of using a mobile phone and mobile app to remotely control the battery-powered remotely-controlled transport system 70, it is understood that the system can be adapted to support the use of an integrated remote control unit such as RC unit 424 shown in FIGS. 18J, 19A and 19B, or RC unit 424' shown in FIG. 22, which may be used to also remotely control the trailer jacking, transport and navigation functions as described in detail herein. Such variations and modifications will readily occur to those skilled in the art having the benefit of the present invention disclosure.

When using multiple spherical wheel assemblies 40 to design, construct and operate a manually powered (i.e. push powered) transport system, a mechanically-powered transport system (e.g. using a gear-drive mechanism driven battery-powered motor or drill) or a battery-powered motor driven transport system, the RC function can be provided and offer great benefits and advantages to the user in terms of convenience and safety. Such multi-spherical wheel supported transport systems 70 and variations thereof, can also provide interconnected and in communication with the cloud-based servers and services illustrated in FIGS. 26A, 27, 30A, and 36, to provide GPS-guided navigation capabilities to system 70, as well as LIDAR-based environmental awareness.

In general, the system networks described in FIGS. 26A, 27, 30A, and 36, and which are used to practice the various embodiments of the present invention disclosure herein, comprise various system components, including: a cellular phone and SMS messaging systems; and one or more industrial-strength data centers, preferably mirrored with each other and running Border Gateway Protocol (BGP) between its router gateways, in a manner well known in the data center art. In FIGS. 26A, 27, 30A, and 36, and other illustrative embodiments, each data center typically comprises: a cluster of communication servers for supporting http and other TCP/IP based communication protocols on the Internet; cluster of application servers; a cluster of email processing servers; cluster of SMS servers; and a cluster of RDBMS servers configured within an distributed file storage and retrieval ecosystem/system, and interfaced around the TCP/IP infrastructure of the Internet well known in the art. For details regarding such system engineering considerations and requirements, reference should be made to US Patent Application Publication No. 20160197993, incorporated herein by reference in its entirety as if set forth fully herein.

As shown, the system network architecture also comprises: a plurality of Web-enabled mobile client machines 427 (e.g. mobile computers such as iPad, and other Internet-enabled computing devices with graphics display capabilities, etc.) running native mobile applications 427AA and mobile web browser applications supported modules supporting client-side and server-side processes on the system network of the present invention; and numerous media servers (e.g. Google, Facebook, NOAA, etc.) operably connected to the infrastructure of the Internet. The network of mobile computing systems will run enterprise-level mobile application software, operably connected to the TCP/IP infrastructure of the Internet. Each mobile computing system is provided with GPS-tracking and having wireless internet connectivity with the TCP/IP infrastructure of the Internet, using various communication technologies (e.g. GSM, Bluetooth and other wireless networking protocols well known in the wireless communications arts).

In general, regardless of the method of implementation employed, the system network of the present invention will be in almost all instances, realized upon an industrial-strength, carrier-class Internet-based network of object-oriented system design. Also, the system network will be deployed over a global data packet-switched communication network comprising numerous computing systems and networking components, as shown. As such, the information networks of the present invention is often referred to herein as the "system" or "system network".

Preferably, although not necessary, the system network of the present invention would be designed according to object-oriented systems engineering (OOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application described above. Such practices are well known in the computer programming, networking and digital communication arts.

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present disclosure.

For example, in alternative embodiments of the present invention described hereinabove, the system can be used for a wide variety of transport applications while not illustrated, will readily occur to those skilled in the art having the benefit of the present invention disclosure. Such alternative applications and/or system configurations will depend on particular end-user application requirements, and target markets for products and services.

These and all other such modifications and variations are deemed to be within the scope and spirit of the present invention as defined by the accompanying Claims to Invention.

What is claimed is:

1. A trailer transport system for mounting to a trailer that can be coupled to a motor-driven vehicle, said trailer transport system comprising:
a semispherical framework having an interior volume contained by the boundaries of the semispherical framework;
a set of bearing surfaces provided within the interior volume of said semispherical framework;
a load-bearing transport ball installed within the interior volume of said semispherical framework, and supported by the bearing surfaces provided therein, and allowing said load-bearing transport ball to rotate freely within said semispherical framework, as defined by the bearing surfaces; and
a support mechanism for supporting said semispherical framework in a transport configuration during transport operations, and also in a storage configuration during storage operations;
wherein said load-bearing transport ball is able to roll freely in all directions within said semispherical framework when said load-bearing transport ball contacts the ground surface and enables rollable transport of the trailer;
wherein the bearing surfaces comprise a set of ball-bearing pads mounted within the interior volume of said semispherical framework; and
wherein each said ball-bearing pad comprises a plurality of spring-biased ball bearings that are mounted on a mounting plate having a surface curvature that approximates a portion of a spherical object.

2. The trailer transport system of claim 1,
a jack assembly mounting mechanism integrated with an extendable jacking post member mounted to said semispherical framework; and
a user-operated mechanism integrated within the extendable jacking post member allowing the jacking post member to elongate, and setting said load-bearing transport ball on a ground surface during said transport configuration.

3. The trailer transport system of claim 2, wherein the extendable jacking post member comprises a telescopically-extending jacking post member having a free end fixedly mounted to said semispherical framework.

4. The trailer transport system of claim 1, wherein said support mechanism comprises
a jack assembly mounting mechanism integrated with an extendable jacking post member mounted to said semispherical framework; and
a user-operated mechanism integrated within the extendable jacking post member allowing the jacking post member to elongate, and setting said load-bearing transport ball on a ground surface during said transport mode.

5. The trailer transport system of claim 4, wherein said extendable jacking post member comprises a telescopically-extending jacking post member having a free end fixedly mounted to said semispherical framework.

6. The trailer transport system of claim 4, wherein said user-operated mechanism comprises: a hand-cranked jack handle integrated within said telescopically-extending jacking post member allowing the post member to elongate in response to certain rotation of the hand-cranked jack handle, and setting said load-bearing transport ball on a ground surface.

7. The trailer transport system of claim 4, wherein said user-operated mechanism comprises a hand-operated electronic device for sending signals to an electrically-driven motor configured to automatically elongate said extendible jacking post member along its axis and enable jacking operating of the trailer jack and transport system.

8. The trailer transport system of claim 4, wherein said semispherical framework has a substantially closed semispherical dome-like structure to which said extendible jacking post member is fixedly attached, and in which said load-bearing transport ball is rotatably mounted and supported on the bearing surfaces provided within the interior volume of said semispherical framework.

9. The trailer transport system of claim 4, wherein said semispherical framework has a substantially open semispherical dome-like structure to which said extendible jacking post member is fixedly attached, and in which the load-bearing transport ball is rotatably mounted and supported on the bearing surfaces provided within the interior volume of said semispherical framework.

10. The trailer transport system of claim 4, wherein a retainer mechanism is mounted to said semispherical framework for securely retaining said load-bearing transport ball rotatably mounted and supported on the bearing surfaces provided within the interior volume of said semispherical framework.

11. The trailer transport system of claim 1, wherein said load-bearing transport ball comprises a hollow interior volume occupied by an inert gas.

12. The trailer transport system of claim 1, wherein said load-bearing transport ball comprises a solid interior volume occupied by a solid mass material.

13. The trailer transport system of claim 1, which further comprises a transport ball braking system having mechanically-operated safety-levers to arrange for non-braking and braking modes of operation; wherein when configured in the non-braking mode of operation, a set of braking shoes are disengaged from said load-bearing transport ball allowing the transport ball to roll freely within said semispherical framework, and wherein when configured in the braking mode of operation, the set of braking shoes are engaged with said load-bearing transport ball, restricting said load-bearing transport ball from rolling freely within said semispherical framework.

14. A trailer transport system for mounting to a trailer that can be coupled to a motor-driven vehicle, said trailer transport system comprising:
a semispherical framework having an interior volume contained by the boundaries of the semispherical framework;
a set of bearing surfaces provided within the interior volume of the semispherical framework;
a load-bearing transport ball installed within the interior volume of the semispherical framework, and supported by the bearing surfaces provided therein, and allowing said load-bearing transport ball to rotate freely within said semispherical framework, as defined by the bearing surfaces; and
a support mechanism for supporting said semispherical framework in a transport configuration during transport operations, and also in a storage configuration during storage operations;
wherein the load-bearing transport ball is free to roll freely in all directions within said semispherical framework when said load-bearing transport ball contacts the ground surface and enables rollable transport of the trailer; and
wherein the bearing surfaces comprise a plurality of spring-biased ball bearings that are mounted between a set of mounting plates having a surface curvature that approximates a portion of a spherical object.

15. The trailer transport system of claim 14, which further comprises an extendable jacking post member having a free end fixedly mounted to said semispherical framework.

16. The trailer transport system of claim 14, which further comprises a transport ball braking system having mechanically-operated safety-levers to arrange for non-braking and braking modes of operation; wherein when configured in the non-braking mode of operation, a set of braking shoes are disengaged from said load-bearing transport ball allowing the transport ball to roll freely within said semispherical framework, and wherein when configured in the braking mode of operation, the set of braking shoes are engaged with said load-bearing transport ball, restricting said load-bearing transport ball to roll from rolling freely within said semispherical framework.

17. The trailer transport system of claim 14, wherein said support mechanism comprises
a jack assembly mounting mechanism integrated with an extendable jacking post member mounted to said semispherical framework; and
a user-operated mechanism integrated within the extendable jacking post member allowing the jacking post member to elongate, and setting said load-bearing transport ball on a ground surface during said transport mode.

18. The trailer transport system of claim 17, wherein the said extendable jacking post member comprises a telescopically-extending jacking post member having a free end fixedly mounted to said semispherical framework.

19. The trailer transport system of claim 17, wherein said user-operated mechanism comprises: a hand-cranked jack handle integrated within said extendable jacking post member allowing the post member to elongate in response to certain rotation of the hand-cranked jack handle, and setting said load-bearing transport ball on a ground surface.

20. The trailer transport system of claim 17, wherein said user-operated mechanism comprises a hand-operated electronic device for sending signals to an electrically-driven motor configured to automatically elongate said extendible jacking post member along its axis and enable the jacking operation of the trailer jack and transport system.

21. The trailer transport system of claim 17, wherein said semispherical framework has a substantially closed semispherical dome-like structure to which said extendible jacking post member is fixedly attached, and in which the load-bearing transport ball is rotatably mounted and supported on the bearing surfaces provided within the interior volume of the semispherical framework.

22. The trailer transport system of claim 17, wherein said semispherical framework has a substantially open semispherical dome-like structure to which said extendible jacking post member is fixedly attached, and in which said load-bearing transport ball is rotatably mounted and supported on the bearing surfaces provided within the interior volume of said semispherical framework.

23. The trailer transport system of claim 17, wherein said jack assembly mounting mechanism comprises a telescoping rotational mounting mechanism that elongates in a direction orthogonal to the longitudinal extent of an extendible jacking post member, when the extendible jacking post member is rotated through 90 degrees of rotation so as to allow said semispherical framework to have dimensions larger than said extendible jacking post member and be accommodated when arranged in a storage configuration.

24. The trailer transport system of claim 14, wherein a retainer mechanism is mounted to said semispherical framework for securely retaining the load-bearing transport ball rotatably mounted and supported on the bearing surfaces provided within the interior volume of said semispherical framework.

25. The trailer transport system of claim 14, wherein said load-bearing transport ball comprises a hollow interior volume occupied by an inert gas.

26. The trailer transport system of claim 14, wherein said load-bearing transport ball comprises a solid interior volume occupied by a solid mass material.

27. A trailer transport system for mounting to a trailer that can be coupled to a motor-driven vehicle, said trailer transport system comprising:
   a semispherical framework having an interior volume contained by the boundaries of the semispherical framework;
   a set of bearing surfaces provided within the interior volume of said semispherical framework;
   a load-bearing transport ball installed within the interior volume of said semispherical framework, and supported by the bearing surfaces provided therein, and allowing said load-bearing transport ball to rotate freely within said semispherical framework, as defined by the bearing surfaces; and
   a support mechanism for supporting said semispherical framework in a transport configuration during transport operations, and also in a storage configuration during storage operations;
   wherein said load-bearing transport ball is free to roll freely in all directions within said semispherical framework when said load-bearing transport ball contacts the ground surface and enables rollable transport of the trailer; and
   wherein a brushing mechanism is mounted about the bearing pads said bearing surfaces for brushing loose debris from the surfaces of said load-bearing transport ball while rotating and supported on the bearing surfaces provided within the interior volume of said semispherical framework.

28. A trailer transport system for mounting to a trailer that can be coupled to a motor-driven vehicle, said trailer transport system comprising:
   a semispherical framework having an interior volume contained by the boundaries of said semispherical framework;
   a set of bearing surfaces provided within the interior volume of said semispherical framework;
   a load-bearing transport ball installed within the interior volume of said semispherical framework, and supported by the bearing surfaces provided therein, and allowing said load-bearing transport ball to rotate freely within said semispherical framework, as defined by the bearing surfaces; and
   a support mechanism for supporting said semispherical framework in a transport configuration during transport operations, and also in a storage configuration during storage operations;
   wherein said load-bearing transport ball is free to roll freely in all directions within said semispherical framework when said load-bearing transport ball contacts the ground surface and enables rollable transport of the trailer; and
   wherein said load-bearing transport ball comprises a rigid spherical structure capable of withstanding a predetermined weight-bearing load, and coated with a surface texture providing a threading surface for channeling water and preventing slippage and sliding while rolling on the ground surface.

29. A trailer transport system for mounting to a trailer that can be coupled to a motor-driven vehicle, said trailer transport system comprising:
   a semispherical framework having an interior volume contained by the boundaries of said semispherical framework;
   a set of bearing surfaces provided within the interior volume of said semispherical framework;
   a load-bearing transport ball installed within the interior volume of said semispherical framework, and supported by the bearing surfaces provided therein, and allowing said load-bearing transport ball to rotate freely within said semispherical framework, as defined by the bearing surfaces; and
   a support mechanism for supporting said semispherical framework in a transport configuration during transport operations, and also in a storage configuration during storage operations;
   wherein the load-bearing transport ball is enabled to roll freely in all directions within said semispherical framework when said load-bearing transport ball contacts the ground surface and enables rollable transport of said trailer; and
   wherein said jack assembly mounting mechanism comprises an angulated joint that allows an elongated jacking post member to rotate away from said trailer when rotated towards a storage configuration, wherein the load-bearing transport ball, supported within said semispherical framework, is allowed to store be stored alongside said trailer.

30. A trailer transport system for mounting to a trailer that can be coupled to a motor-driven vehicle, said trailer transport system comprising:
   a semispherical framework having an interior volume contained by the boundaries of said semispherical framework;
   a set of bearing surfaces provided within the interior volume of said semispherical framework;
   a load-bearing transport ball installed within the interior volume of said semispherical framework, and supported by the bearing surfaces provided therein, and allowing said load-bearing transport ball to rotate freely within said semispherical framework, as defined by the bearing surfaces; and
   a support mechanism for supporting said semispherical framework in a transport configuration during transport operations, and also in a storage configuration during storage operations;
   wherein said load-bearing transport ball is free to roll freely in all directions within said semispherical framework when said load-bearing transport ball contacts the ground surface and enables rollable transport of said trailer;
   wherein a set of electrically-powered motors are mounted relative to said semispherical framework to engage the exterior surface of said load-bearing transport ball, to drive and cause said load-bearing transport ball to rotate in a direction or pathway on the ground surface controlled by a user, to enable the automated transport of said trailer.

31. The trailer jack and transport system of claim 30, wherein a control device supported on an extendible jacking post member is provided to operate and control said set of electrically-powered motors.

32. The trailer transport system of claim 31, wherein said control device is a removable wireless communication device provided for use in operating and controlling said set of electrically-powered motors remotely.

33. The trailer transport system of claim 30, wherein said support mechanism comprises
- a jack assembly mounting mechanism integrated with an extendable jacking post member mounted to said semispherical framework; and
- a user-operated mechanism integrated within said extendable jacking post member allowing the extendable jacking post member to elongate, and setting said load-bearing transport ball on a ground surface during said transport mode.

34. The trailer transport system of claim 33, wherein said extendable jacking post member comprises a telescopically-extending jacking post member having a free end fixedly mounted to said semispherical framework.

35. The trailer transport system of claim 33, wherein said user-operated mechanism comprises: a hand-cranked jack handle integrated within the telescopically-extending jacking post member allowing the post member to elongate in response to certain rotation of the hand-cranked jack handle, and setting said load-bearing transport ball on a ground surface.

36. The trailer transport system of claim 33, wherein said user-operated mechanism comprises a hand-operated electronic device for sending signals to an electrically-driven motor configured to automatically elongate the extendible jacking post member along its axis and enable jacking operating of said trailer jack and transport system.

37. The trailer transport system of claim 33, wherein said semispherical framework has a substantially closed semispherical dome-like structure to which said extendible jacking post member is fixedly attached, and in which said load-bearing transport ball is rotatably mounted and supported on the bearing surfaces provided within the interior volume of said semispherical framework.

38. The trailer transport system of claim 33, wherein said semispherical framework has a substantially open semispherical dome-like structure to which said extendible jacking post member is fixedly attached, and in which the load-bearing transport ball is rotatably mounted and supported on the bearing surfaces provided within the interior volume of said semispherical framework.

39. The trailer transport system of claim 30, wherein a retainer mechanism is mounted to said semispherical framework for securely retaining the load-bearing transport ball rotatably mounted and supported on the bearing surfaces provided within the interior volume of said semispherical framework.

40. The trailer transport system of claim 30, wherein said load-bearing transport ball comprises a hollow interior volume occupied by an inert gas.

41. The trailer transport system of claim 30, wherein said load-bearing transport ball comprises a solid interior volume occupied by a solid mass material.

42. The trailer transport system of claim 30, wherein a brushing mechanism is mounted about the bearing surfaces for brushing loose debris from the surfaces of said load-bearing transport ball while rotating and supported on the bearing surfaces provided within the interior volume of said semispherical framework.

43. The trailer transport system of claim 30, wherein said load-bearing transport ball comprises a rigid spherical structure capable of withstanding a predetermined weight-bearing load, and coated with a surface texture providing a threading surface for channeling water and preventing slippage and sliding while rolling on the ground surface.

* * * * *